(12) United States Patent
Largman et al.

(10) Patent No.: US 7,536,598 B2
(45) Date of Patent: May 19, 2009

(54) COMPUTER SYSTEM CAPABLE OF SUPPORTING A PLURALITY OF INDEPENDENT COMPUTING ENVIRONMENTS

(75) Inventors: Kenneth Largman, San Francisco, CA (US); Anthony B. More, Sebastopol, CA (US); Jeffrey Blair, San Francisco, CA (US)

(73) Assignee: Vir2us, Inc., Sausalito, CA (US)

( * ) Notice: Subject to any disclaimer, the term of this patent is extended or adjusted under 35 U.S.C. 154(b) by 635 days.

(21) Appl. No.: 10/484,051

(22) PCT Filed: Nov. 19, 2002

(86) PCT No.: PCT/US02/37125

§ 371 (c)(1),
(2), (4) Date: Jan. 15, 2004

(87) PCT Pub. No.: WO03/067435

PCT Pub. Date: Aug. 14, 2003

(65) Prior Publication Data

US 2004/0210796 A1    Oct. 21, 2004

Related U.S. Application Data

(60) Provisional application No. 60/393,719, filed on Jul. 3, 2002.

(51) Int. Cl.
*G06F 11/00* (2006.01)
(52) U.S. Cl. .................... 714/36; 714/2; 714/7; 714/13
(58) Field of Classification Search ............... 714/2, 714/7, 13, 19, 20, 23, 36, 38, 6; 713/2, 100; 726/21, 34, 35, 36
See application file for complete search history.

(56) References Cited

U.S. PATENT DOCUMENTS 4,222,033 A * 9/1980 Brown .................. 180/287

(Continued)

FOREIGN PATENT DOCUMENTS

CA    2197502 A1    8/1998

(Continued)

OTHER PUBLICATIONS

Unknown Author, "Bulletin Board," Laptop Magazine, p. 14, Jul. 2001.

(Continued)

*Primary Examiner*—Robert Beausoliel
*Assistant Examiner*—Joseph D Manoskey
(74) *Attorney, Agent, or Firm*—Perkins Coie, LLP

(57) ABSTRACT

A method for a computer repairing itself to an operational status at any time during operation, the method comprising the computer-executed steps of: booting from a first hard disk drive boot device disposed within a main computer hardware box of the computer; then, in response to a signal indicating a need for repair of the computer during the booting or during any operating state, booting from a second hard disk drive boot device also disposed within the main computer hardware box of the computer prior to the signal indicating a need for repair; and then repairing software on the first hard disk drive while booted from the second hard disk drive boot device and selectively either: (i) maintaining operation of the computer from the second boot device to restore operational status of the computer during repairing of the software on the first hard disk device, or (ii) changing to operation of the computer from the second boot device to the first boot device to restore operational status of the computer.

66 Claims, 100 Drawing Sheets

U.S. PATENT DOCUMENTS

| | | | |
|---|---|---|---|
| 4,464,747 A | | 8/1984 | Groudan et al. |
| 4,492,582 A | * | 1/1985 | Chang et al. ............... 434/169 |
| 4,939,694 A | | 7/1990 | Eaton et al. |
| 5,434,562 A | | 7/1995 | Reardon |
| 5,655,069 A | | 8/1997 | Ogawara et al. |
| 5,675,813 A | * | 10/1997 | Holmdahl ................. 713/310 |
| 5,704,031 A | | 12/1997 | Mikami et al. |
| 5,732,268 A | | 3/1998 | Bizzarri |
| 5,737,118 A | | 4/1998 | Sugaya et al. |
| 5,764,878 A | | 6/1998 | Kablanian et al. |
| 5,826,012 A | | 10/1998 | Lettvin |
| 5,841,712 A | | 11/1998 | Wendell et al. |
| 5,859,968 A | * | 1/1999 | Brown et al. ................. 726/36 |
| 5,860,001 A | | 1/1999 | Cromer et al. |
| 5,894,551 A | | 4/1999 | Huggins et al. |
| 5,920,515 A | | 7/1999 | Shaik et al. |
| 5,969,632 A | | 10/1999 | Diamant et al. |
| 5,974,549 A | | 10/1999 | Golan |
| 6,009,518 A | | 12/1999 | Shiakallis |
| 6,016,553 A | | 1/2000 | Schneider et al. |
| 6,067,618 A | | 5/2000 | Weber |
| 6,088,794 A | | 7/2000 | Yoon et al. |
| 6,178,452 B1 | | 1/2001 | Miyamoto |
| 6,199,178 B1 | | 3/2001 | Schneider et al. |
| 6,202,153 B1 | | 3/2001 | Diamant et al. |
| 6,205,527 B1 | | 3/2001 | Goshey et al. |
| 6,268,789 B1 | | 7/2001 | Diamant et al. |
| 6,289,426 B1 | | 9/2001 | Maffezzoni et al. |
| 6,301,657 B1 | | 10/2001 | Jones et al. |
| 6,317,845 B1 | | 11/2001 | Meyer et al. |
| 6,327,653 B1 | | 12/2001 | Lee |
| 6,347,375 B1 | | 2/2002 | Reinert et al. |
| 6,367,042 B1 | | 4/2002 | Phan et al. |
| 6,374,366 B1 | | 4/2002 | Maffezzoni |
| 6,381,694 B1 | | 4/2002 | Yen |
| 6,421,792 B1 | | 7/2002 | Cromer et al. |
| 6,457,069 B1 | | 9/2002 | Stanley |
| 6,473,811 B1 | * | 10/2002 | Onsen ........................ 710/15 |
| 6,477,629 B1 | | 11/2002 | Goshey et al. |
| 6,577,920 B1 | | 6/2003 | Hypponen et al. |
| 6,640,317 B1 | | 10/2003 | Snow |
| 6,691,230 B1 | | 2/2004 | Bardon |
| 6,697,950 B1 | | 2/2004 | Ko |
| 6,754,818 B1 | | 6/2004 | Lee et al. |
| 6,880,110 B2 | | 4/2005 | Largman et al. |
| 7,096,381 B2 | | 8/2006 | Largman et al. |
| 7,100,075 B2 | | 8/2006 | Largman et al. |
| 7,111,201 B2 | | 9/2006 | Largman et al. |
| 7,137,034 B2 | | 11/2006 | Largman et al. |
| 2002/0004908 A1 | | 1/2002 | Galea |
| 2002/0053044 A1 | | 5/2002 | Gold et al. |
| 2002/0078366 A1 | | 6/2002 | Raice |
| 2002/0087855 A1 | | 7/2002 | Dykes et al. |
| 2002/0095557 A1 | | 7/2002 | Constable et al. |
| 2002/0169998 A1 | | 11/2002 | Largman et al. |
| 2002/0174137 A1 | | 11/2002 | Wolff et al. |
| 2003/0105973 A1 | | 6/2003 | Liang et al. |
| 2004/0083369 A1 | | 4/2004 | Erlingsson et al. |
| 2004/0210796 A1 | | 10/2004 | Largman et al. |
| 2004/0236874 A1 | | 11/2004 | Largman et al. |
| 2004/0255165 A1 | | 12/2004 | Szor |
| 2004/0268361 A1 | | 12/2004 | Schaefer |
| 2005/0010670 A1 | | 1/2005 | Greschler et al. |
| 2005/0060722 A1 | | 3/2005 | Rochette et al. |
| 2005/0149726 A1 | | 7/2005 | Joshi et al. |
| 2006/0020858 A1 | | 1/2006 | Schaefer |
| 2006/0020937 A1 | | 1/2006 | Schaefer |
| 2006/0137013 A1 | | 6/2006 | Lok |
| 2006/0143514 A1 | | 6/2006 | Largman et al. |
| 2006/0272017 A1 | | 11/2006 | Largman et al. |
| 2006/0277433 A1 | | 12/2006 | Largman et al. |

FOREIGN PATENT DOCUMENTS

| | | |
|---|---|---|
| EP | 0 978 785 A1 | 2/2000 |
| WO | WO 95/22794 | 8/1995 |
| WO | WO 95/22794 A1 | 8/1995 |
| WO | WO 01/11449 A1 | 2/2001 |
| WO | WO 02/21274 | 3/2002 |
| WO | WO 02/099642 | 12/2002 |
| WO | WO 03/073208 A2 | 9/2003 |
| WO | WO 03/075158 A2 | 9/2003 |
| WO | WO 03/075158 A3 | 9/2003 |
| WO | WO 03/073208 A3 | 11/2003 |
| WO | WO 03/096169 A2 | 11/2003 |
| WO | WO 03/104954 A2 | 12/2003 |
| WO | WO 2004/012416 A2 | 2/2004 |
| WO | WO 2004/012416 A3 | 2/2004 |
| WO | WO 2005/043360 A1 | 5/2005 |

OTHER PUBLICATIONS

Collection of printouts from GreenBorder website, © 2004-2006 GreenBorder Technologies, Inc., www.greenborder.com, Jan. 27, 2006, 36 pgs.

Whitepaper: iSolation Server v.2, 2005, Avinti, Inc., Lindon, UT, 15 pgs.

"iSolation Server FAQ,"© 2003-2006 Avinti, Inc., www.avinti.com/downloads/isolation-server-faq.html, Jan. 27, 2006, 4 pgs.

Avinti, iSolation Server v.2 Whitepaper, © 2003-2006 Avinti, Inc., www.avinti.com/downloads/isolation-server-whitepaper.html, Jan. 27, 2005, 15 pgs.

Elrad, Tzilla et al., "Developing Secure Applications Through Aspect-Oriented Programming," Nov. 18, 2004, 27.1 Introduction, 27.2 The Domain of Application-Level Security, 27.3 An Experience Report, 27.4 Discussion, 27.5 Related Work, 27.6 Conclusion, Acknowledgements, References, © 2003-2006 Pearson Education, Addison-Wesley Professional, Sample Chapter begins at www.awprofessional.com/articles/article.asp?p=340869&seqNum=1, 29 pgs.

"Server and Domain Isolation Using Ipsec and Group Policy," Mar. 17, 2005, © 2006 Microsoft Corporation, www.Microsoft.com/technet/security/topics/architectureanddesign/ipsec/default.mspx, 4 pgs.

Grizzard, Julian B. et al. "Towards an Approach for Automatically Repairing Compromised Network Systems," Jun. 2004 or later, 4 pgs.

Zeichick, Alan, Isolation and Protection: Intel's LaGrande Vision for Trusted Virtualization, Nov. 22, 2005, www.devx.com/Intel/Article/30008, Jan. 27, 2006, 4 pgs.

Sapuntzakis, Constantine and Monica S. Lam, "Virtual Appliances in the Collective: A Road to Hassle-Free Computing," May 2003 or later, 6 pgs.

Chandra, Ramesh et al., "The Collective: A Cache-Based System Management Architecture," Presented at the $2^{nd}$ Symposium on Networked Systems Design and Implementation, May 2-4, 2005, Boston MA, 14 pgs.

Chow, Jim et al., "Understanding Data Lifetime via Whole System Simulation," Aug. 2003 or later, 16 pgs.

Ruwase, Olatunji and Monica S. Lam, "A Practical Dynamic Buffer Overflow Detector," Jun. 2003 or later, 11 pgs.

Garfinkel, Tal et al., "Ostia: A Delegating Architecture for Secure System Call Interposition," Aug. 2003 or later, 15 pgs.

Sapuntzakis, Constantine et al., "Virtual Appliances for Deploying and Maintaining Software," Jun. 2003 or later, 15 pgs.

Brumley, David and Dan Boneh, "Remote Timing Attacks are Practical," 2003 or later, 13 pgs.

Li Ninghui et al. "Obvious Signature-Based Envelope," PODC'03, Jul. 13-16, 2003, Boston, MA, p. 182-19, © 2003, ACM, 8 pgs.

Garfinkel, Tal et al., "Flexible OS Support and Applications for Trusted Computing," Feb. 2003 or later, 6 pgs.

Garfinkel, Tal and Mendel Rosenblum, "A Virtual Machine Introspection Based Architecture for Intrusion Detection," Dec. 2002 or later, 16 pgs.

Garfinkel, Tal, "Traps and Pitfalls: Practical Problems in System Call Interposition Based Security Tools," Nov. 2002 or later, 14 pgs.

Sapuntzakis, Constantine et al., "Optimizing the Migration of Virtual Computers," Dec. 2002 or newer, 14 pgs.

Garfinkel, Tal et al., "Terra: A Virtual Machine-Based Platform for Trusted Computing," SOSP'03, Oct. 19-22, 2003, Bolton Landing, NY, © 2003 ACM, 14 pgs.

Lam, Monica et al., "The Collective: A Virtual Appliance Computing Infrastructure," http://suif.Stanford.edu/collective/index.html, Jan. 27, 2006, 3 pgs.

Messmer, Ellen, "GreenBorder offers security 'barrier' for IE, Outlook," Mar. 23, 2005, Computerworld, © 2005 Network World, Inc., www.computerworld.com/securitytopics/security/story/0,10801,100579,00.html, Jan. 27, 2006, 4 pgs.

Schmidt, Brian K. et al., "The Interactive Performance of SLIM: a Stateless, Thin-Client Architecture," 17th ACM Symposium on Operating Systems Principles (SOSP'99), Published as *Operating Systems Review*, 34(5):3247, Dec. 1999, SOSP-17, Dec. 1999, Kiawah Island, SC, © 1999 ACM, 16 pgs.

Schmidt, Brian K. et al., "Supporting Ubiquitous Computing with Stateless Consoles and Computation Caches," Aug. 2000, 140 pgs.

Microsoft Corporation Microsoft Windows 95 Resource Kit, 1995, Microsoft Press, pp. 650-651.

The International Search report for PCT application PCT/US06/013343 Search Report dated Nov. 7, 2007.

\* cited by examiner

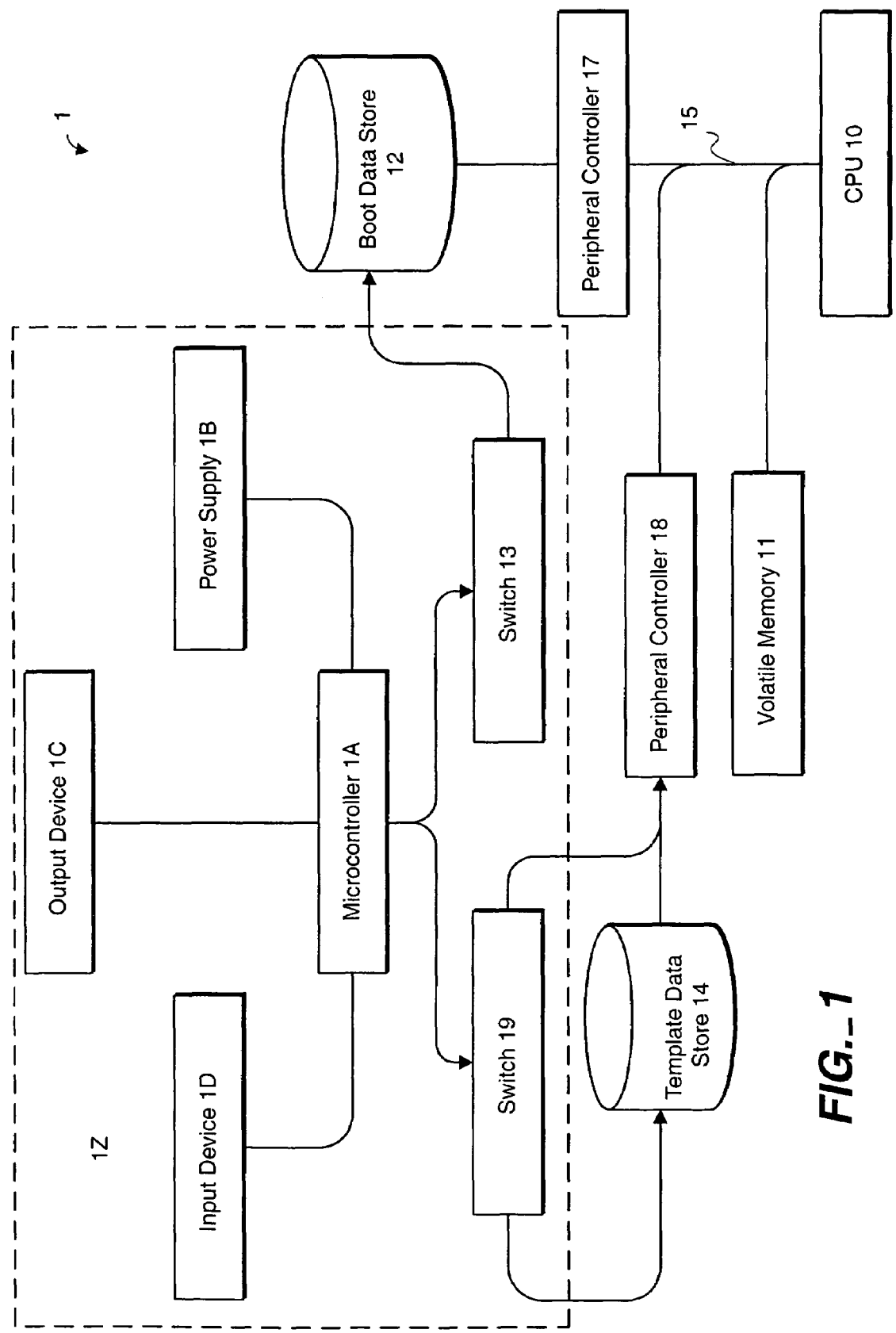
FIG._1

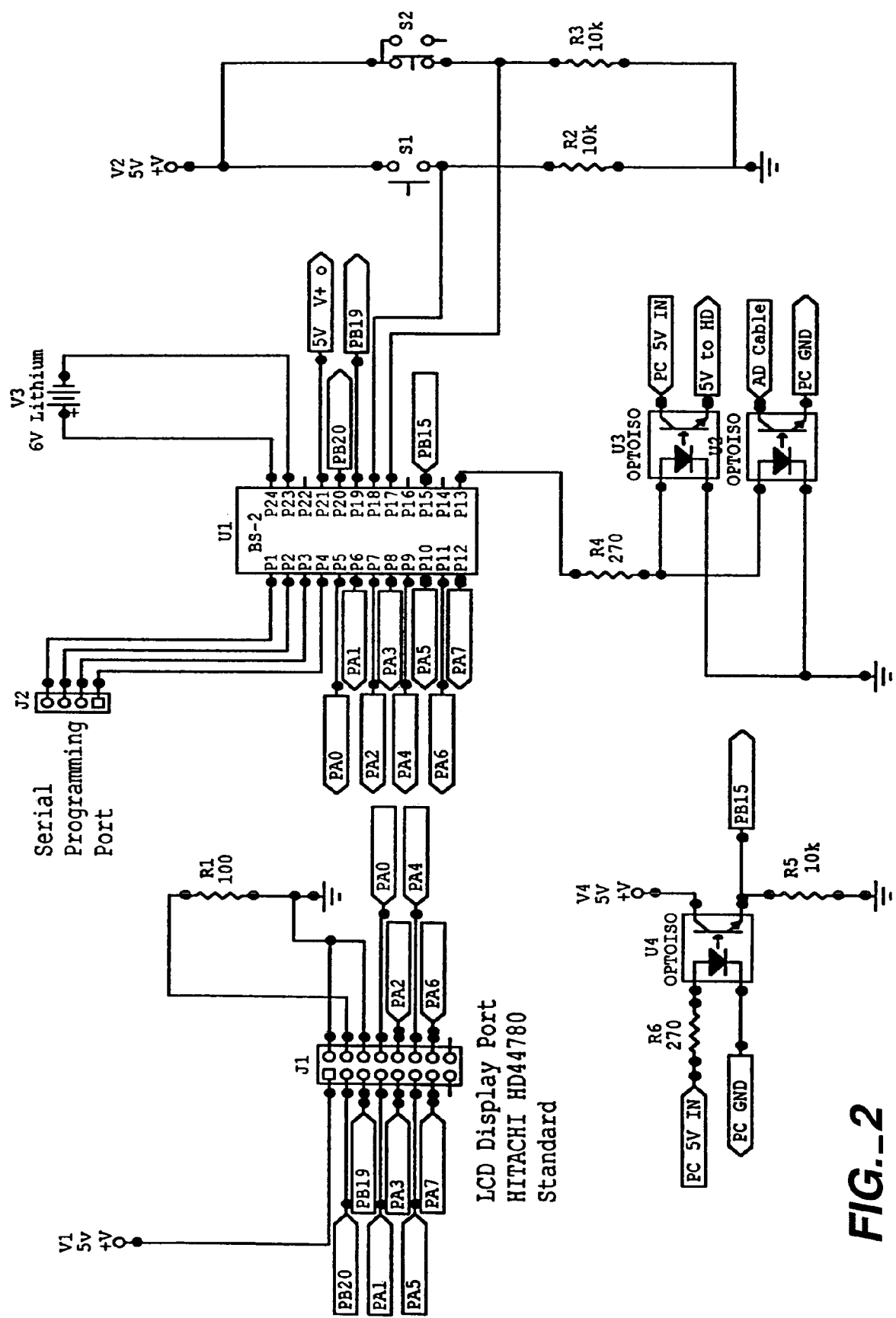
FIG._2

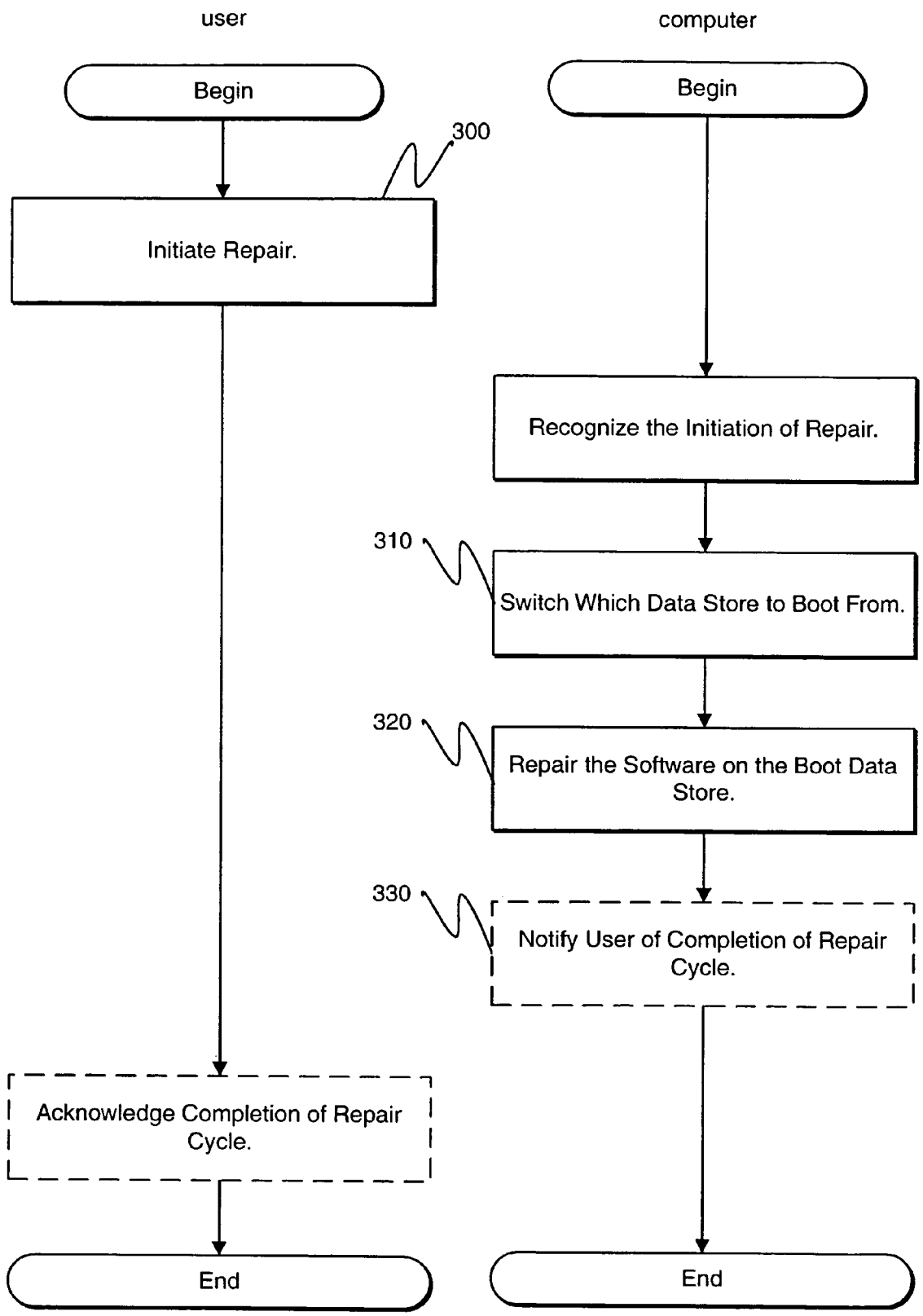

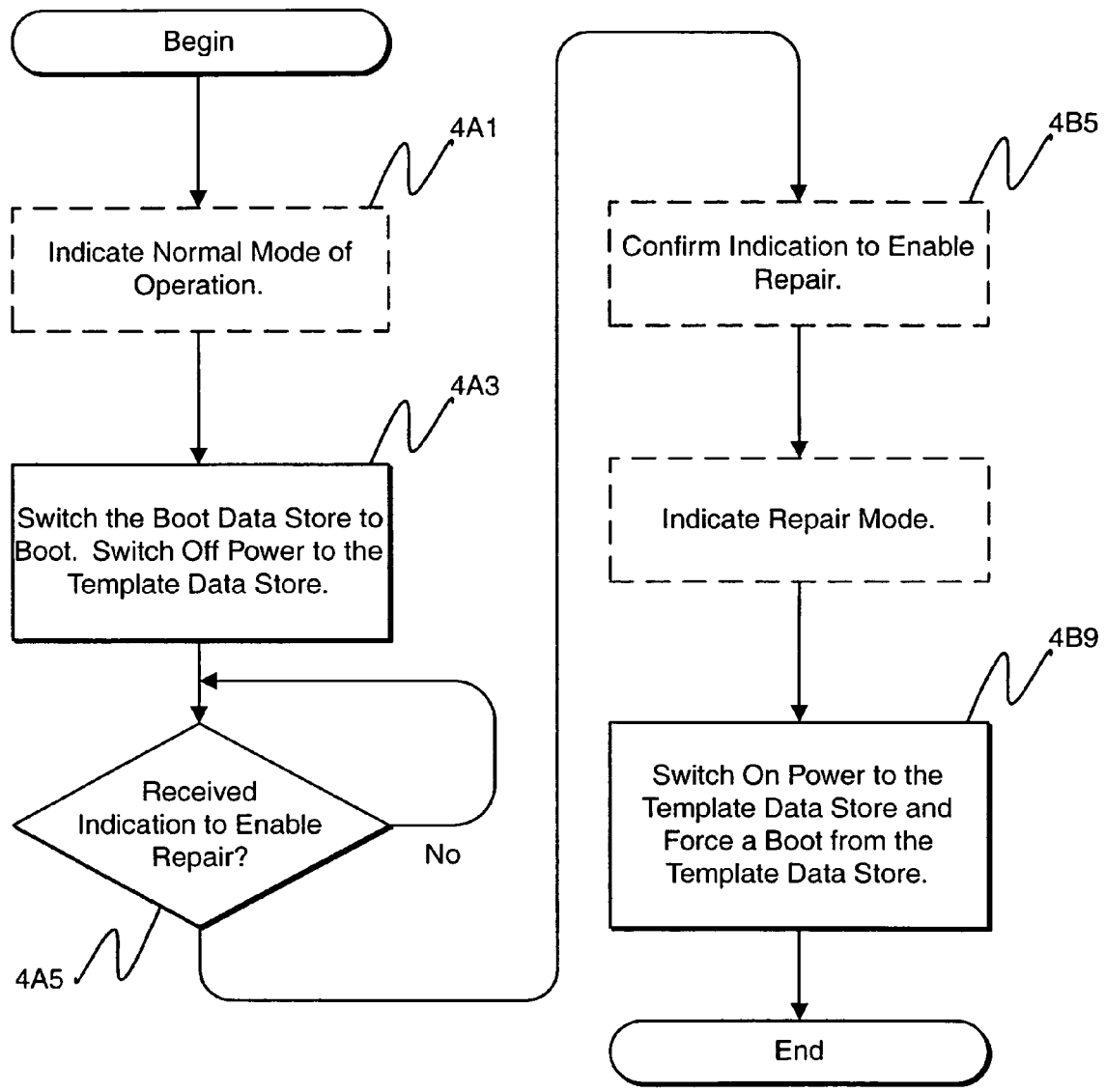
FIG._4

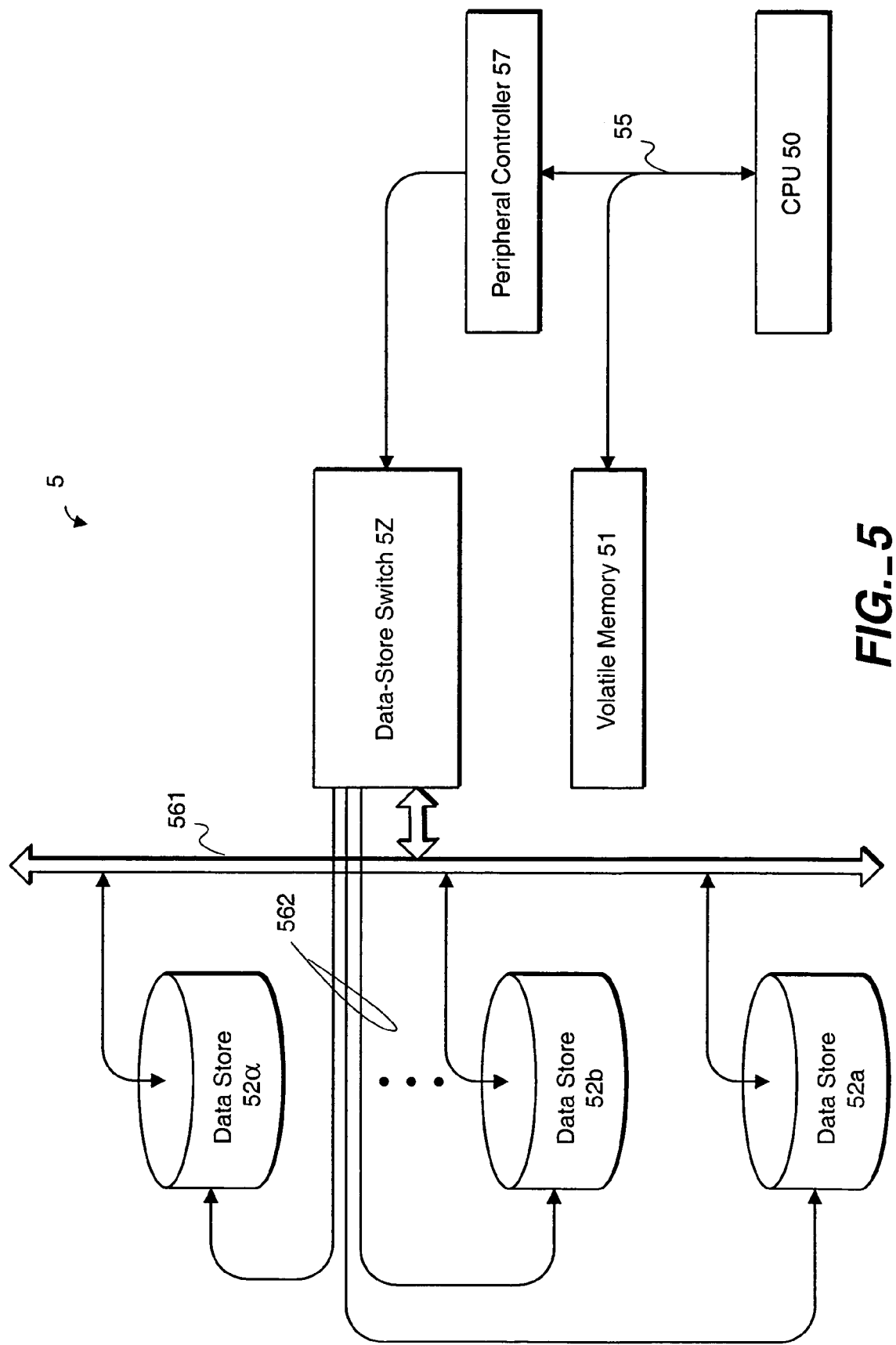
FIG._5

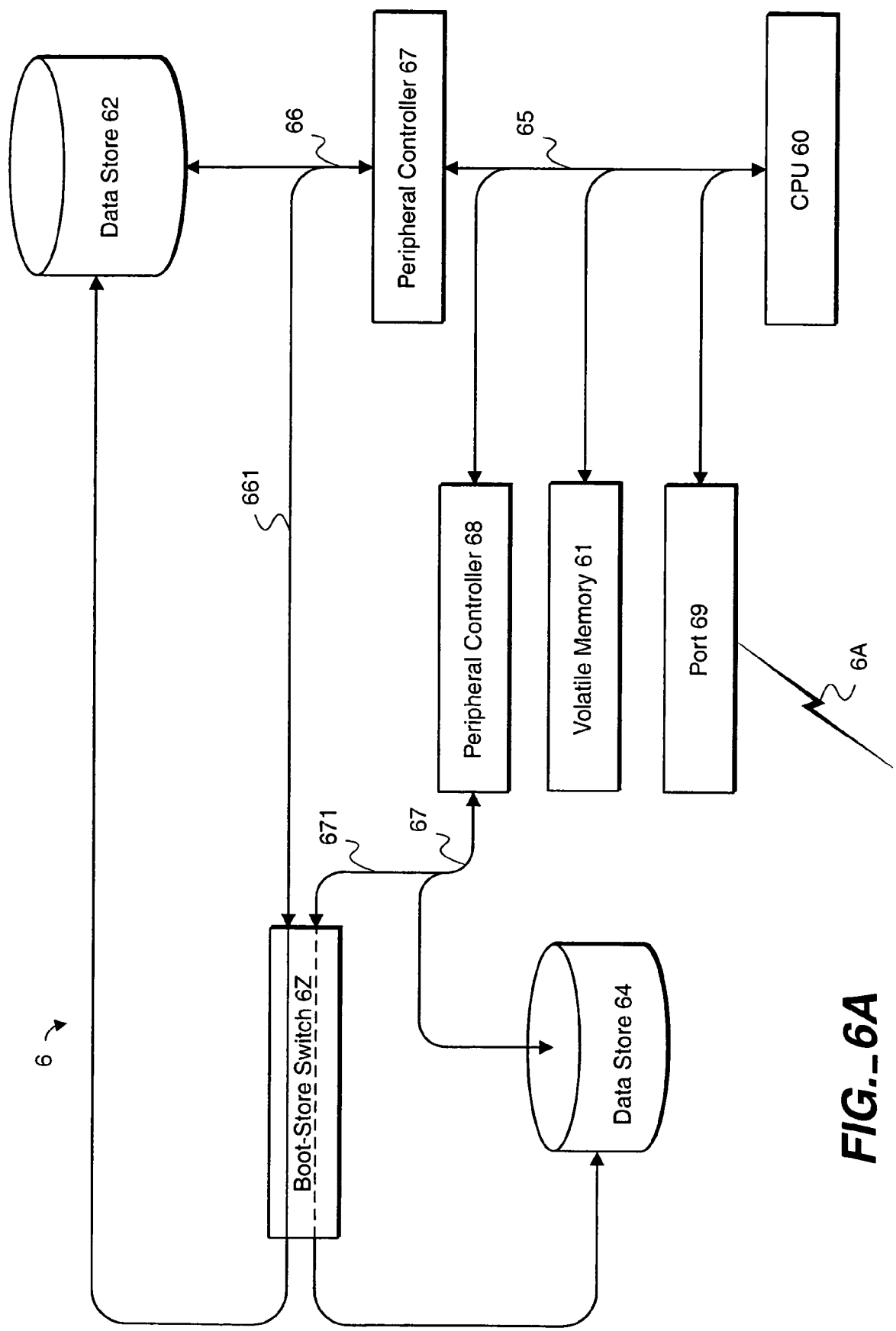
FIG._6A

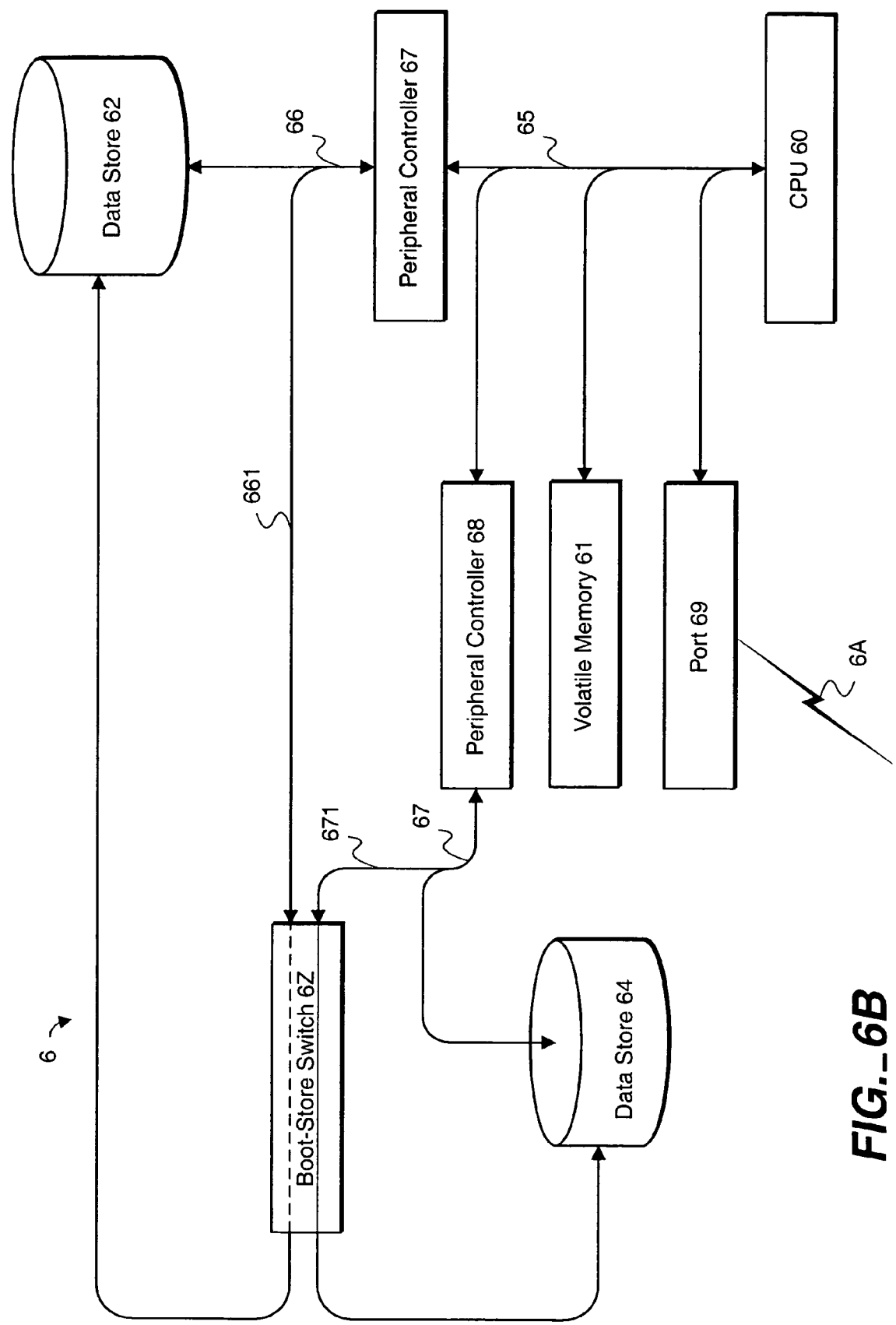
FIG._6B

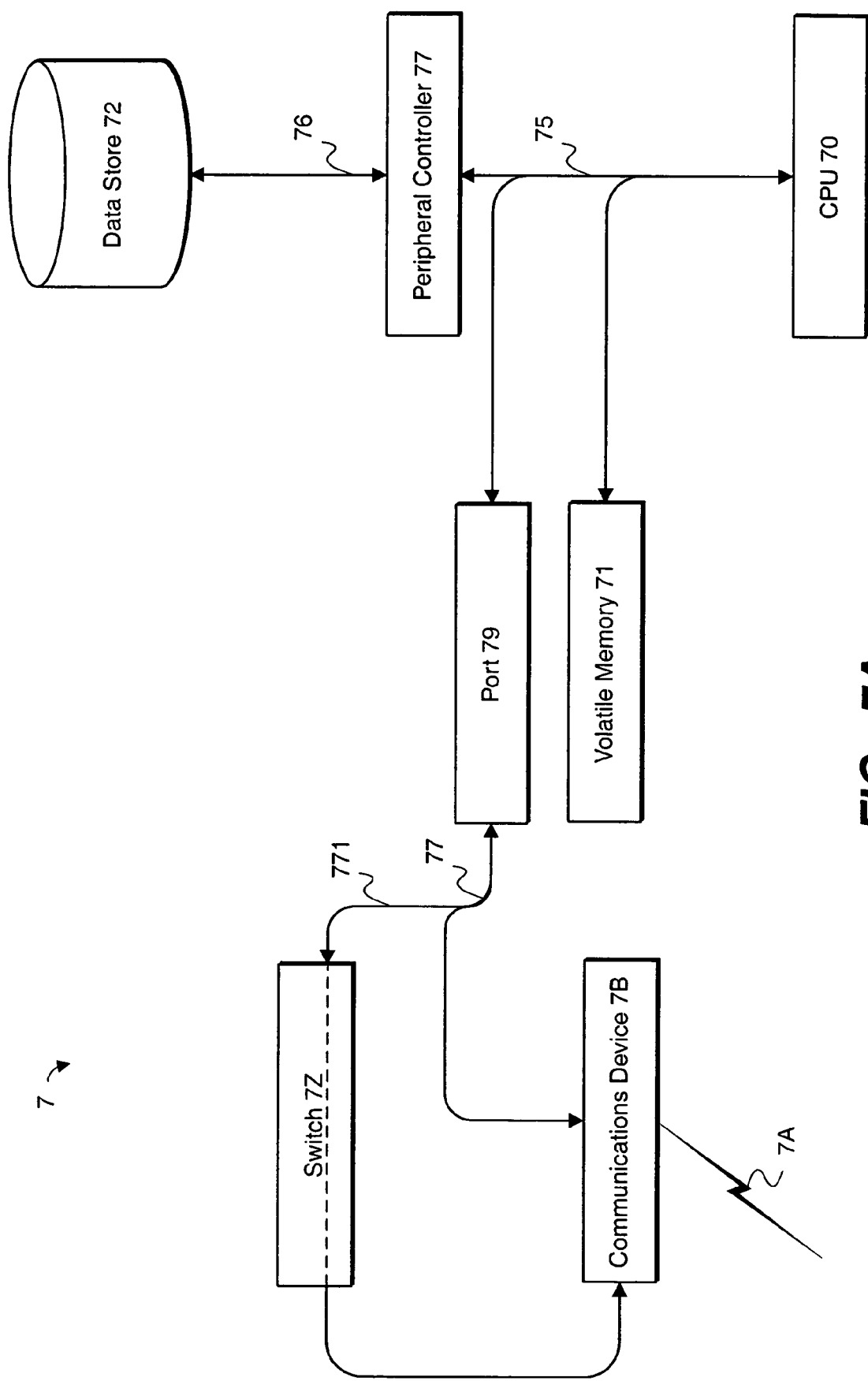
FIG._7A

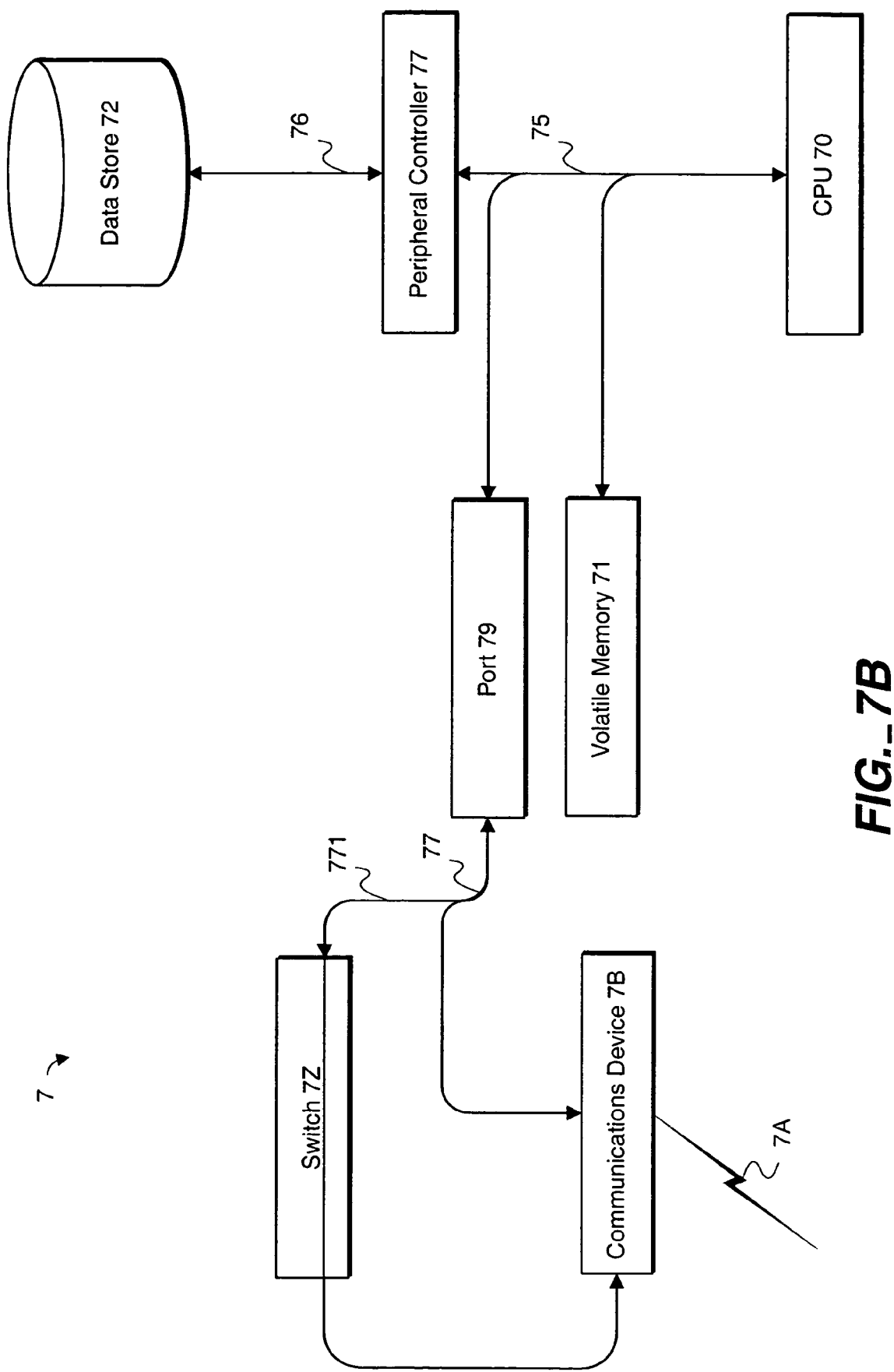
FIG._7B

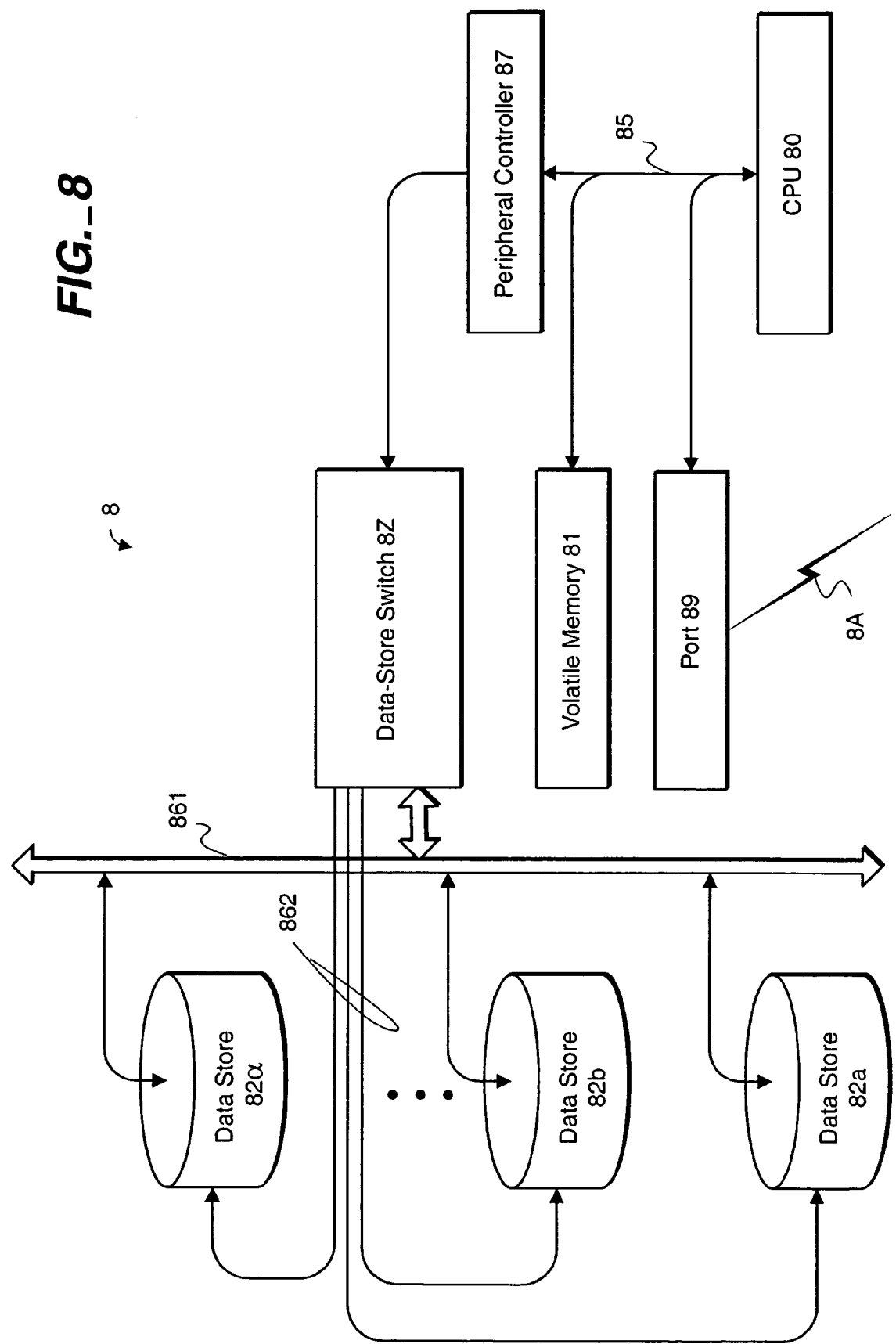
FIG._8

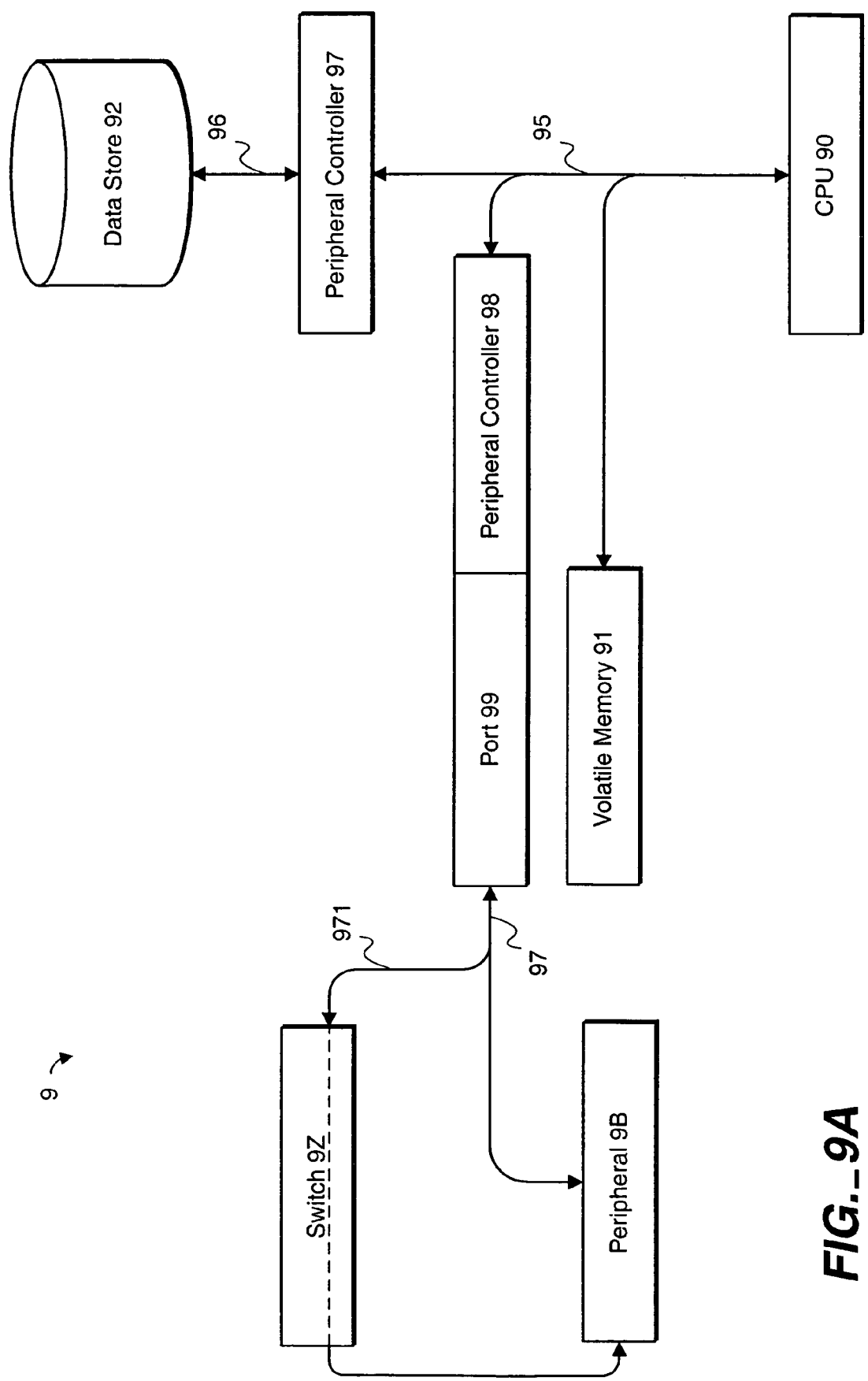
FIG._9A

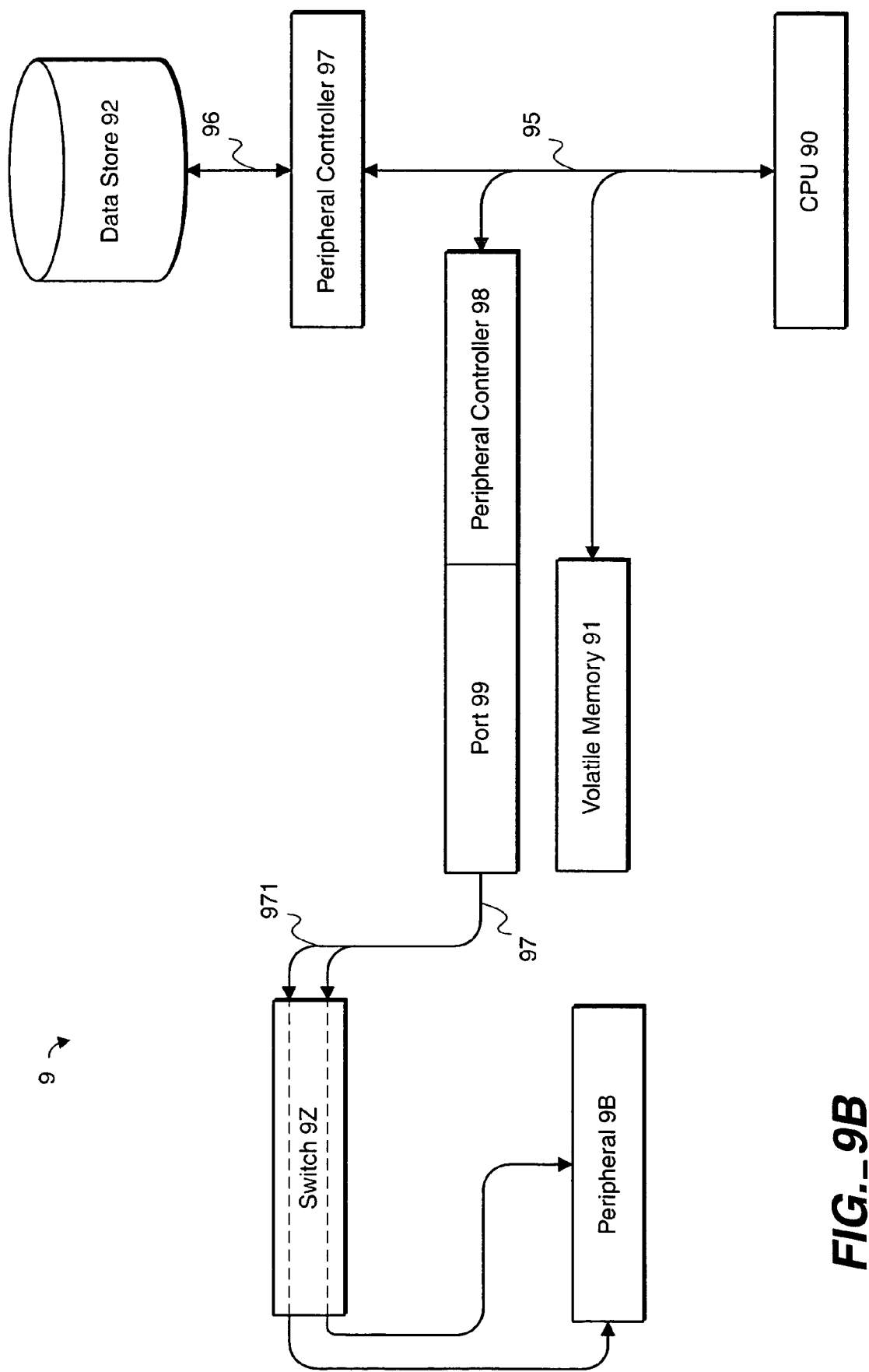
FIG._9B

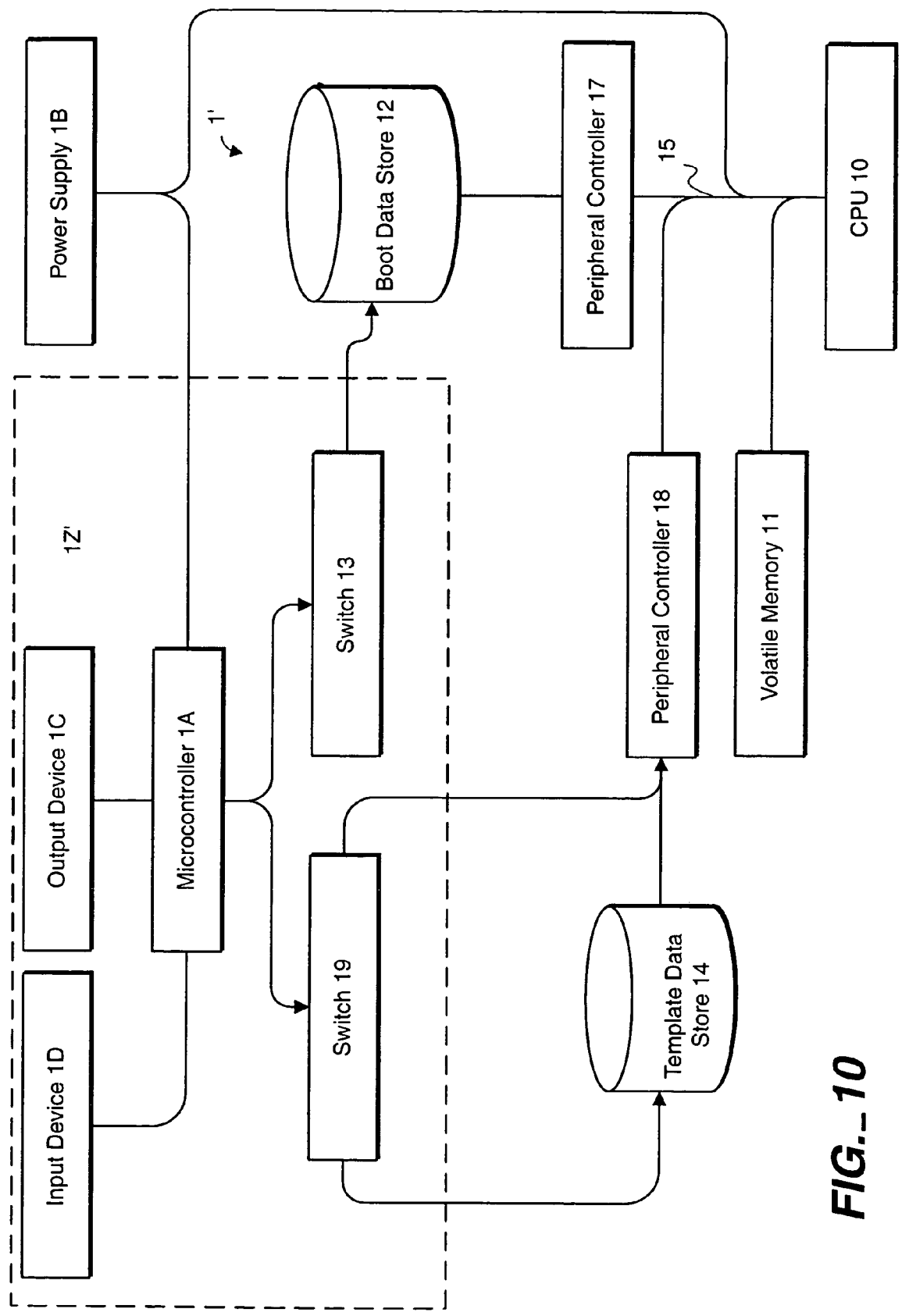
FIG._10

Description of Self-Repairing System:

When power is applied to the system, the micro controller powers up, initializes the LCD prompt screen and the "Ready for Normal Operation" prompt is displayed. At this point the micro controller waits until the single pole single throw switch (S1) is pressed. When S1 is pressed the micro controller prompts the user "Repair Selected".

The position of the slider switch S2 is now stored in memory. Then based on the switch's initial location the user is instructed to slide the switch opposite its initial position to confirm the repair request: "Please slide switch from A->B" or "Please slide switch from B->A".

At this point or any other time (except when a "Repair in Progress"), the user can cancel the repair request by pressing the pushbutton switch, at which point the dialog "Repair Cancelled" is displayed. The system will then return to "Ready for Normal Operation" mode.

If the user wishes to confirm the repair, and moves the slide switch as instructed, the computer will check the power status of the computer. The micro controller reads the logic level of opto-isolator U4. Logic high represents the computer being powered. If the computer is on, the user will be prompted to "Please Shutdown the Computer". The computer then again reads in the logic level of U4.

If the computer has been shut down U4 will output a logic low. After the controller confirms that the computer is off the user is then prompted to restart the computer At this point solid-state relay U3 and opto-isolator U2 are enabled. This ensures that when the computer is restarted the Master hard drive receives power as IDE ID0 and the internal user drive boots with its ID switched to Address 1 (ID1).

When the computer is restarted, U4 outputs logic high to the micro controller. This signal denotes that the computer is powered and prompts the "Repair in Progress" message, which is displayed on the LCD screen. Once the repair process is enabled the micro controller displays this message and executes no other commands until the computer is shutdown (U4 outputs a logic low signal).

When the computer is shutdown by the repair software, the micro controller informs the user that the process is complete with the "Repair Complete" dialog.

The micro controller then enters the "Ready for Normal Operation" mode and waits for a new repair process.

Hardware description:

The microcontroller at the heart of the system is a Basic Stamp II micro controller which controls the repair progress, LCD user interface and also supplies a 5 volt regulated power supply for all the devices in the circuit.

FIG._11A

The optional LCD screen is a 2X16 character LCD based on the industry standard Hitachi HD44780 controller chip.

The solid-state relay, which switches power to the master hard drive, is an International Rectifier PVN012. Any switching device could be used to switch hard drive power.

The other opto-isolators are NEC 2501.

The batteries are quantity 2 – 3 volt 1200ma Lithium batteries connected in series for a 6 volt output. This powers a voltage regulator on the Micro controller, which supplies 5 volts to the rest of the circuit. Any power supply from 5.1 volts to 15 volts can be used.

*FIG._11B*

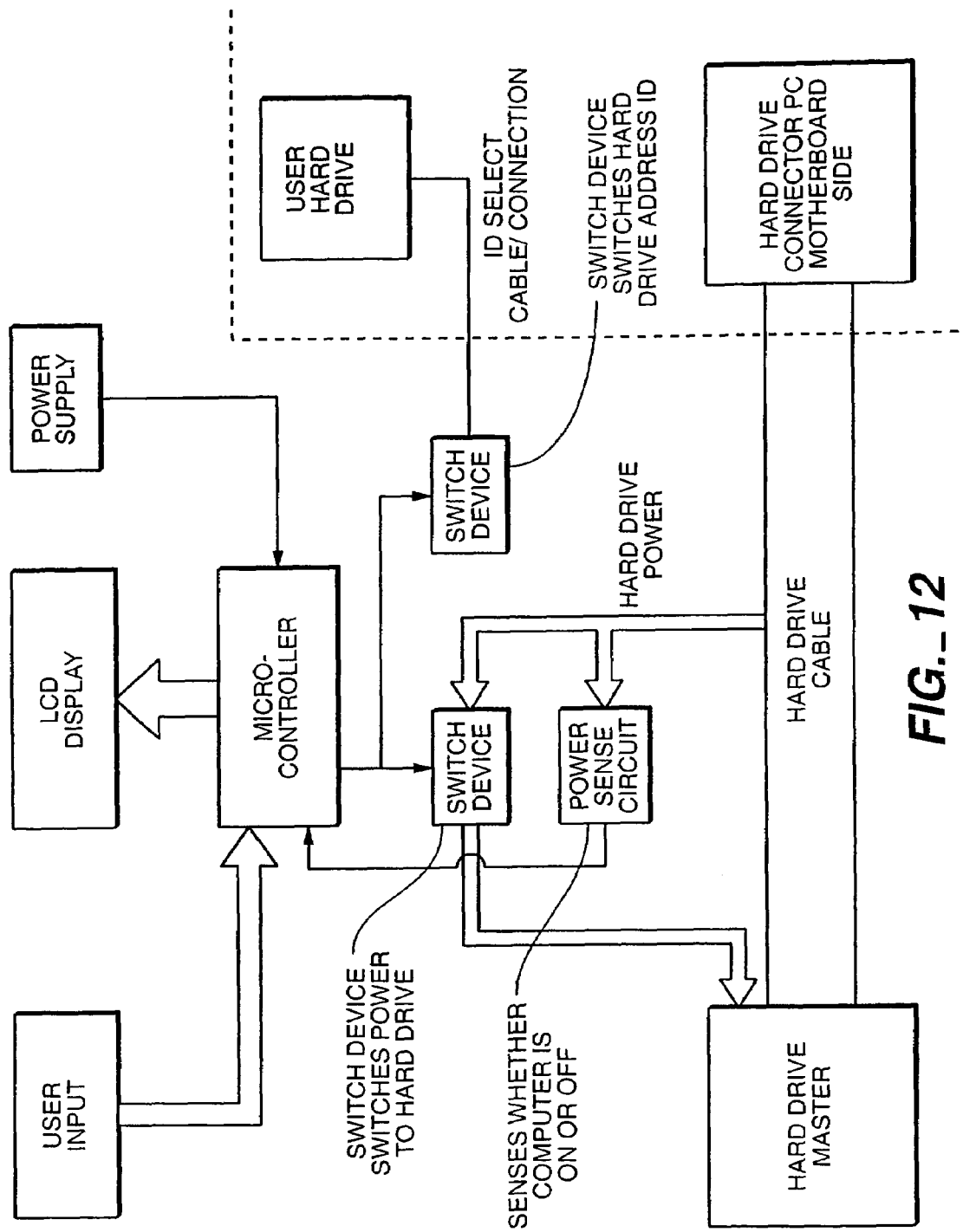
FIG._12

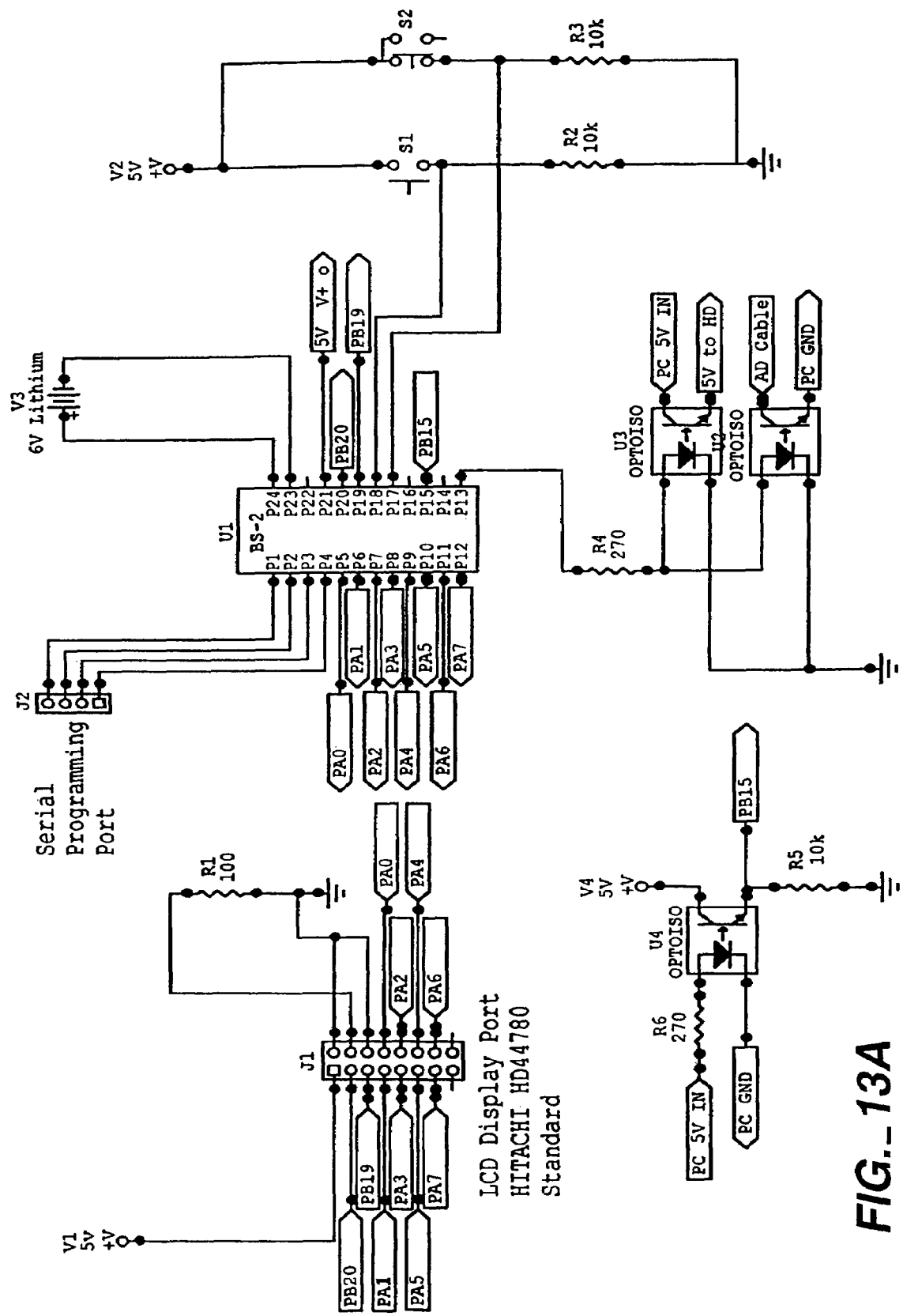
FIG._13A

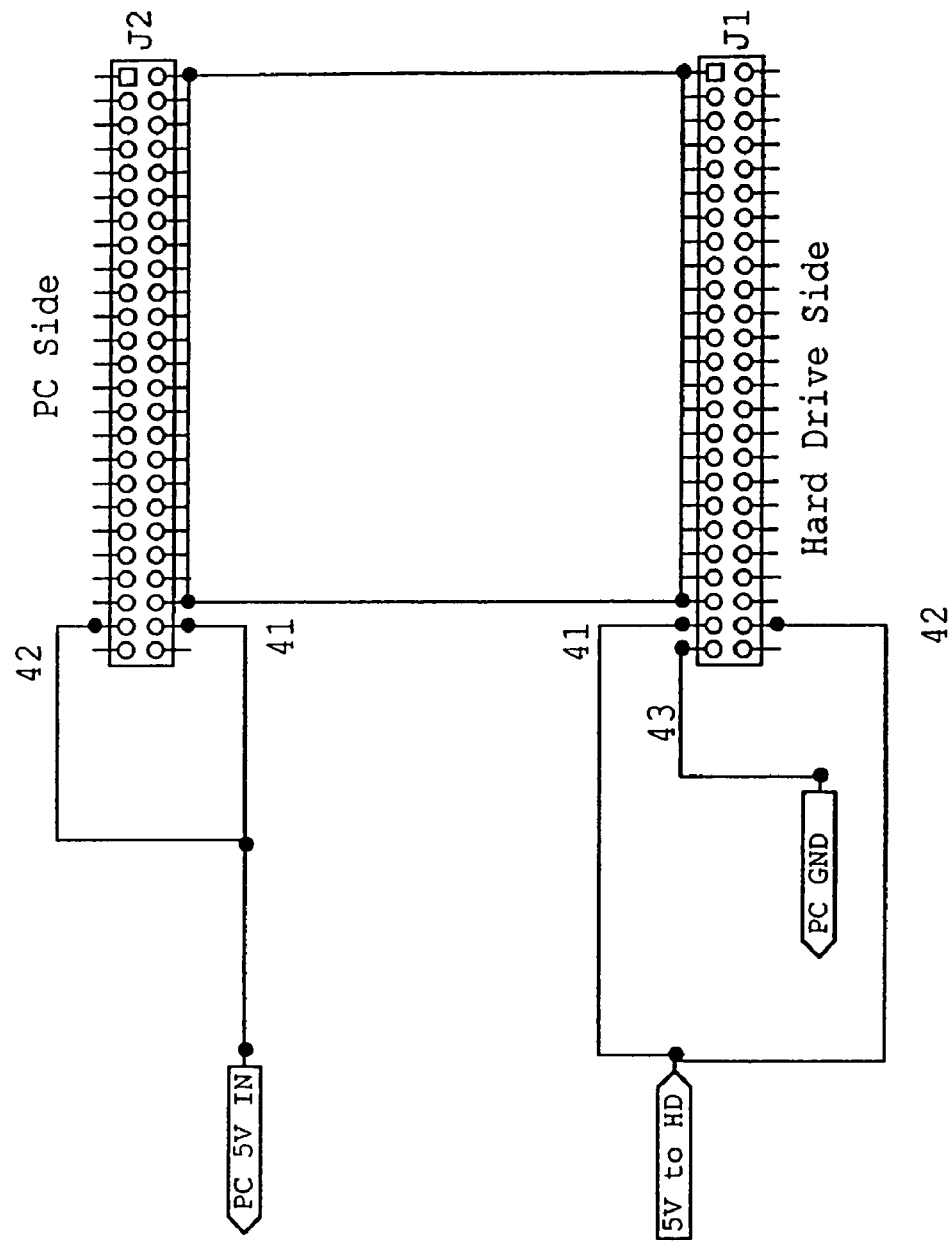
FIG._13C

| Backup & Repair | Freeze-Buster | Hardware Repair | Virus-Proof Hacker-Proof | Net-Lock | Multi-User | Entertainment/ Communication |
|---|---|---|---|---|---|---|
| 25M | 21Z-2 | 26A | 21Z-7 | 21Z | 21A | 25A |
| 25Q | 26A | 26B | 21Z-8 | 21Z-1 | 21P | 25J |
| 21B | 26B | L72 | 21Z-8 | 26A | 21Z-3 | 25K |
| 21C | 26E | 26F | 21Z-9 | 26B | 21Z-5 | 25L |
| 21D | 26G | 26J | 21Z-9 | 26D | 26A | 25M |
| 21E | 26J | 24A | 21Z-10 | 26I | 26B | 25B |
| 21F | 26P | 24B | 21P | 26J | 26C | 25C |
| 21G | 26U | 24C | 21Q | 26R | 26H | 25D |
| 21H | 24D | 24D | 21R | 26U | 26J | 25E |
| 21I | 24E | 24E | 21T | 24D | 26K | 25F |
| 21J | 20L | 20L | 21U | 24E | 26N | 25G |
| 21K | 20R | 20P | 21V | 20L | 26Q | 25H |
| 21L | 20T | 20T | 21W | 20Q | 26T | 25N |
| 21M | 22M | 20I | 21X | 20T | 24A | 25O |
| 21N | 22O | 22U | 21Y | 22Y | 24B | 25P |
| 21O | | 22I | 21Z-3 | W64.5 | 24C | 25Q |
| 21P | | 22J | 21Z-6 | 22N | 24D | 25I |
| 21Z-3 | | 22K | 26N | | 24E | 20T |
| 21Z-4 | | 22L | 24A | | 20J | 22Z-2 |
| 26L | | 22Z-3 | 24B | | 20L | |
| 26M | | | 24C | | 20O | |
| 26N | | | 24D | | 20T | |
| 26O | | | 24E | | 20C | |
| 26S | | | 20J | | 20D | |
| 24A | | | 20K | | 20E | |
| 24B | | | 20L | | 20F | |
| 24C | | | 20M | | 20G | |
| 24D | | | 20N | | 22U | |
| 24E | | | 20O | | 22W | |
| 20A | | | 20S | | 22B | |
| 20J | | | 20T | | 22D | |
| 20L | | | 22P | | 22E | |
| 20O | | | 22R | | 22F | |
| 20B | | | 22S | | 22G | |
| 20T | | | 22Z | | 22H | |
| 20H | | | 22Z-1 | | 22Q | |
| 22T | | | 22Z-3 | | 22S | |
| 22V | 22Z | | | | 22Z | |
| 22X | 22Z-1 | | | | 22Z-1 | |
| 22A | 22Z-3 | | | | 22Z-3 | |
| 22C | | | | | | |
| 22H | | | | | | |
| 23A | | | | | | |
| WJ10 | | | | | | |
| 23B | | | | | | |
| 23C | | | | | | |

TABLE OF WHICH DIAGRAMS GO WITH WHICH INVENTION EMBODIMENTS

*FIG. 14*

Hacking and Virus Proof Computing Device 104.10

"Isolation"

"Expanded"

"Where's Data"

"Dual Processors"

"Protected"

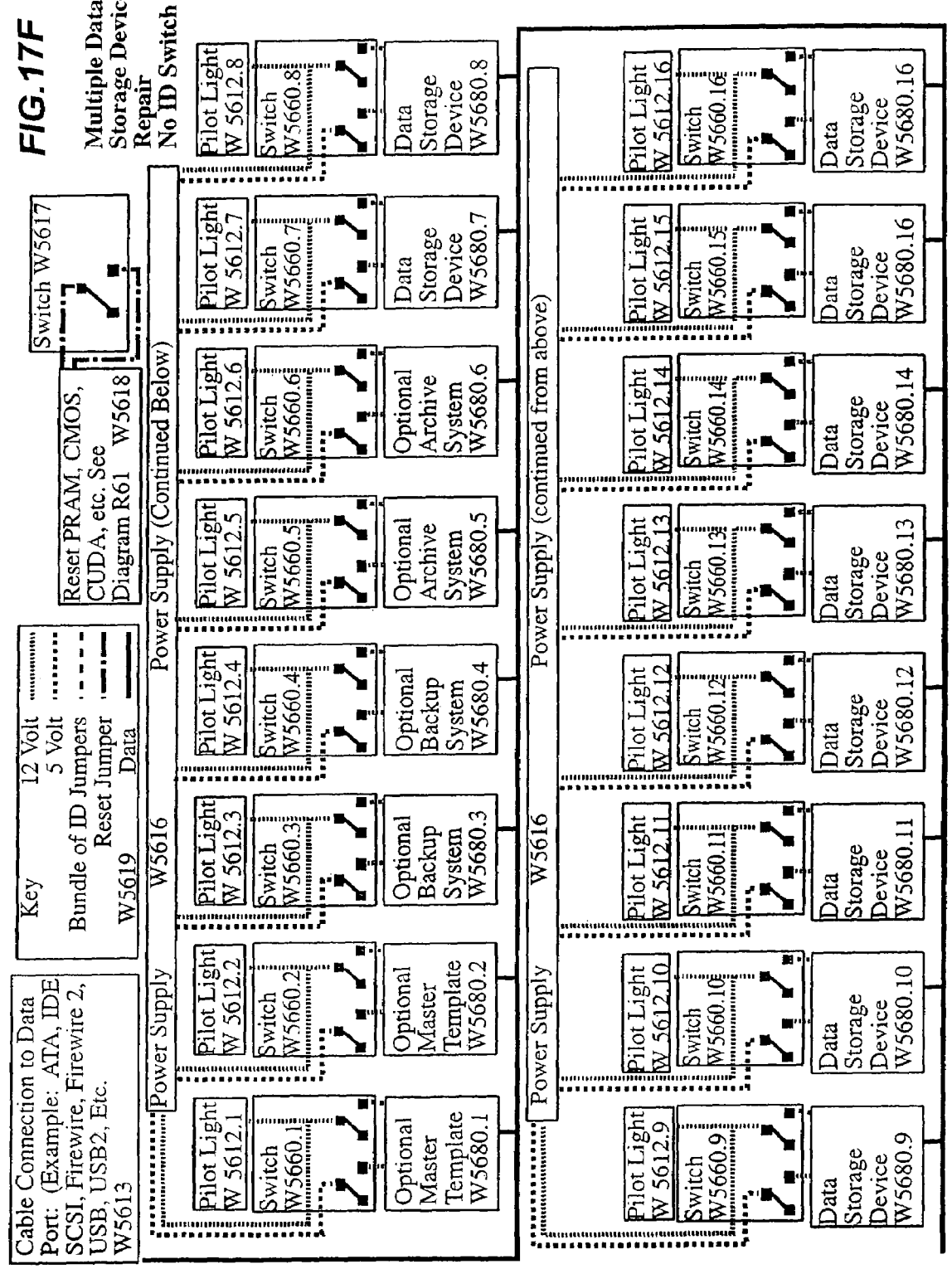

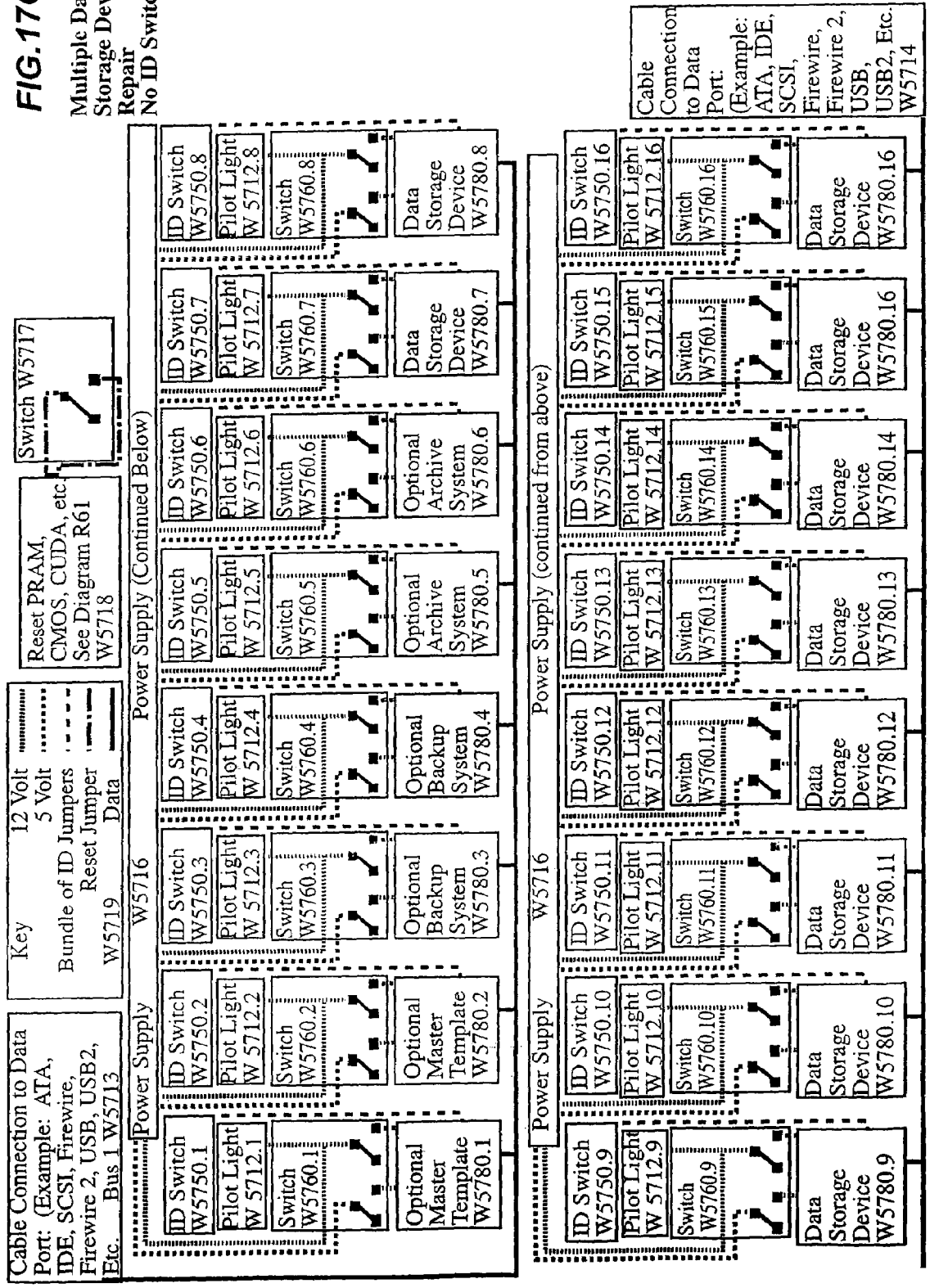
FIG.17G Multiple Data Storage Devices & Repair No ID Switch

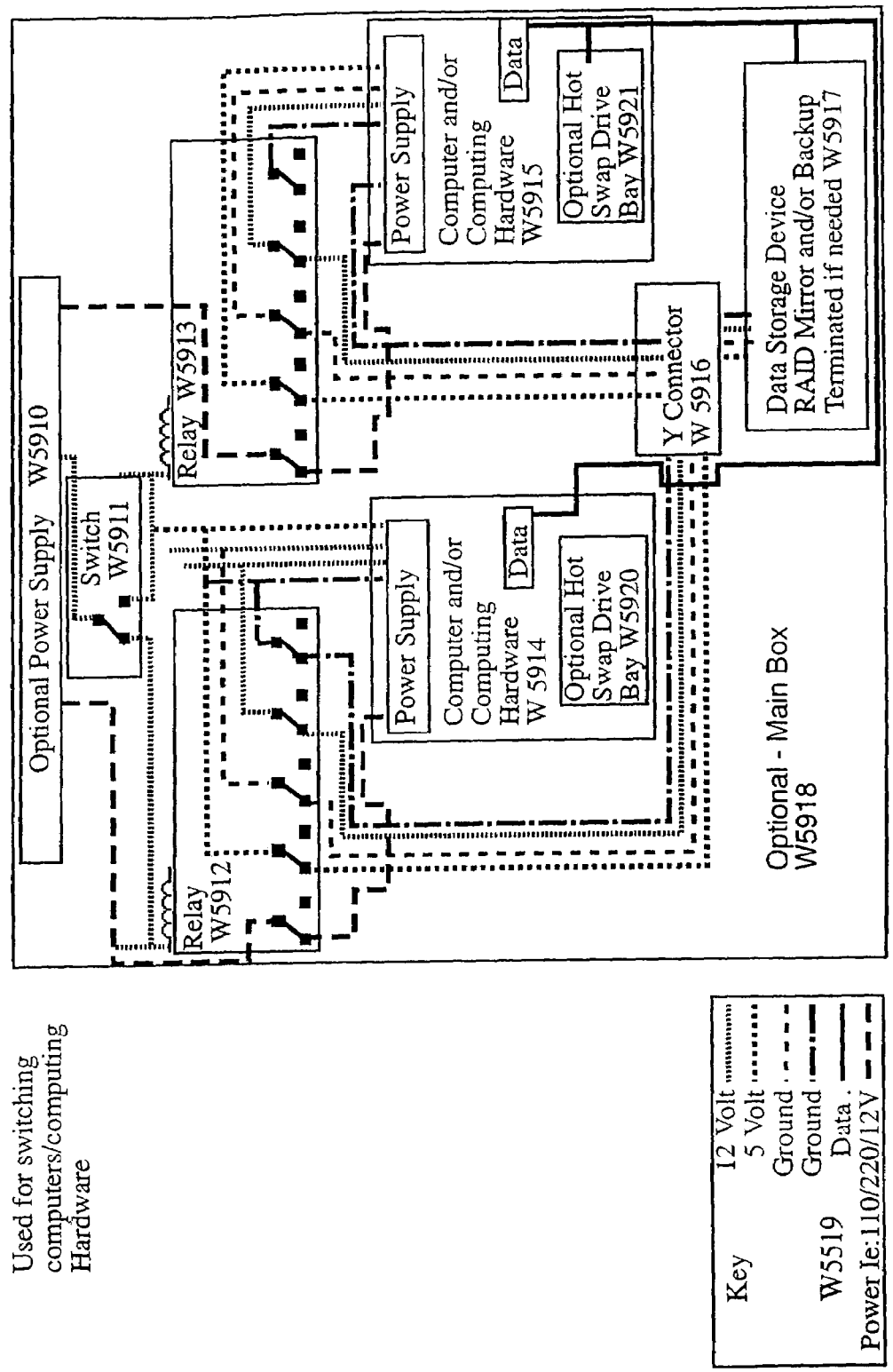

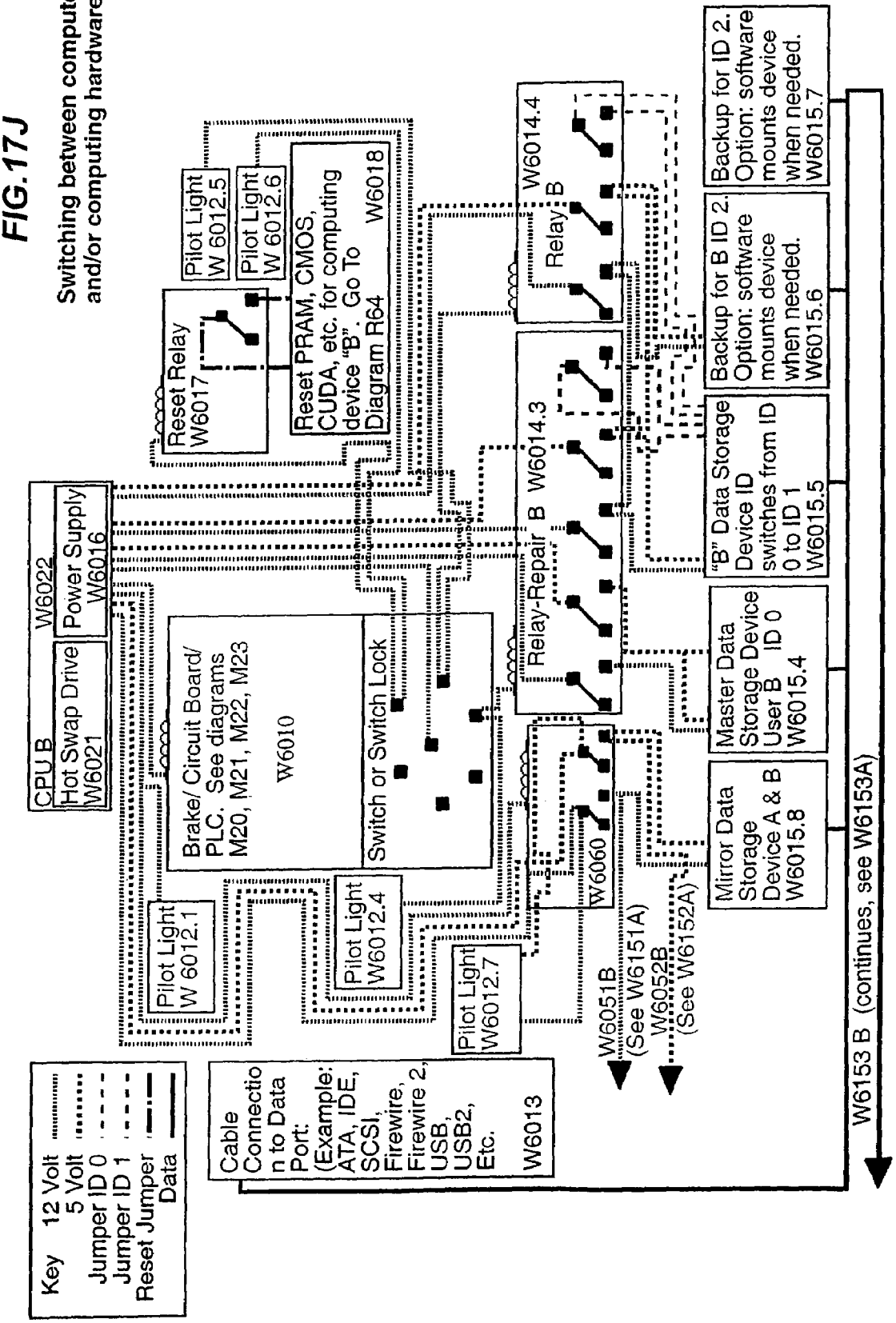
FIG. 17J Switching between computers and/or computing hardware.

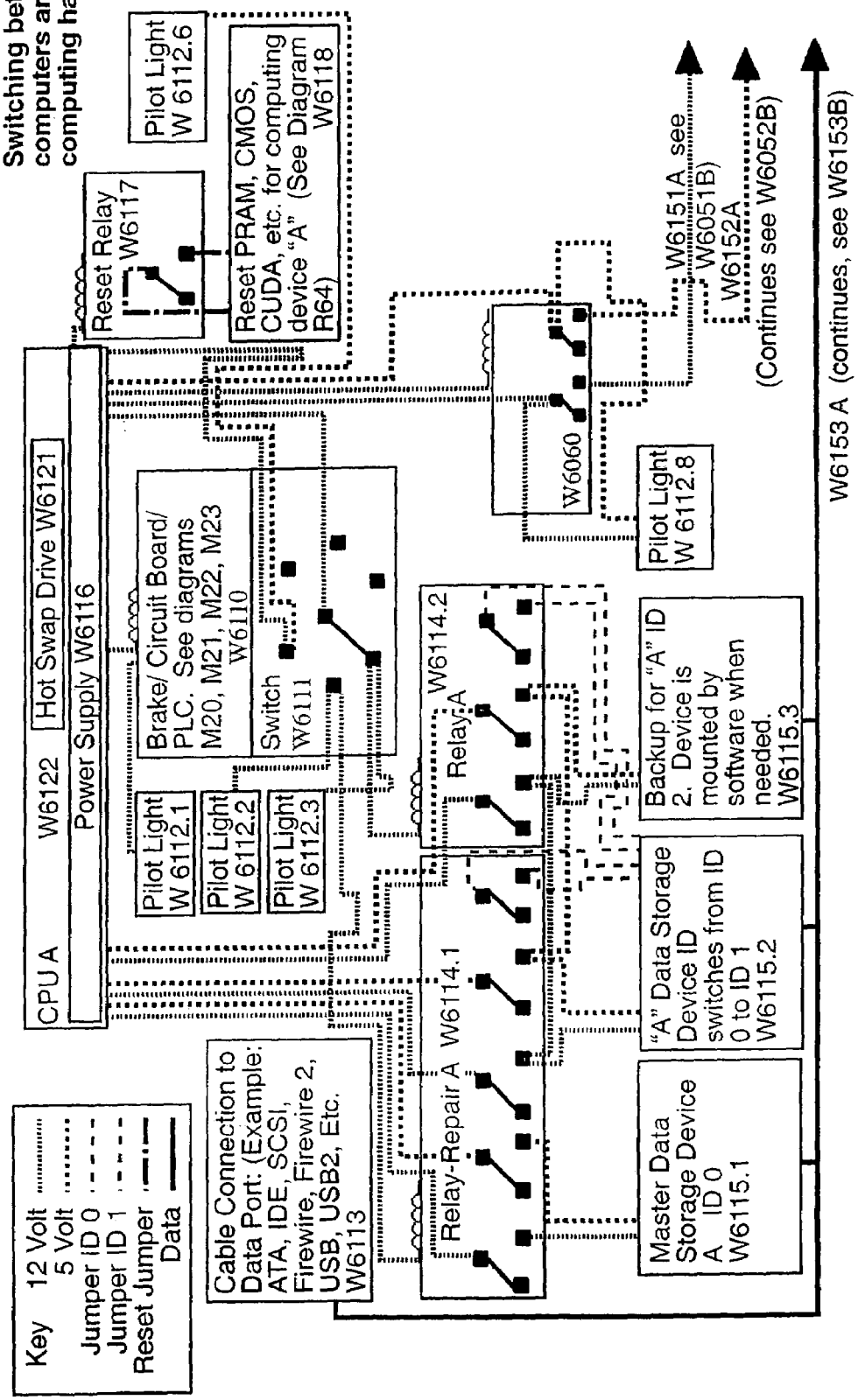

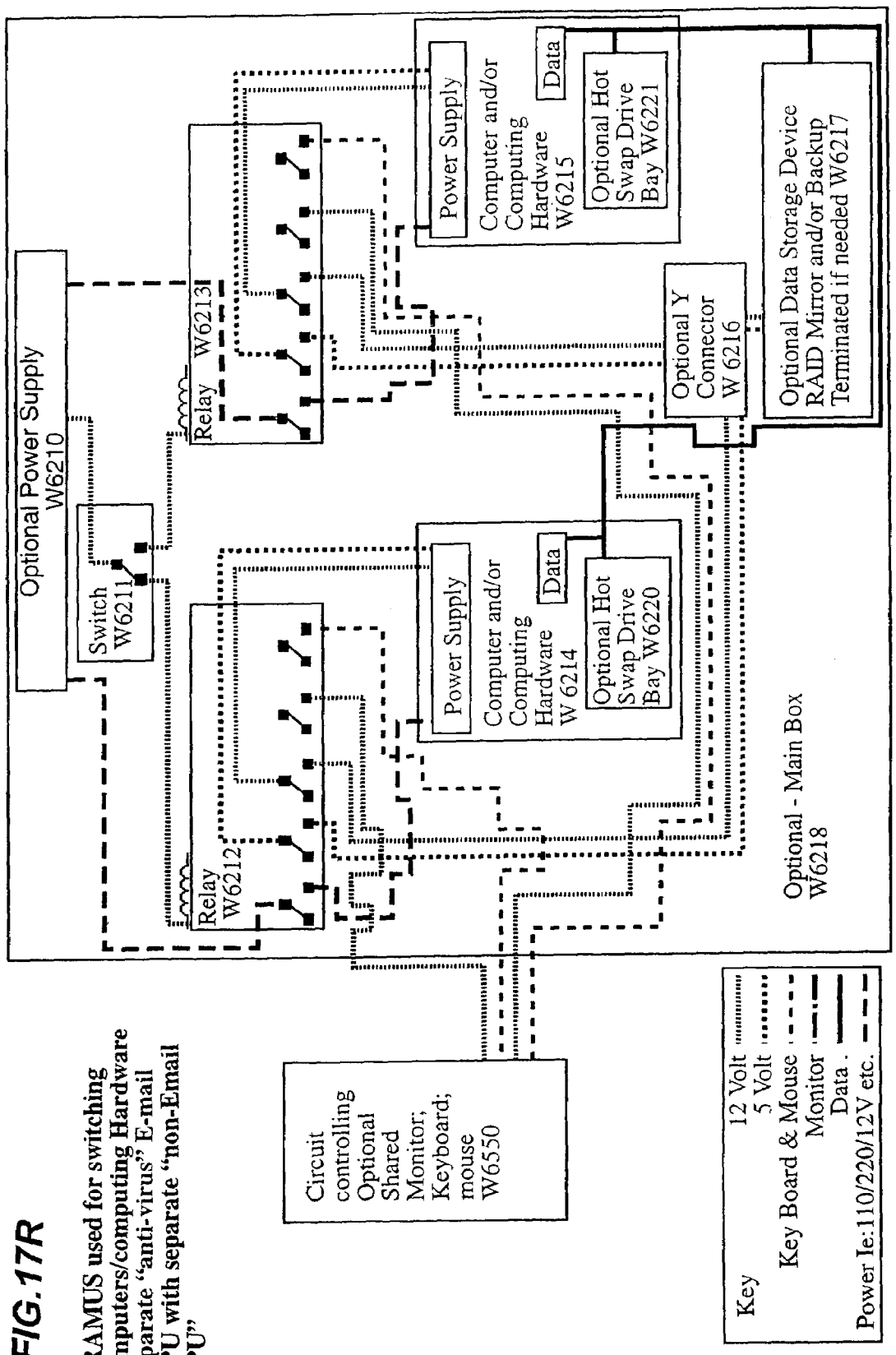

Optional Circuit Board and Socket Assembly

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|
| Input | Input | Input | Input | Input | Input | Input | Input | Input | Input | Input | Input | Input | Input | Input | Input | Input | Input | Input | Input | | | | | Delay ■50 ■A Out |
| Output | Output | Output | Output | Output | Output | Output | Output | Output | Output | Output | Output | Output | Output | Output | Output | Output | Output | Output | Output | | | | | |
| 1 | 2 | 3 | 4 | 5 | 6 | 7 | 8 | 9 | 10 | 11 | 12 | 13 | 14 | 15 | 16 | 17 | 18 | 19 | 20 | | | | | 25 |

1) circuit 1
2) circuit 2
3) circuit 3
4) circuit 4
5) circuit 5
6) circuit 6
7) circuit 7
8) circuit 8
9) circuit 9
10) circuit 10
11) circuit 11
12) circuit 12
13) circuit 13
14) circuit 14
15) circuit 15
16) circuit 16
17) circuit 17
18) circuit 18
19) circuit 19
20) circuit 20
21) Power Control Indicator #21
22) Power Control Indicator #22
23) Power Control Indicator #23
24) Power Control Indicator #24
25) Power Control Indicator #25
26) time delay circuit
27) Data and power to LCD screen and/or data for computer monitor and/or to computer.
28) Power to board
40) delay start time for delay circuit
41) stop time for delay circuit
50) jumper "A"

*FIG.17S*

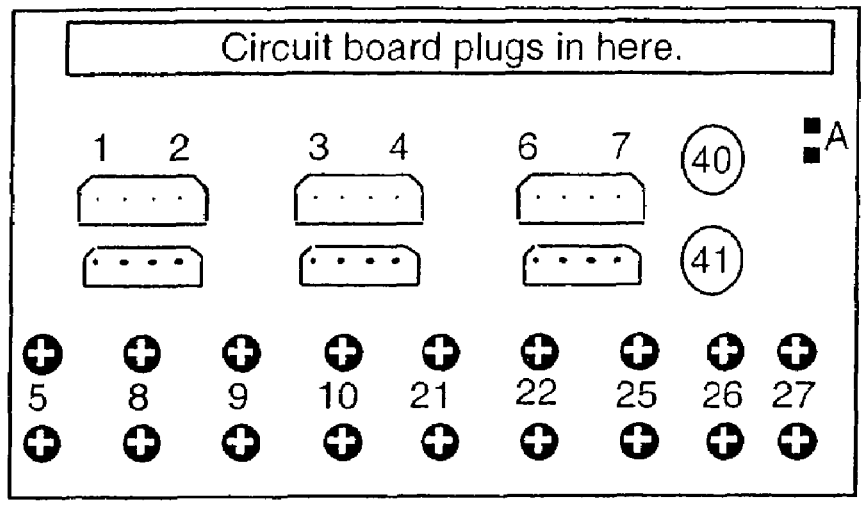
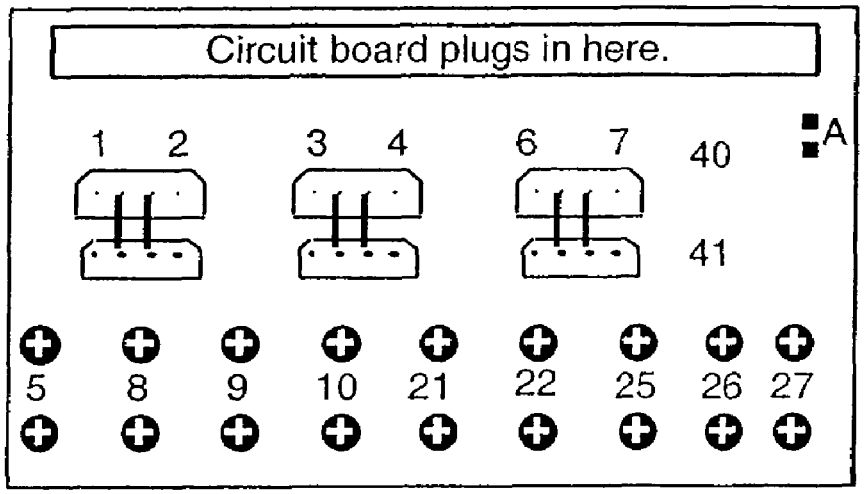
FIG. 17V

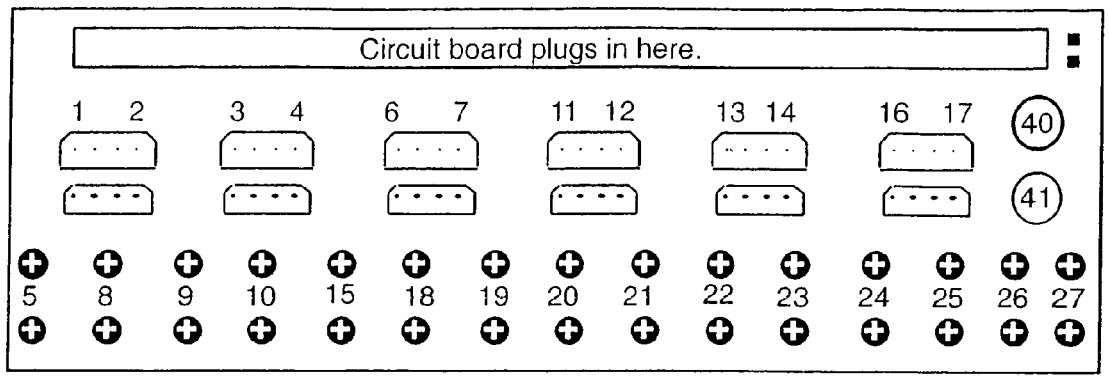
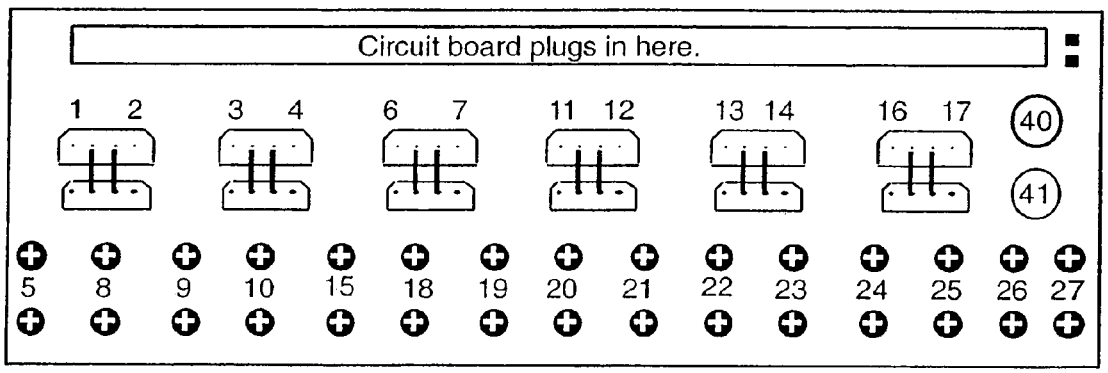
FIG.17W

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | |
|---|---|---|---|---|---|---|---|---|---|---|---|---|---|---|---|---|---|---|---|---|---|---|---|---|---|---|
| | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ⏜ |
| | Input | Input | Input | Input | Input | Input | Input | Input | Input | Input | Input | Input | Input | Input | Input | Input | Input | Input | Input | Input | Power Control | | Delay | | | Optional |
| | Output | Output | Output | Output | Output | Output | Output | Output | Output | Output | Output | Output | Output | Output | Output | Output | Output | Output | Output | Output | ㊵ | ㊶ | Delay Out | | | Jumper "A" |
| | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ■ | | ■ | ■ |
| | 1 | 2 | 3 | 4 | 5 | 6 | 7 | 8 | 9 | 10 | 11 | 12 | 13 | 14 | 15 | 16 | 17 | 18 | 19 | 20 | | | | | 25 | |

1) circuit 1                11) circuit 11          21) Power Control Indicator #21
2) circuit 2                12) circuit 12          22) Power Control Indicator #22
3) circuit 3                13) circuit 13          23) Power Control Indicator #23
4) circuit 4                14) circuit 14          24) Power Control Indicator #24
5) circuit 5                15) circuit 15          25) time delay circuit
6) circuit 6                16) circuit 16          40) delay start time for delay circuit
7) circuit 7                17) circuit 17          41) stop time for delay circuit
8) circuit 8                18) circuit 18
9) circuit 9                19) circuit 19
10) circuit 10              20) circuit 20

Socket Top View

BURPMU may need 4/22/01:   Circuit board 7/15/2000

FIG. 17X

COMPUTER SYSTEM CAPABLE OF SUPPORTING A PLURALITY OF INDEPENDENT COMPUTING ENVIRONMENTS

This application claims benefit of priority under 35 U.S.C. 119(e) to:

U.S. Provisional Patent Application No. 60/393,719 entitled, "Computers That Defend Against Viruses, Hacking, Spy Software, Cyber-Terrorism, Theft, and Make Malicious Code Irrelevant," filed Jul. 3, 2002, naming Kenneth Largman, Anthony B. More and Jeffrey Blair as inventors; each of which application is are incorporated by reference.

This invention relates to computers and information appliances generally, and more particularly to computers and information appliances supporting security features and failure prevention and recovery features, and even more particularly to computers capable of supporting multiple independent computing environments to prevent computer hacking and corruption between the independent computing environments.

RELATED AND BENEFIT APPLICATIONS

This application claims benefit of priority under one or more of 35 U.S.C. 119(e) and 35 U.S.C. 120 to:

U.S. patent application Ser. No. 10/075,136, entitled, "On-The-Fly Repair Of A Computer," filed Nov. 19, 2001, naming Kenneth Largman, Anthony B. More and Jeffrey Blair as inventors;

U.S. patent application Ser. No. 10/074,686, entitled, "External Repair Of A Computer," filed Feb. 11, 2002, naming Kenneth Largman, Anthony B. More and Jeffrey Blair as inventors;

U.S. patent application Ser. No. 10/090,480 entitled, "Backup Of A Computer," filed Feb. 27, 2002, naming Kenneth Largman, Anthony B. More and Jeffrey Blair as inventors; and U.S. patent application Ser. No. 10/094,600 entitled, "Computer With Special-Purpose Sub-Systems," filed Mar. 6, 2002, naming Kenneth Largman, Anthony B. More and Jeffrey Blair as inventors; each of which applications are incorporated by reference;

BACKGROUND

Personal-computer manufacturers and sellers often offer via-telephone and on-site repair services. Yet purchasers—particularly home, home-office and small-office purchasers—readily complain that their service contract offers less service than they expected. For example, a computer seller may dispatch a technician only after the purchaser calls the help center, performs a number of tests under the direction of the help center, escalates the problem at the telephone help center and performs redundant or additional tests under the direction of a putatively more knowledgeable telephone-help staff. The purchaser may have to escalate the problem still further and perform additional redundant tests before a repair technician is dispatched.

Frequently, the help center directs the customer to cycle the power on the computer, to re-boot the computer, to detach and reattach peripherals in question and to re-install application and operating-system software. Each call to the help center and each level of escalation may require the purchaser to cycle, re-boot, detach and reattach.

Detaching and reattaching peripherals can be extremely inconvenient. USB devices, for example, typically attach at the back of a computer in a location difficult to reach. In any event, the non-digerati purchaser may fear disassembling his computer, worrying that he may damage the computer further.

Help centers even direct a customer to reformat the boot drive of the computer and re-install operating-system and application software. Re-formatting is an onerous task for several reasons. Firstly, the home, home-office and small-office user rarely reformats a drive in the normal operation of his computer and is unfamiliar with the process itself. Secondly, reformatting destroys all the data on the drive, and such a user understandably becomes anxious on finding out that he will lose all of his data. Thirdly, such a user may not retain the application or operating-system installation media, especially where the seller pre-installs the software. The user may have been unsure which media to keep, or intending to keep a particular media, is in fact unable to locate that media later when needed.

Fourthly, the user typically does not back up his drives as often as an information technologist would recommend. That he will have to rely on his back ups (if any) if he is to have any hope of restoring his application is then not a comforting thought.

Accordingly, the art evinces a need for a computer that reduces or even eliminates the need for a user to call a help line, to keep installation media, to attach and reattach peripherals at the port, etc. Indeed, a computer that reduces or eliminates the technical savvy its user needs to effect repairs is desirable.

These and other goals of the invention will be readily apparent to one of ordinary skill in the art on reading the background above and the description below.

BRIEF DESCRIPTION OF THE DRAWINGS

FIG. 6A illustrates the enabling of a data store in conjunction with the defeat of access to a communications link. FIG. 6B illustrates the enabling of a data store in order to support access to the communications link.

FIG. 7A illustrates the computer in its Network Disconnected state, while FIG. 7B illustrates the computer in its Network Connected state.

Pages 164-165 of the Appendix illustrate another embodiment of a computer incorporating an embodiment of the invention.

FIG. 12 illustrates another embodiment of a computer incorporating an embodiment of the invention and showing a main computer/Computing Hardware box or housing.

Figure 13B:
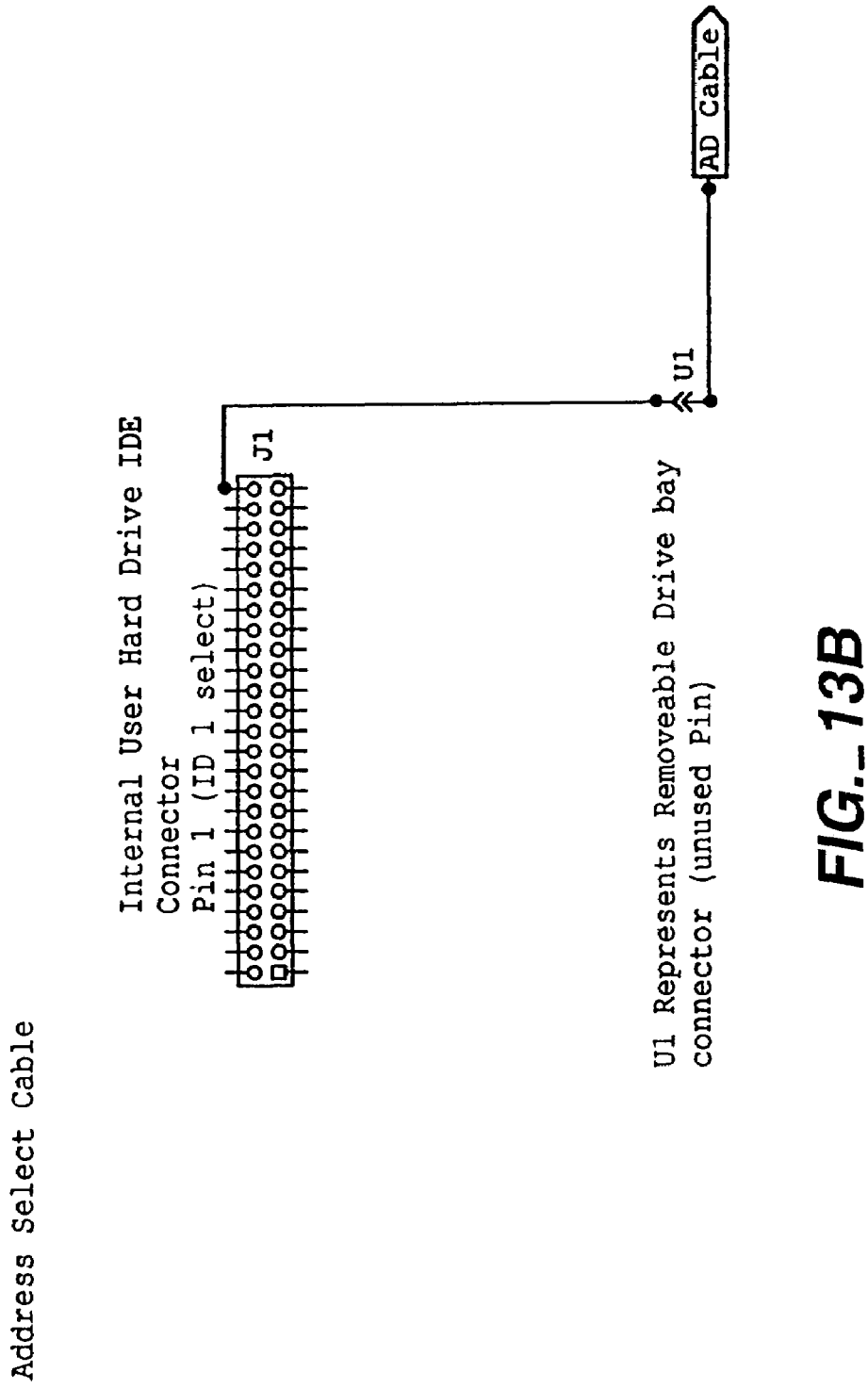
Figure 15A:
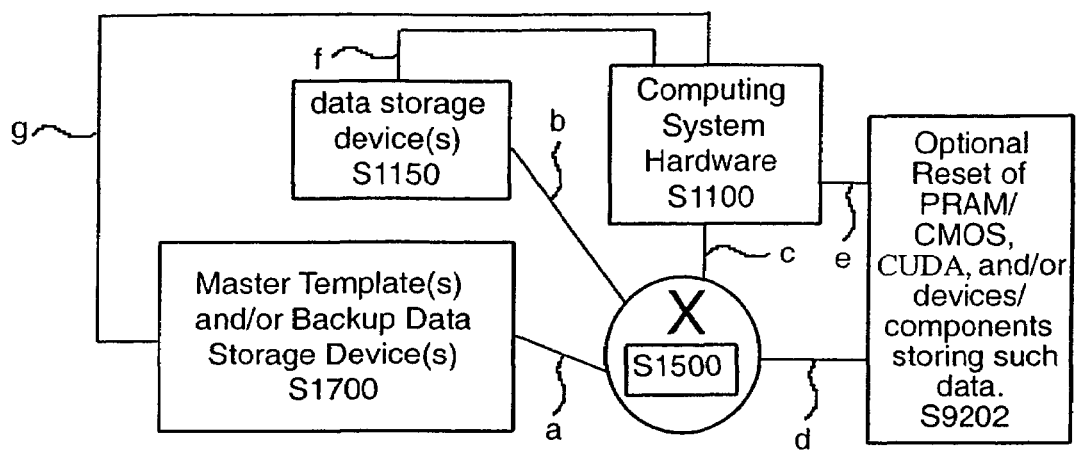
Figure 15B:
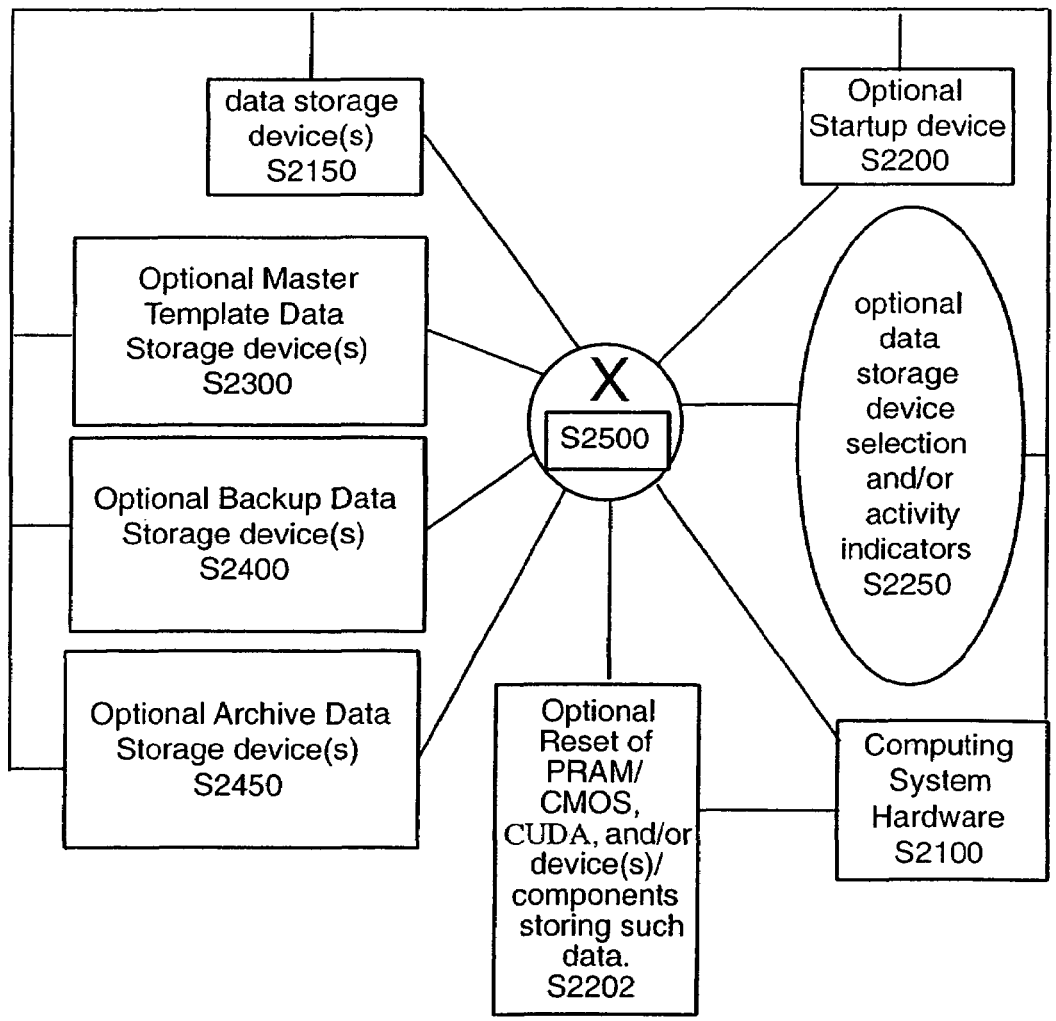
Figure 15C:
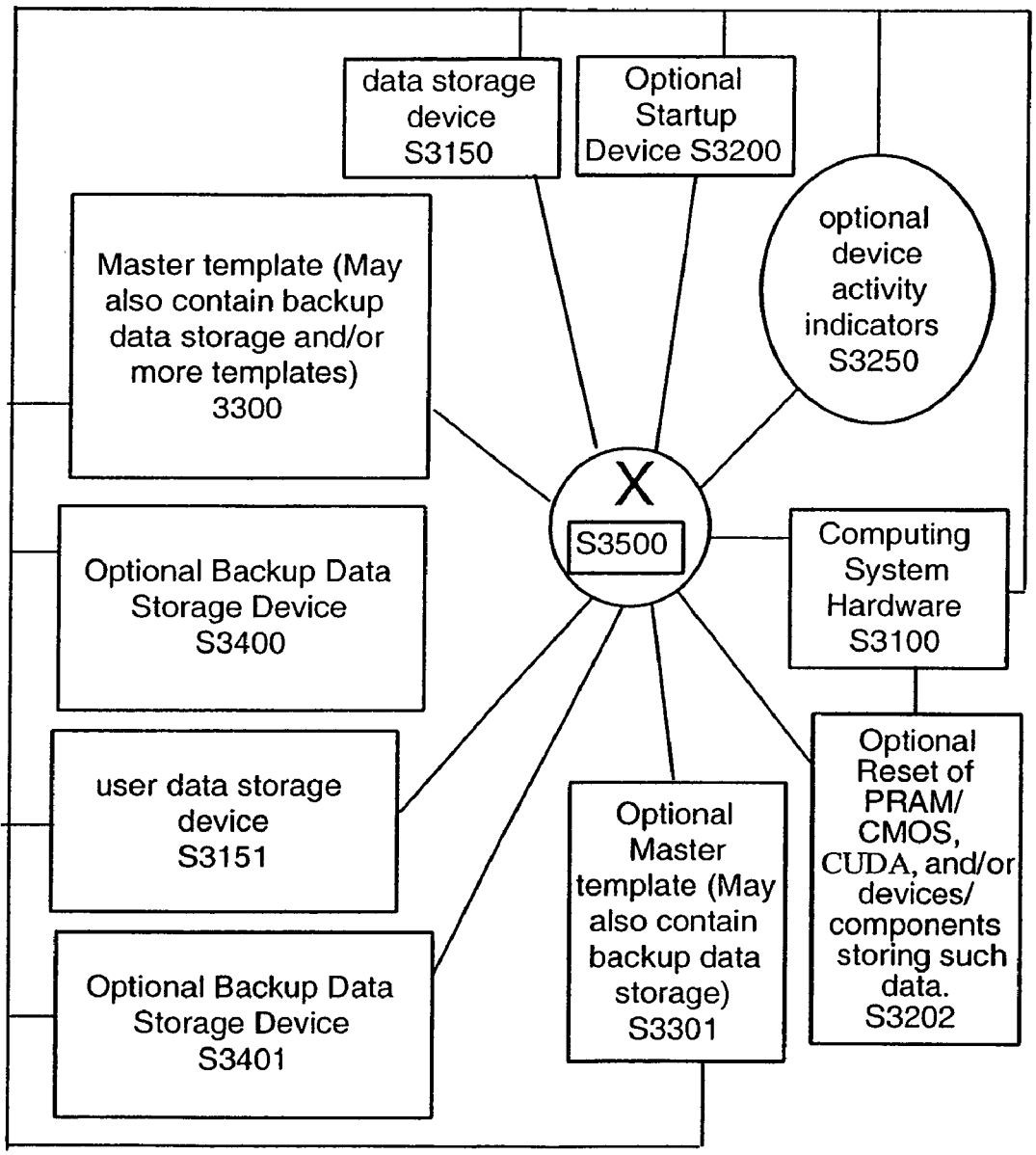
Figure 15D:
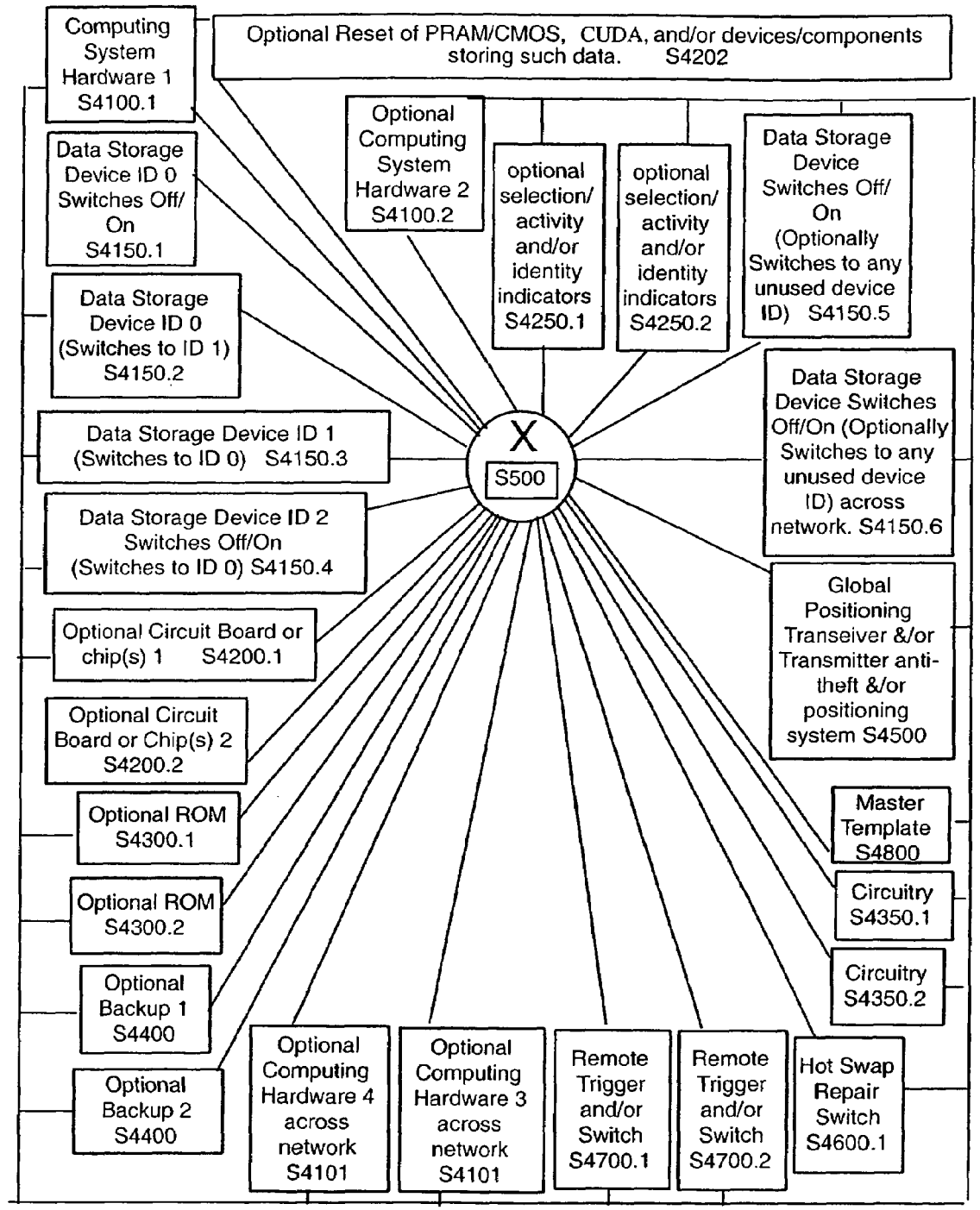
Figure 15E:
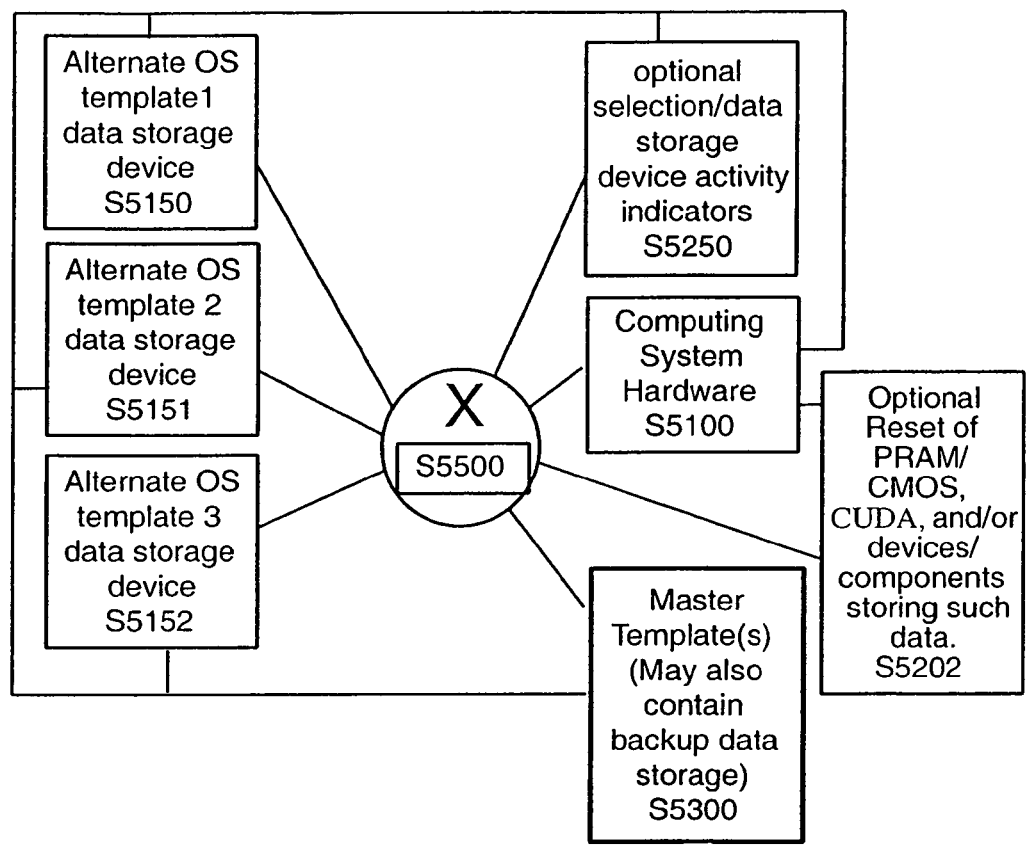
Figure 15F:
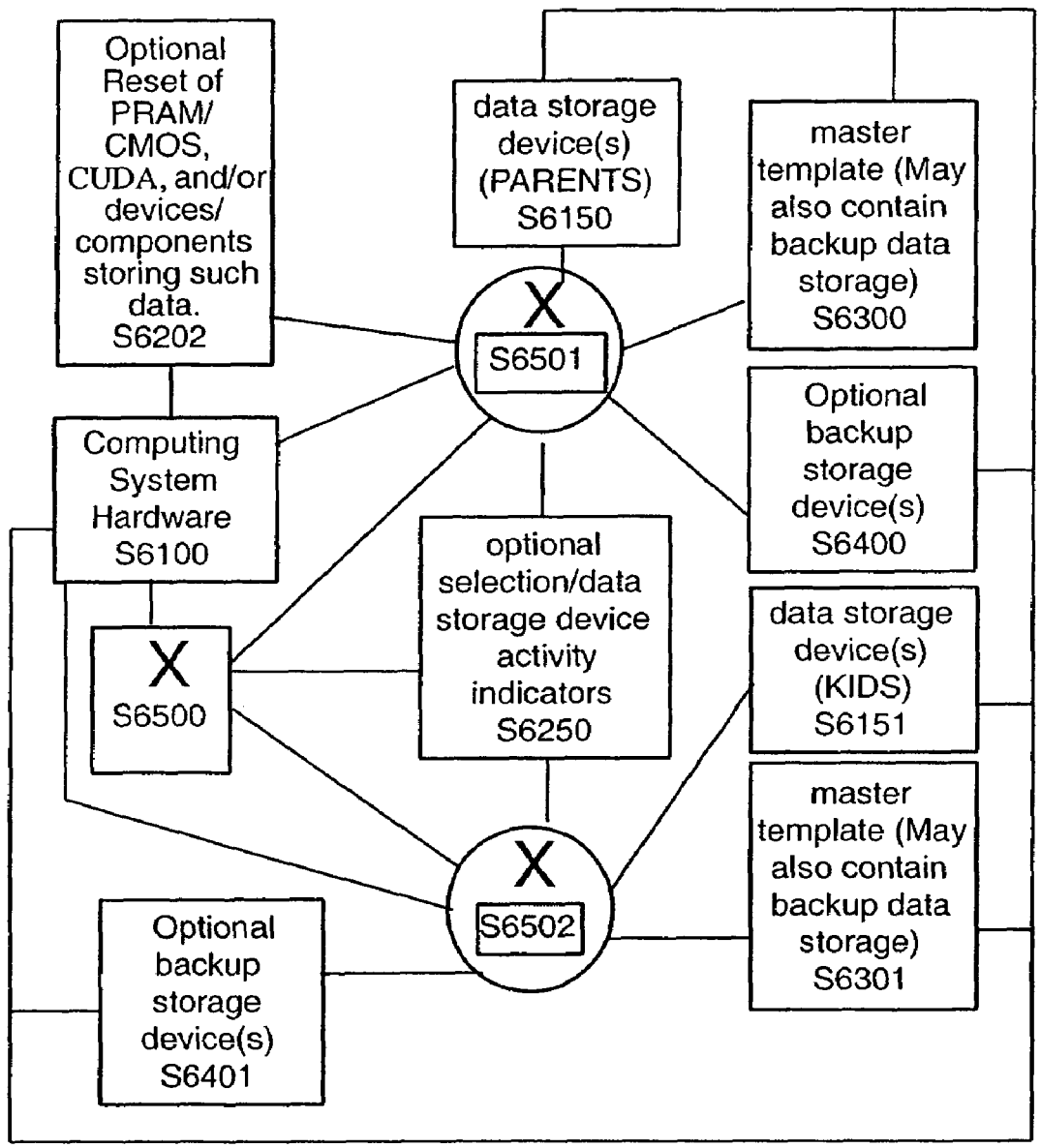
Figure 15G:
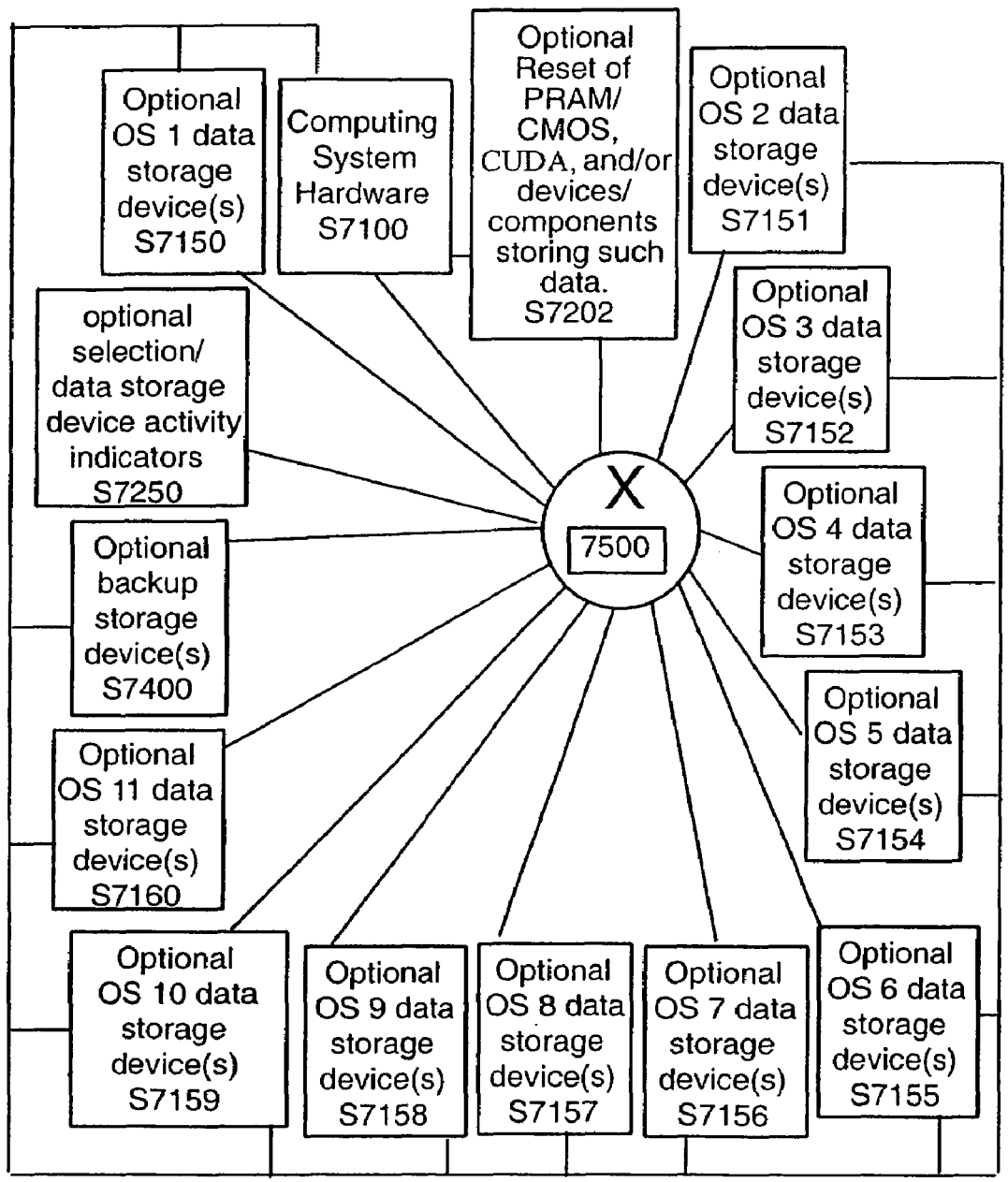
Figure 15H:
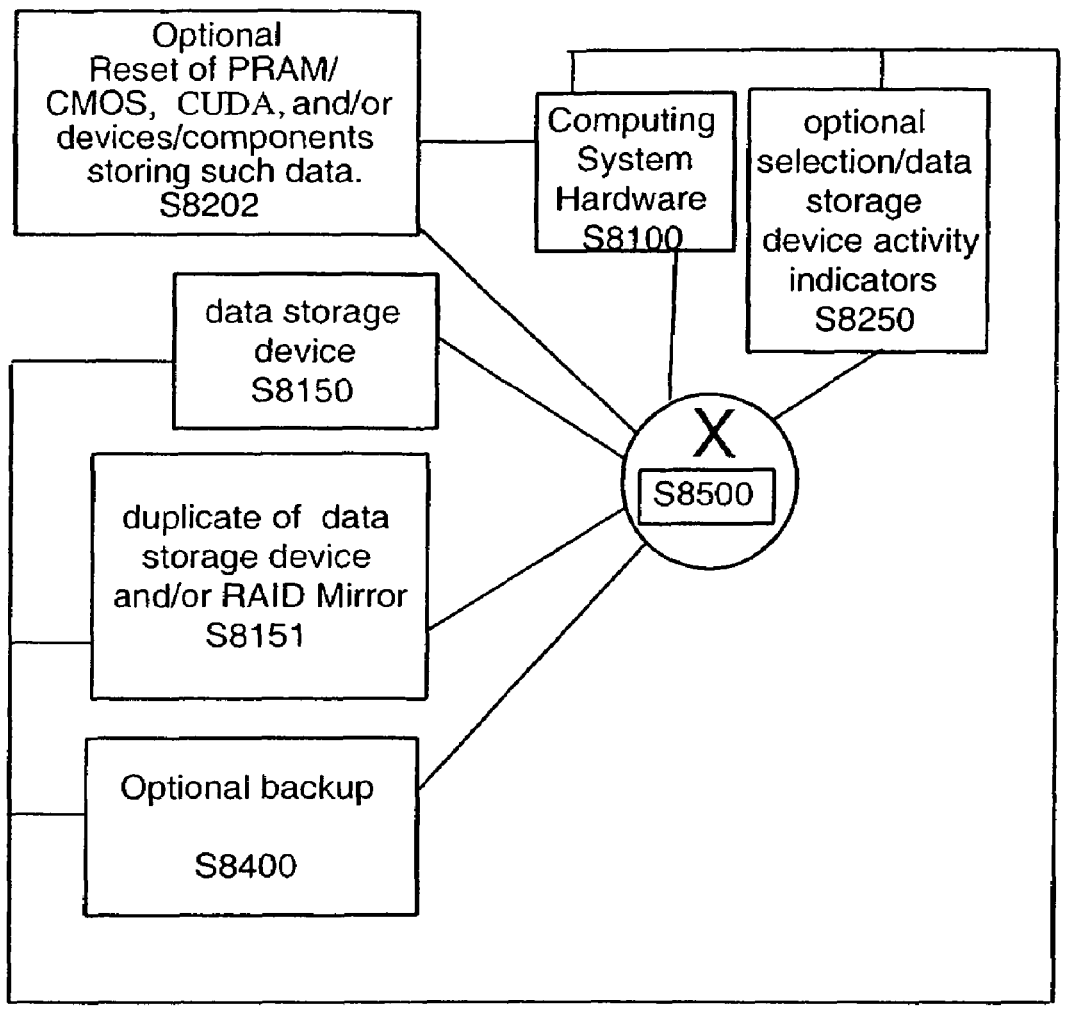
Figure 15I:
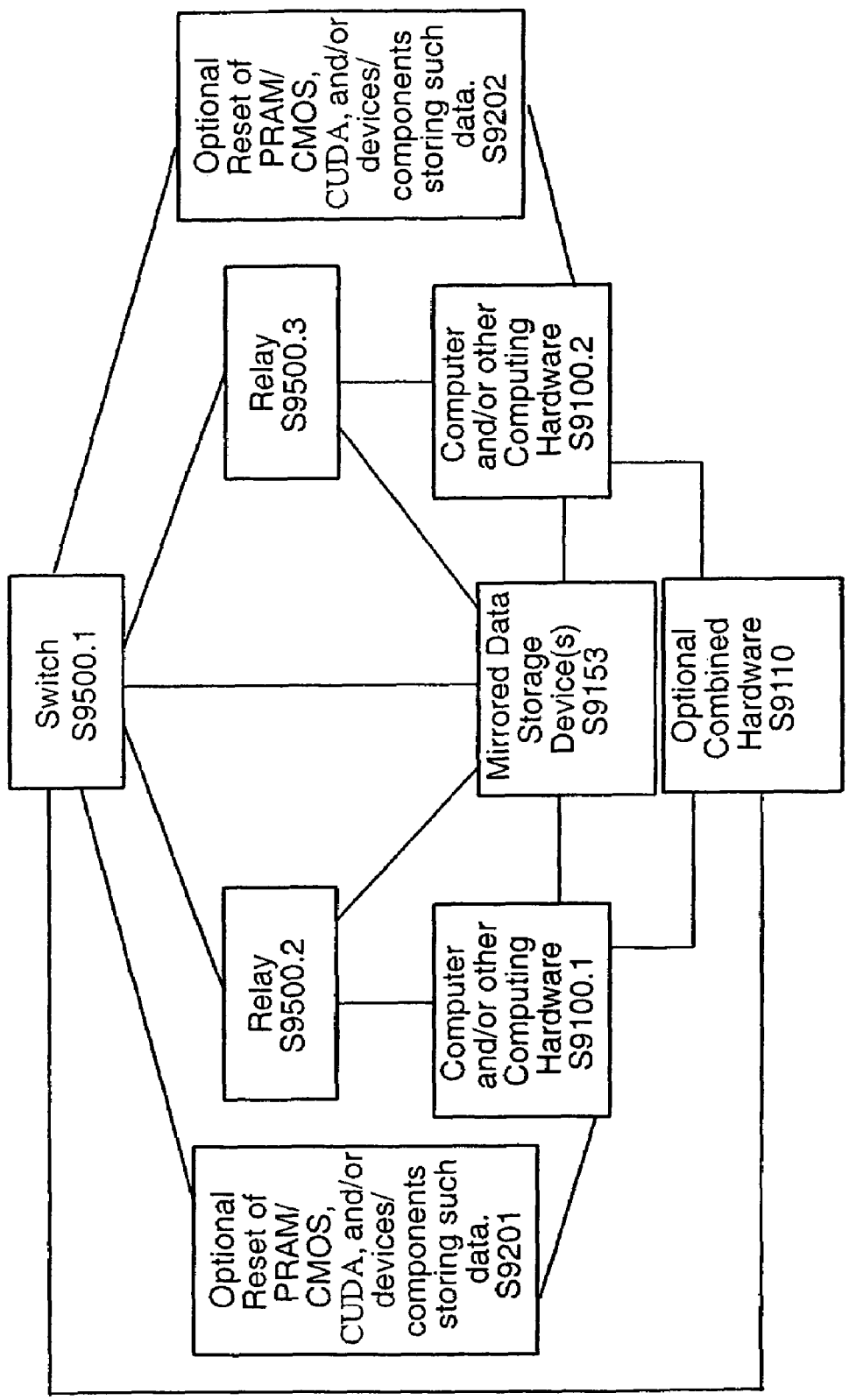
Figure 15J:
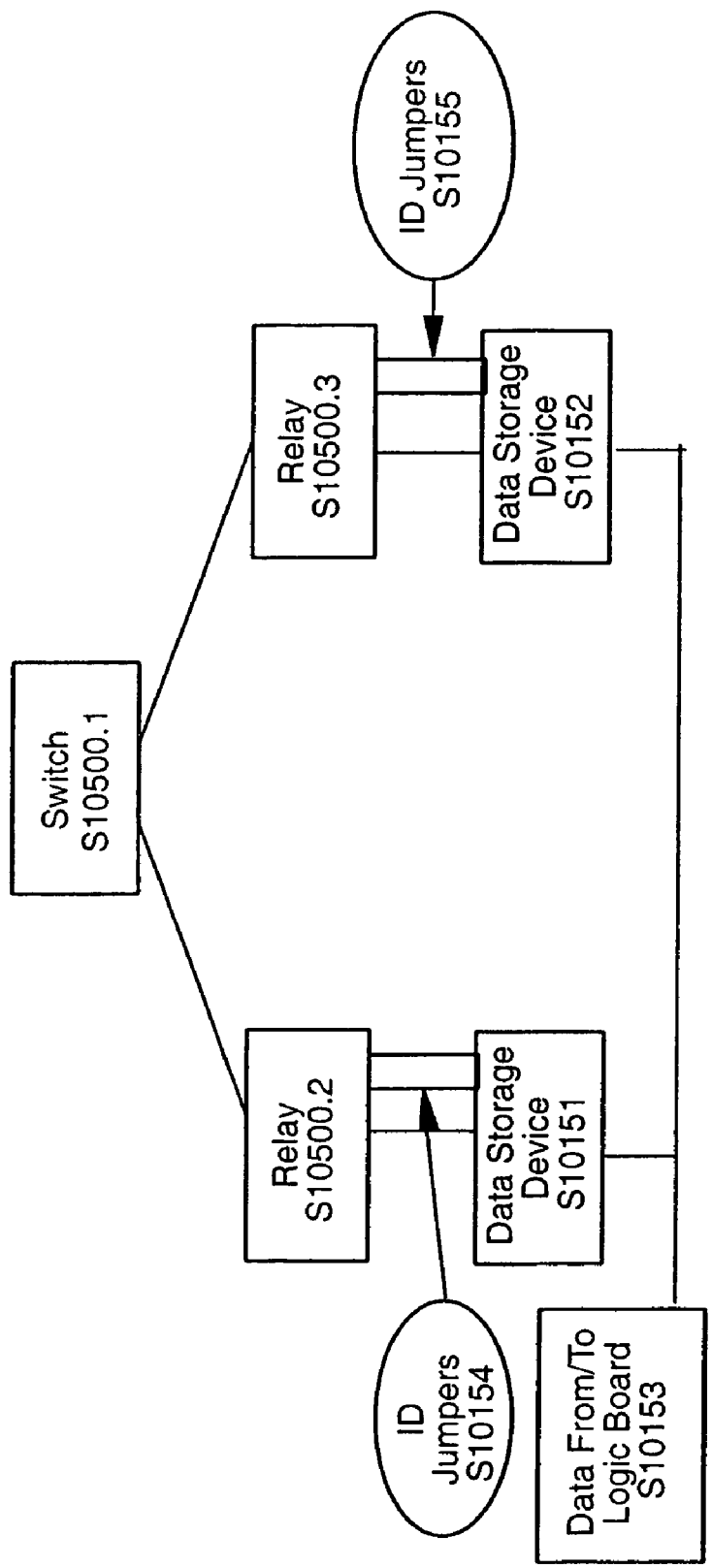
Figure 15K:
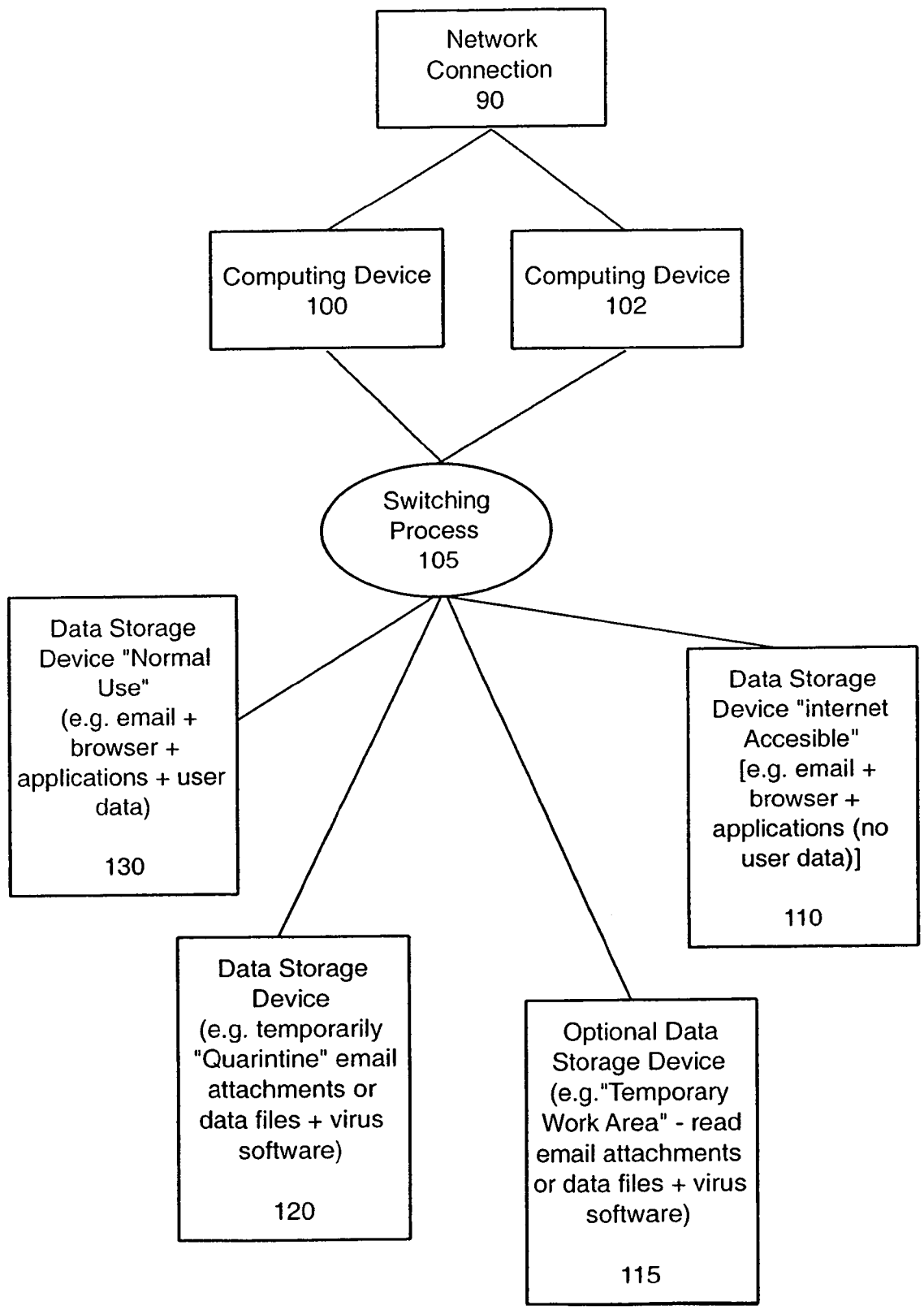
Figure 15L:
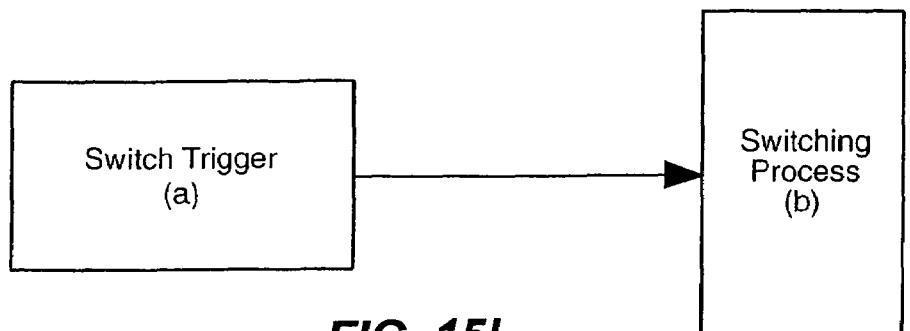
Figure 15M:
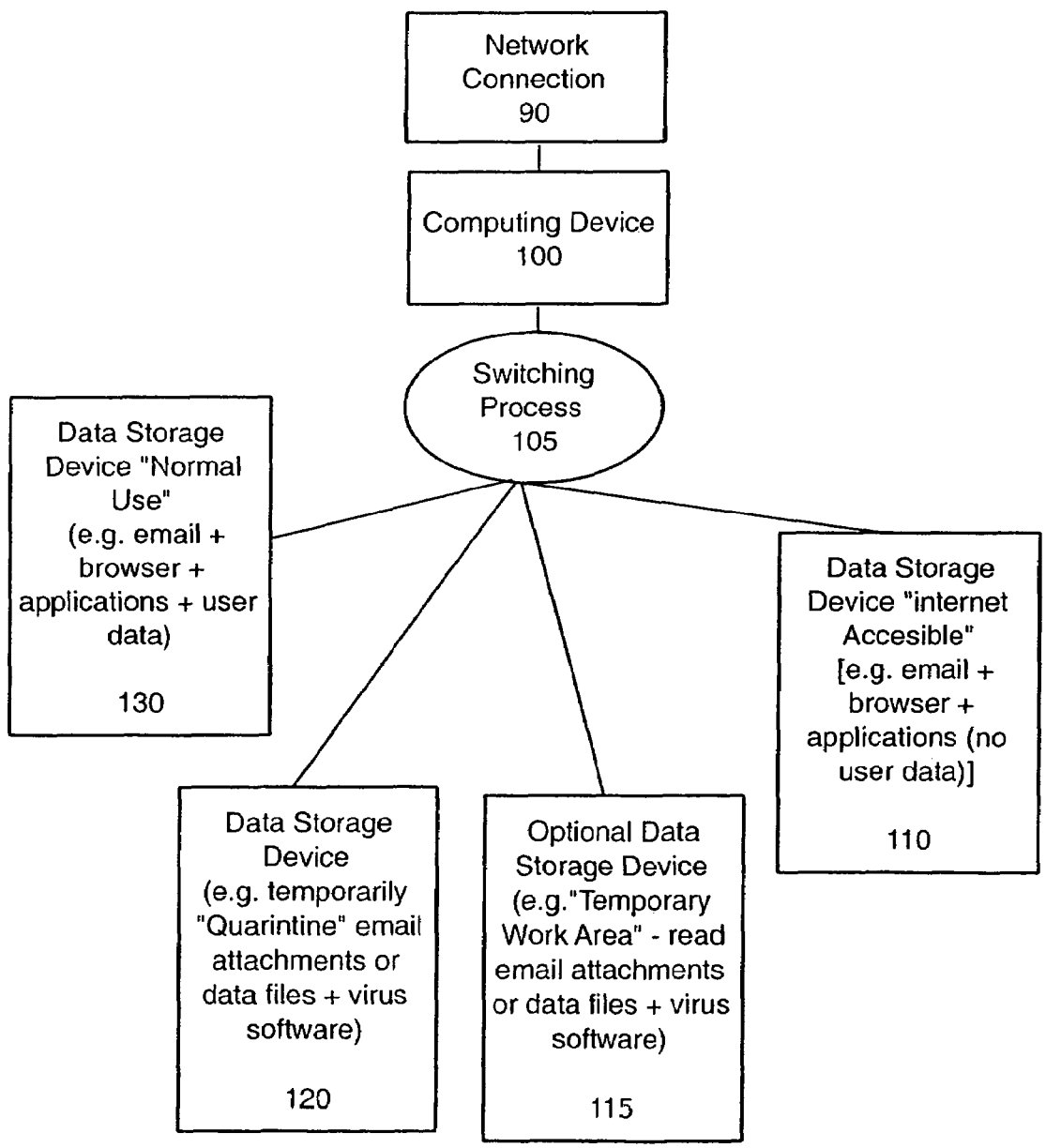
Figure 15N:
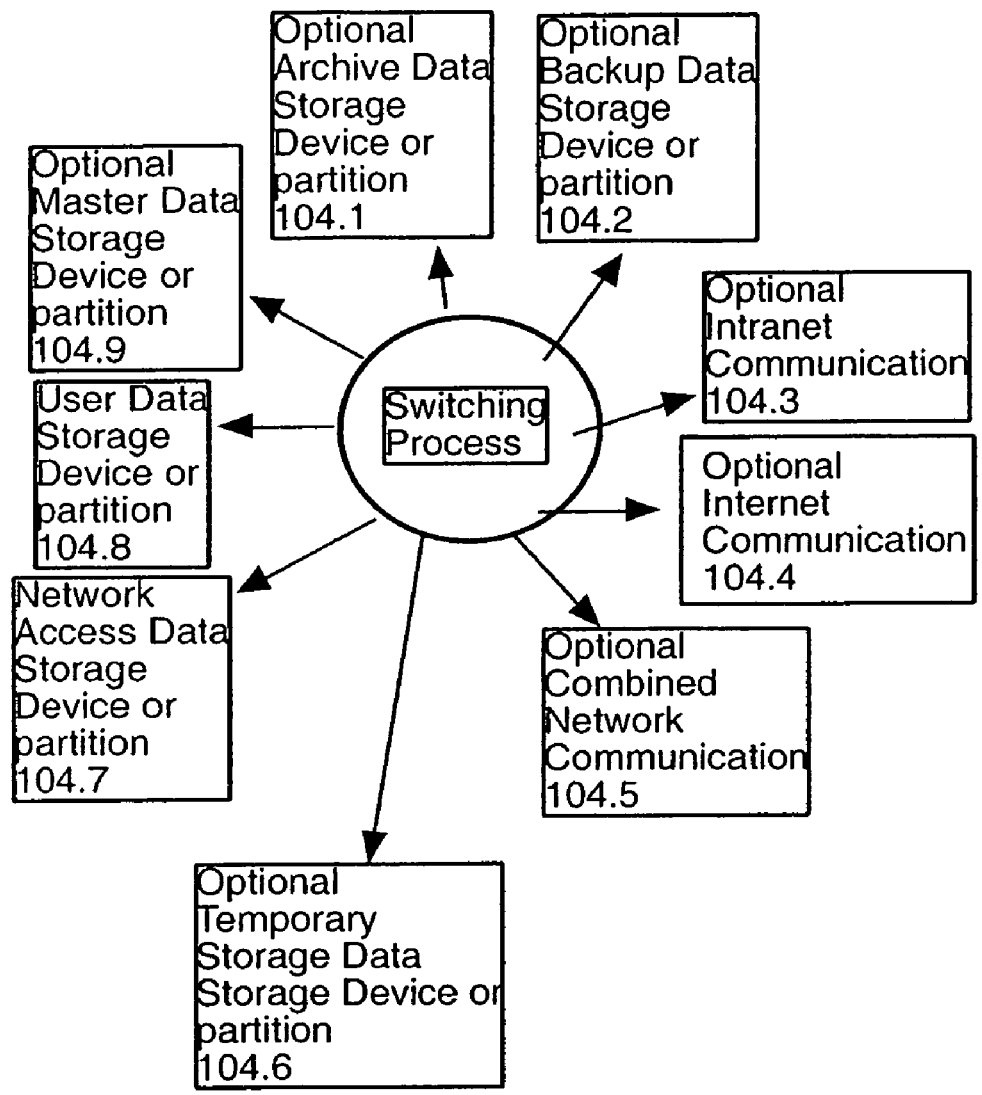
Figure 15O:
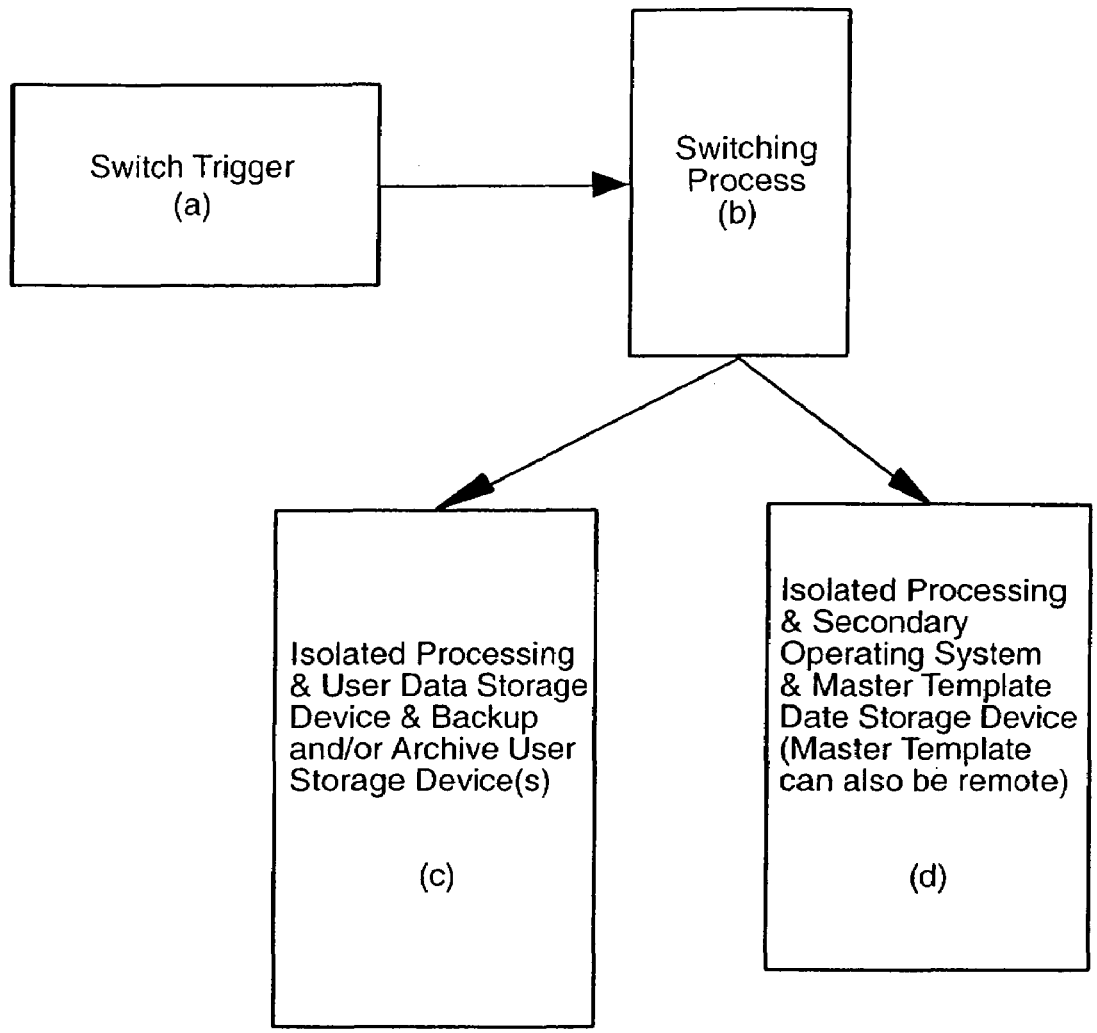
Figure 15P:
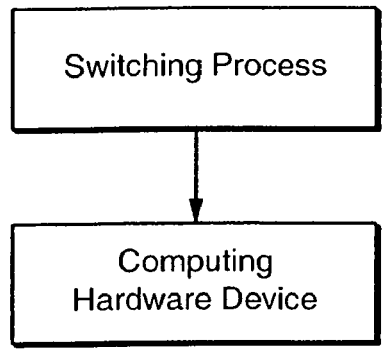
Figure 15Q:
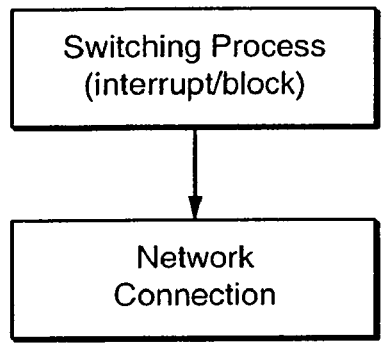
Figure 15R:
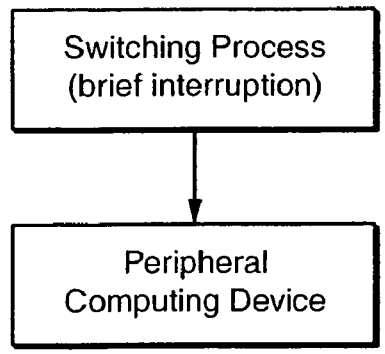
Figure 15S:
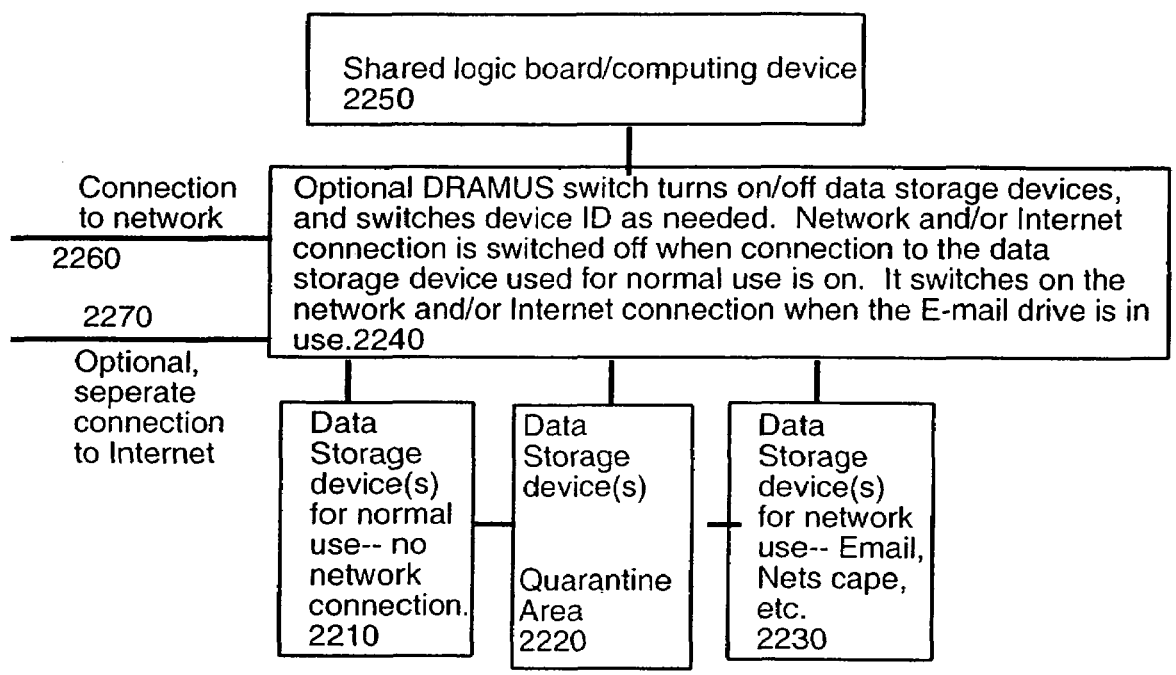
Figure 15T:
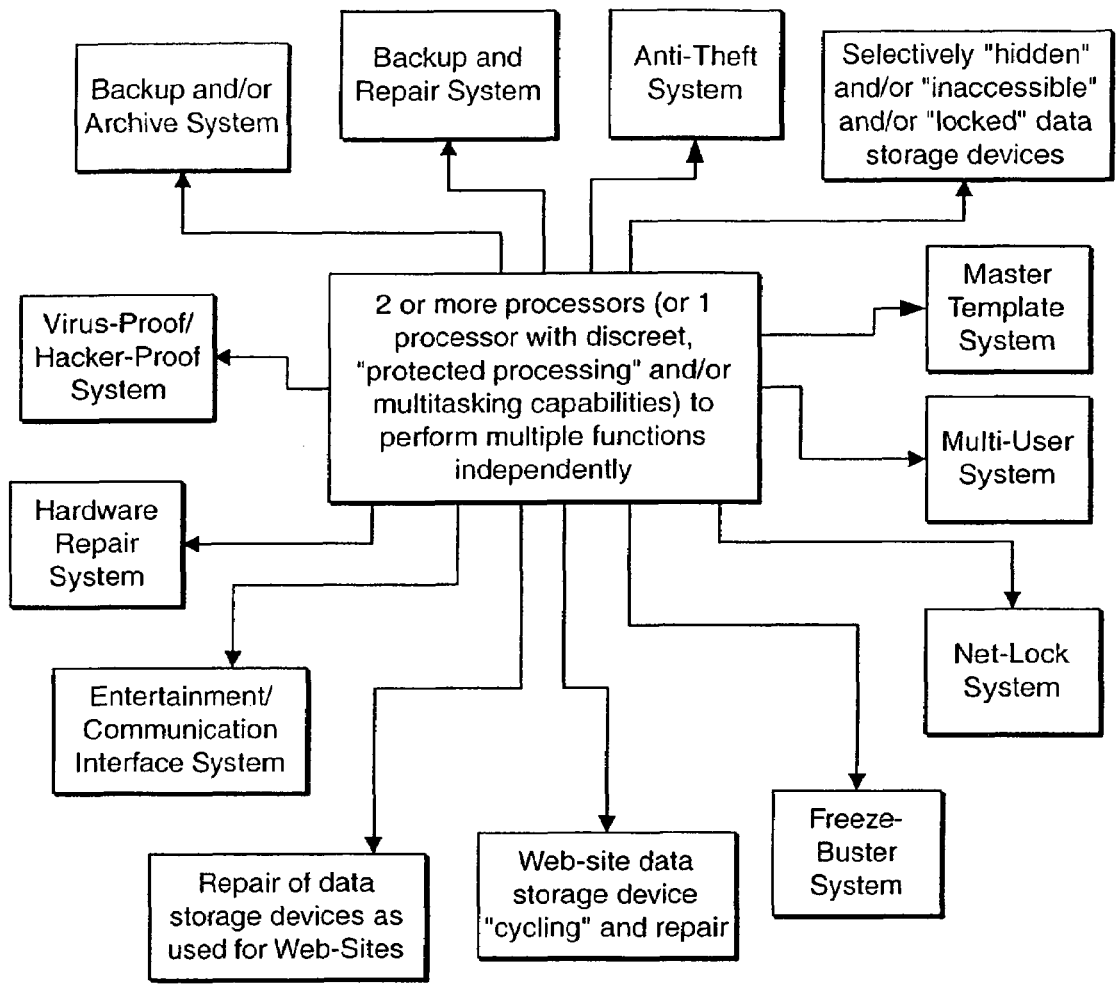

FIG. 13 illustrates a hard drive cable pin out for an IBM Travelstar 20GN, 30GT, and 32 GH rotating magnetic hard disc drive.

Page 166 of the Appendix illustrates an example of Backup and Repair system Switching Process as used for repair with other processes such as switching circuit boards, chips, devices, device identity, data storage devices, circuitry, global positioning transceiver & transmitter anti-theft and positioning system, computing hardware systems, ROM, backup storage devices, identity indicators, remote trigger and/or switch, and any Store Execute.

Pages 167-172 of the Appendix illustrate an embodiment of the invention.

Page 173 of the Appendix illustrates an embodiment of the invention.

Pages 174-206 of the Appendix illustrate a laptop computer system, according to the prior art.

Pages 207-220 of the Appendix illustrate a laptop computer system incorporating one embodiment of the present invention.

FIG. 14 illustrates a schematic system for supporting multiple independent computing environments, according to one embodiment of the present invention.

FIG. 15 illustrates a method for using an embodiment of the present invention.

FIG. 16 illustrates a method for initiating computing environments of FIG. 15.

FIG. 17 illustrates a method for configuring one or more switch systems of FIG. 14.

(The drawings are not necessarily to scale.)

SUMMARY

Herein are taught apparatus, methods, computer programs and computer program products for a computer to repair itself. In one aspect, embodiments of the invention provide a method for a computer repairing itself to an operational status at any time during operation, the method comprising the computer-executed steps of: booting from a first hard disk drive boot device disposed within a main computer hardware box of the computer; then, in response to a signal indicating a need for repair of the computer during the booting or during any operating state, booting from a second hard disk drive boot device also disposed within the main computer hardware box of the computer prior to the signal indicating a need for repair; and then repairing software on the first hard disk drive boot device while booted from the second hard disk drive boot device and selectively either: (i) maintaining operation of the computer from the second boot device to restore operational status of the computer during repairing of the software on the first hard disk device, or (ii) changing to operation of the computer from the second boot device to the first boot device to restore operational status of the computer.

In another aspect, embodiments of the invention provide a computer, computing system, or information appliance comprising: a main computer hardware box or housing; a CPU disposed within the main computer hardware box; a memory disposed within the main computer hardware box; first and second controllers for respective first and second hard disk drive data storage devices disposed within the main computer hardware box; a bus, communicatively coupling the CPU, memory and first and second controllers; and a switch, communicatively coupled to the second hard disk drive data storage device, for altering the accessibility of the second data storage device to the CPU and exposed through the main computer hardware box or at a surface of the main computer hardware box for manipulation by a user.

In another aspect, embodiments of the invention provide a computer, computer system or information appliance comprising: a plurality of data stores including at least one protected data store; a plurality of switching system for communicatively coupling at least one source with a plurality of destinations, including a data store switch system wherein the source is a data store source, and a I/O switch system wherein the source is a peripheral source; a plurality of computing environments for performing a processing activity independently of another computing environment, each the computing environment is identified by at least one trait selected from a plurality of traits, coupled between the data store switch system and the I/O switch system, wherein the destination is the computing environment, the switching system communicatively couples the source and the destination according to the traits; at least one control computing environment selected from the plurality of computing environments for configuring the switch configuration according to the processing activity and the traits, communicatively coupled with the protected data store; and, at least one user computing environment selected from the plurality of computing environments, wherein the processing activity is not performed on the protected data store.

In another aspect, embodiments of the invention provide a computer system comprising: a plurality of data stores; a protected data store selected from the plurality of data stores for storing at least the user data; a data store switch system coupled with the plurality of data stores, the switch system coupled with a data store switch configuration for configuring communication with one or more data store; an I/O switch system coupled with at least one peripheral, the I/O system coupled with an I/O system configuration including a plurality of traits for configuring the communication with the peripheral; a plurality of computing environments, each the computing environment identified by at least one trait selected from the plurality of traits, including: a data store switch communication path coupled with the data store switch, the data store switch communication path coupling at least one data store with the computing environment according to the data store switch configuration; an I/O switch communication path coupled with the I/O switch system, the I/O switch communication path for coupling the peripheral with the computing environment according to the I/O switch system configuration; the computing environment capable of performing a processing activity including receiving input from the I/O switch system and sending output to the I/O switch system, the processing activity performed independently of the processing activity of another computing environment; a control computing environment selected from the plurality of computing environments for configuring the data store switch configuration, for configuring the I/O switch system configuration, the data store switch configuration supporting communication between the control computing environment and the protected data store; and at least one user computing environment selected from the plurality of computing environments; wherein the I/O switch system configuration is configured to direct a received input to at least one of the computing environment based on the trait, the I/O switch system configuration is configured to direct an output generated by one or more of the plurality of computing environments to the peripheral based on the trait.

In another aspect, embodiments of the invention provide a computer system comprising: a communication device for communicating over a communications link to a second computer system, a port for communicatively coupling the computer system and the communication device over a bus having a plurality of data lines; and, a switch coupled within the data line selected from the plurality of data lines for enabling and disabling the communication device.

In another aspect, embodiments of the invention provide a computer system comprising: a port for communicatively coupling the computer system and a peripheral over a bus having a plurality of data lines; and a switch coupled to at least one data line selected from the plurality of data lines for cycling the peripheral.

In another aspect, embodiments of the invention provide computer system comprising: one or more peripheral devices including a means for communication, an coupling member, and a capability for emitting light; a receptacle mechanically coupled with the computer system for engaging the coupling member of the peripheral device; and, a port for communicatively coupling the computer system and the peripheral devices coupled with receptacle.

In another aspect, embodiments of the invention provide a computer system comprising: a plurality of data stores; a data store switch coupled with the plurality of data stores for altering the accessibility of the data store; a peripheral controller for communicatively coupling the data store switch and the computer system; an accessible data store selected from the plurality of data stores communicatively coupled with the peripheral controller; and a computer program including at least one instruction capable of executing on the computer system, the instruction for analyzing the accessible data store to determine a health of the accessible data store; the health selected from a group of healths consisting of: a corruption health, and a correct health; if the corruption health is determined then the data store switch is actuated to remove accessibility to the accessible data store, and add a second accessible data store, if the correct health then the data store switch remains is not altered.

In other aspects the invention provides methods and procedures for configuring and operating the computers, computer systems, networks, and information appliances in the manner described. In other aspects the invention provides computer programs and computer program products implementing the inventive methods and procedures in whole or in part.

DESCRIPTION OF EMBODIMENTS OF THE INVENTION

Overview of Selected Aspects and Embodiments of the Invention

An example of the invention in use follows: A user runs an application on a computer incorporating an embodiment of the invention. At some point, the user modifies the application or underlying operating system to the point that the application, the operating system or both become unusable. Indeed, the user may no longer be able to even boot the operating system.

Recognizing that the computer needs to be repaired, the user throws a switch on the computer. The computer fixes the malfunctioning software and so informs the user.

The user can then re-boot the computer. On re-booting, the user again has access to a correctly functioning operating system, application and data files.

A Self-Repairing Computer

Figure 16A:
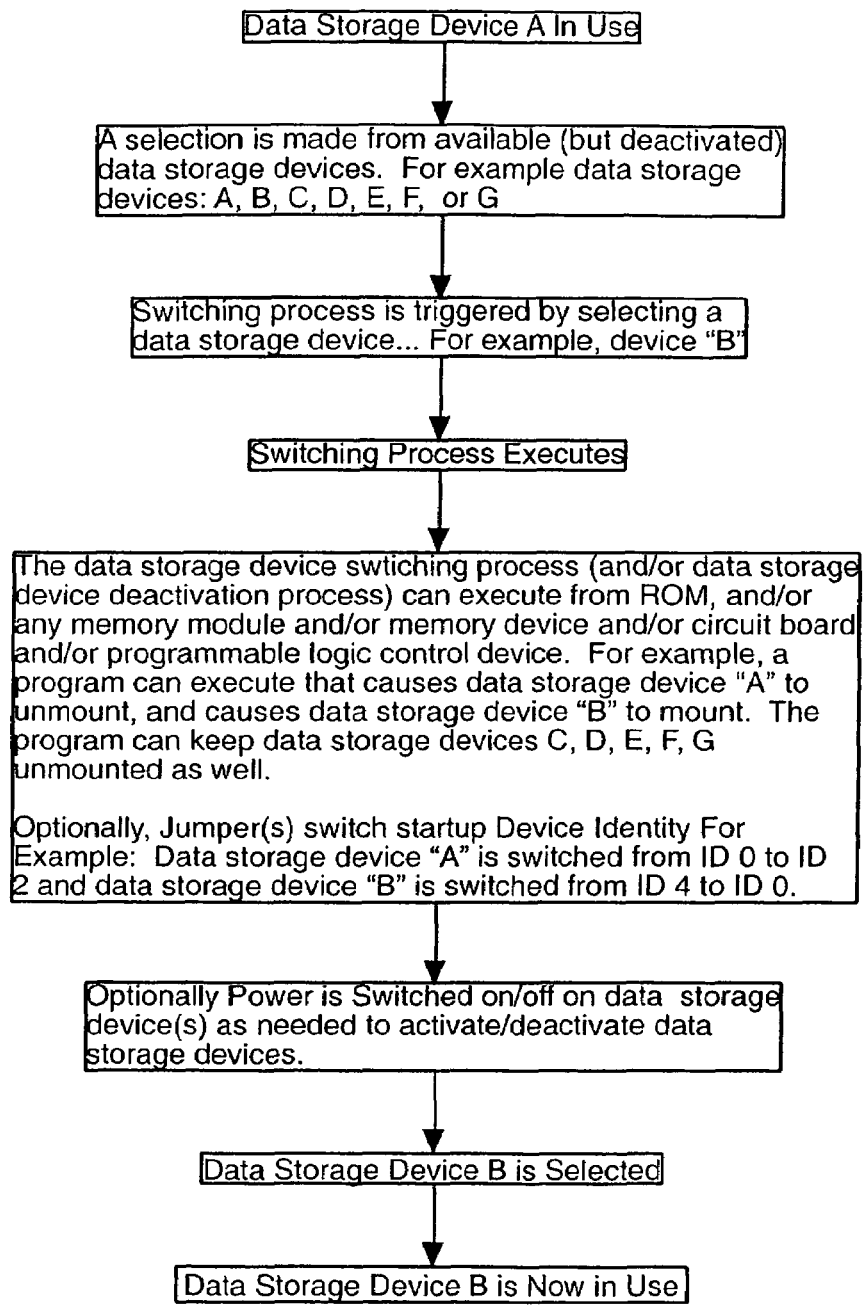
Figure 16B:
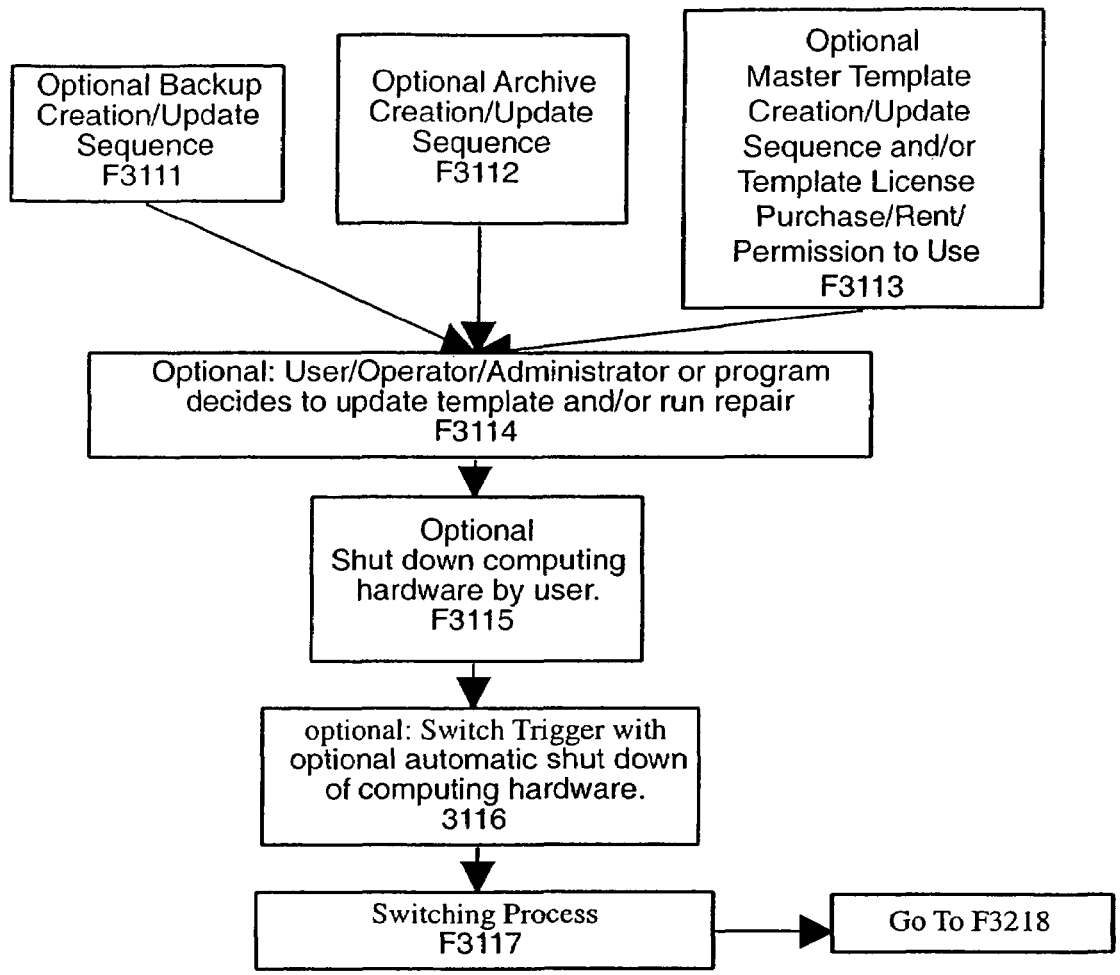
Figure 16C:
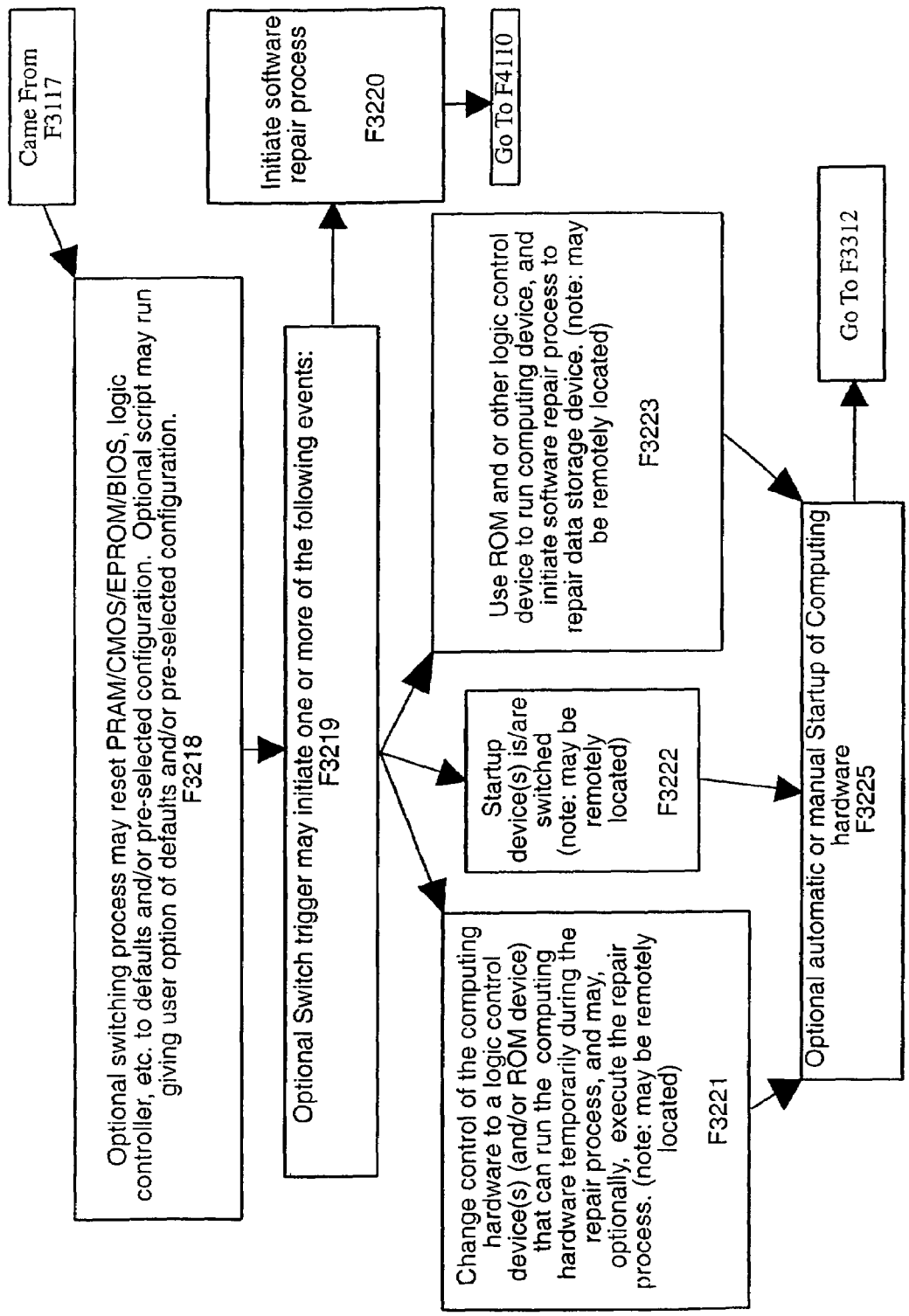
Figure 16D:
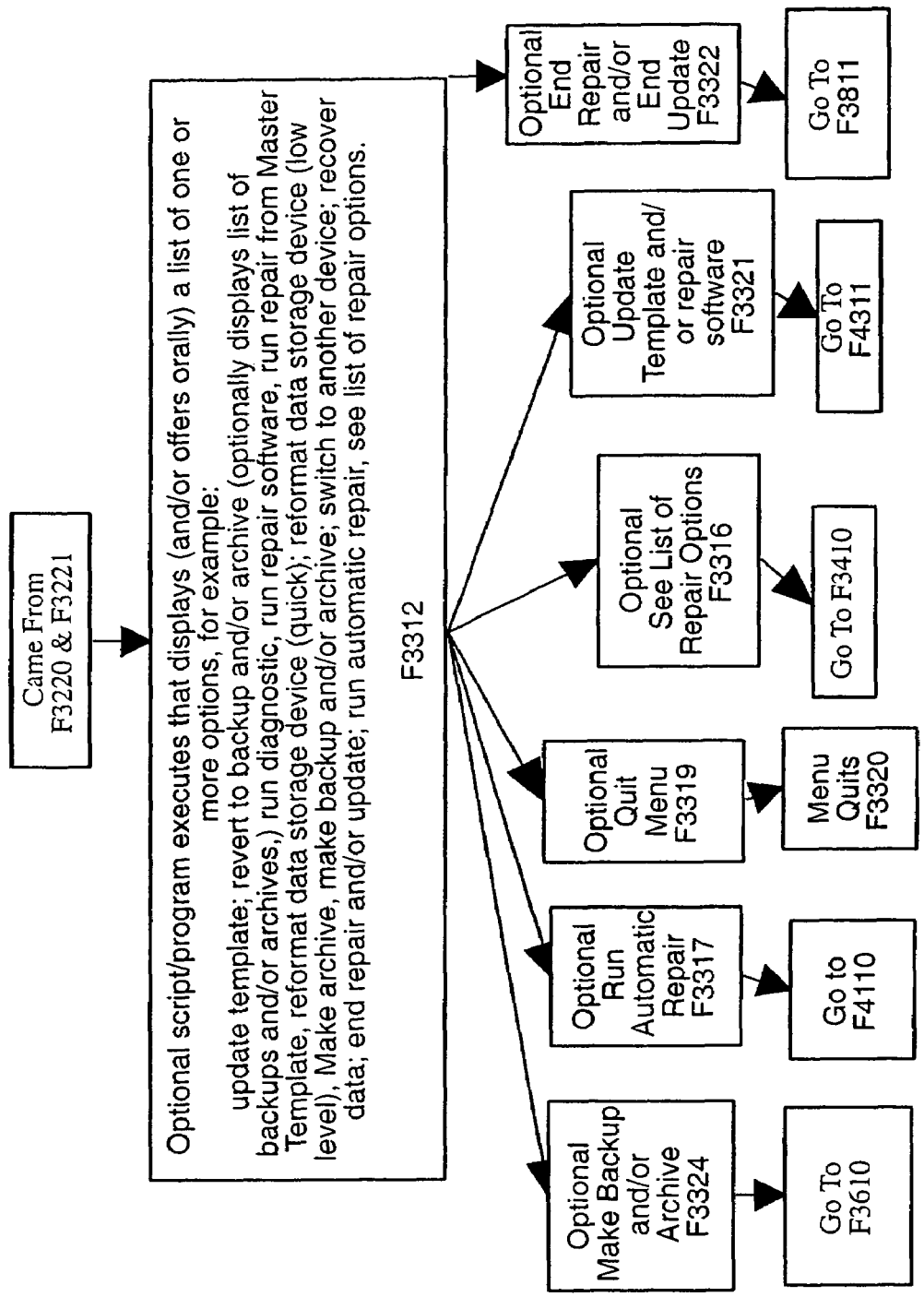
Figure 16E:
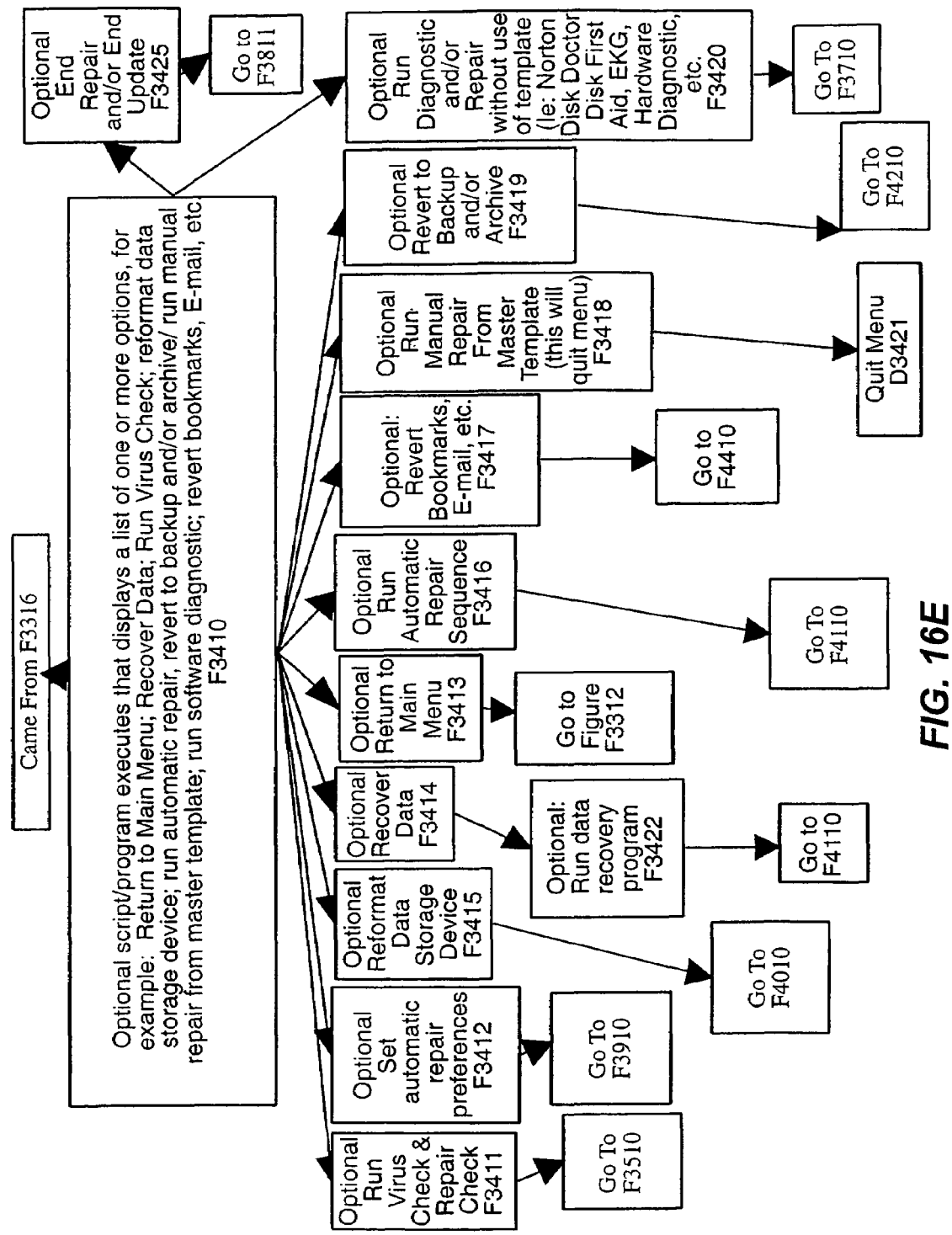
Figure 16F:
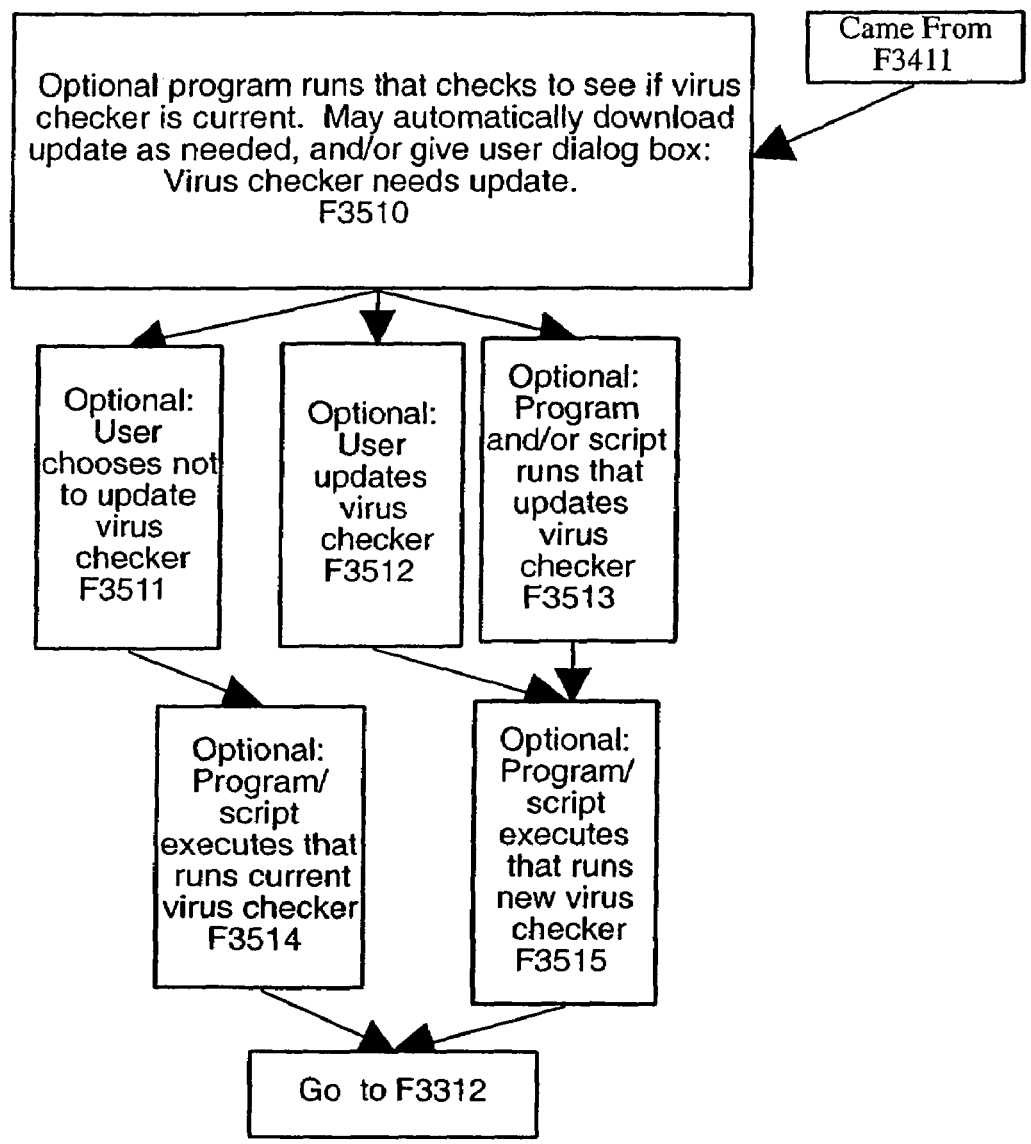
Figure 16G:
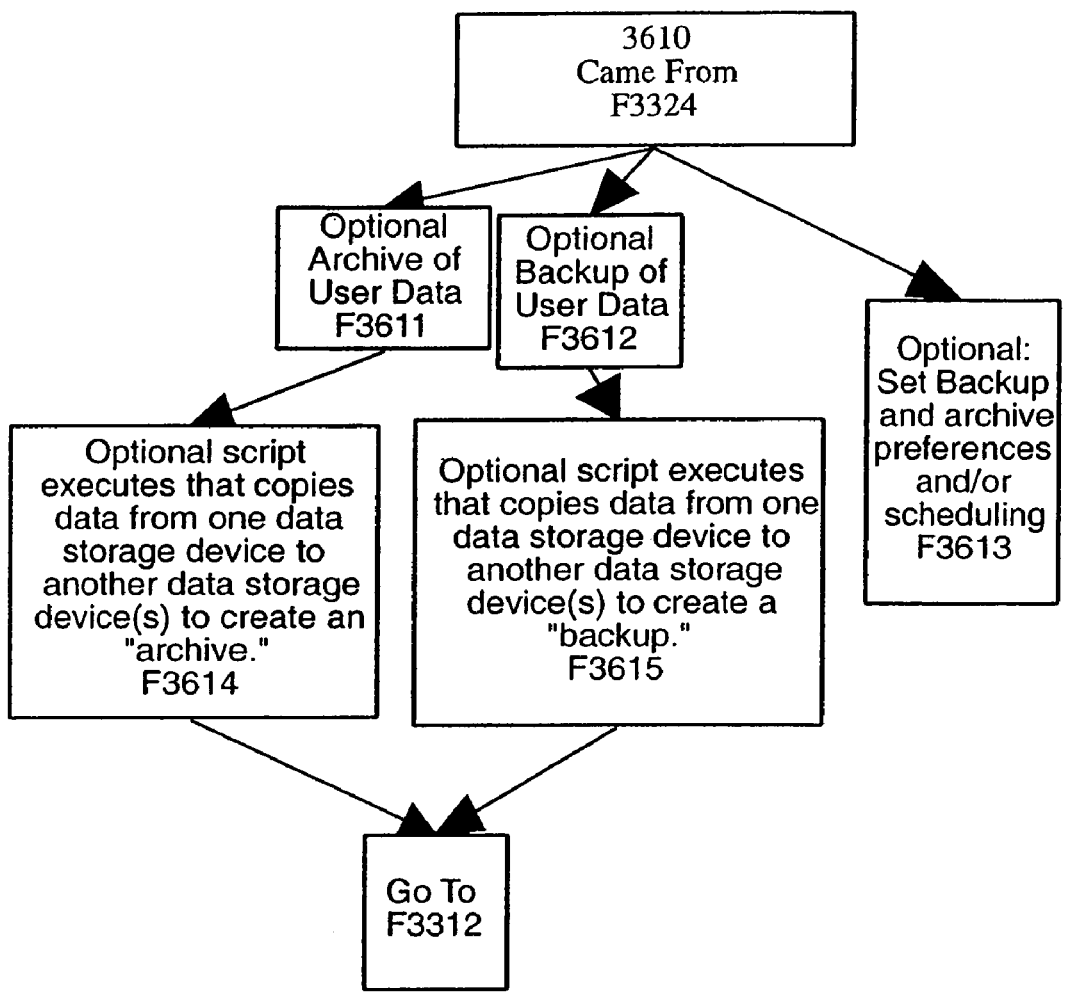
Figure 16H:
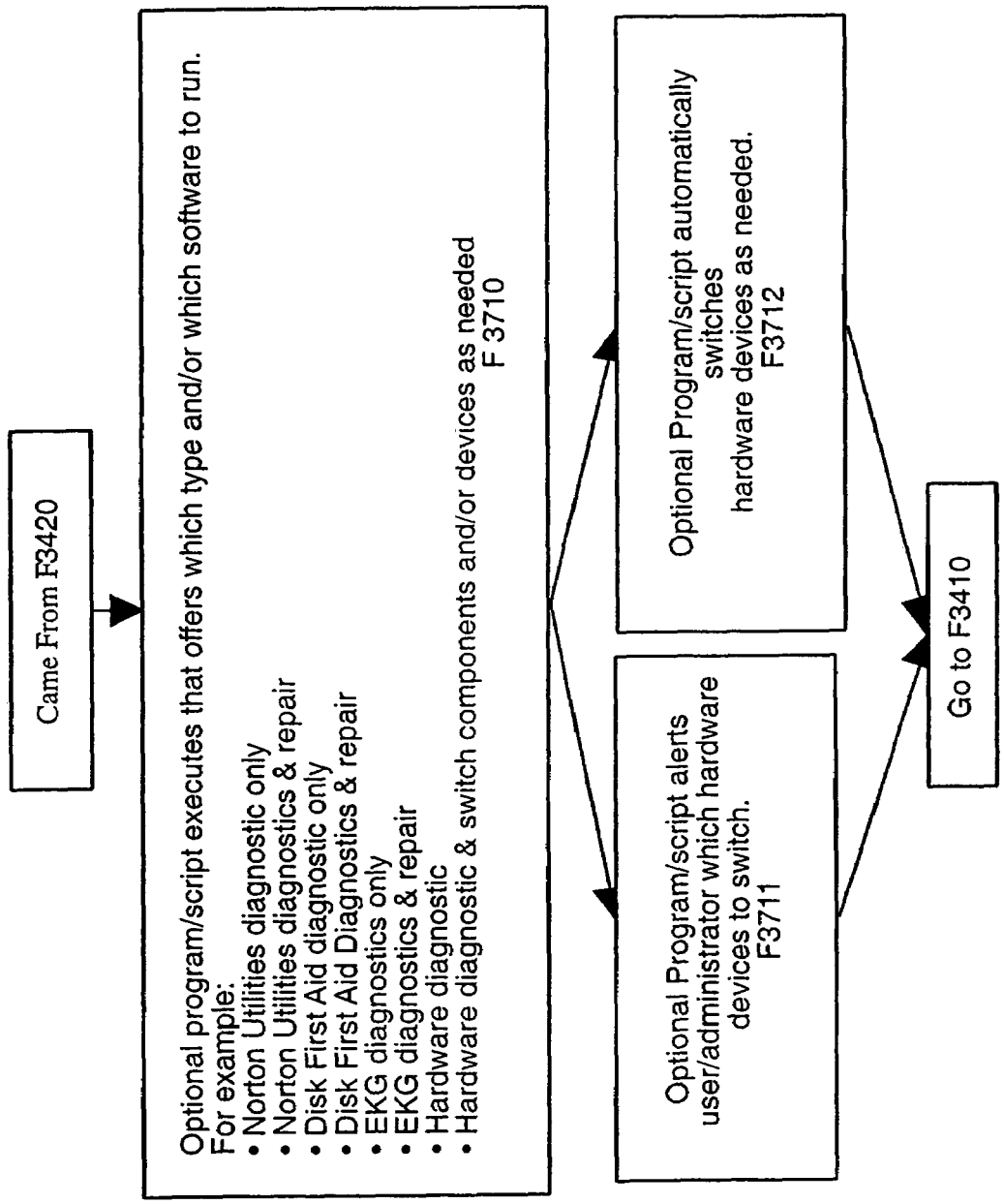
Figure 16I:
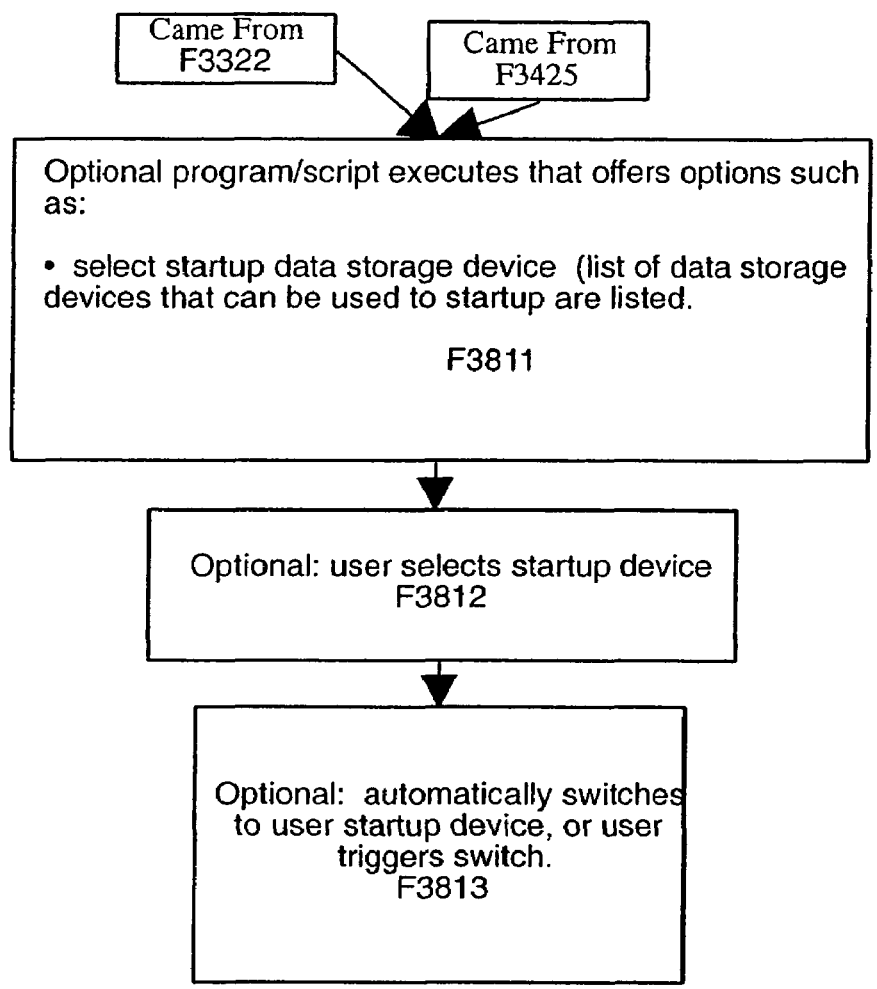
Figure 16J:
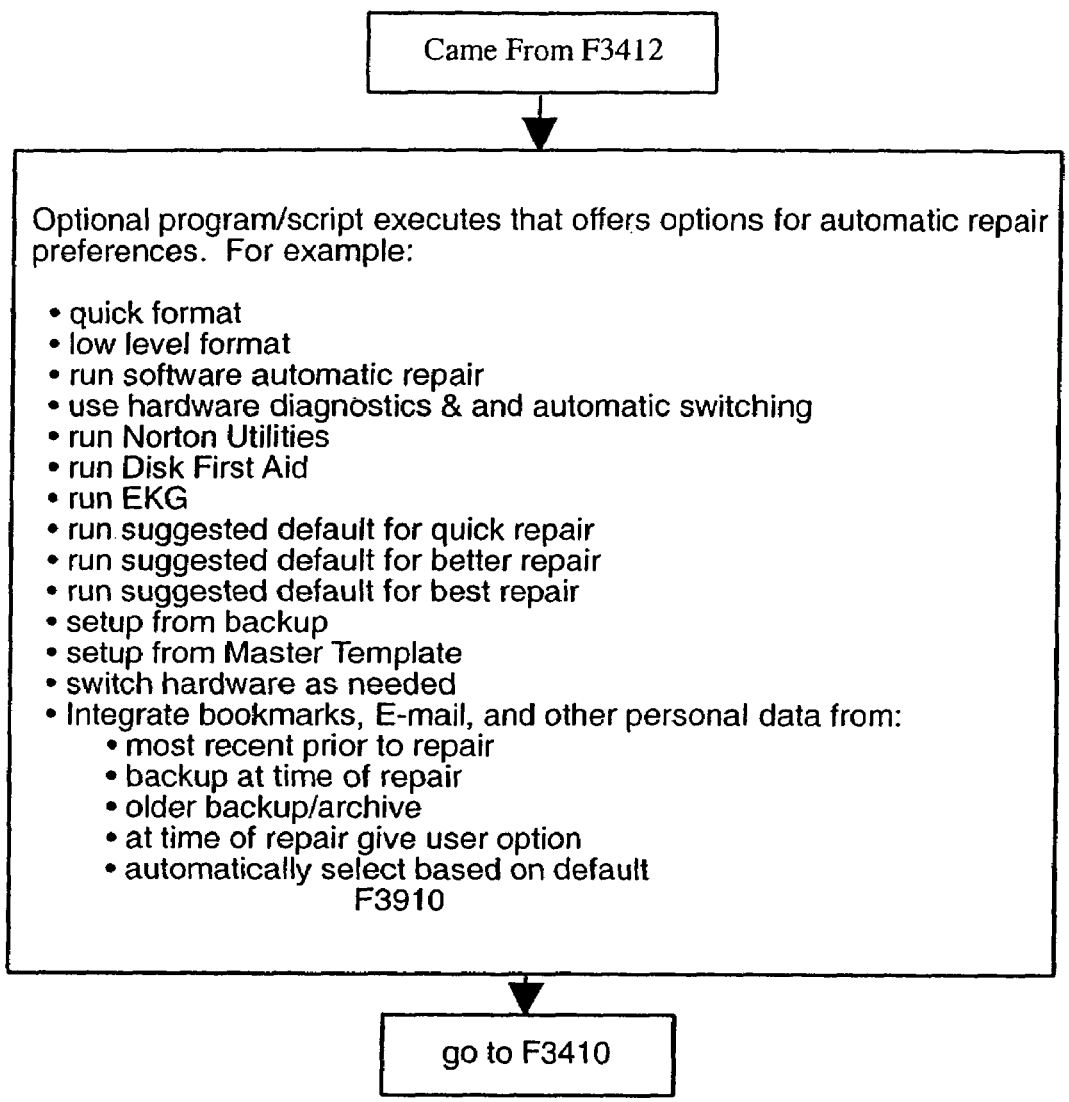
Figure 16K:
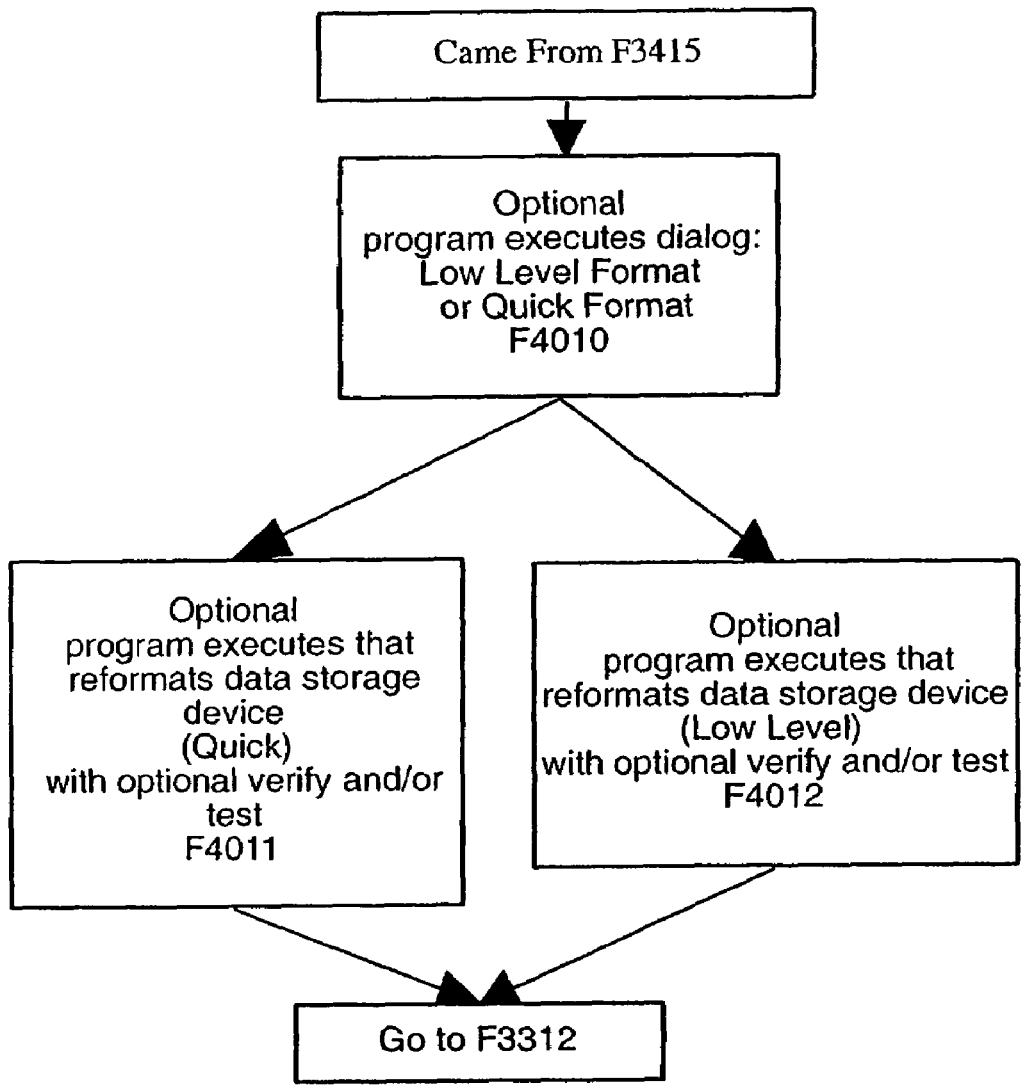
Figure 16L:
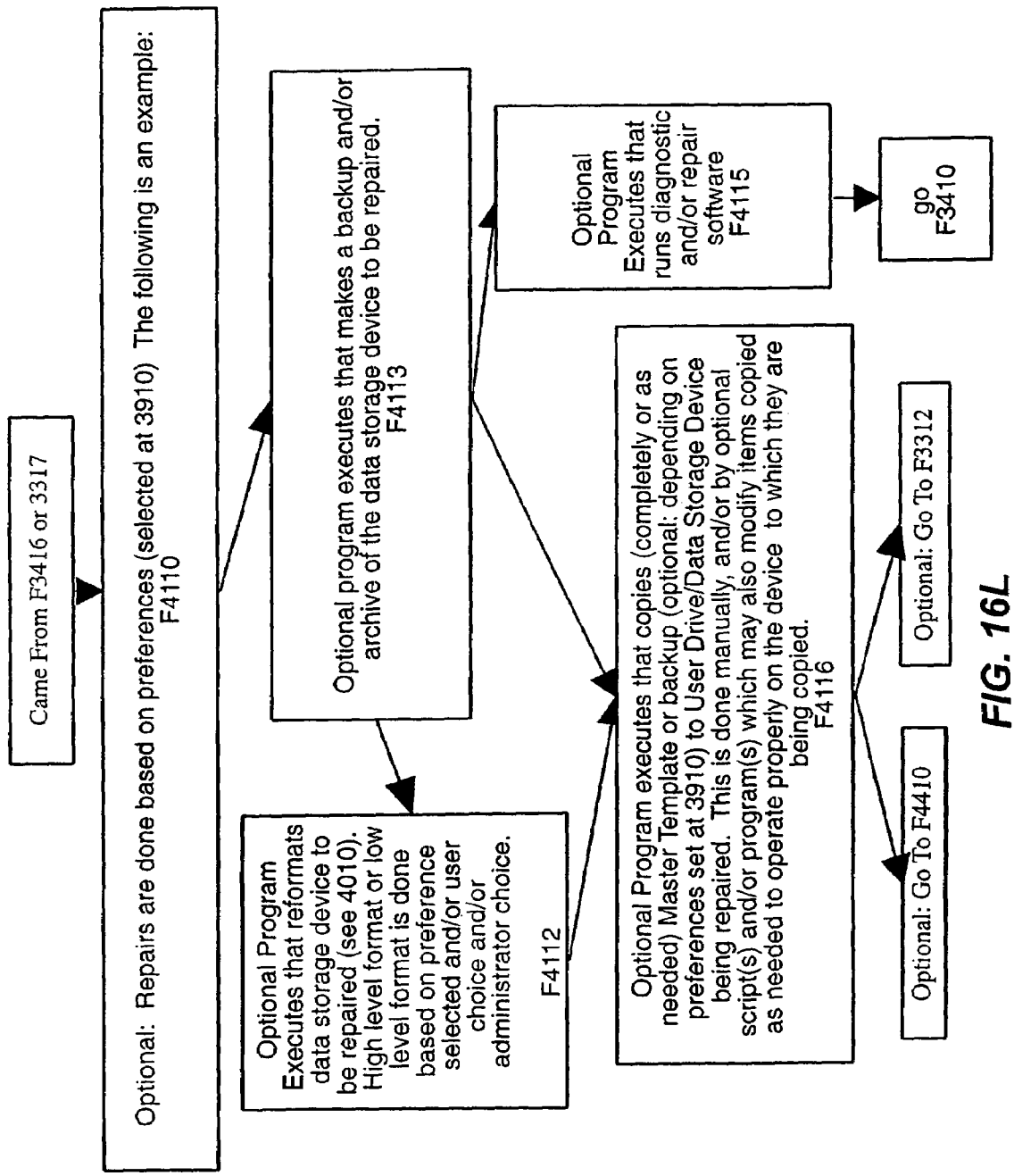
Figure 16M:
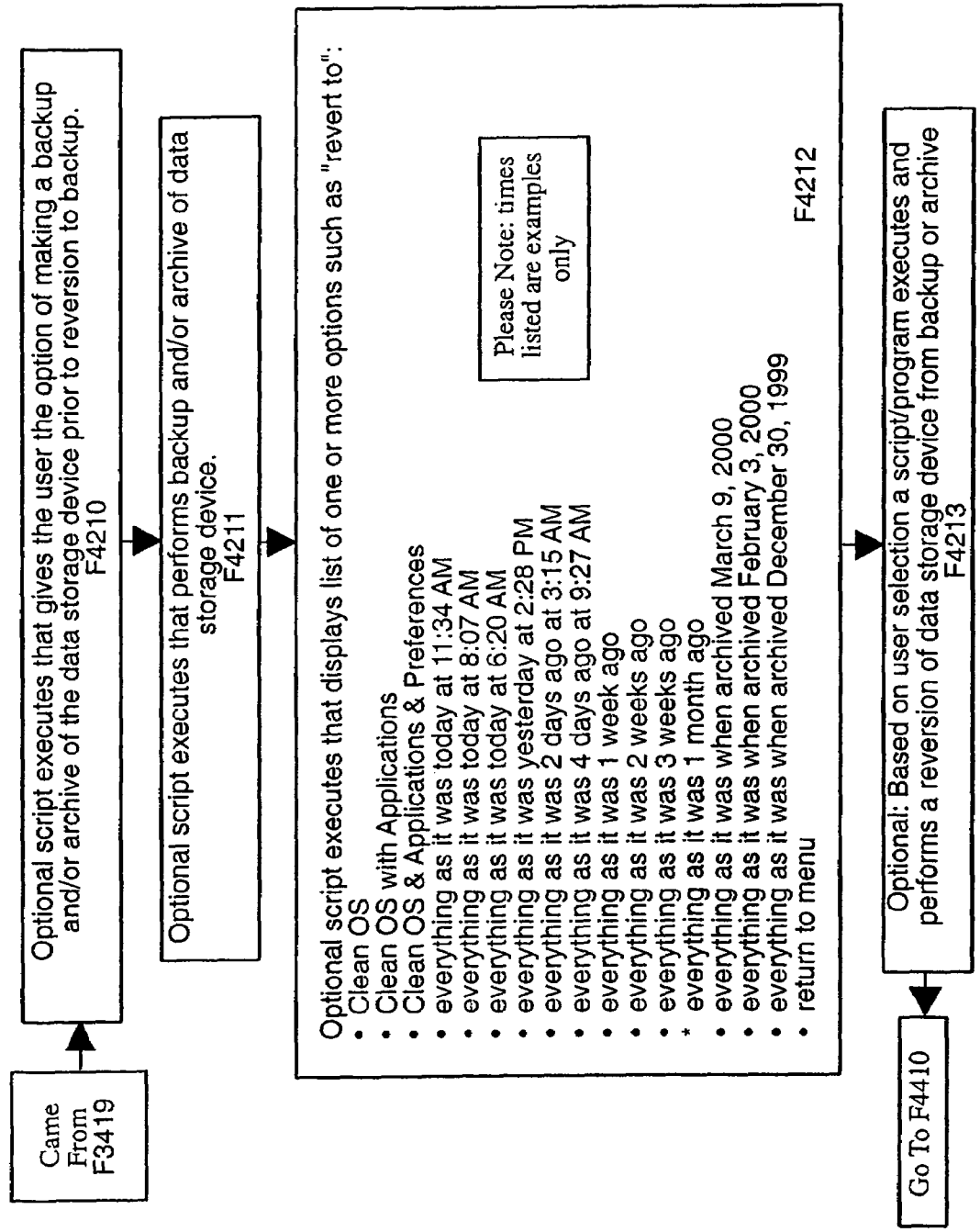
Figure 16N:
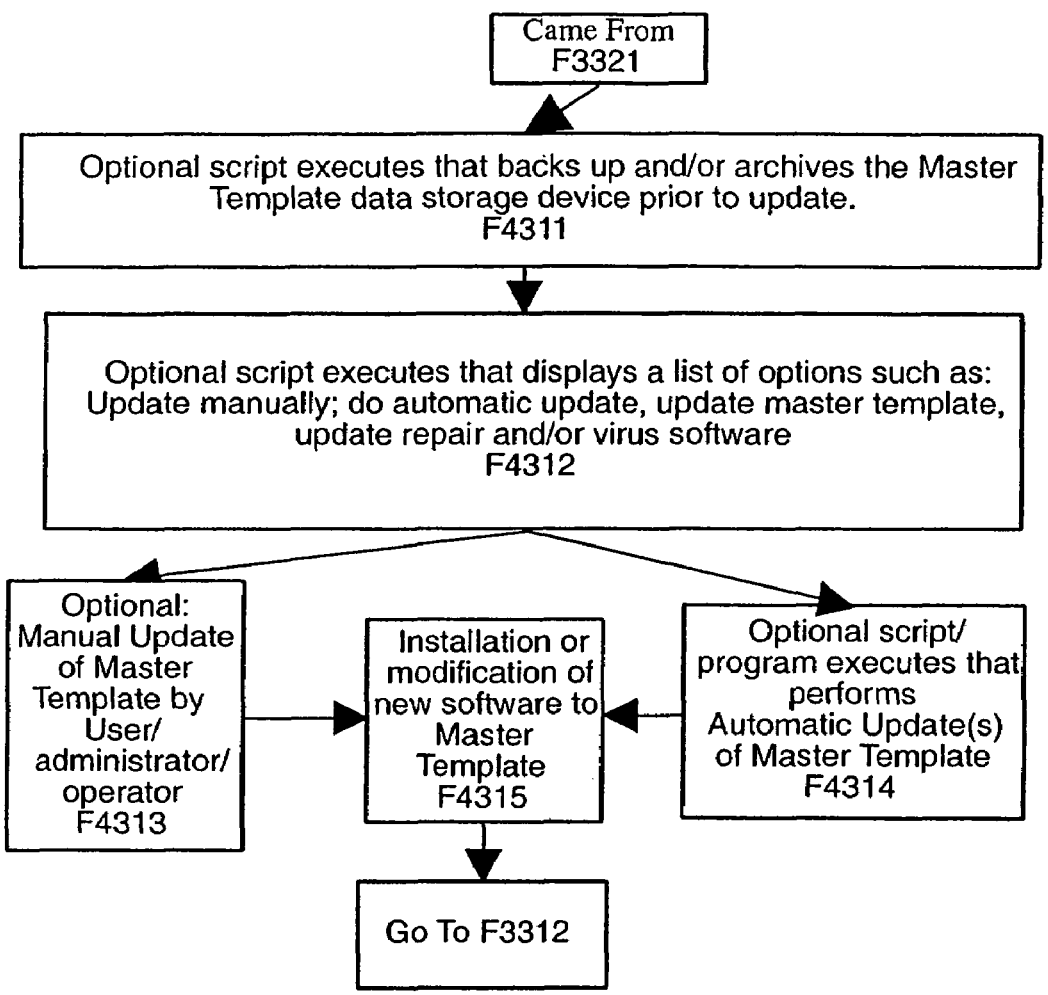
Figure 16O:
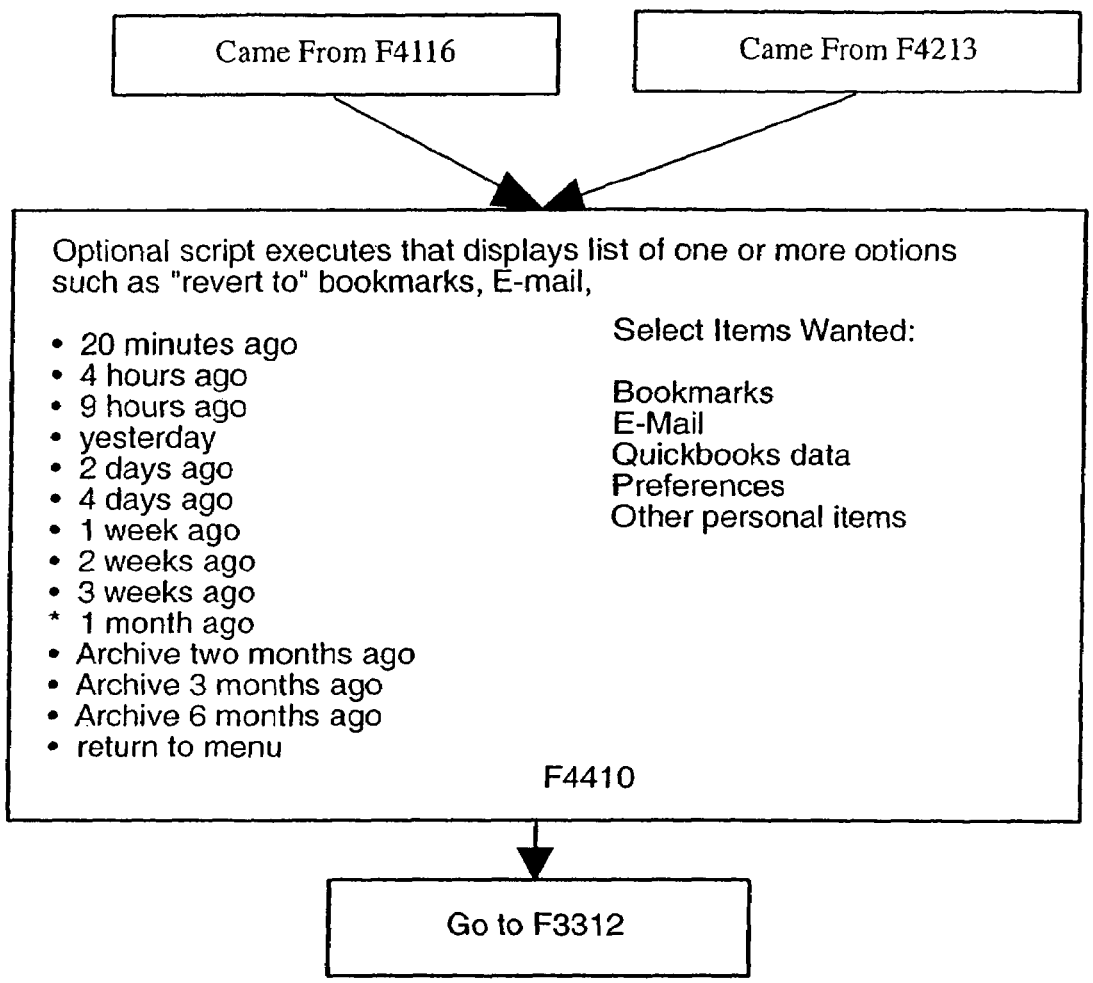
Figures 1, 16P:
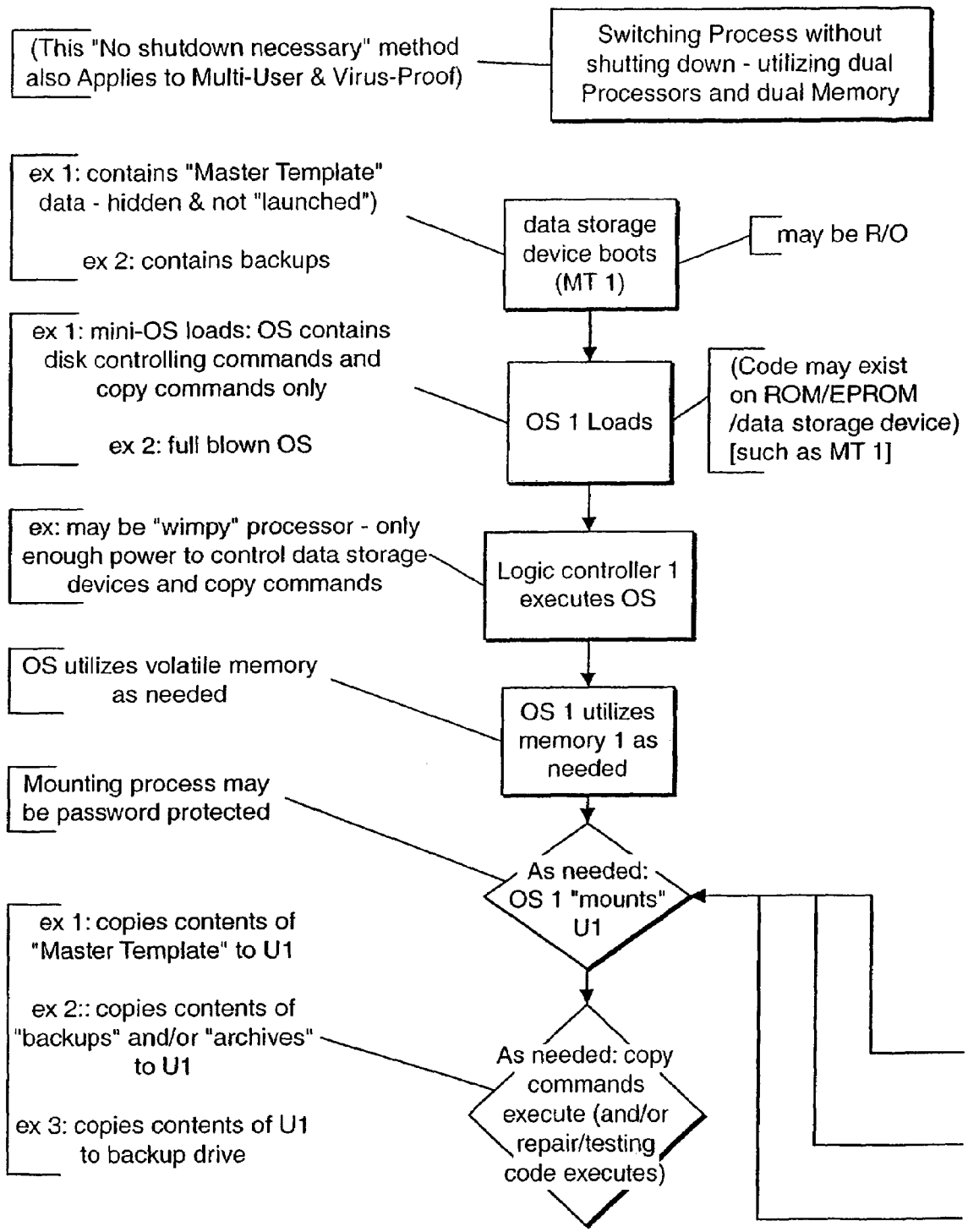
FIG. 1 illustrates a computer incorporating an embodiment of the invention.

FIG. 1 illustrates a computer 1 incorporating an embodiment of the invention. The computer 1 may include a CPU 10, volatile memory 11, peripheral controllers 17, 18, a first non-volatile data store 12 and a bus 15, all well known in the art.

The computer 1 may also include switches 13, 19, a second non-volatile data store 14, a controller 1A, a power supply 1B, an output device 1C and an input device 1D.

The bus 15 may communicatively couple the volatile memory 11 and the peripheral controllers 17, 18 to each other and to the CPU 10. The peripheral controllers 17, 18 may communicatively couple with the data stores 12, 14, respectively.

The switches 13, 19, the controller 1A, power supply 1B, output device 1C and input device 1D may form a data-store switch 1Z. A data-store switch may alter the accessibility of a connected data store according to the setting of the switch.

The controller 1A may communicatively couple with the switches 13, 19, the output device 1C and the input device 1D. The power supply 1B may supply the controller 1A (and other switch components) with power. More particularly, the power supply 1B may power the controller 1A independently of the power to the rest of the computer 1.

The power to the switch 1Z may come from the same source as the power for the rest of the computer (the wall outlet or laptop battery, for example). The switch 1Z may then be powered from that supply even when the rest of the computer 1 is not. FIG. 10 illustrates this embodiment of the invention.

The switch 13 may communicate with the data store 12. The switch may control (toggle, for example) the identification settings of the data store 12.

The switch 19 may couple to the data store 14. The switch 19 may control (toggle, for example) the power to the data store 14.

The volatile memory 11 may be random-access memory. The data stores 12, 14 may be magnetic disks, for example.

The output device 1C may be the monitor of the computer 1, LEDs or an LCD distinct from the monitor, for example.

Figures 2, 16P:
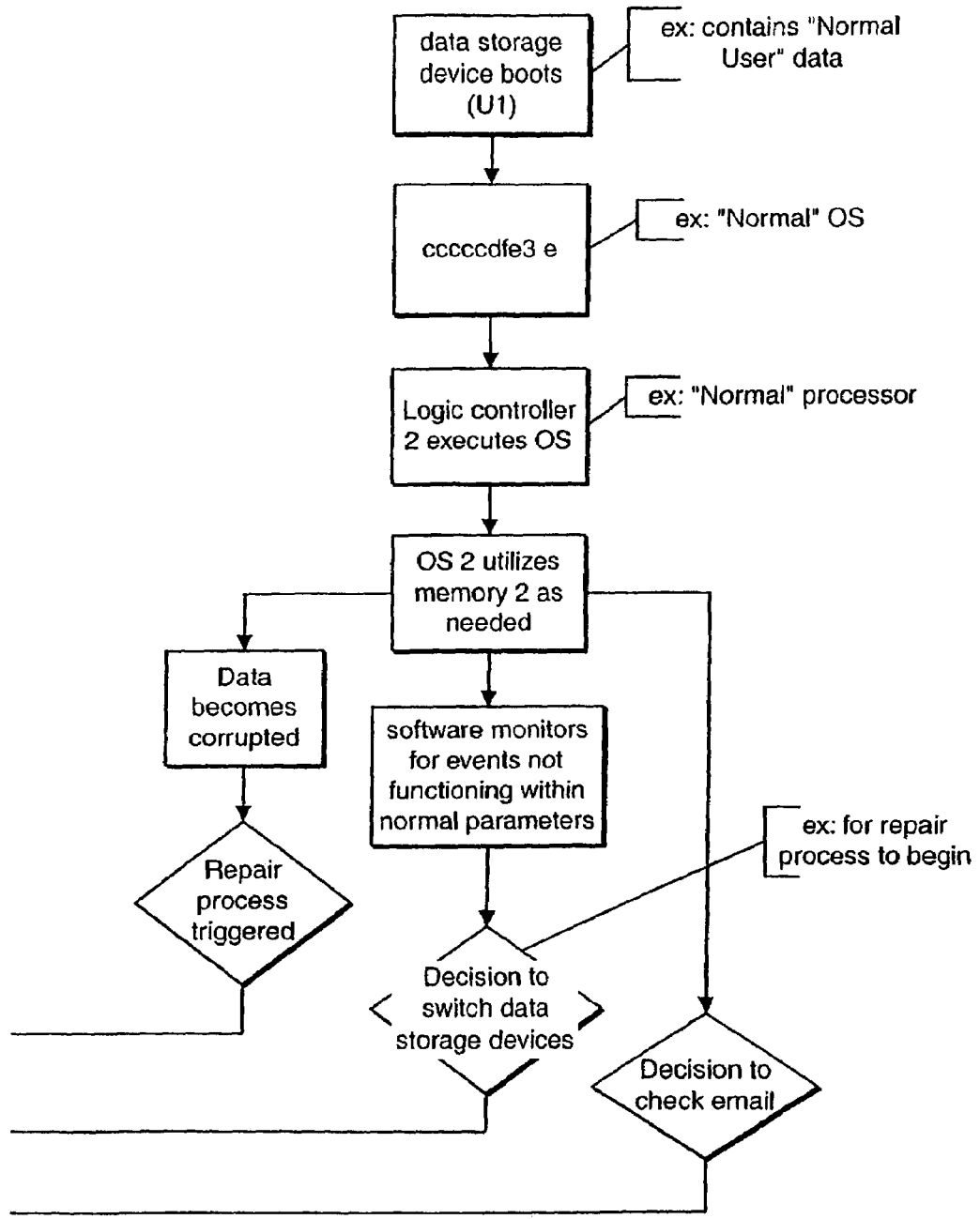
FIG. 2 is a schematic of a data-store switch according to an embodiment of the invention.
Figure 16Q:
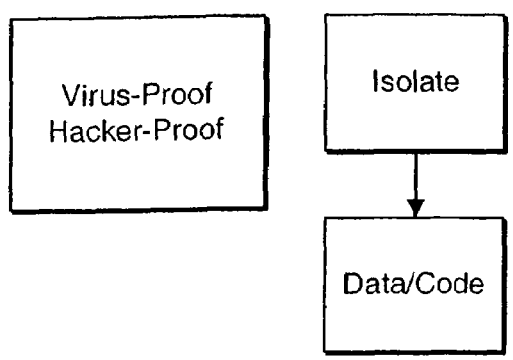
Figure 16R:
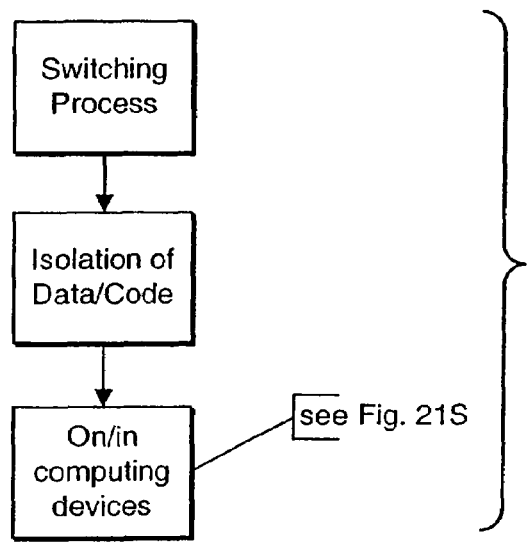
Figure 16S:
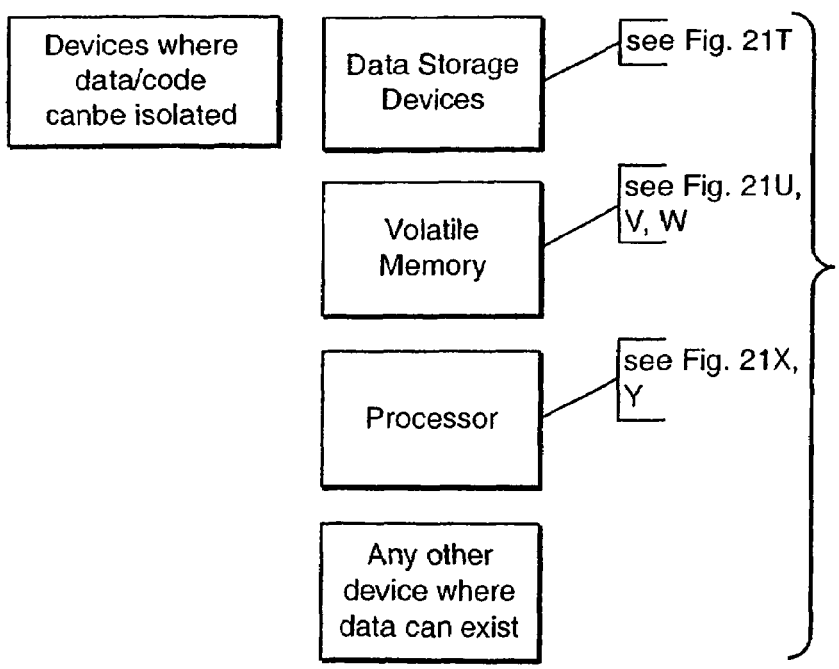
Figures 1, 16T:
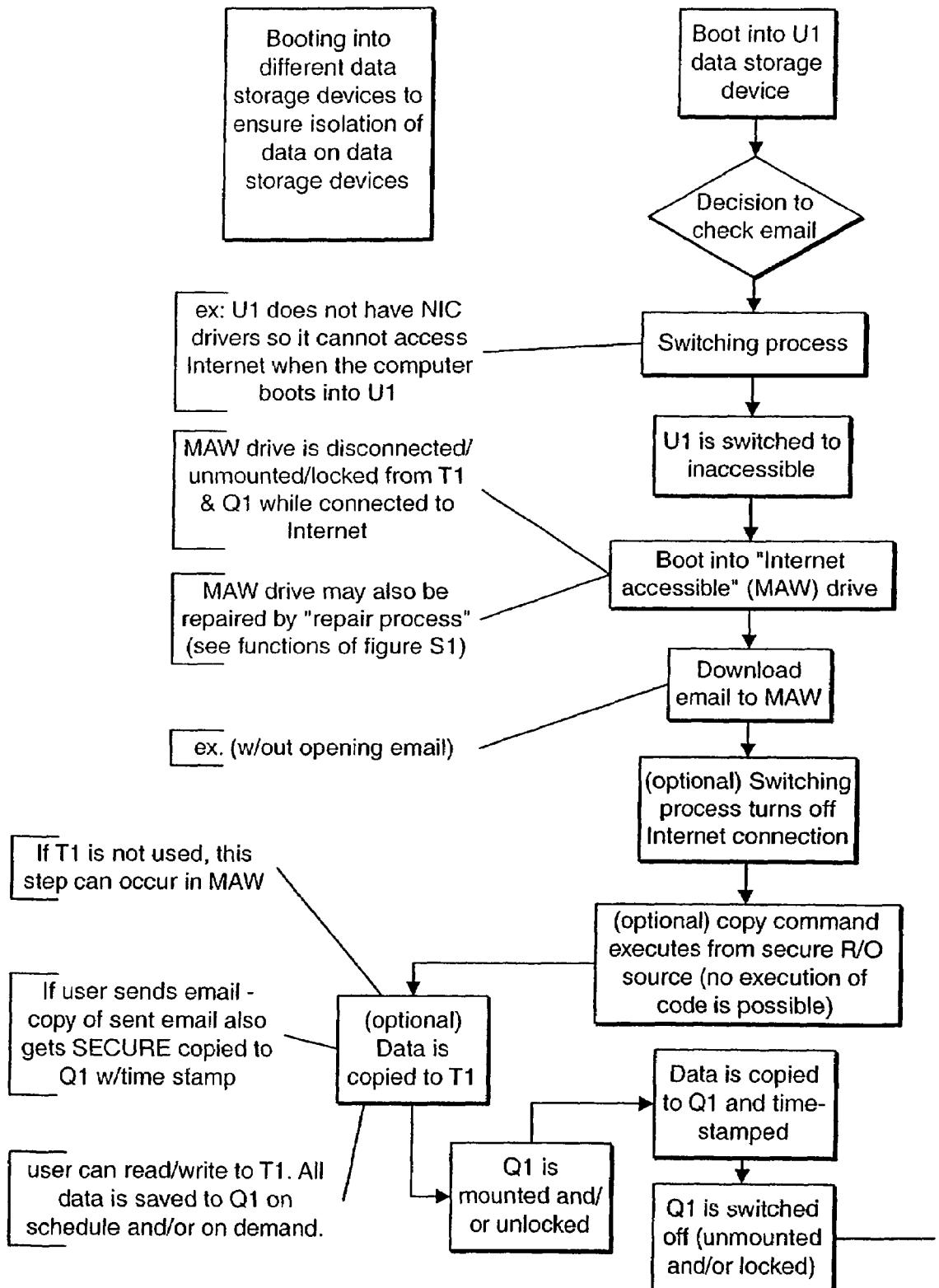
Figures 2, 16T:
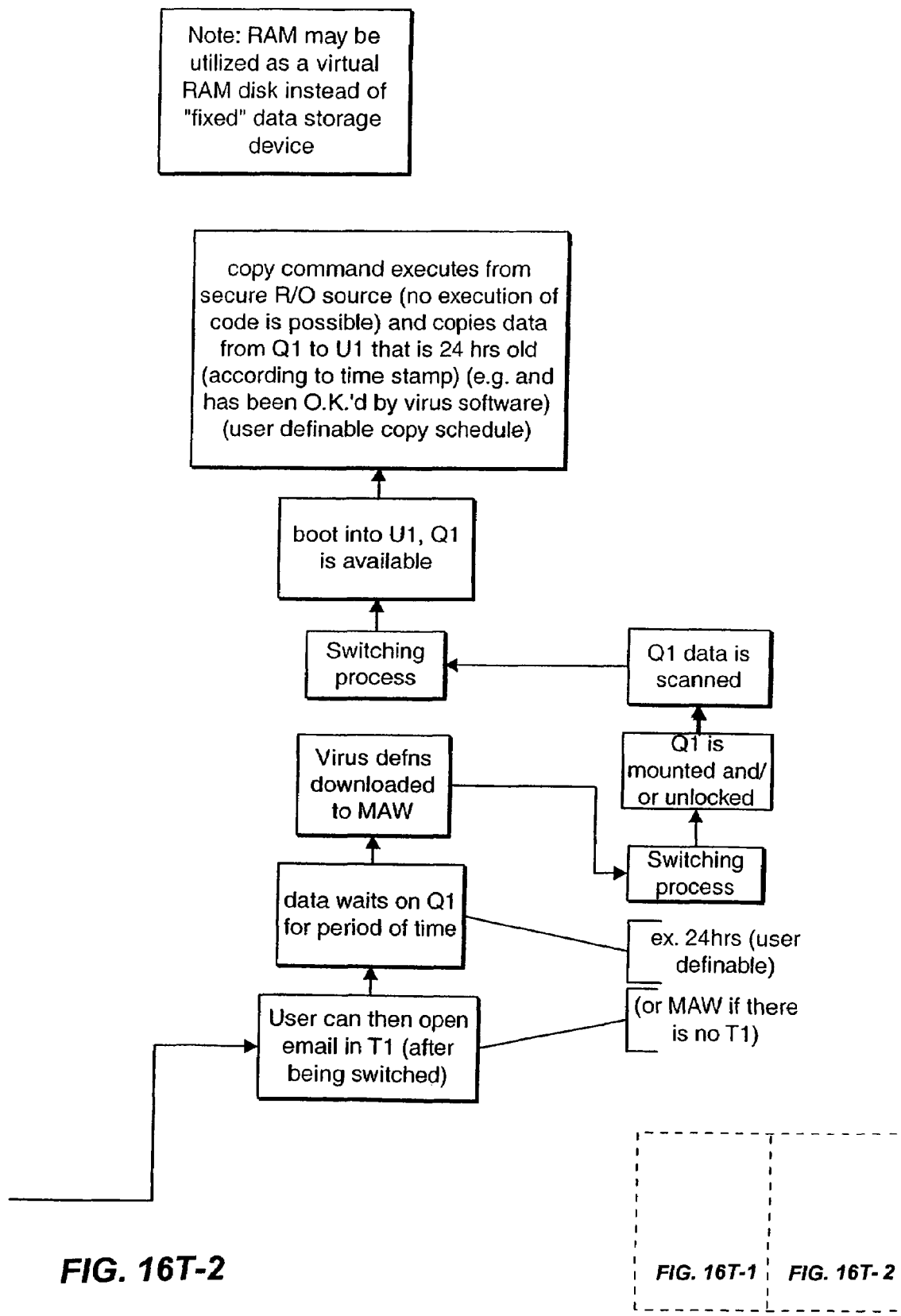
Figure 16U:
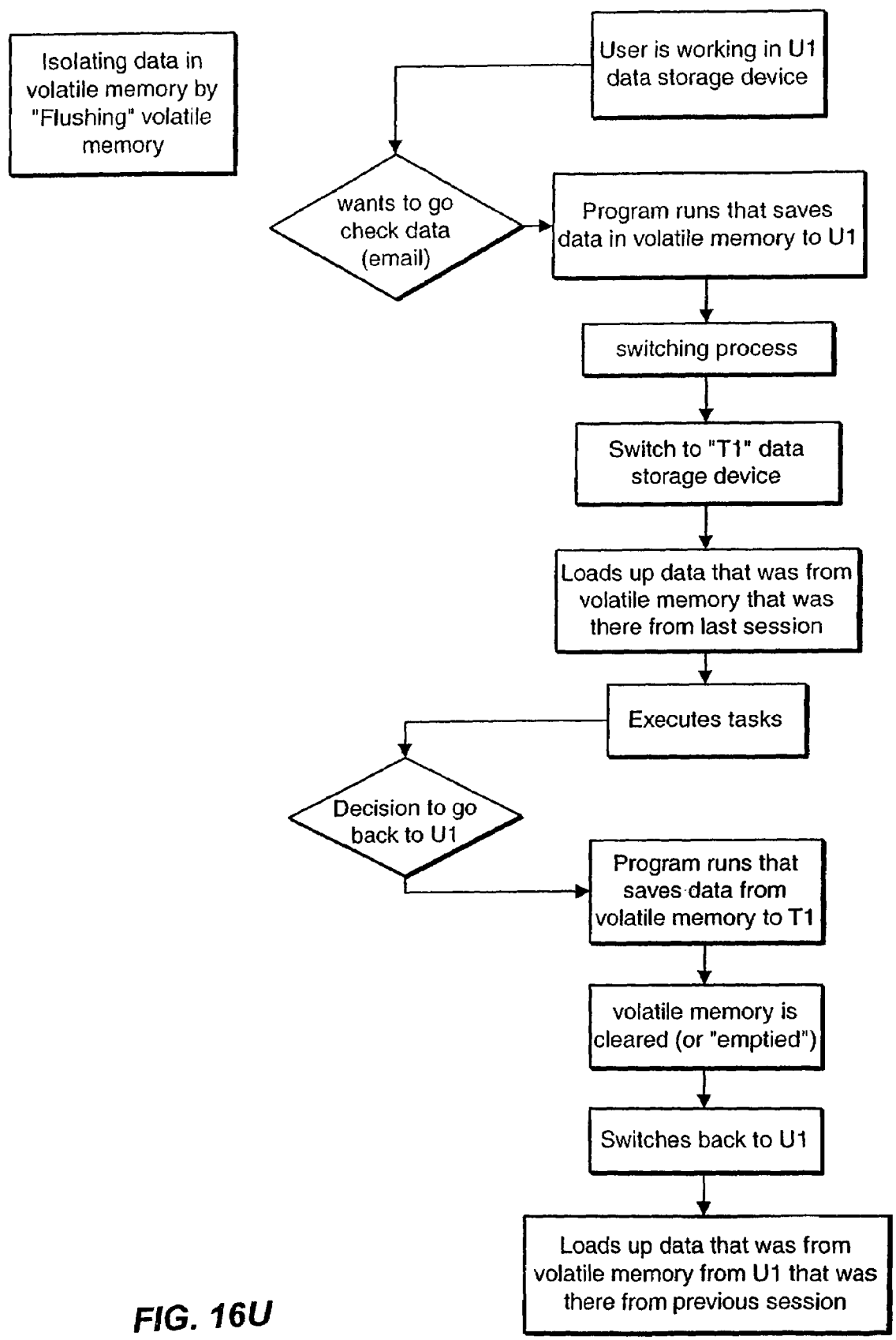
Figure 16V:
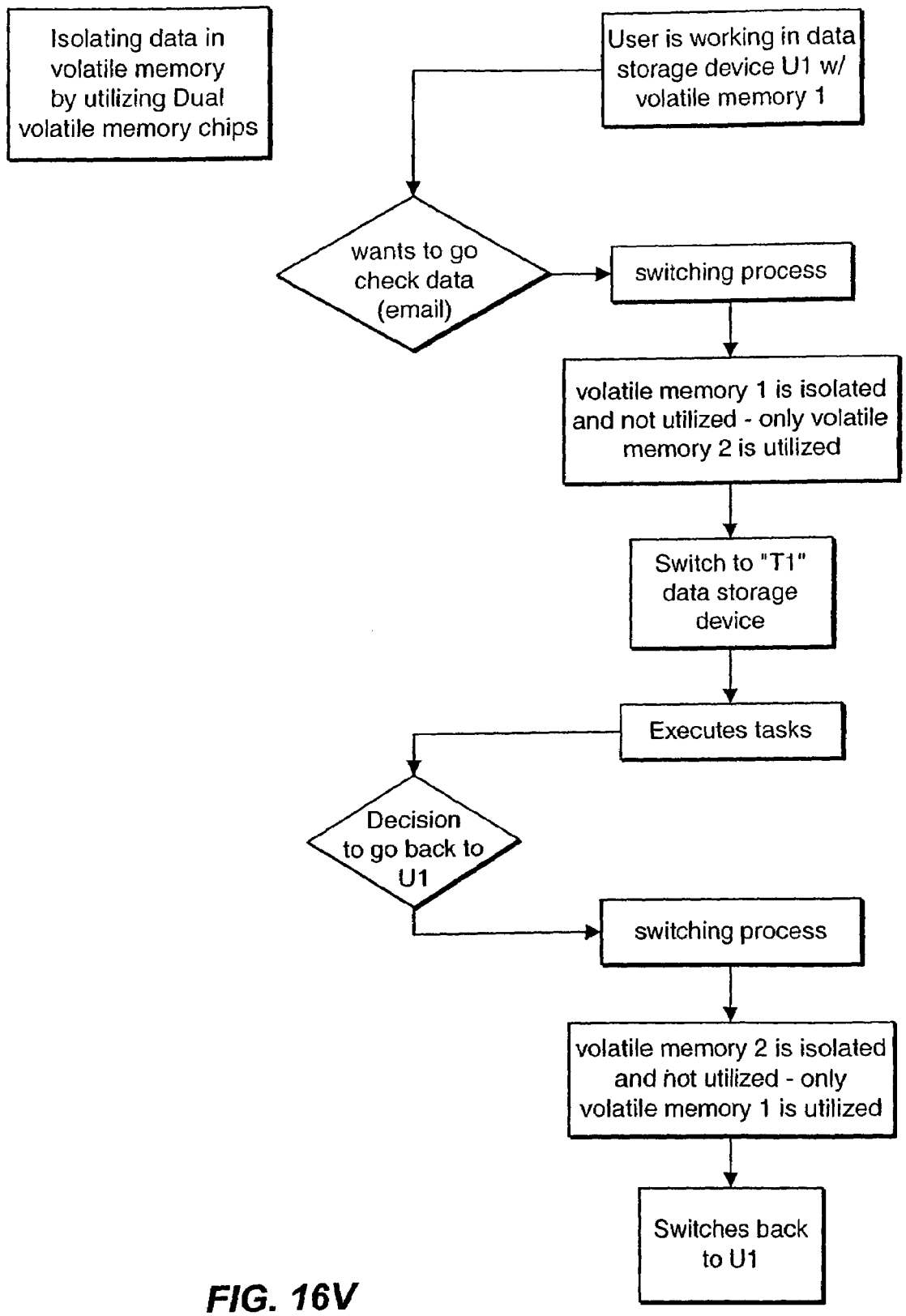
Figure 16W:
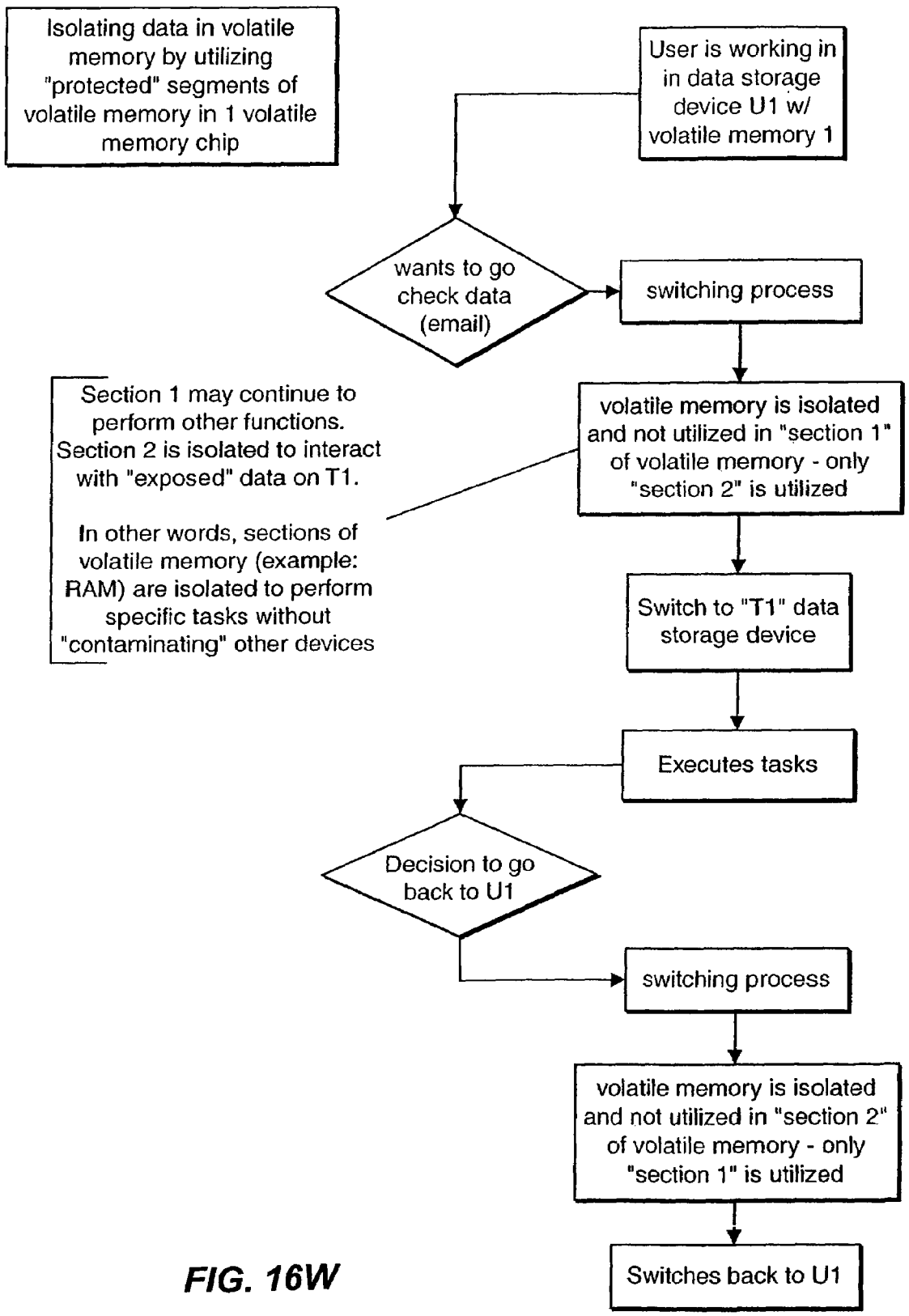
Figure 16X:
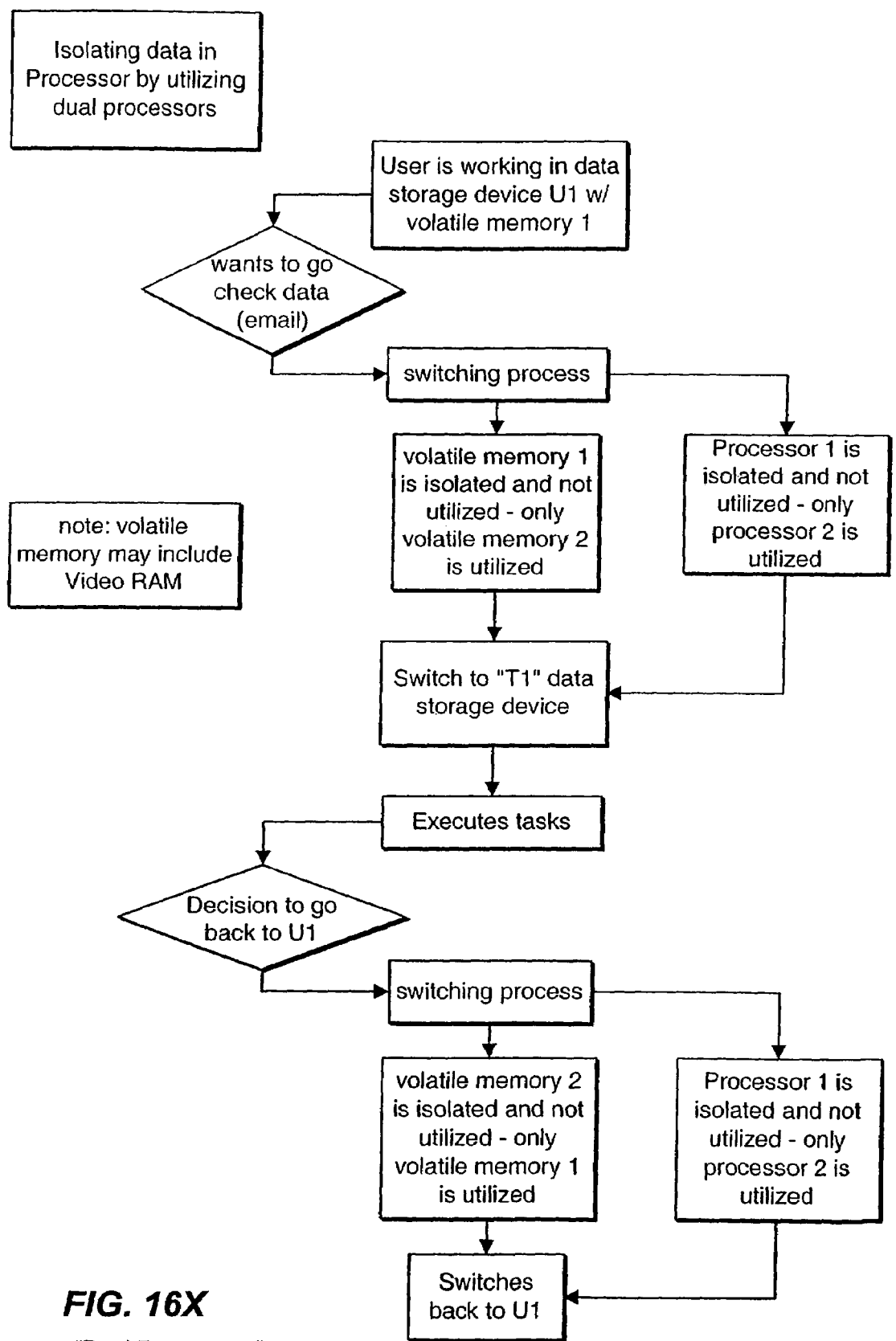
Figure 16Y:
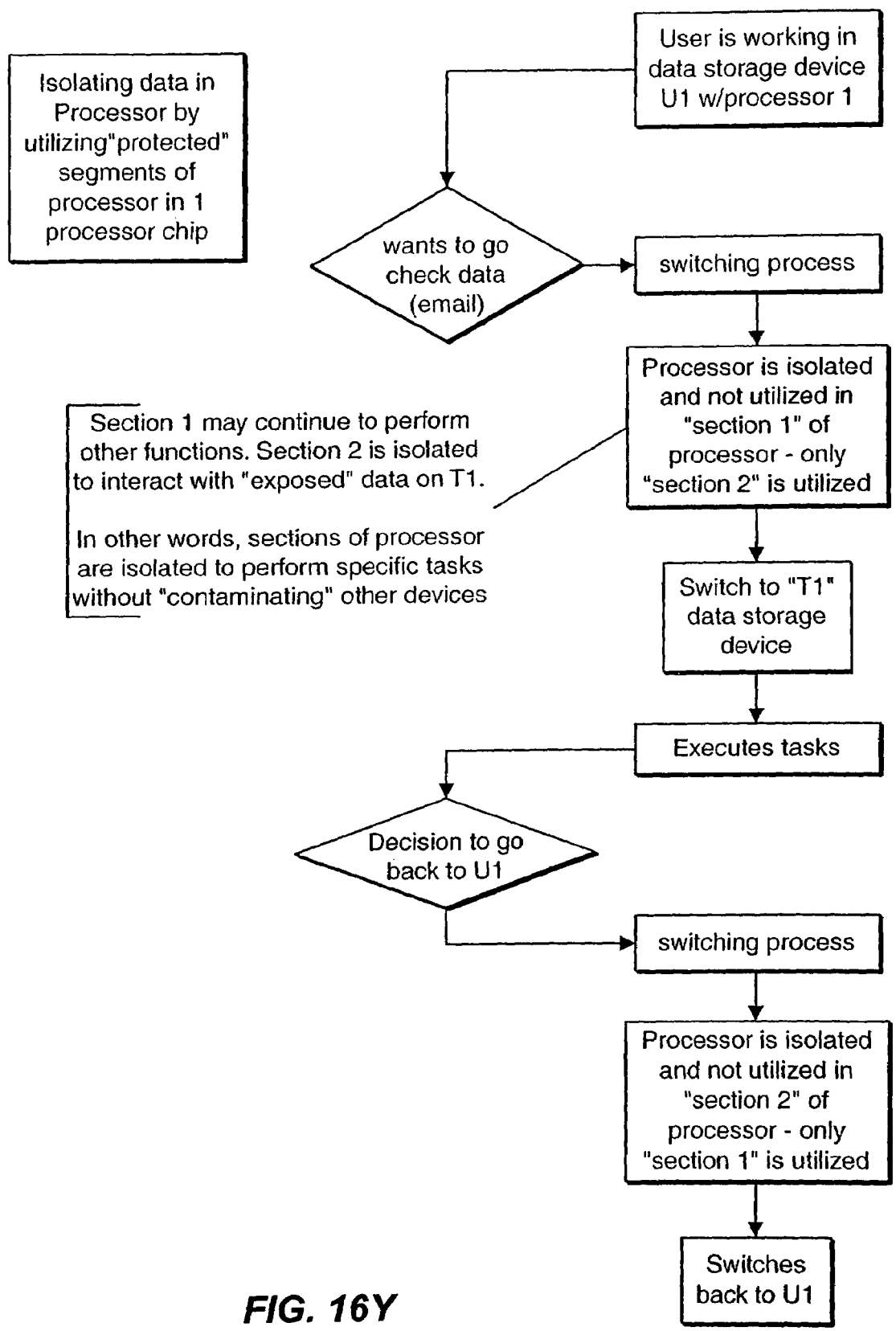
Figure 16Z:
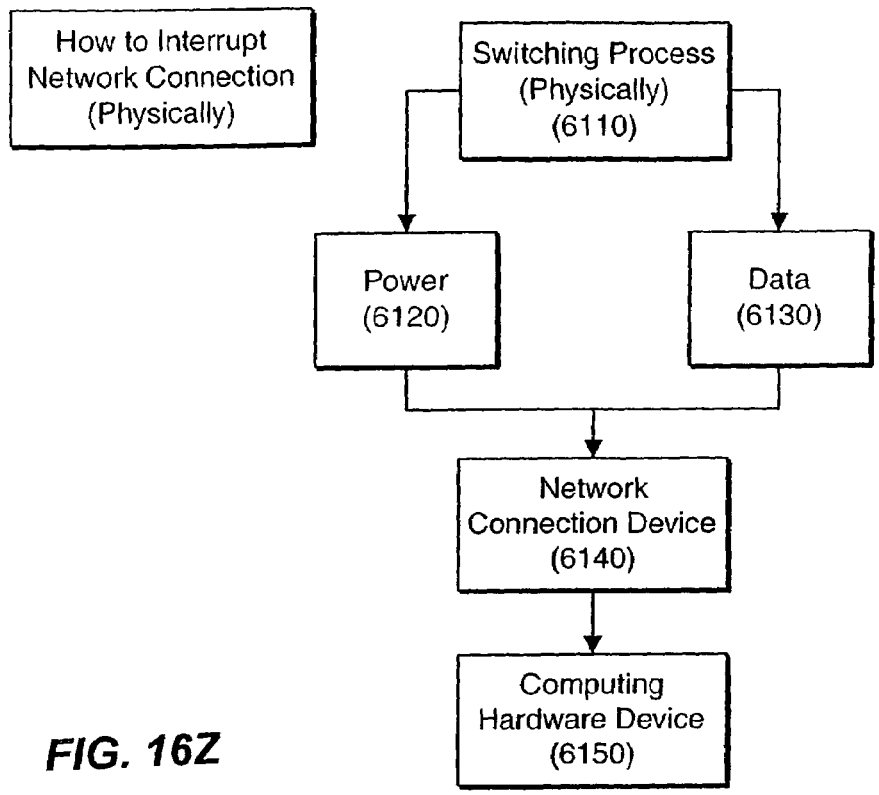
Figures 1, 16Z:
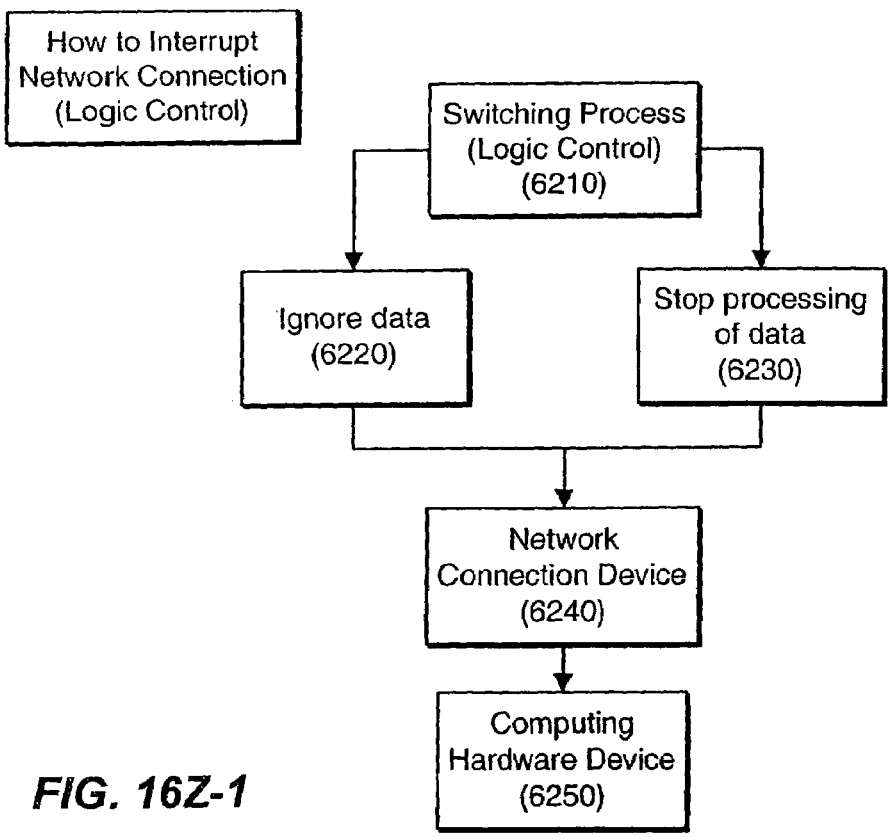
Figures 2, 16Z:
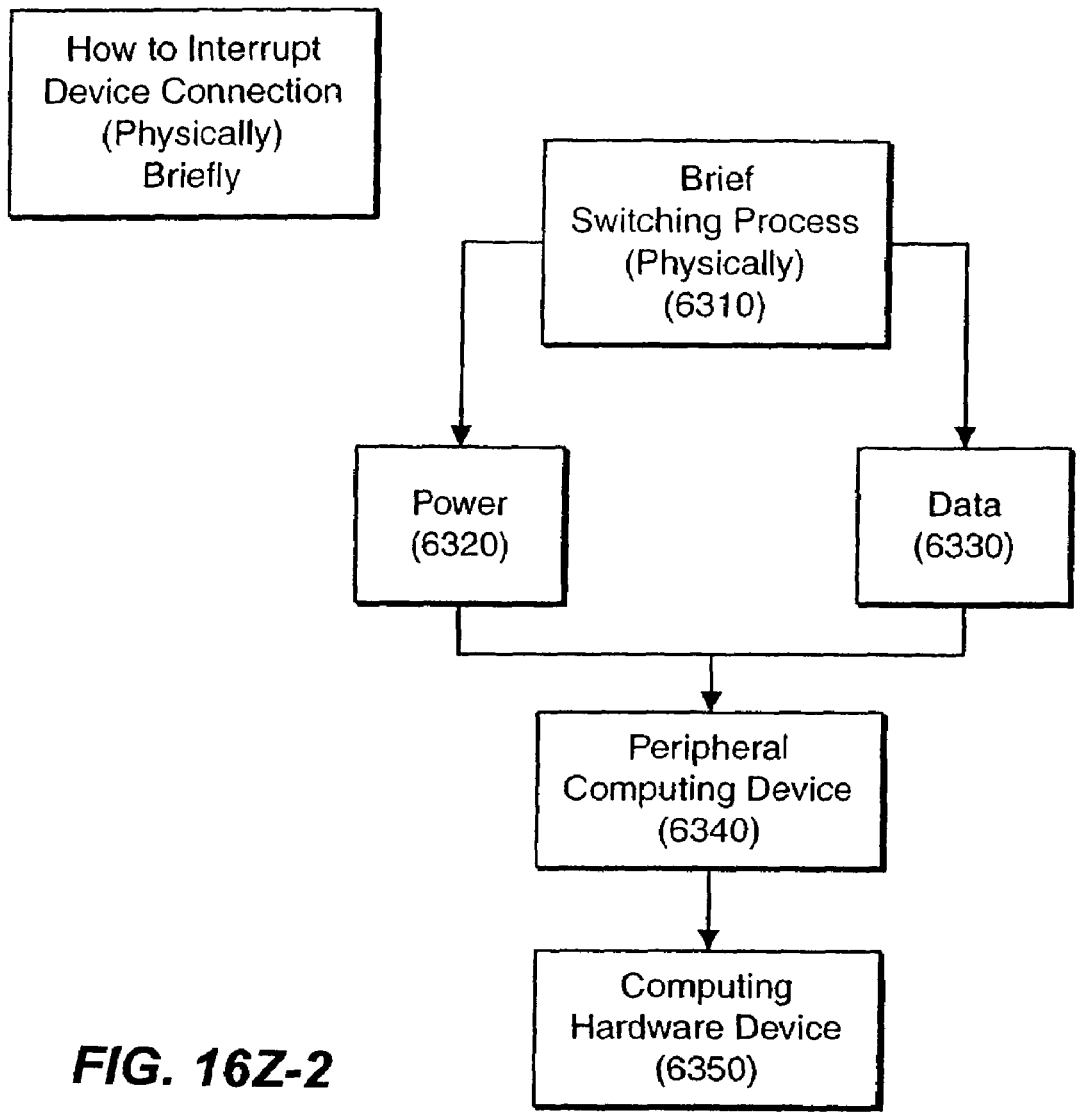
Figures 3, 16Z:
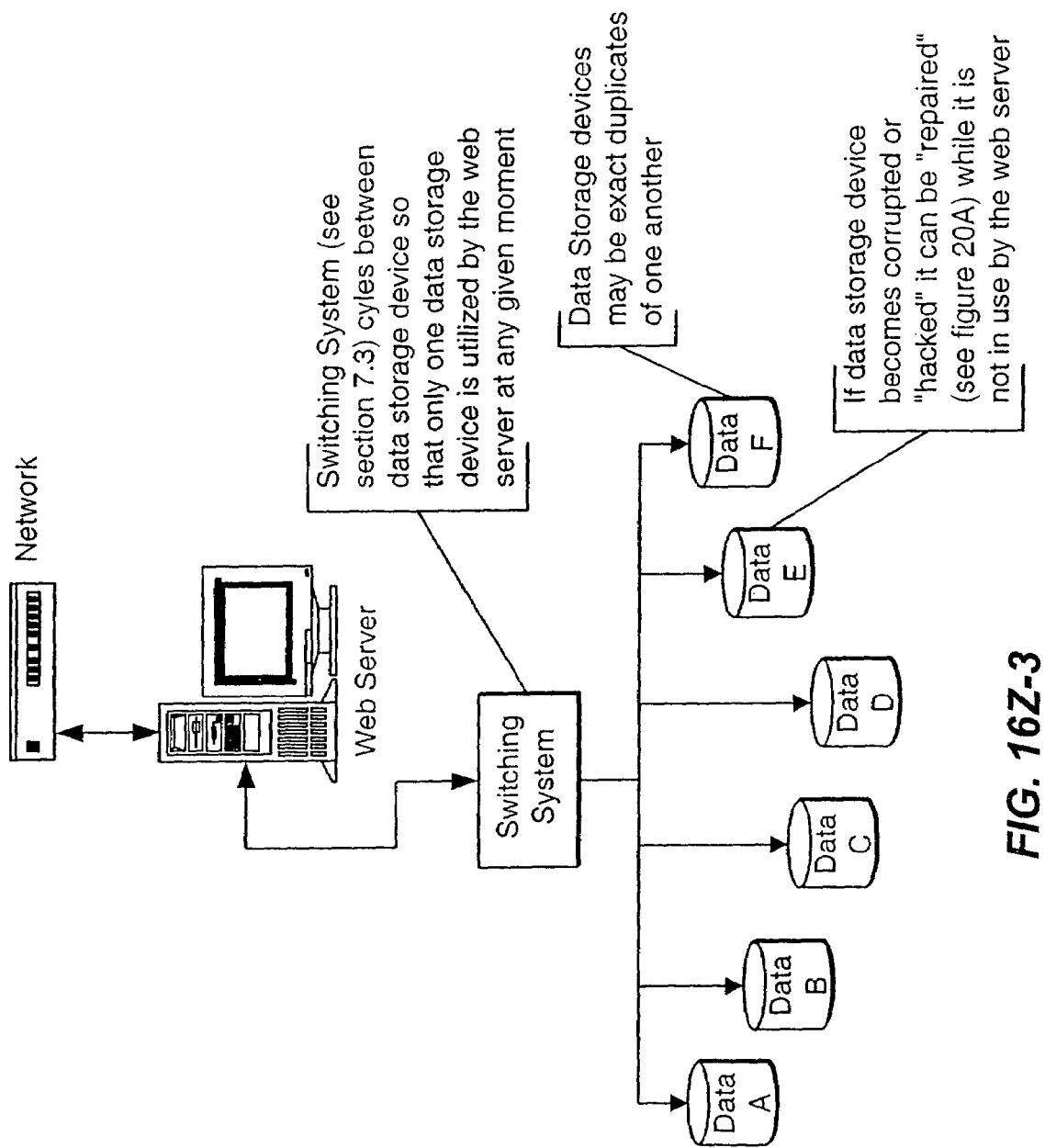
FIGS. 3A through 3B illustrate the switch-and-repair process according to one embodiment of the invention.

FIG. 2 is a schematic of the data-store switch 1Z according to an embodiment of the invention. In FIG. 2, the opto-isolators U2, U3 implement the switches 13, 19, respectively. The Basic Stamp II microcontroller U1 (from Parallax, Inc., Rocklin, Calif.) implements the controller 1A. The battery V3 implements the power supply 1B. The LCD display port J1 represents the output device 1C, and the switches S1, S2 implement the input device 1D. (Opto-isolator U4 detects whether the computer 1 has power.)

In a first mode of operation herein termed "normal mode," the computer 1 may run a predetermined operating system and application. Accordingly, the data store 12 may contain a correctly functioning copy of that software. The CPU 10 may access the data store 12, boot the operating system and then execute that application.

The data store 12 is termed herein the "boot data store." The data store 12 may contain a bootable, executable operating system and executable application.

The data-store switch 1Z may make the data store 12 accessible to the computer 1 as the boot drive (by means of the switch 13, for example). The data-store switch 1Z may also make the data store 14 inaccessible to the computer 1 (by means of the switch 19, for example). Otherwise, the data-store switch 1Z may idle, waiting for user input on the device 1D.

In the normal stage, the computer 1 may perform as a conventional computer. The user may run his application software, inattentive to the invention incorporated into the computer 1.

In a third mode of operation herein termed the "repair mode," the CPU 10 may run software on the data store 14 and the controller 1A may execute a program in parallel. A mode intermediate to the normal and repair modes, herein termed the "switching mode," may effect the transition from normal to repair mode.

In the switching mode, using an input device such as the device 1D the user may indicate that he wishes to repair software on the data store 12. (FIGS. 3A and 3B illustrate the switch-and-repair process according to one embodiment of the invention.) In response to the input, the computer 1 may switch from normal operation to repair, step 310, and repair the software on the data store 12, step 320.

The switching of a data store may be logical or physical. Logical switching is switching enforced purely by software. For example, software may set one or more predetermined bits that it or other software tests to determine whether a data store is accessible at any given time.

A physical switch opens or closes a predetermined electrical circuit of a device to be switched. A physical switch may, for example, alter the open/close state of identification jumpers of a data store. A physical switch may turn on or off the power supply to a device to be switched.

Figures 4A, 16Z:
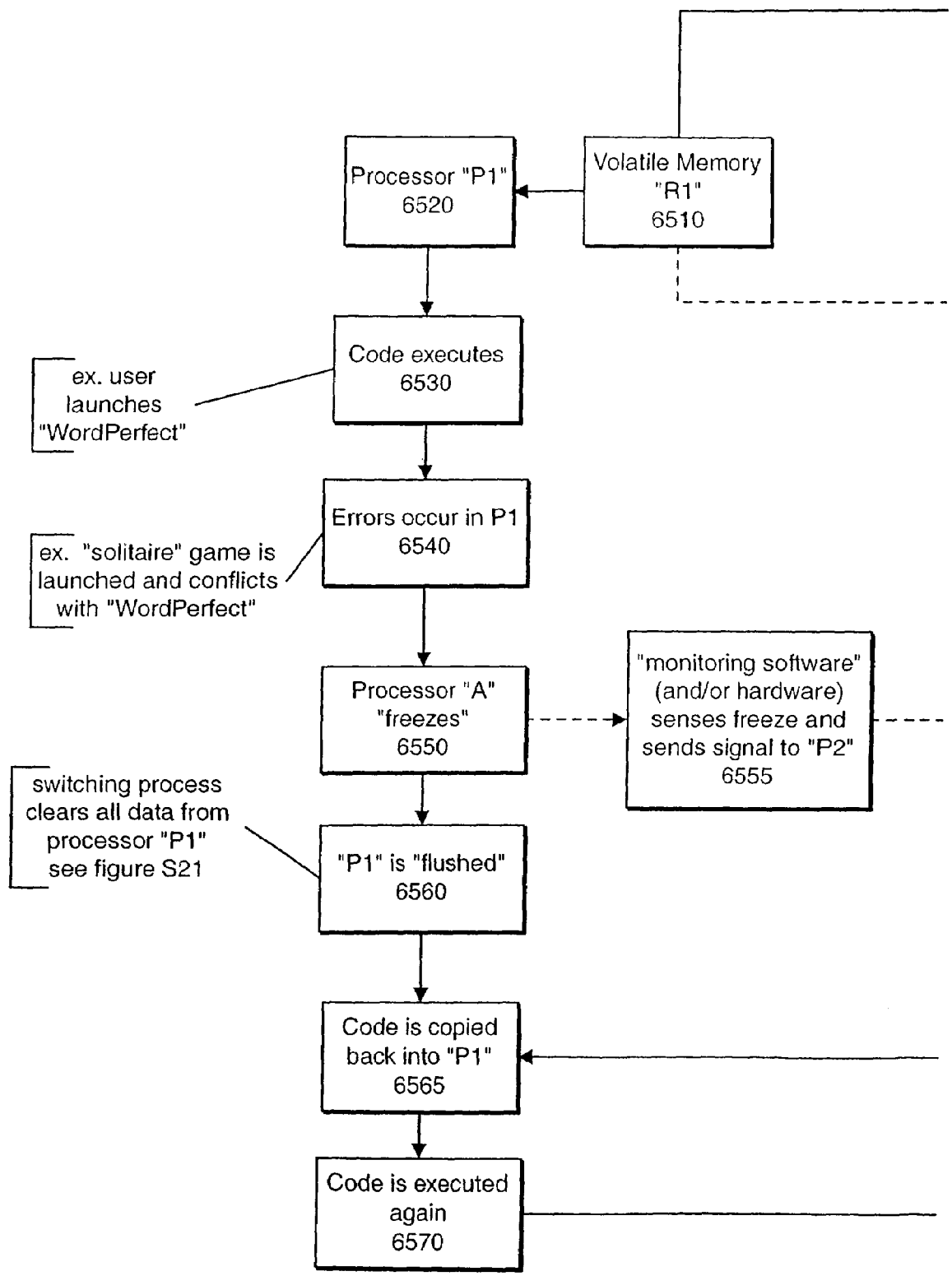
FIG. 4 illustrates the flow of control in a data-store switch according to one embodiment of the invention.
Figures 4B, 16Z:
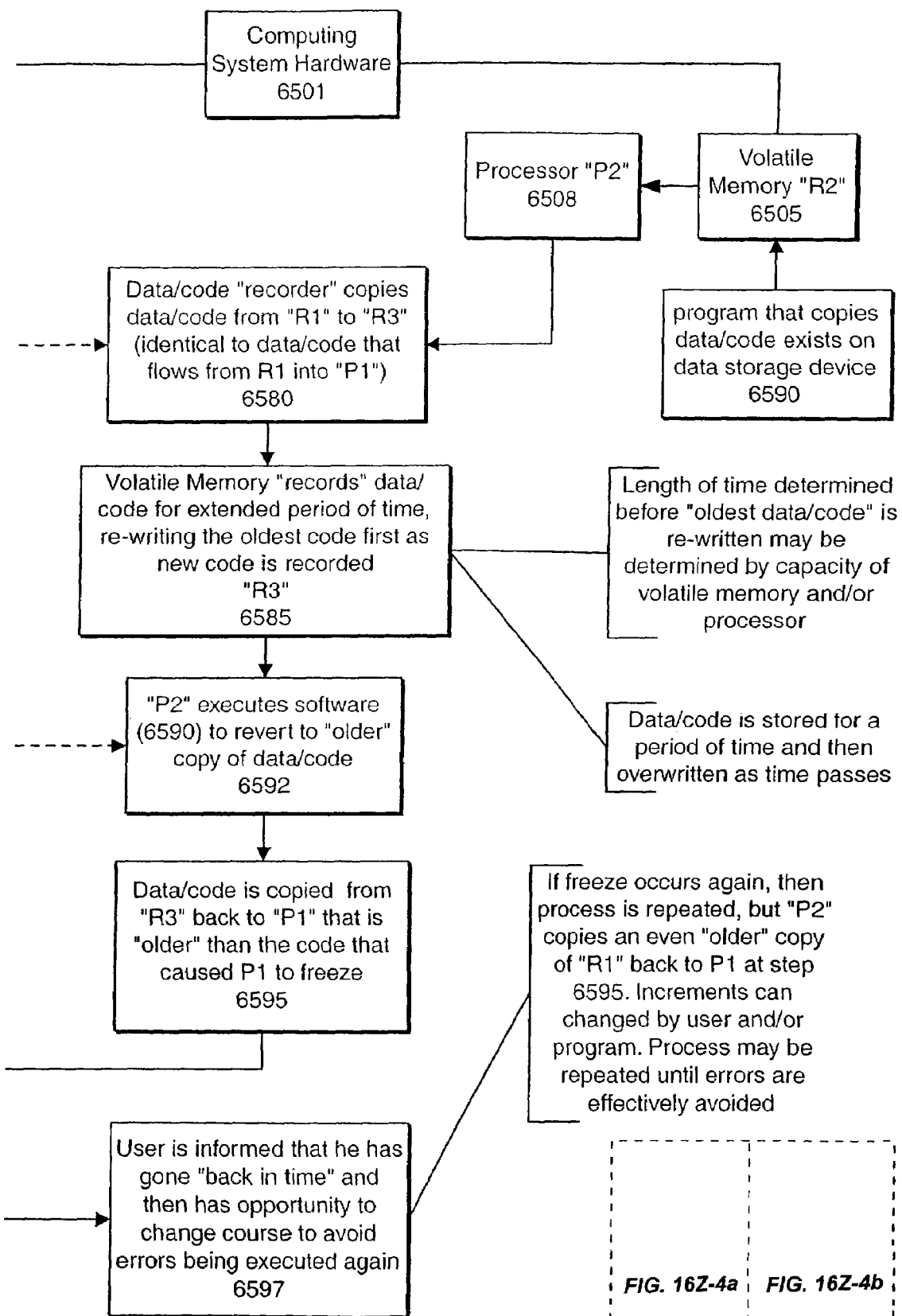
Figures 5, 16Z:
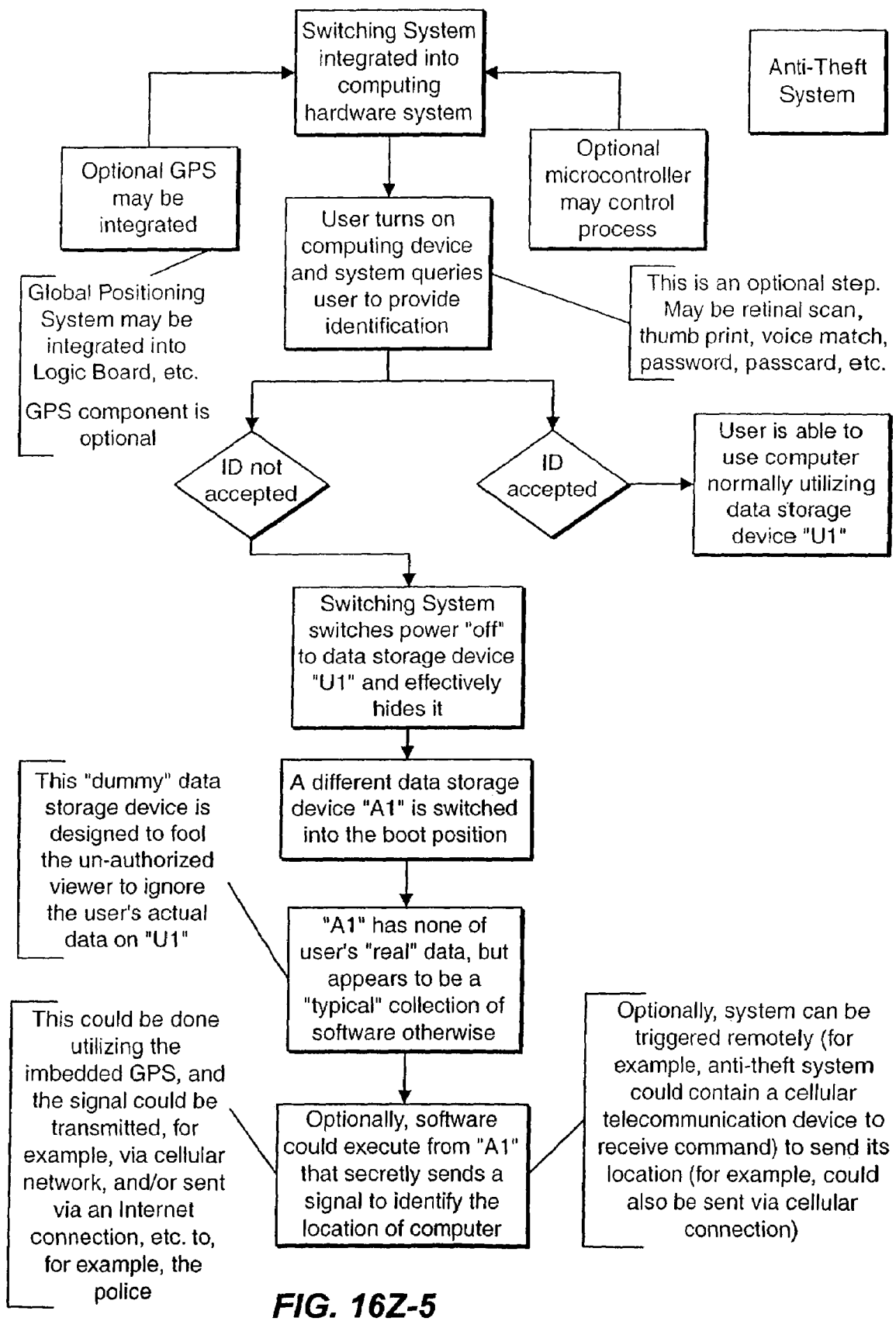
FIG. 5 illustrates a computer incorporating an embodiment of the invention.

FIG. 4 illustrates the flow of control in a data-store switch 1Z according to one embodiment of the invention. On start up, the data-store switch 1Z may go into normal mode of operation. In this stage, the switch 1Z may set the switch 13 to make the data store 12 the boot drive, step 4A3. The switch also may set the switch 19 to leave the template data store 14 unpowered.

The data-store switch 1Z may then idle, waiting for the user to initiate the switch to repair mode, step 4A5. The data-store switch 1Z may display a message indicating that it is in normal mode, step 4A1.

When the data-store switch 1Z receives an indication to switch to repair mode, the switch 1Z may ask the user to confirm this indication, step 4B5. Confirmation is preferable where the repair process is destructive before it is constructive. Confirmation is preferable also because the activation of the input device indicating the switch to repair mode may have been accidental or ill considered.

On confirmation if requested, the data-store switch 1Z may switch power to the data store 14, step 4B9, making the data store 14 accessible to the computer 1. The data store 14 may be permanently configured to be addressable as the boot drive when it is accessible. Accordingly, the address of the data store 12 may then change.

In normal operation, the data store 12 may be addressable as the boot drive. However, during the switch, the switch 1Z may change the identity (address jumpers, for example) of the data store 12 to something other than the boot-drive identity.

The computer 1 is now ready to enter the repair stage.

Switched physically to repair mode, the computer 1 may boot from the template boot drive. The booted program or some other program executed during the boot sequence (autoexec.bat, for example, on machines running Windows™ operating system from Microsoft Corp., Redmond, Wash.) may query the user.

In one embodiment, on rebooting the computer 1 may automatically repair the data drive 12. It copies software from the template data store 14 to the data store 12 without further direction from the user. Previously set user preferences may, however, direct the course of repair.

Thus, where the template data store 14 contains only application software, the repair process may copy over or re-install that application software from the template data store 12. Where the template data store contains operating-system and application software, the repair process may copy over or re-install the operating system first and then the application software.

Uninstallation or deletion of an application may precede re-installation or copying over of that software. Re-formatting of the data store 12 may precede re-installation or copying over of the operating system. Resetting of ROM-resident parameters may precede re-installation or copying over of operating-system or application software.

On completion of the repair, the repair software may direct the user to switch back to normal mode and re-boot the computer 1.

Alternatively, the repair process may be menu-driven. The repair process may present the user a sequence of options to determine what repair process to execute. For example, on re-boot in repair mode, the repair software may offer the choices of running the repair process, reviewing repair-process settings, updating the template software (the application, operating system or repair-process software itself) and quitting the repair process.

The template data store 14 may contain application software, operating-system software and repair-process software. The application software may include the executable software itself (.exe, .dll, .o, etc.) or the files created by the application (.wpd files for Corel WordPerfect word-processing software, for example).

The software on a template data store 14 typically is an operating system and may include one or more applications, along with the underlying software to run the operating system (and any included application) on a computer with a predetermined configuration. The underlying software may include one or more boot records, one or more partition tables or a BIOS.

The template software is created by installing software onto a data store, by copying installed software onto the data store or by copying installation software onto a data store. (Installed software includes data files and other pre-existing software.)

The template data store software may be updated. Where the template software is installation-ready software, that installation software may be updated to a different, usually later, version. Where the template software is a backup of the software on the data store 12, a different, usually more recent, backup of the data-store software replaces or supplements that software.

Repair-process settings may include whether to recover data, run a virus check, reformat the data store, revert to a backup, run a human-mediated (i.e., manual) or an automatic repair, run diagnostics (software or hardware, for example). Repair-process settings may also include whether to format and at what level (quick versus low-level, for example), what software to re-install (operating system (OS) only; OS and executable-application software; OS, executable-application software and application data files; data files only, for example), whether to switch automatically (i.e., under program or hardware control), what level of repair to run (quick, better or best, in one embodiment), whence to setup (backup or template, in one embodiment) and whence to recover data files (most recent backup prior to repair, backup at the time of repair, other predetermined backup, query-and-response-specified backup, as examples).

The repair process may entail recovering a usable version of the appropriate data file. In some instances of computer repair, the problem is not so much with the operating-system or executable-application software so much as with the files (usually data files) associated with one or more of the applications. If the application in question is Microsoft Outlook, then the file to be recovered may be the mail-and-folder-data.pst file. Where the application is Microsoft's Internet Explorer, the file to recover may be the favorites file.

Running a virus check may entail first checking that the virus-check-and-repair software is up to date. Because new software attacks appear daily, and because newer malicious code has a higher chance of delivering a payload, this is not a trivial step. The software may then check for malicious code and repair software, as directed by the user or by default.

The above process presupposes that the data store 14 contains a copy of (a version of) the operating-system, application software or data file on the data store 12. In this sense, this second data store 14 is termed herein the "template data store." With the computer 1 switched to boot from the template data store 14, the computer 1 may perform the original copying of template software onto the data store 14. (Where the data store 14 is a read-only medium, it may arrive at the computer 1 in a pre-written state.)

An example of the operation of the computer 10 follows: Assume that the data store 12 contains a bootable Windows™ operating system (from Microsoft Corp., Redmond, Wash.). Assume also that the data store 12 also contains NaturallySpeaking® application software (Lernout & Hauspie, Ieper, Belgium and Burlington, Mass.).

The operating system and the application on the data store 12 may have each been run any number of times, and the user may have customized the operating system, the application or both to his preferences. In contrast, the template data store 14 may contain as-installed copies of the operating-system and the application software.

In the course of using his computer 1, the user puts the computer 1 into an undesirable state. He may, for example, foul up the optional settings of the operating system or application such that he cannot reset them to a usable state. He may download a virus, Trojan horse or other malicious code that changes his operating system, application or both. The particulars of the malicious code are unknown but the manifest effect is that the computer 1 is partially or completely inoperable. He may remove files critical to the correct operation of the software. As one of skill in the art will recognize, the ways in which software may be intentionally or unintentionally altered to the point of unusability are legion.

Recognizing that his computer 1 is in an undesirable state, the user activates the switch 13, step 300. FIG. 3 illustrates the switch-and-repair process according to one embodiment of the invention, and step 310 illustrates the actual switching. In response to the switch activation, step 300, the computer 1 repairs the software on the data store, step 320.

The repair process involves copying software from the template data store 14 to the data store 14. The software on the template data store 14 may be a master copy, a backup copy or an archive copy of software on the data store 12. (An archive is a copy of software, which copy cannot be overwritten or deleted.)

With template software on the template data store 14, the computer 1 may re-install or copy over software onto the data store 12. The computer 1 may overwrite all or part of any software on the data store 12.

The computer 1 may offer the user options as to how thorough its attempt to repair itself should be. In one embodiment, the computer 1 offers the options of a "Quick Repair," a "Better Repair," a "Best Repair" and a "Test." A Quick Repair may, for example, re-install or copy template software from the data store 14 onto the data store 12 without first re-formatting the data store 12. The Better Repair may perform a high-level re-format of the data store 12 before that copy or re-installation. A Best Repair may perform a low-level re-format of the data store 12 before copying over or re-installing software.

In one embodiment of the invention the first or damaged data store (such as a failed magnetic hard disc drive) is replaced by the undamaged or second data store and the second data store (such as an operable magnetic hard disc drive) that had prestored information within the housing of the computer before failure occurred. The second storage device completely takes over for the failed first storage device. The damaged or inoperable first storage device may then be swapped our or replaced at an opportune time without requiring manual reconfiguration of the replaced storage device. When the first storage device is a magnetic hard disk drive and provides virtual memory or other storage for software or firmware executing within the computer (including one or more of a BIOS program, operating system, or application program) that is required for normal operation of the computer, the second storage device may advantageously be selected to be the same type of storage device such as a second magnetic hard disc drive so that normal operation may continue after switching between the failed device (first hard disk drive) and the replacement device (second hard disc drive). It will be appreciated that read and/or write access time of the two storage devices may be important for providing the desired switchover between the two storage devices in the event of a failure event. Utilizing for example a floppy disk drive, a magnetic tape drive, a CD-ROM, or other device that does not provide for the read and/or write access that that the computer system needs or expects may lead to other failure modes, such as time-outs and the like. The storage volume of the second device as compared to the first storage device may also present issues relative to restored operation. Random access to the second storage device as compared to the linear access provided by typical magnetic tape drive backup systems may also prevent restored operation in normal manner from the second storage device. Not having the second device within the main box, case, or housing of the computer so that it is continuously available and current relative to data and software may also prevent the desired restored operation. Therefore, it will be appreciated that providing a magnetic tape drive as the second storage device when the first storage device is a high speed magnetic disk drive (or say 100 megabytes) for example would not generally provide an appropriate second storage device that could be switched in for the failed first storage device hared disk drive because the access time of the tape drive may be too slow for the operating system to tolerate and time-outs are likely to occur, there is no facility to provide the virtual memory features within the tape storage that are normally utilized by contemporary operating systems (such as Microsoft Windows 95, 98, 98SE, 2000, Linux, Unix, Apple OS, and the like), and the tape drive would be continuously winding forward and rewinding backward to access data and commands stored on the tape at the beginning or middle of the tape and to write new data and/or commands to unused portions of the tape at the unused end. Temporary or virtual storage on the order of five to ten or even tens of megabytes may be required to load portions of the operating system to permit even modest execution capabilities. Floppy disk drive devices (such as the 1.44 MB or similar sized devices) are generally too small to provide sufficient storage for actual operation of the computer system and are also too small and may be too slow even if they had sufficient storage capacity.

On the other hand, providing a second hard disk drive already loaded with an appropriate set of software as described above not only provides an option for restoring the operation of the first hard disk drive storage device but also affords the option of switching operation from the first disk drive storage device to the second disc drive storage device which further provides an operational environment from which the computer may actually be operated not merely a data storage from which a copy of software can be reloaded. It will further be appreciated that if the first hard drive has a hardware failure, such as a head crash, failed controller, failed motor, or the like, restoration from such tape drive or floppy drive will not be possible.

While these distinctions have focused on and specifically mentioned magnetic hard disk drives, it will be appreciated that other embodiments of the invention may utilize other first and second storage devices other than hard disc drives so long as the first and second storage devices have comparable operating characteristics (such as read and write access times, random access characteristics, and sufficient capacity to store the data and/or software and provide any required temporary storage for the processor, though not necessarily the same or even similar storage capacity. Therefore high-speed and moderate to high capacity storage devices such as soft disc bernouli drives, IOMEGA™-type drives, solid state RAM memories, and other fast access media as are known in the art may be used.

FIG. 4 illustrates the switch-and-repair process in more detail, according to one embodiment of the invention. The switching copies software from the template data store onto the data store, replacing the unusable software on the data store.

A number of situations occur where the computer 1 may effect repair without rebooting. For example, if only data files or application executables need to be repaired, then shutting down the operating system booted from the data store 12 is not usually necessary—especially in newer operating systems such as Windows 2000 (Microsoft) and more sophisticated operating systems such as Linux.

Further, a large number of operating-system files can be repaired (for example, by replacement) without shutting down the operating system. Repairing the operating system without rebooting is a preferred embodiment.

Still further, for backups (automated or otherwise), continuing to run from the data store already booted may be preferable. Where the computer 1 can become sufficiently quiescent that a backup from the data store 12 to the data store 14 can occur while still booted from the data store 12, then such a backup is quicker than shutting down and backing up the data store 12 while booted from the data store 14.

Where the data store 12 remains the boot drive when the data store 14 is simultaneously available, the data store 14 may be addressable as other than the boot drive. The address of the data store 14 may be switched similarly to the address switching of the data store 12.

A Virus-Resistant and Hacker-Resistant Computer

Figures 6, 16Z:
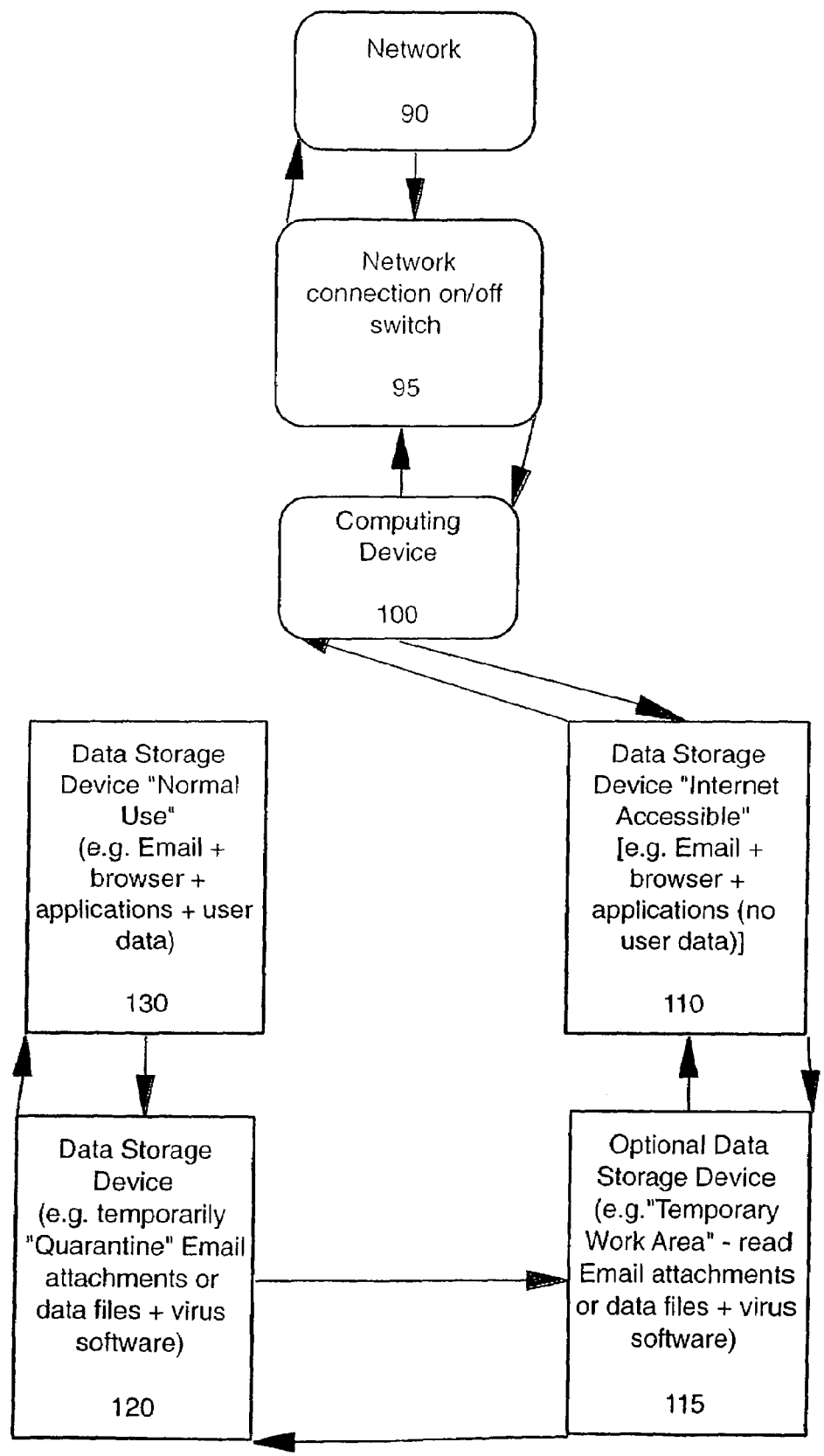
FIGS. 6A, 6B illustrate a computer incorporating an embodiment of the invention.

FIG. 6A illustrates a computer 6 incorporating an embodiment of the invention. The computer 6 may include a CPU 60, volatile memory 61, peripheral controllers 67, 68, first and second non-volatile data stores 62, 64, data port 69, communications link 6A and buses 65, 66, all well known in the art. The computer 6 may also include a data-store switch 6Z.

The bus 65 may communicatively couple the volatile memory 61, the peripheral controllers 67, 68 and the data port 69 to each other and to the CPU 60. The peripheral controllers 67, 68 may communicatively couple with the data stores 62, 64, respectively. The data port 69 may mediate access to the communications link 6A.

The bus 66 may communicatively and electrically couple the peripheral controller 67 to the data store 62 and to the boot-store switch 6Z. More specifically, the boot-store switch 6Z may switch the power line 661 of the bus 66, thus powering up or down the boot store 62.

Likewise, the bus 67 may communicatively and electrically couple the peripheral controller 68 to the data store 64 and to the boot-store switch 6Z. The boot-store switch 6Z may switch the power line 671 of the bus 66, powering up or down the boot store 64.

The port 69 may link the computer 6 to other devices such as a modems, networks, etc. as indicated by the communications link 6A.

The computer 6 may operate in two states: Connected and Disconnected. In the Disconnected state, the computer 6 does not use the data port 69 to communicate and the data-store switch may enable the data store 62.

By contrast, in the Connected state, the computer 6 may use the data port 69 to obtain data over the communications link 6A. In the Connected state, the switch may enable the second data store 64.

Thus, the computer 6 may enable only one of the multiple data stores 62, 64 at any given time, which depending on whether it is accessing the communications link 6A. This isolates data received over the communications link 6A to one of the data stores, namely, the data store 64. Where the data received was maliciously created (a virus or a hacking executable), this data is confined to the data store 64.

The switching of the data stores 62, 64 may be done under manual, hardware or software control. A mechanical throw switched by the user when the user wishes to access (or cease accessing) the communications link exemplifies a manual switch. A boot-store switch 6Z that responds programmatically to the CPU 60 illustrates a software-controlled switch.

For example, if the user boots an Internet browser and the communications link 6A is the Internet, then the CPU 60 may programmatically recognize the (intended) launch of a browser and initiate the switch of the data stores 62, 64. The switch may involve re-booting the computer 6 in order to make the second data store 64 the only data store available during the use of the communications link 6A. (A browser on the data store 64 may launch automatically on the boot from the data store 64.)

In one embodiment, the computer may synchronously switch the port 69 and the second boot store 64. This may improve the resistance of the computer 6 to hacking or infection.

FIG. 6A illustrates the enabling of the data store 62 in conjunction with the defeat of access to the communications link 6A. The solid line continuing the power line 661 through the boot-store switch 6Z illustrates the accessibility of the data store 62. Conversely, the dashed lined through the switch 6Z illustrates the inaccessibility of the data store 64.

FIG. 6B illustrates the enabling of the data store 64 in order to support access to the communications link 6A. The solid power line through the boot-store switch 6Z illustrates the accessibility of the data store 64. Conversely, the dashed lined through the switch 6Z illustrates the inaccessibility of the data store 62.

The data store 64 may contain application software to process the data received over the link 6A. In such a setting the need to migrate the data on the data store 64 to the data store 62 may be minimal or non-existent.

Where, however, the application to process the data received over the link 6A and stored on the store 64 resides on the data store 62, then a process of migration is necessary. A predetermined time after receiving data over the link 6A, the computer may simultaneously enable the data stores 62, 64 and copy the data received to the data store 62 for processing there. The delay allows, for example, anti-virus software providers to produce and distribute security software addressing threats that have come to light since the time of receipt of the data.

The migration process may be manual or automatic.

A Lockable Network Computer

Figures 7, 16Z:
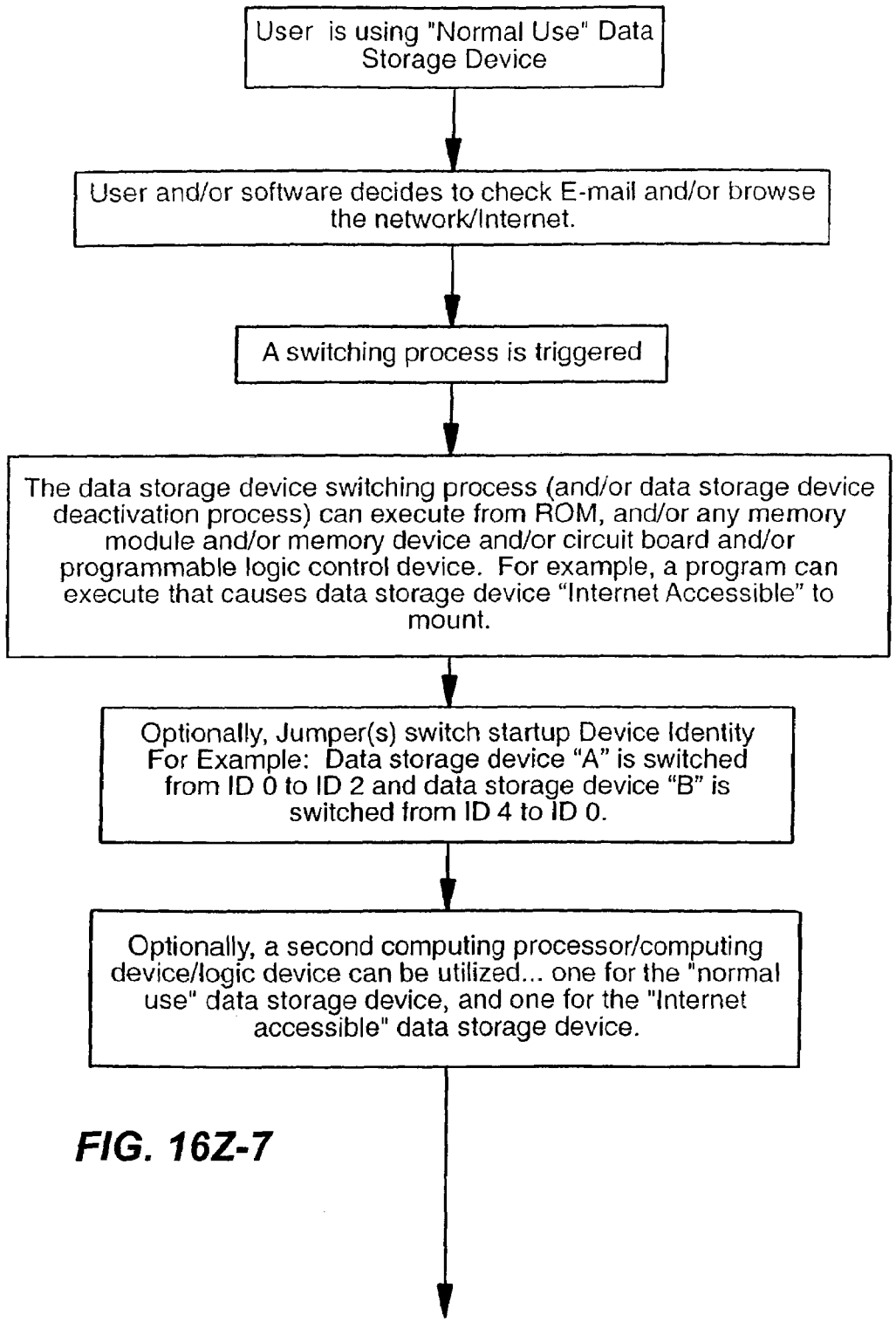
FIGS. 7A, 7B illustrate a computer incorporating an embodiment of the invention.

FIG. 7A illustrates a computer 7 incorporating an embodiment of the invention. The computer 7 may include a CPU 70, volatile memory 71, a peripheral controller 77, a non-volatile data store 72, a data port 79, a communications link 7A and buses 75, 77, all well known in the art. The computer 7 may also include a switch 7Z.

The bus 75 may communicatively couple the volatile memory 71, the peripheral controller 77 and the data port 79 to each other and to the CPU 70. The peripheral controller 77 may communicatively couple with the data store 72. The data port 79 may mediate access to the communications link 7A.

The bus 77 may communicatively or electrically couple the data port 79 to the communications device 7B.

The port 79 may link the computer 7 to other communicators through a communication device 7B and over a communications link 7A. Examples of the communications device 7B and link 7A include an acoustic modem 7B and a POTS telephone line 7A; a tap 7B and an ethernet 7A; and a wireless modem 7B and radiation-permeable space 7A.

The switch 7Z may switch a power line 771 of the bus 77, thus powering up or down the communications device 7B. The switch 7Z may switch (tri-state, for example) a data line 771 of the bus 77, thus interrupting or enabling the ability of the communications device 7B to transfer data to the data port 79.

The computer 7 may operate in two states: Network Connected and Network Disconnected. FIG. 7A illustrates the computer 7 in its Network Disconnected state, while FIG. 7B illustrates the computer 7 in its Network Connected state. (The solid line continuing the power line 761 through the switch 7Z illustrates the continuity of the power or data line 771, and dashed lined through the switch 7Z illustrates the discontinuity of that line 771.

In the Network Disconnected state, the switch 7Z may disconnect the communications device 7B from communicating on the data port 79. Accordingly, none of the software running on the computer 7 may access the communications link 7A.

By contrast, in the Network Connected state, the switch 7Z may enable the communications device 7B to communicate on the data port 79. Accordingly, software on the computer 7 may access the communications link 7A.

An exemplary use for the computer 7 is where a parent uses the computer 7 to access, say, his employer's computer network via a virtual private network (VPN) over the Internet 7A. The parent also wants his child to be able to use the computer 7 for school or recreation—but without access to the Internet 7A. The parent thus switches the computer 7 into the Network Enabled state when he (the parent) wants to use it, and switches the computer 7 into the Network Disconnected state when the child is to use the computer 7.

The switching of the data stores 72, 74 may be done under manual, hardware or software control. A mechanical switch thrown by the user when the user wishes to access (or cease accessing) the communications link 7A exemplifies a manual switch. A mechanical switch that may be locked with a key, for example, is preferable.

A switch 7Z that responds programmatically to the CPU 70 illustrates a software-controlled switch 7Z. (The CPU 70 may respond to any kind of input, including keystrokes, voice commands, biometric data and data received over a network.) A hardware switch 7Z may be considered as an analog computer.

A computer 7 running an operating system that supports hot swapping offers an advantage. The addition and removal of the communications device 7B from the computer 7 may confuse OSs that do not permit hot swapping of peripherals.

A Multi-Data Store Server

Figures 8, 16Z:
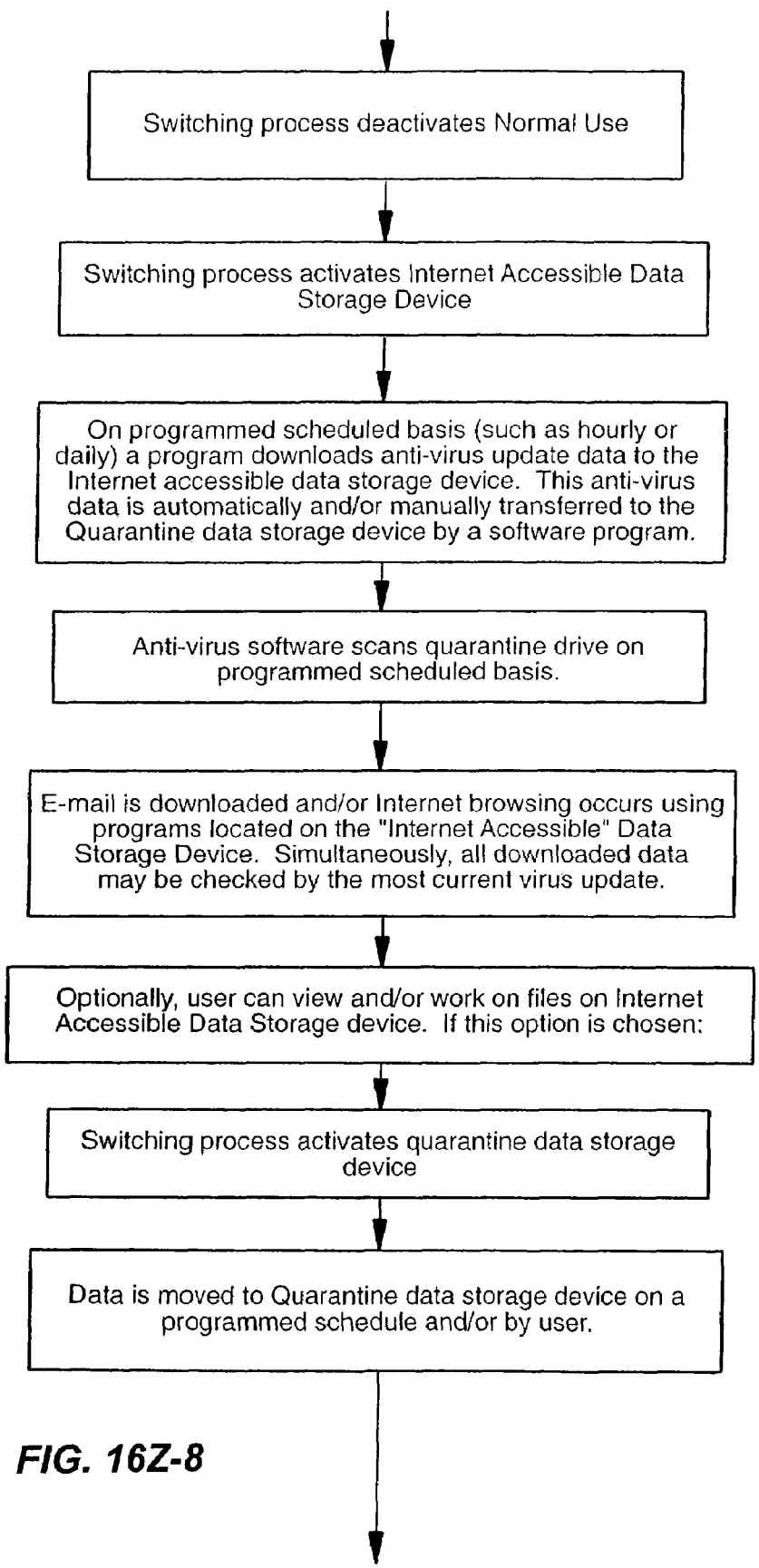
FIG. 8 illustrates a computer incorporating an embodiment of the invention.

FIG. 8 illustrates a computer 8 incorporating an embodiment of the invention. The computer 8 may include a CPU 80, volatile memory 81, a peripheral controller 87, multiple non-volatile data stores 82a, 82b, . . . 82α, a data port 89, a communications link 8A and a bus 85, all well known in the art. The computer 8 may also include a data-store switch 8Z and a bus 86 consisting of the buses 861 or 862.

The bus 85 may communicatively couple the volatile memory 81, the peripheral controller 87 and the data port 89 to each other and to the CPU 80. The data port 89 may mediate access to the communications link 8A.

The peripheral controller 87 may communicatively couple with the data-store switch 8Z. The data-store switch 8Z in turn may communicatively or electrically couple to the data stores 82. The bus 861 may communicatively couple the data path of the switch 8Z to those of the data stores 82, and the bus 862 may electrically couple a power supply in or through the switch 8Z to the data stores 82.

The data port 89 may mediate access to the communications link 6A. The port 89 links the computer 8 to other communicators over the communications link 7A.

The computer 8 may operate in any of N states, where N is the number of data stores 82. In a first state, the data-store switch 8Z enables the first data store 82a to communicate with the peripheral controller 87. In the second state, the switch 8Z enables the second data store 82b to communicate with the peripheral controller 87, and in the Nth state, the switch 8Z enables the Nth data store 82α to communicate with the peripheral controller 87.

The corruption or other failure of the data store 82 currently communicating with the controller 87 prompts the switching from one state to another, and thus from the failed data store to another, working data store 82. (The failed data store 82 may then be repaired in place, or it may be removed and repaired, removed and replaced, or removed permanently.)

Where, for example, the computer 9 is a web server and the communications link 8A is the Internet, the multiple data stores 82 may provide resistance against infection and hacking by malicious users of the Internet 8A. If the hackers succeed in corrupting the data store currently attached to the peripheral controller, then a switching may occur from that corrupted data store 82 to another correct data store 82. This switching may occur very quickly (preferably as quickly as possible) in order to minimize the loss of access to the data on the data stores 82.

The switching may be manual, hardware or programmatic. For example, a diagnosis program may execute periodically to determine the health of the currently accessible data store 82.

A Computer With Peripherals That can be Cycled

Figures 9, 16Z:
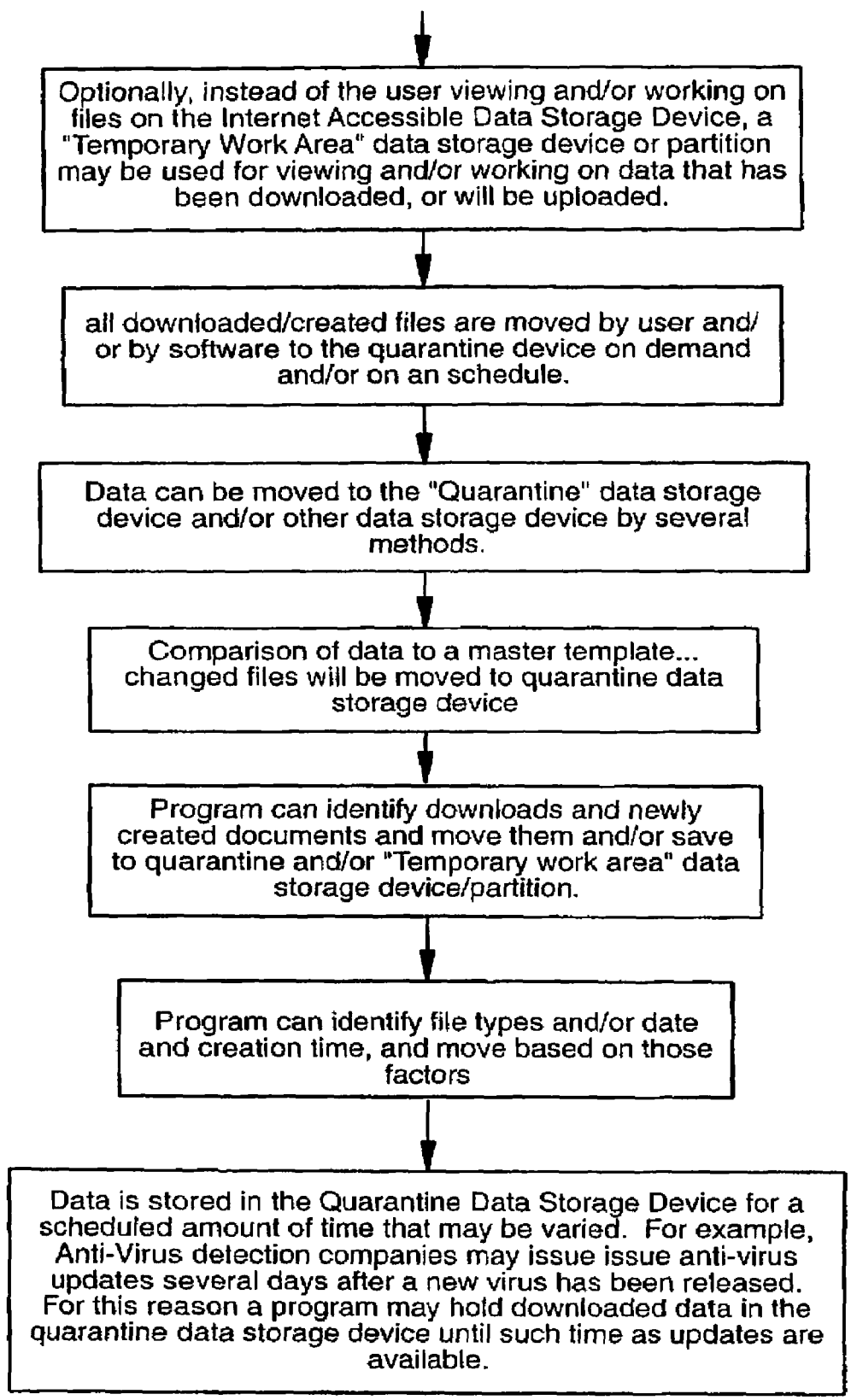
FIGS. 9A, 9B illustrate a computer incorporating embodiments of the invention.
Figures 10, 16Z:
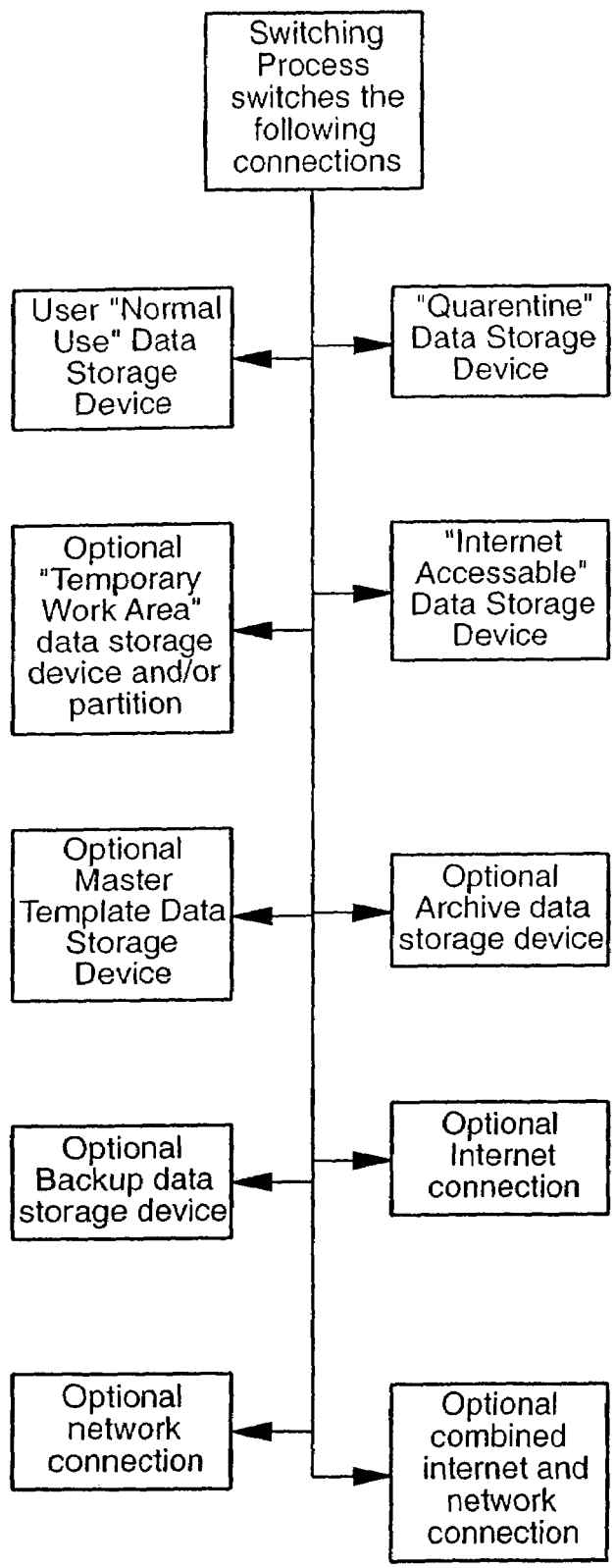
FIG. 10 illustrates a computer incorporating an embodiment of the invention.
Figure 17A:
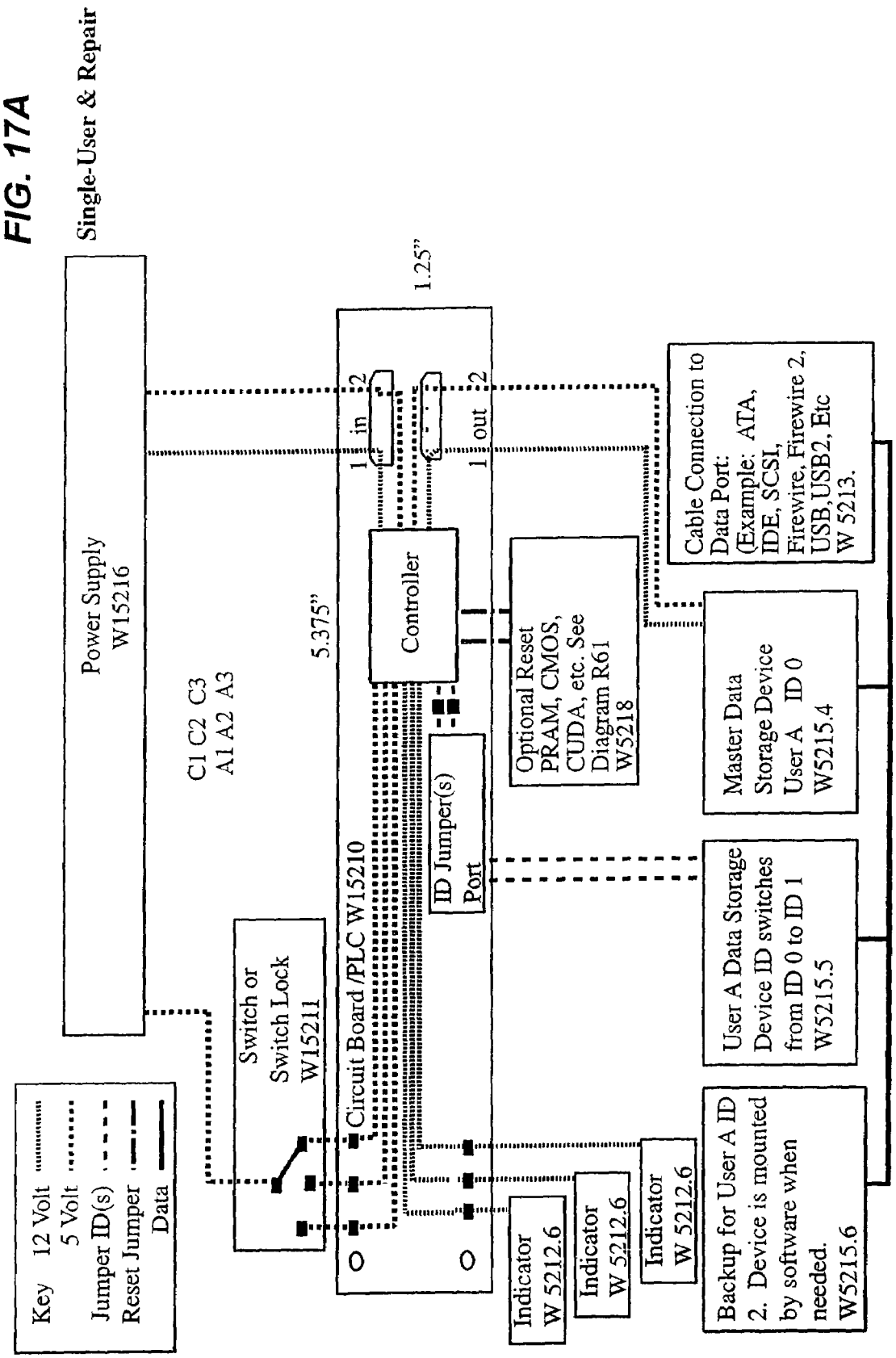
Figure 17B:
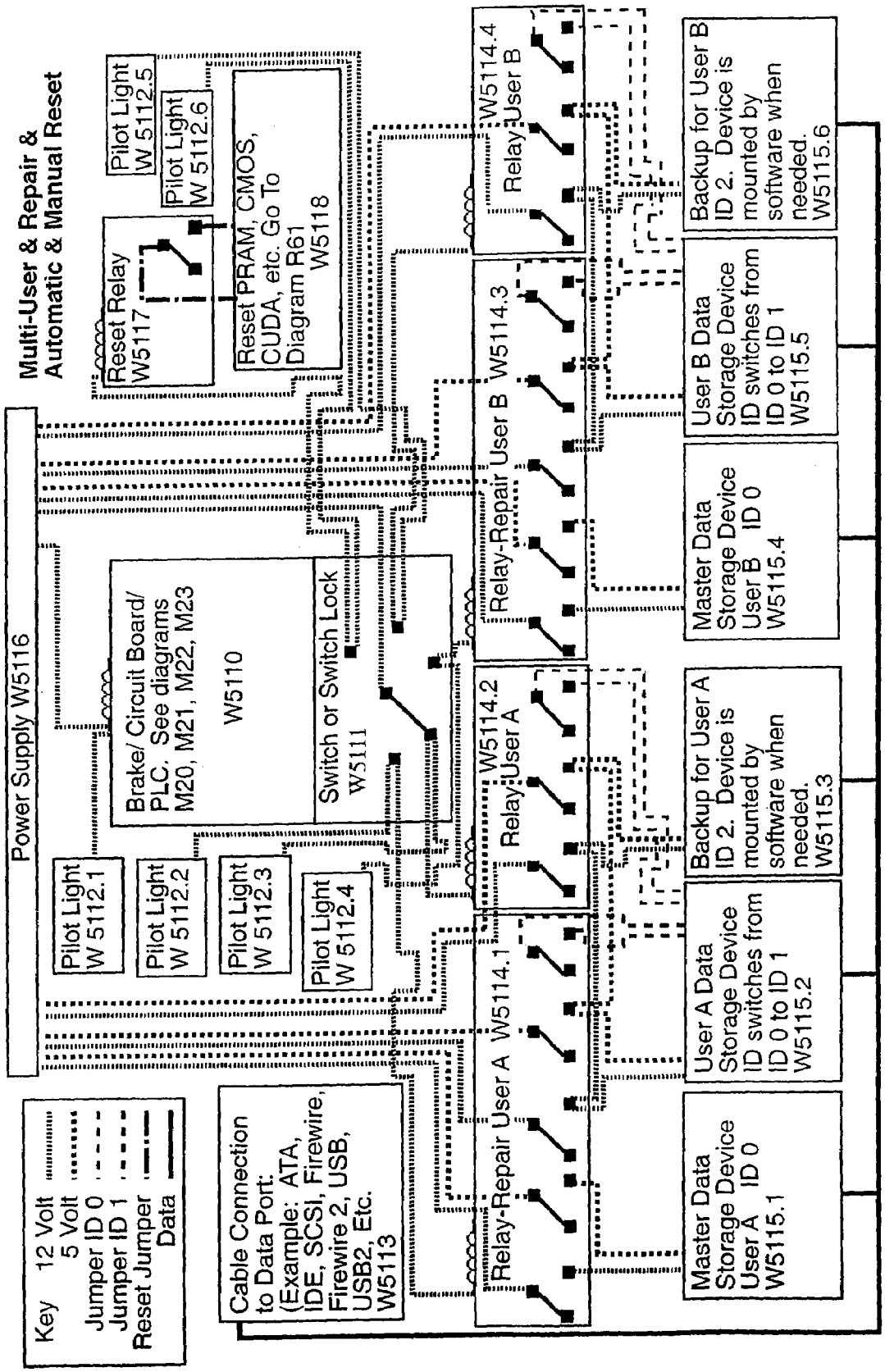
Figure 17C:
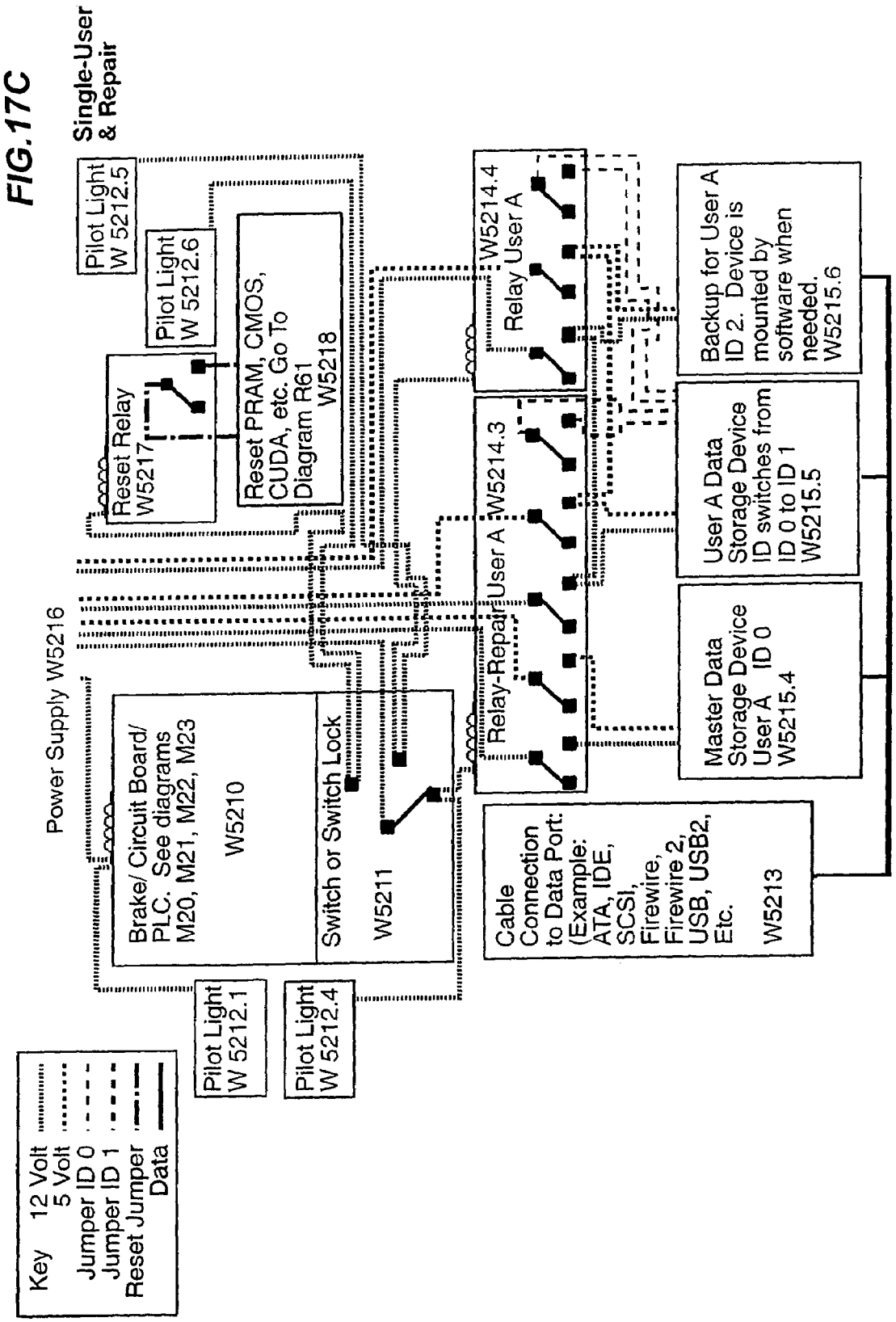
Figure 17D:
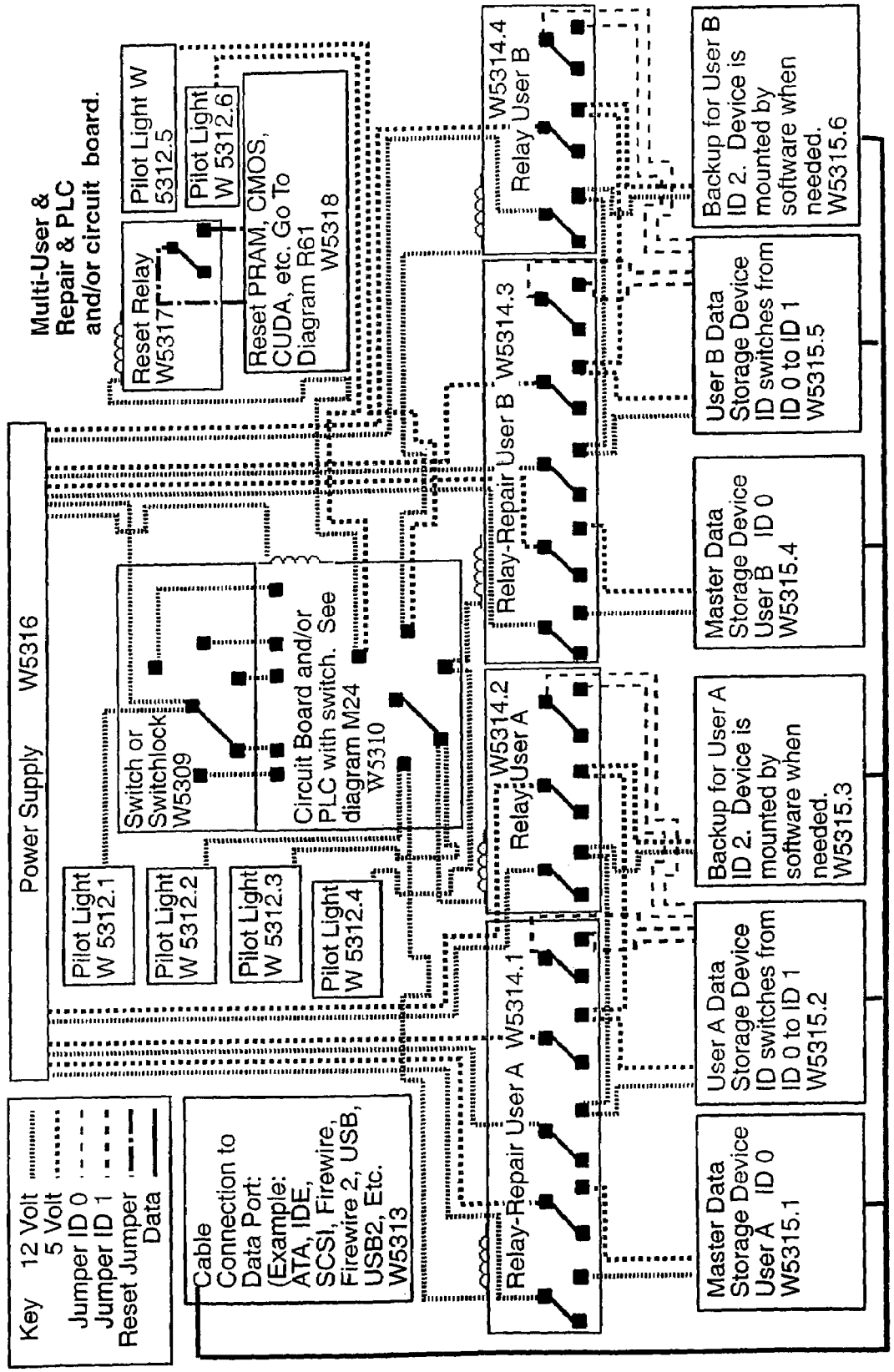
Figure 17E:
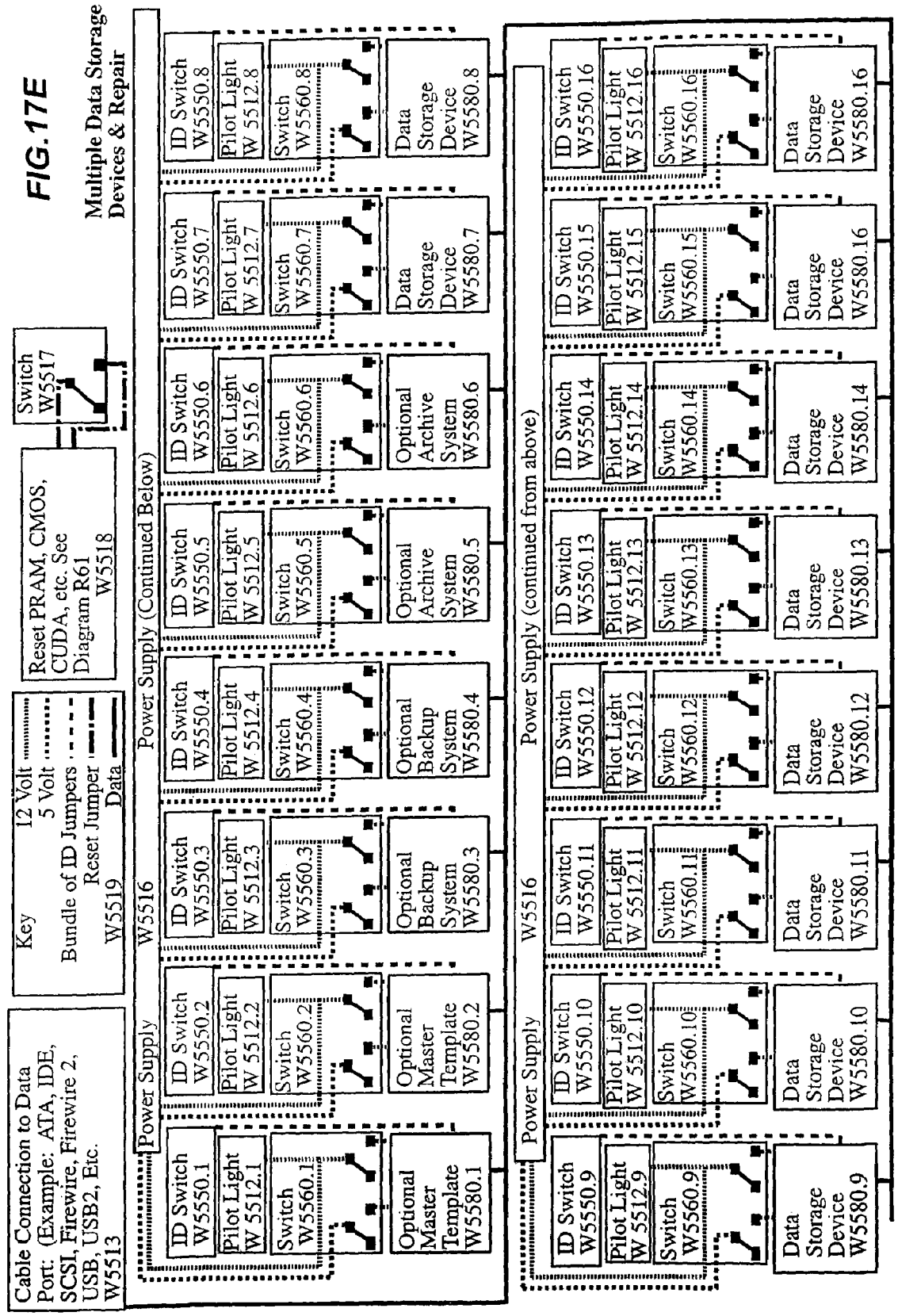
Figure 17H:
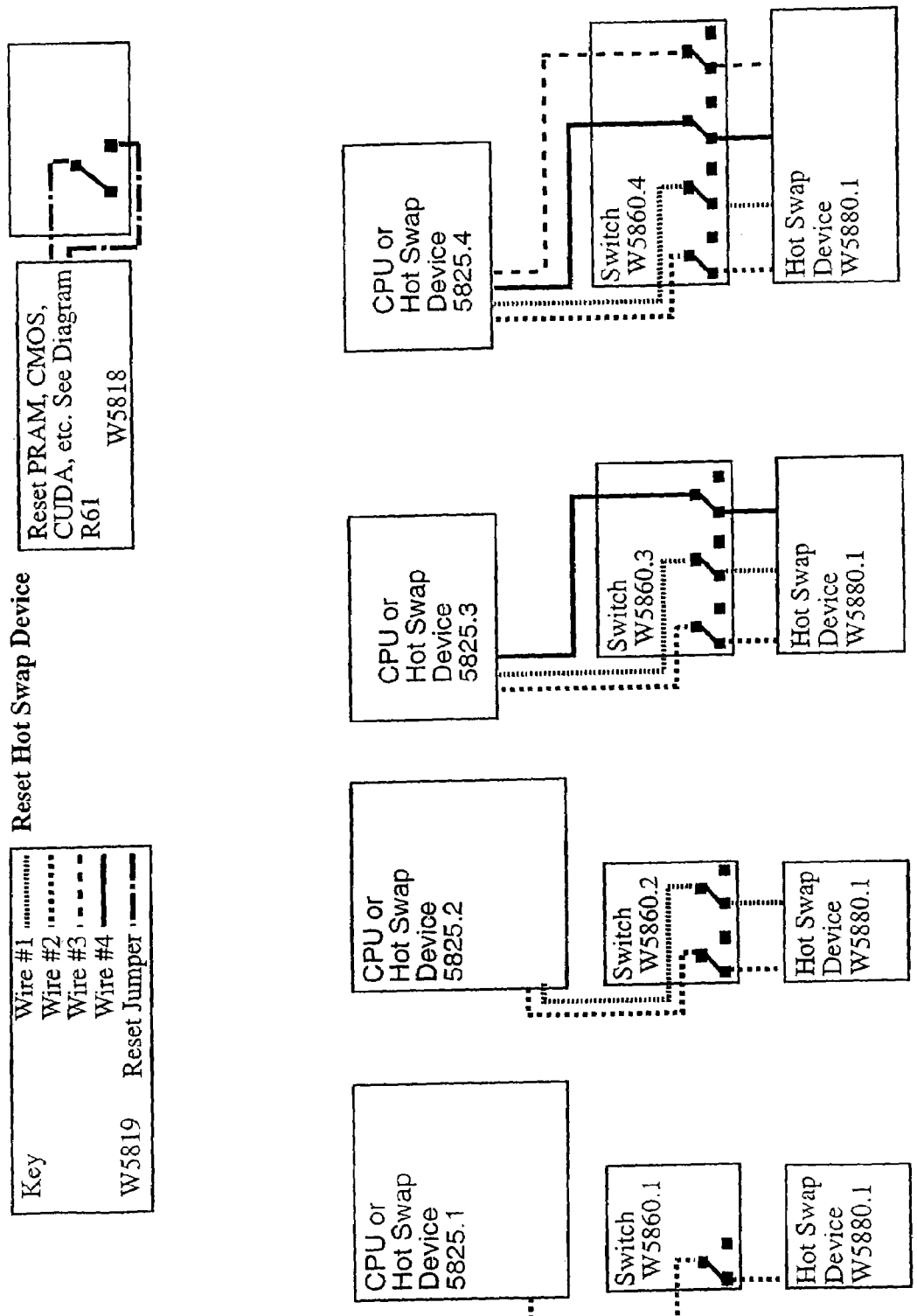
Figure 17L:
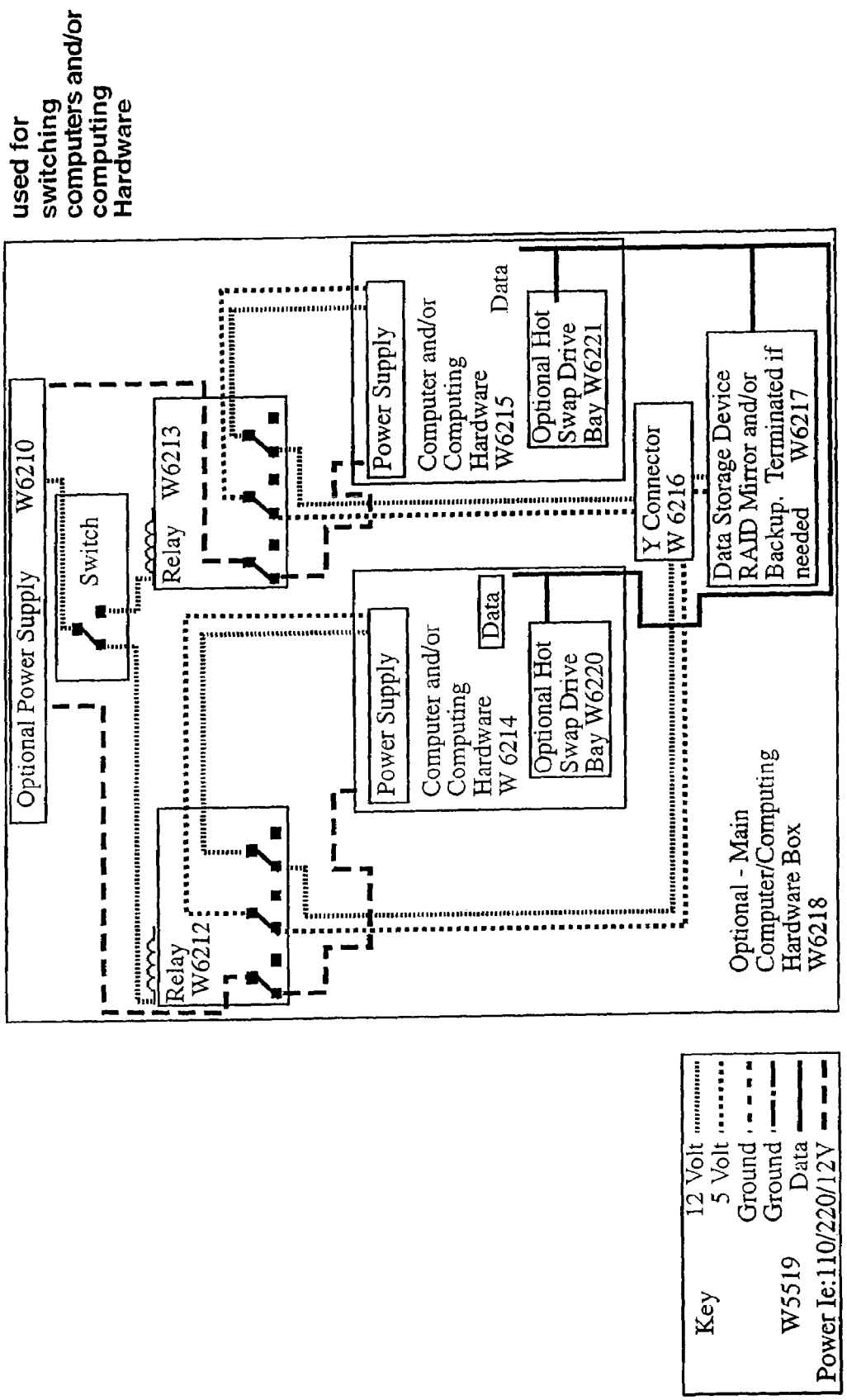
Figure 17M:
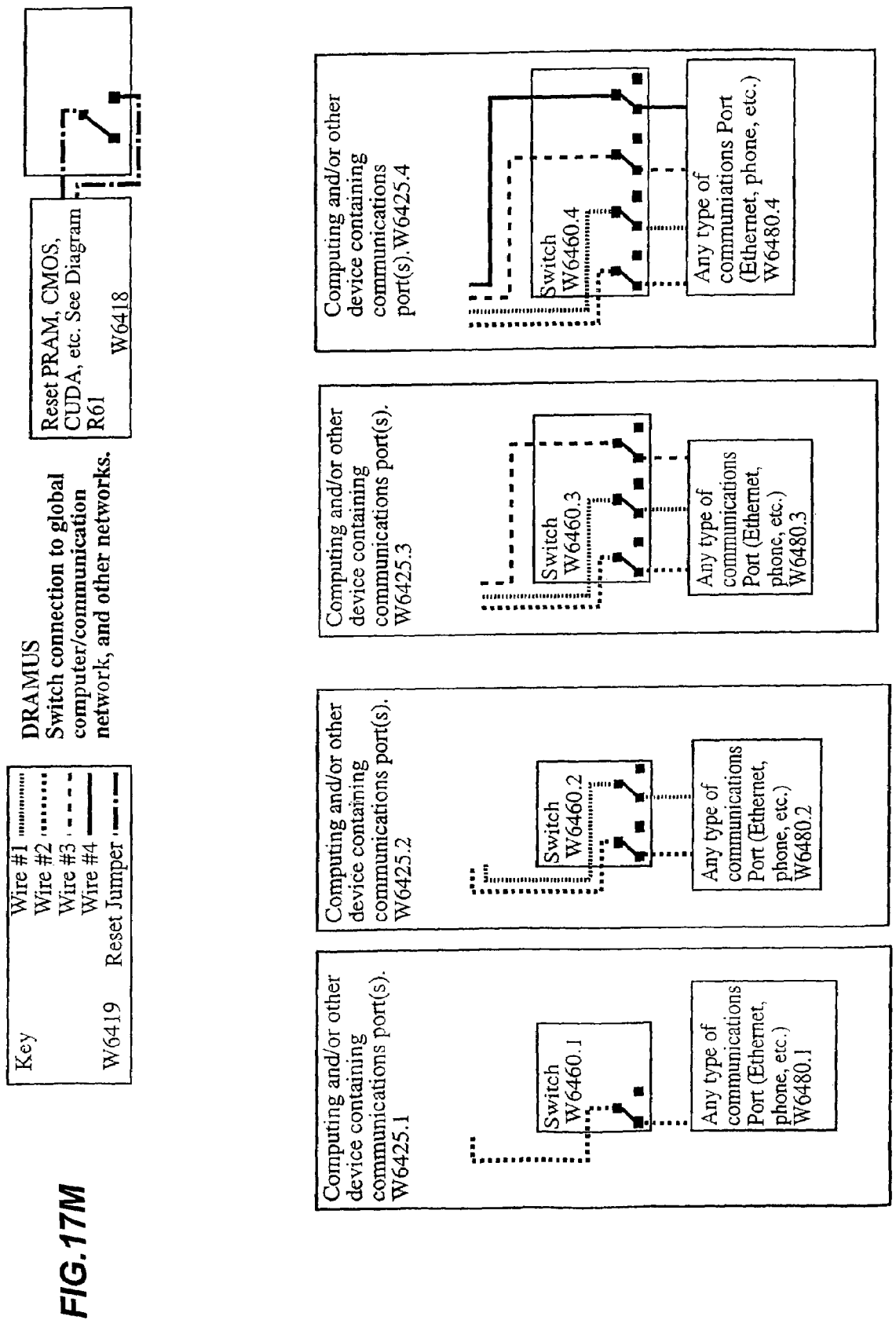
Figure 17N:
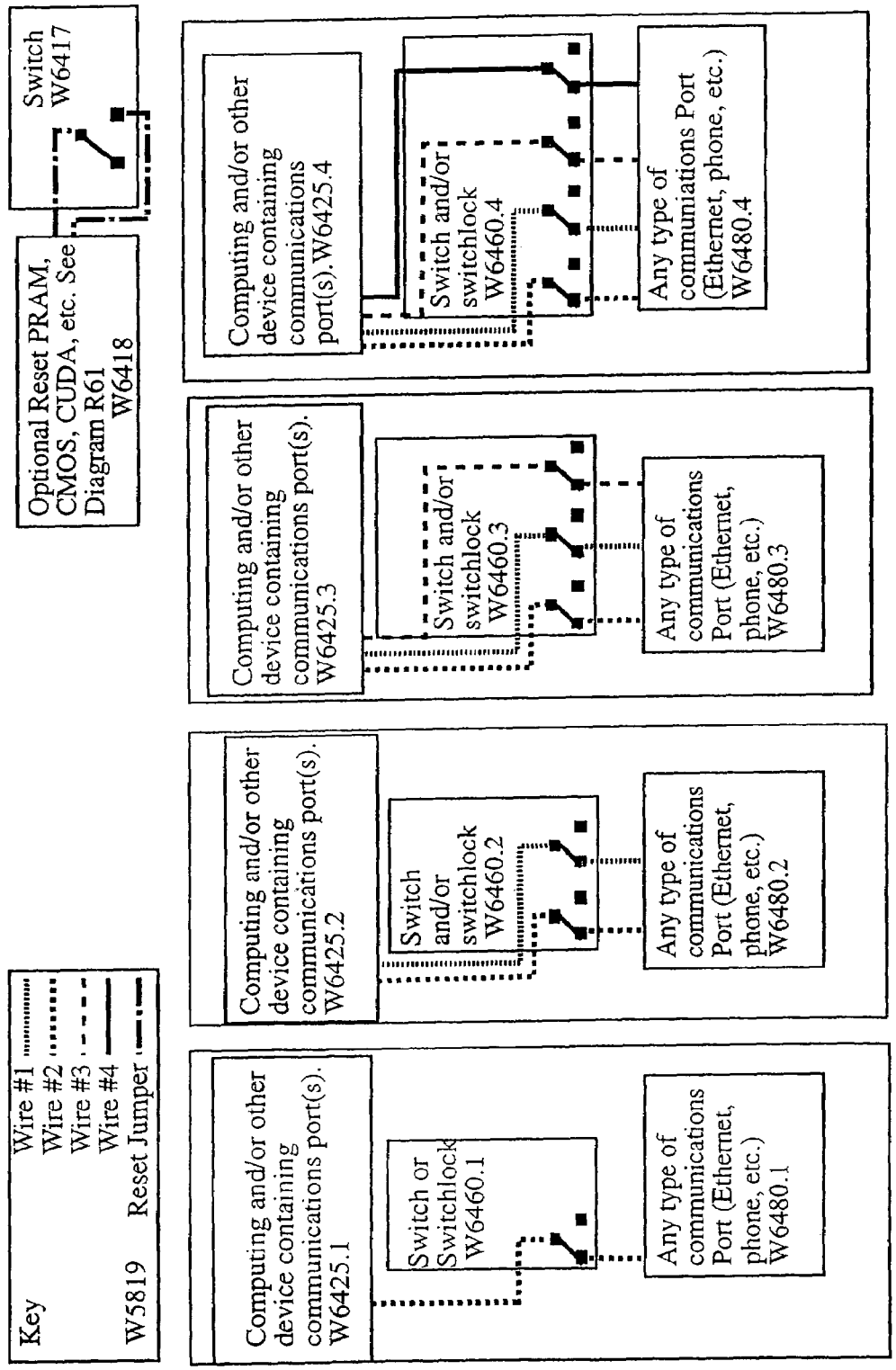
Figure 17O:
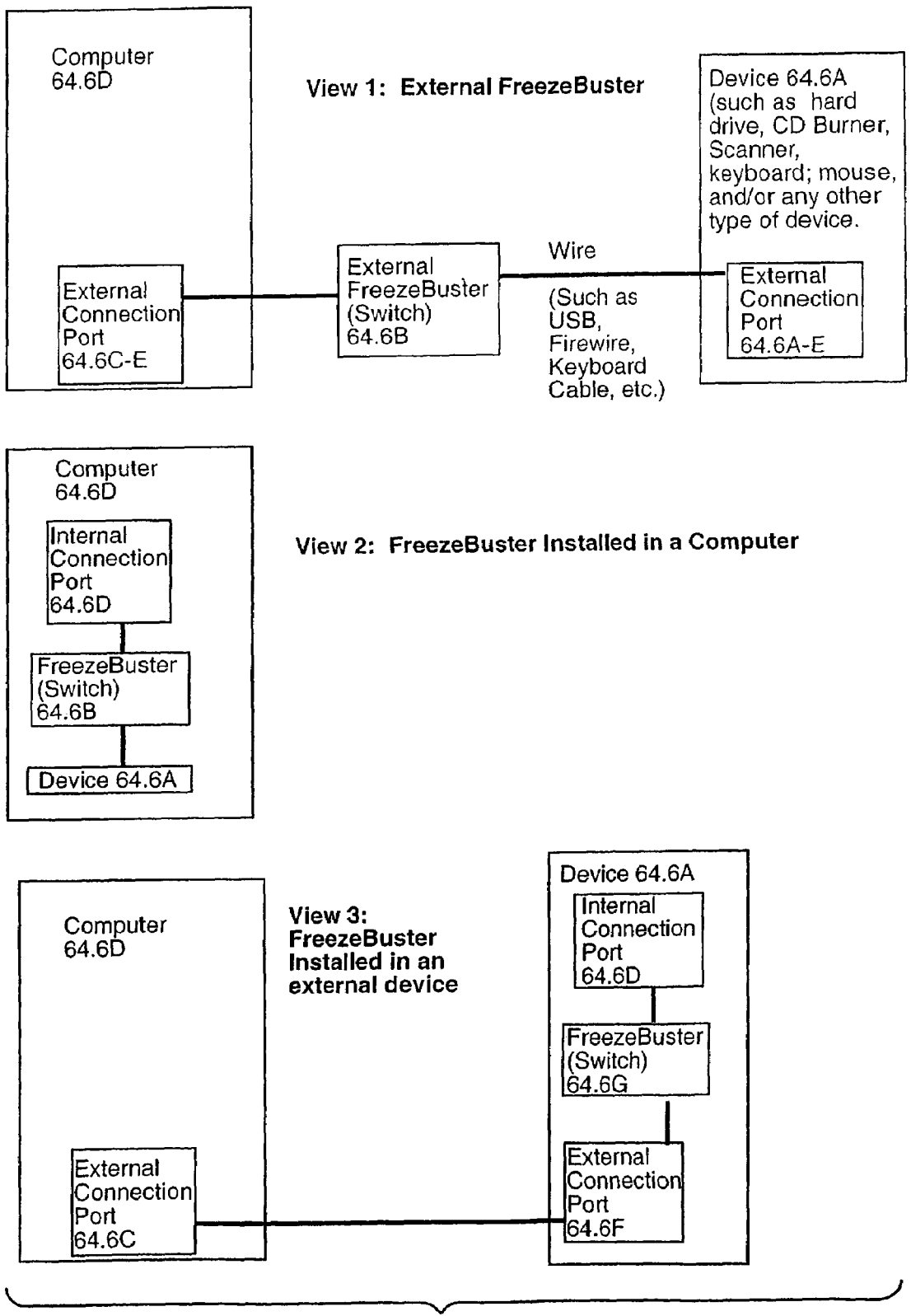
Figure 17P:
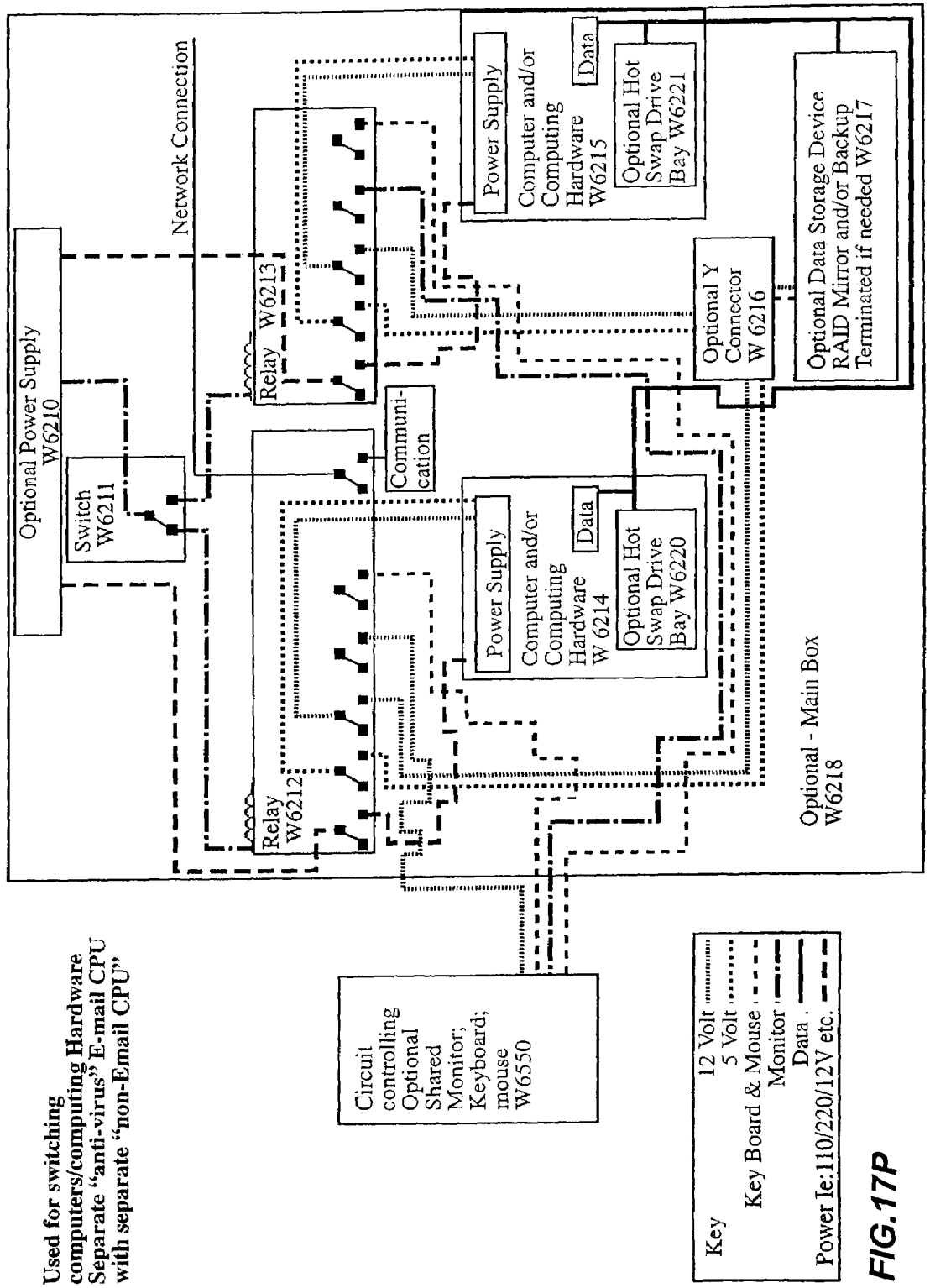
Figure 17Q:
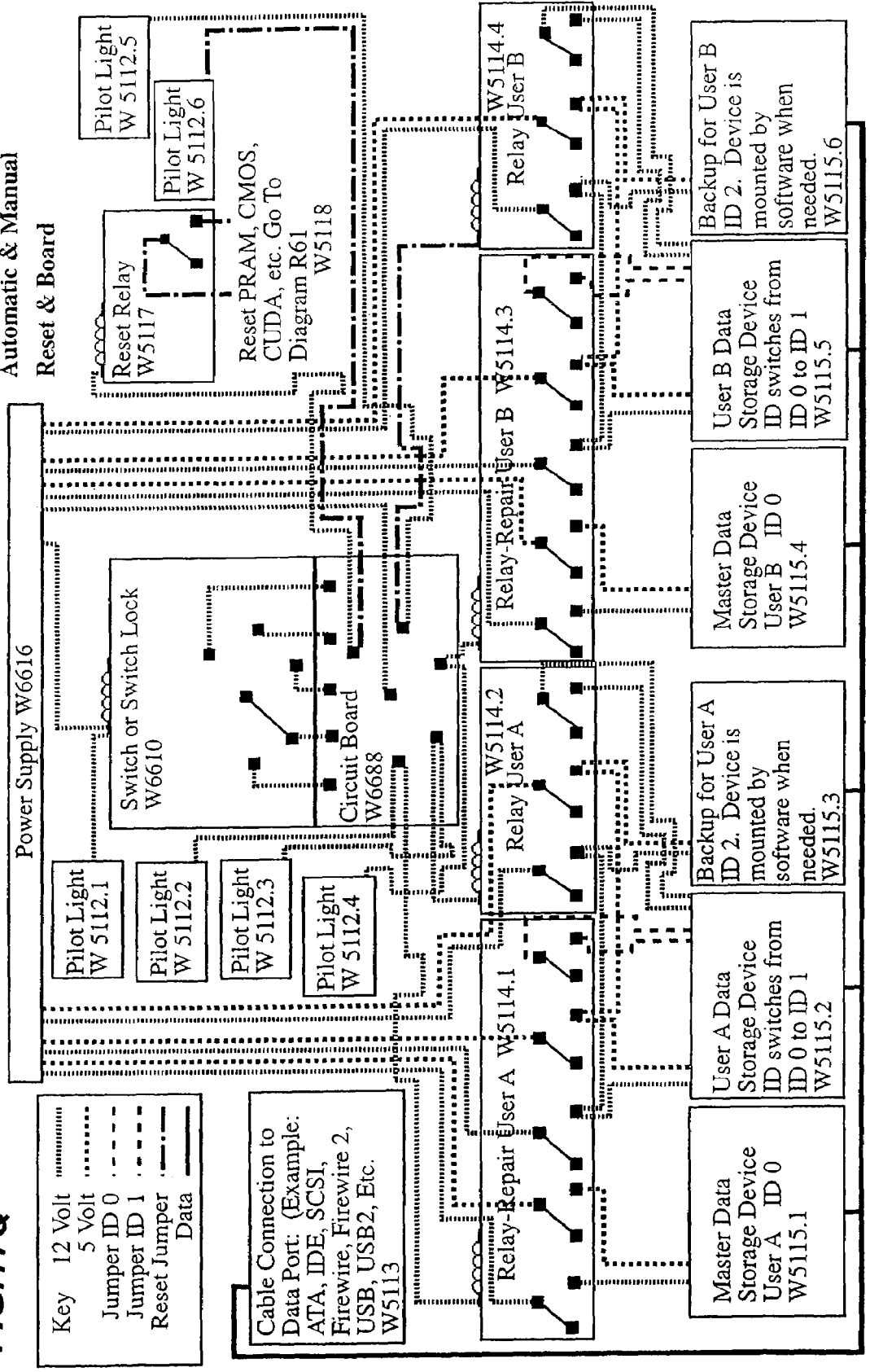
Figure 17T:
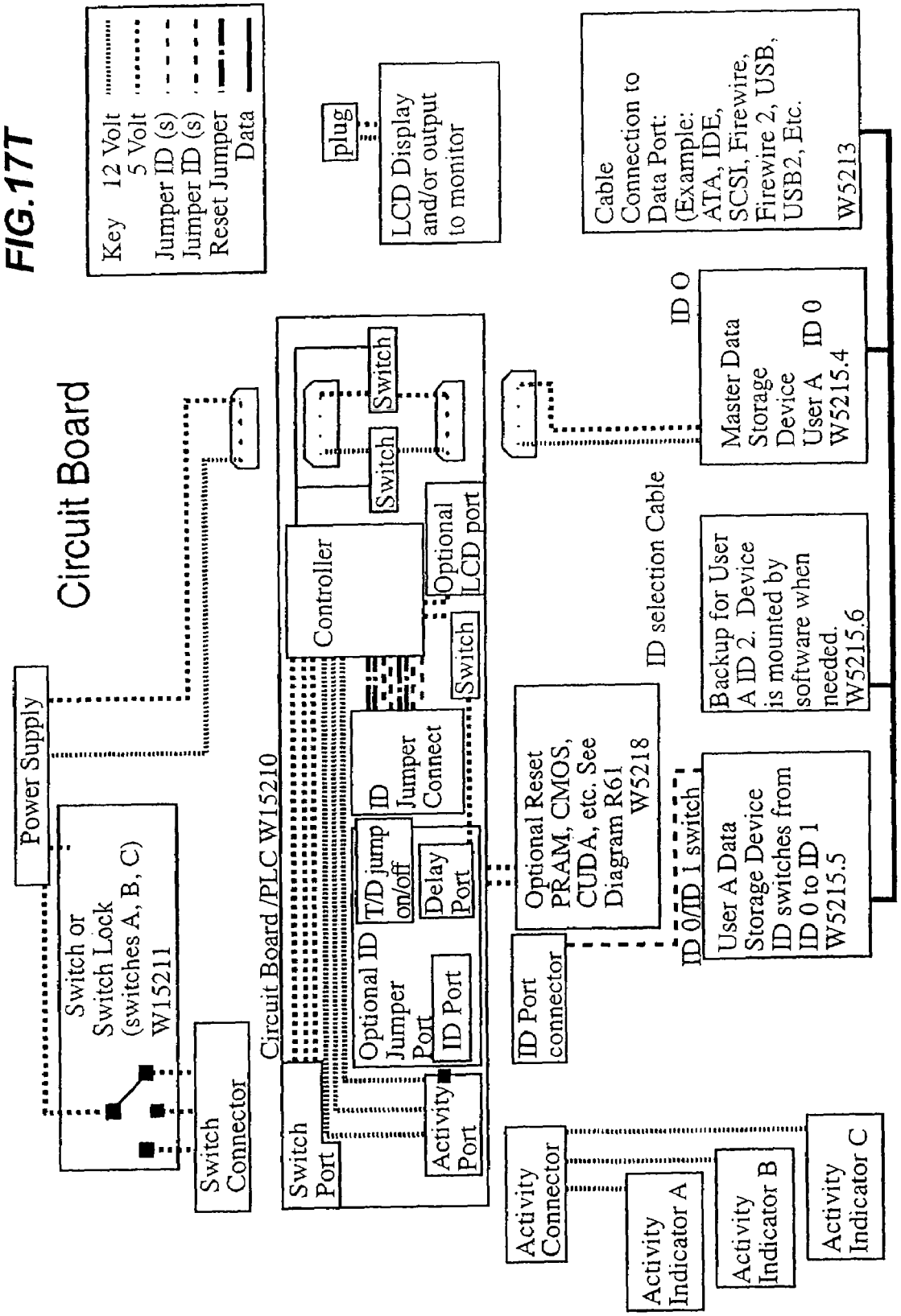
Figure 17U:
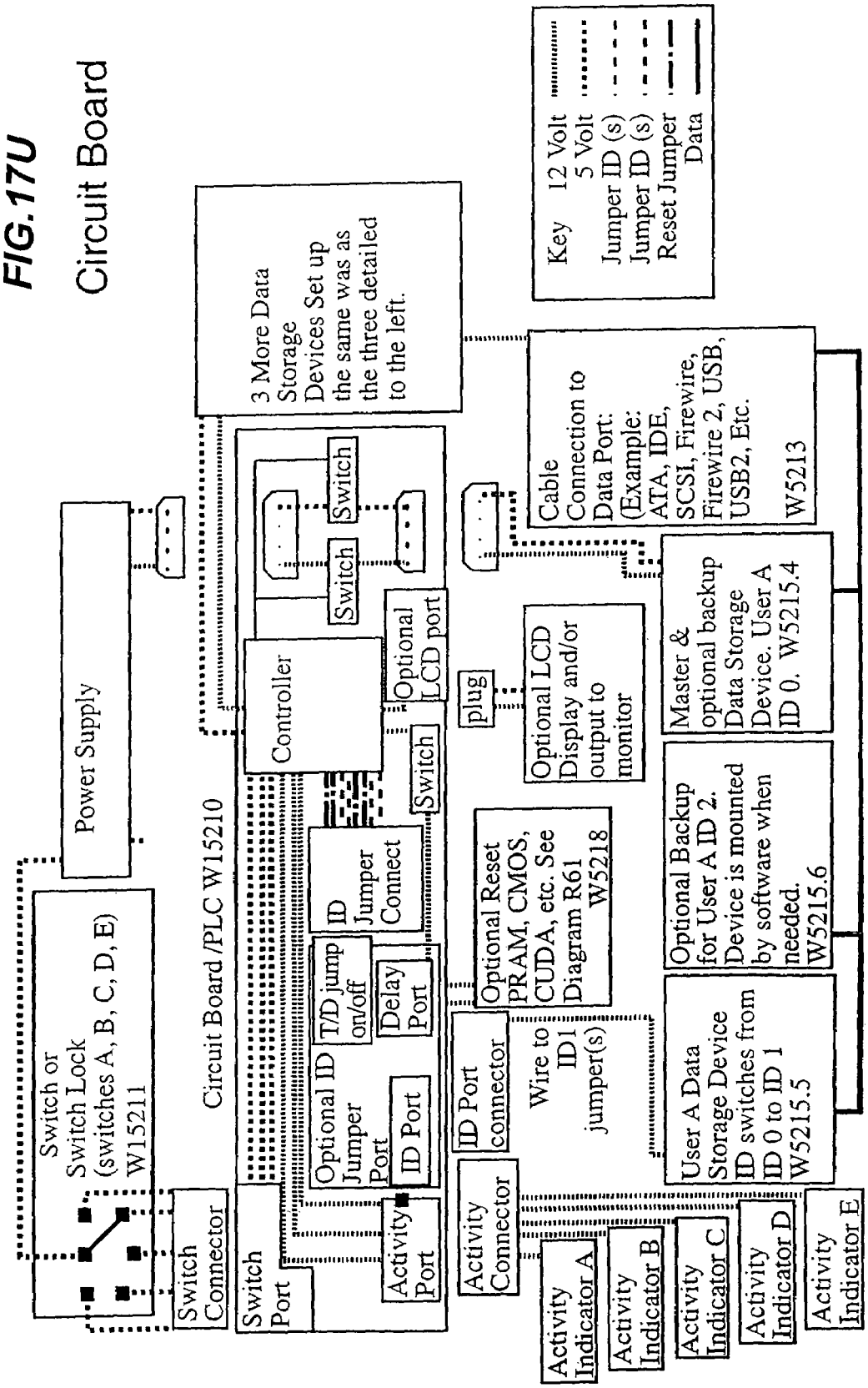
Figure 17Y:
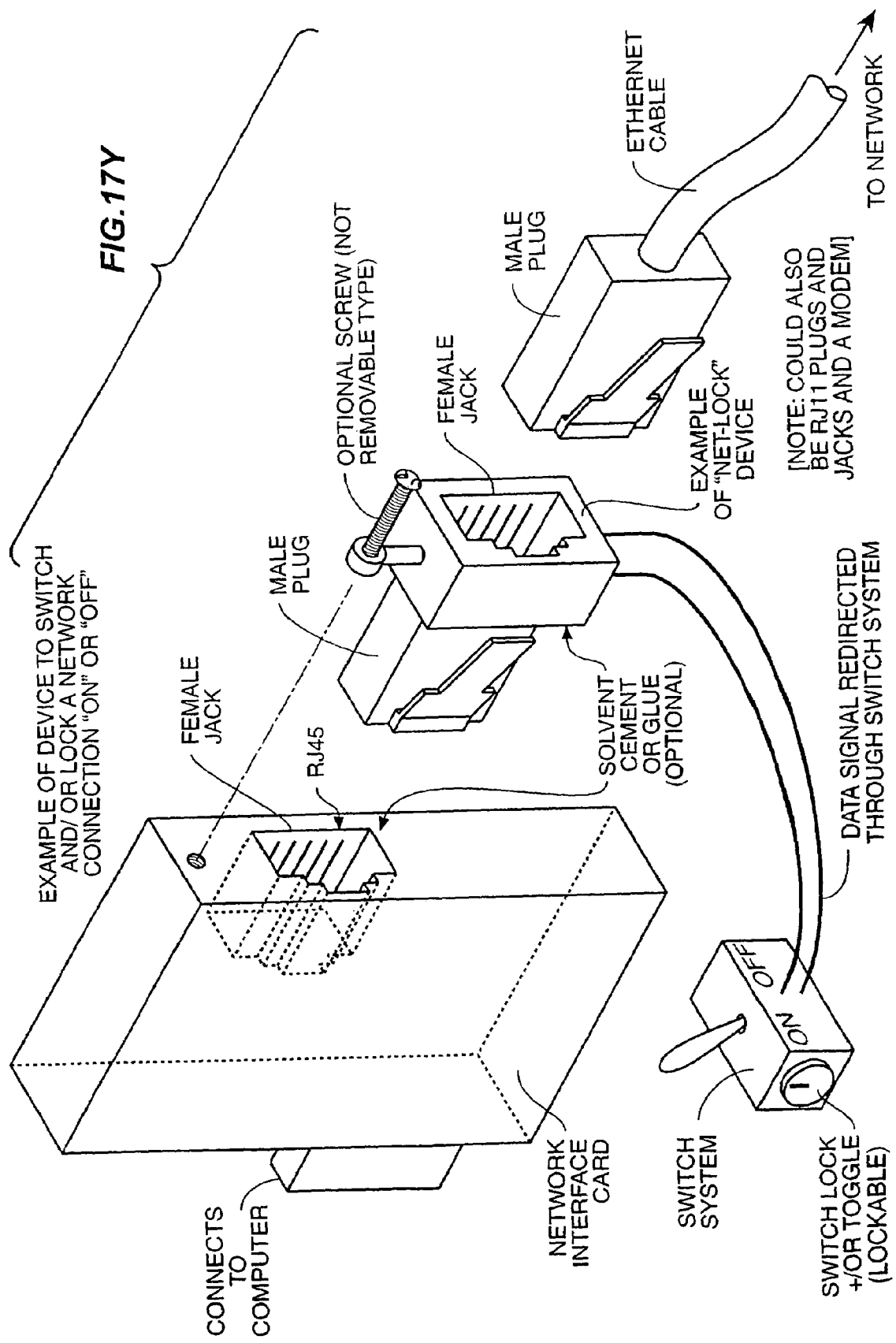
Figure 17Z:
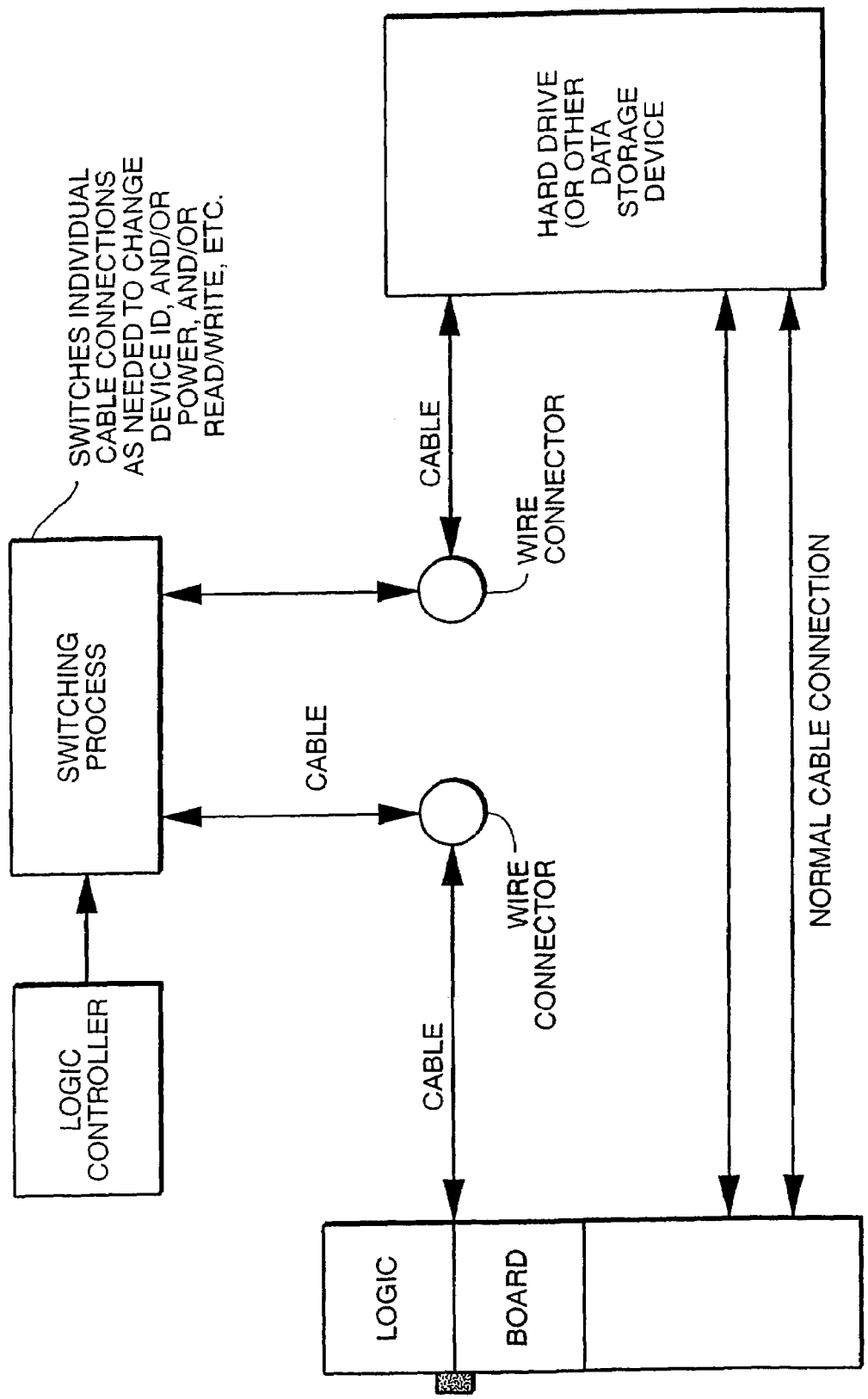
Figures 1, 17Z:
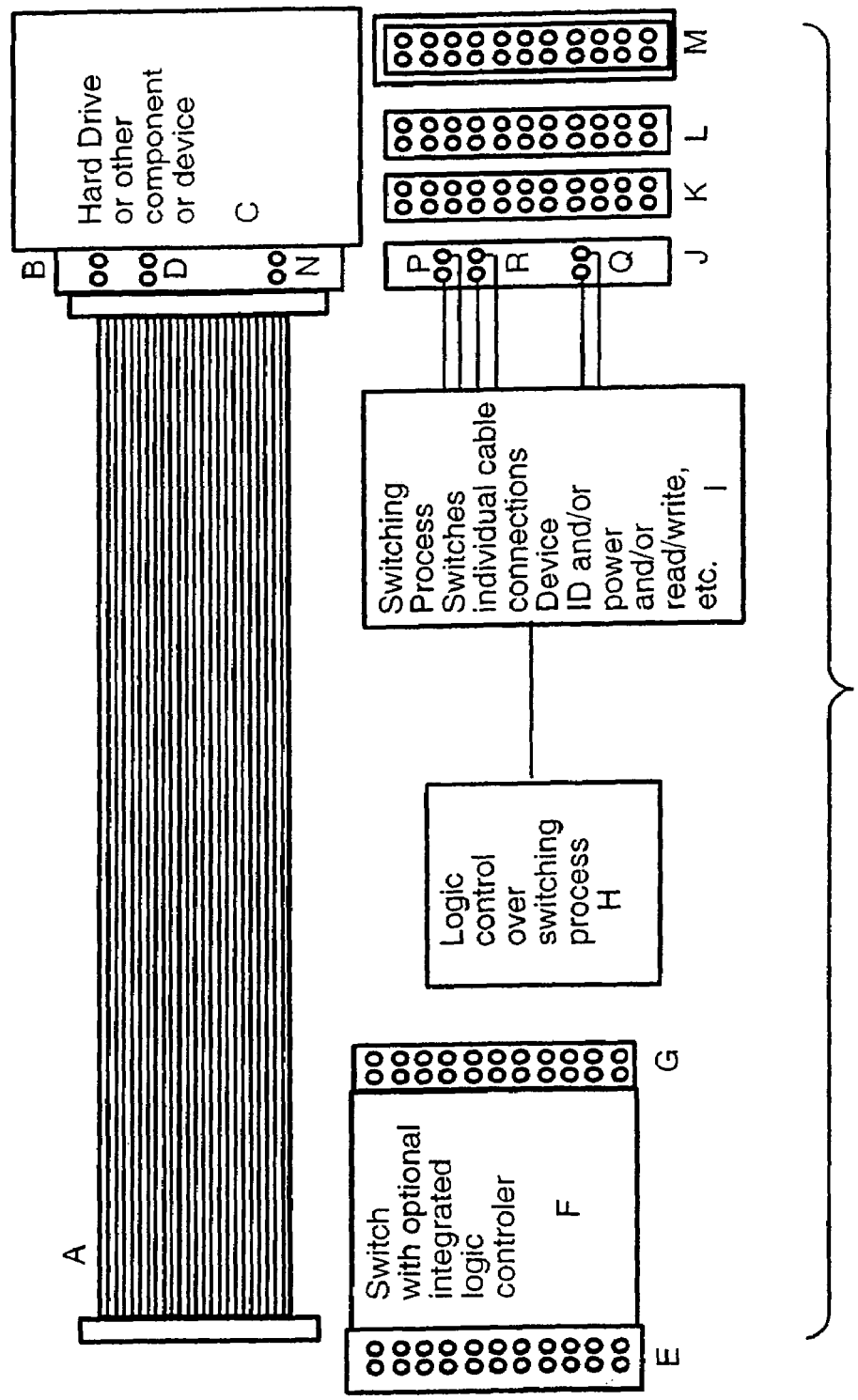
Figures 2, 17Z:
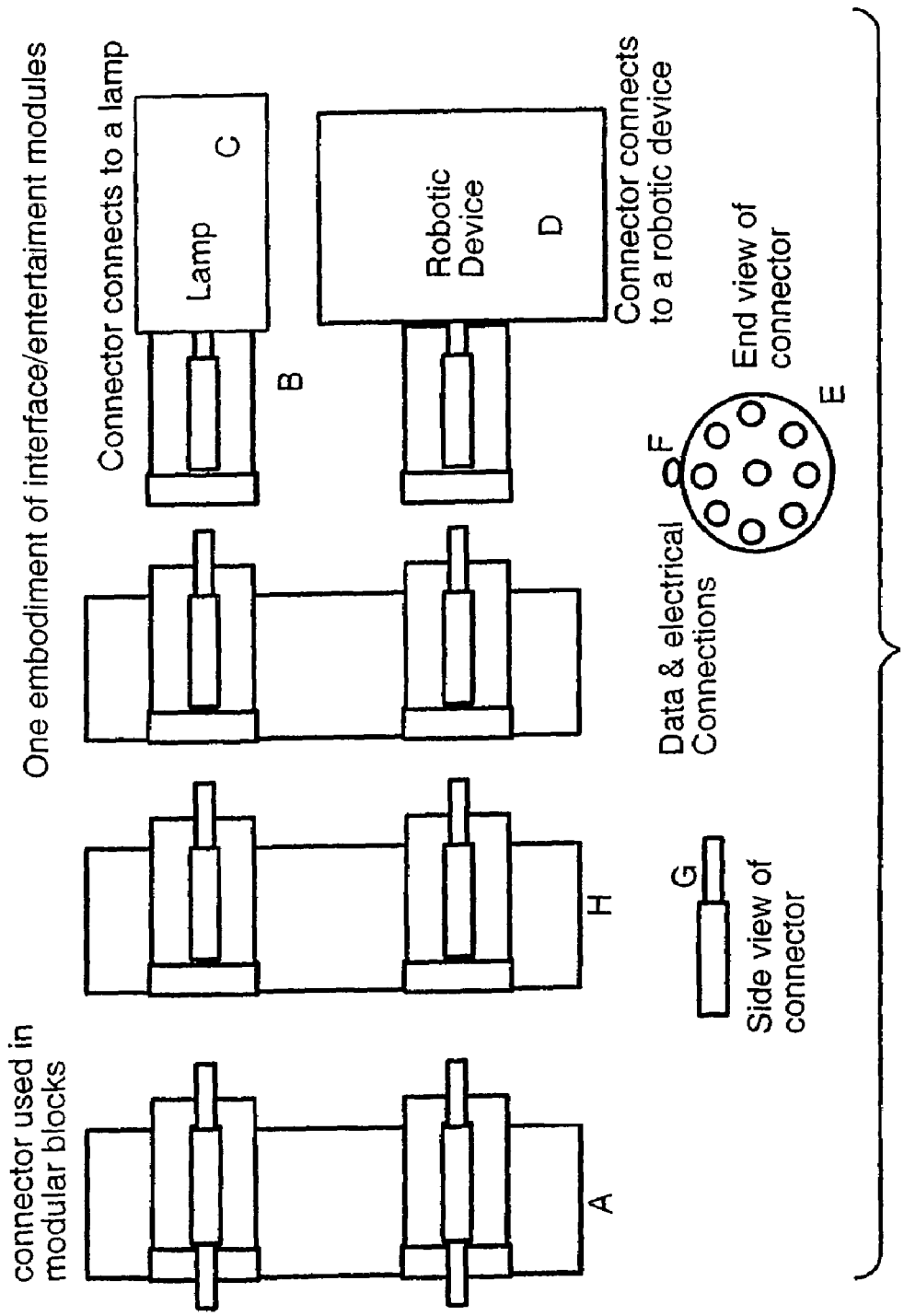

FIG. 9A illustrates a computer 9 incorporating an embodiment of the invention. The computer 9 may include a CPU 90, volatile memory 91, a controllers 97, 98, a non-volatile data store 92, a port 99, a peripheral 9B and buses 95, 97, all well known in the art. The computer 9 may also include a switch 9Z.

The bus 95 may communicatively couple the volatile memory 91, the controllers 97, 98 to each other and to the CPU 90. The controller 97 may communicate with the data store 92. The controller 98 may communicate with the peripheral 9B.

The bus 97 may communicatively or electrically couple the port 99 (and thus the controller 98) to the peripheral 9B.

The peripheral 9B may be any computer peripheral. Examples include printers, USB devices, scanners, fax machines, data stores and keyboards.

The switch 9Z may switch a power line 971 of the bus 97, thus powering up or down the peripheral 9B. The switch 9Z may switch one or more data lines 972 of the bus 97, thus disabling or enabling the peripheral 9B to transfer data to the port 99.

A user of the computer 9 may be using the peripheral 9B, transmitting or receiving data on the from the device 9B as expected. The switch 9Z is supplying power to the peripheral 9B.

At some point, the computer 9 becomes unable to communicate with the peripheral 9B. This may be caused by an error in the software or hardware of the computer 9, including software or logic of the peripheral 9B.

The user attempts to revive communications with the peripheral 9B. The user may. for example, cycle the power to the peripheral 9B. Thus, the user changes the state of the switch 9Z such that the switch 9Z goes from powering to the peripheral 9B, to not powering that peripheral 9B, to again powering that peripheral 9B. This switching may be done manually, in hardware, or programmatically.

The cycling of the peripheral 9B may resolve the communication problem that the user was experiencing. For example, where the problem was with the software or logic of the peripheral 9B, then the power cycling may clear the software or logic state of the peripheral 9B. Where the problem was with the software or logic of the computer 1, cycling the power may clear the software or logic state f the controller 97 or applications running in the memory 91.

FIG. 9B illustrates an alternate embodiment of the computer 9. The switch 9Z switches both power and data lines.

A Multi-User Computer

FIG. 5 illustrates a computer 5 incorporating an embodiment of the invention. The computer 5 may include a CPU 50, volatile memory 51, a peripheral controller 57, multiple non-volatile data stores 52a, 52b, . . . 52α and a bus 55, all well known in the art. The computer 5 may also include a data-store switch 5Z and a bus 56 consisting of the buses 561 or 562.

The bus 55 may communicatively couple the volatile memory 51, the peripheral controller 57 and the data port 59 to each other and to the CPU 50.

The peripheral controller 57 may communicative with the data-store switch 5Z. The data-store switch 5Z in turn may communicatively or electrically couple with the data stores 52. The bus 561 may communicatively couple the data path of the switch 5Z to those of the data stores 52, and the bus 562 may electrically couple a power supply in or through the switch 5Z to the data stores 52.

The computer 5 may operate in any of N states, where N is the number of data stores 52. In a first state, the data-store switch 5Z enables the first data store 52a to communicate with the peripheral controller 57. In the second state, the switch 5Z enables the second data store 52b to communicate with the peripheral controller 57, and in the Nth state, the switch 5Z enables the Nth data store 52α to communicate with the peripheral controller 57. Only one data store 52 may access the peripheral controller 57 at any given time.

In one embodiment, the computer 5 has only one controller with multiple devices. In another embodiment, the computer 5' has multiple controllers, each with respective multiple peripherals. The switching then switches among the multiple peripherals of the first controller, the multiple peripherals of the second controller, etc. (The multiple controllers need not have the same number of multiple peripherals.)

Each data store 52 may contain self-contained software for a respective user or group of users. Each data store 52 may contain a bootable operating system, and optionally such application or data files as the user(s) corresponding to the data store 52 may require or desire.

Each user or group of users may use only a predetermined one (or more) of the data stores 52. Thus, before using the computer 5, a user sets the switch 5Z to the predetermined position enabling the data store 52 corresponding to that user to communicate via the controller 57.

In this way, a first user's data is separated from a second user's data on the same computer. The computer 5 more effectively separates users' data by enforcing security at a physical level rather than at the logical (software-enforced) level typical of multi-user operating systems.

In this scenario, re-booting between switches is desirable. Re-booting clears out the memory 51 in the switch from one user to another. Also desirable is a multi-key, multi-position lock. Any one key may turn the lock to any one predetermined position, enabling one corresponding data store 52.

The invention now being fully described, one of ordinary skill in the art will readily recognize many changes and modifications that can be made thereto without departing from the spirit of the appended claims. For example, in addition to switching software, data stores or other peripherals as described above, a computer may also switch properly functioning hardware for malfunctioning hardware. Indeed, in a computer with multiple mother boards, a switch may switch the functioning components of a computer from one board to another.

Also, while the description above usually uses data stores as the devices to switch, one of skill in the art will readily now realize that other computer components may be switched, including logic boards, ROM and controllers.

Under certain circumstances, danger or damage may follow from switching when power is supplied. Accordingly, a switch may be deactivated when such danger or damage may result. Logic such as the controller 1A may prevent dangerous or damaging switching by tracking power states, device identities, etc. and permitting switching, for example, when no electrical current is flowing to the devices to be switched.

Preferably, the switch is located in an easy-to-reach location. This contrasts with the typical location of USB, keyboard and other ports, for example.

Some additional or optional features and characteristics of embodiments of the invention are now described.

The repair scripts made backups of the user's data storage device, reformatted the data storage device as necessary, and then replaced some or all of the operating system data, and/or other settings and/or data. These repair scripts and programs were loaded onto the prototype, and after a few adjustments, we got the contraption working.

For the first time, in conjunction with a combination of our repair scripts and programs, a user could just turn a switch on their computer and the computer would fix itself.

Here is a different example using our switching system, in conjunction with programs and/or scripts, to perform a backup and repair process for a malfunctioning hard drive:

Two hard drives can be connected to a "regular" computer.

A single toggle switch can be mounted on the front of the computer, or any location.

Both hard drives are controlled by our special switching system that can control their "Device IDs" and/or "master" and "slave" settings, and power.

Hard drive 1 is a "typical computer user's" hard drive with an OS (such as but not limited to a rotating magnetic hard disc drive), a few applications, documents, and e-mail. Its device identity is set as the "master" hard drive.

Hard drive 2 can be partitioned into 3 partitions: a) a "start-up" partition b) a "master" partition and c) a "backup" partition. Partition "a" is configured to be the "booting" partition.

During "normal" use, our switching system switches hard drive 2's device identity to be a "master" hard drive, but our switching system also turns off hard drive 2's power.

In partition "a" we have a perfectly functioning OS and related software to control the repair process. In partition "b" we have exactly the same OS and exactly the same applications as on hard drive 1, in a "pristine state" with no "defects". Partition "c" is blank at this point in the process because the machine is new and "backups" have not yet been made.

A program that copies data from hard drive 1 to hard drive 2 can then execute periodic "backups" of the user's data (e.g. the "My Documents" folder, email) to partition c of hard drive 2. These backups may be uncompressed, compressed, or represented by an algorithm. The program can be stored on any device that can store data (hard drive 1 or a flash ROM chip are two examples).

This copying procedure can be made possible, for example, by utilizing a program that initiates the switching process (which switches the power "on" to hard drive 2 and gives it the "slave" device ID) at periodic intervals (that could be adjusted by the user) in conjunction with scripts that copy the user's documents and email to the "backup" partition "c". Each backup that is created may be given a unique time/date stamp so that when the user needs his/her data back s/he can choose from multiple "backups."

Various parts of the OS, application software, or any other data on hard drive 1 could then be damaged, deleted, corrupted, or destroyed. The hard drive could even have "bad blocks" and/or sectors, and/or even physical damage on the surface of the hard drive. The corruption of hard drive 1 could be so terrible that the computer could not even "boot up." We could then repair it:

"Flip" the "toggle switch" and the following switching process occurs:

Our switching system then switches the "device ID" settings so that hard drive 1 becomes the "slave" drive, power is then connected to hard drive 2, and hard drive 2 is switched to become the new device ID of "master."

The script that creates "backups" could then execute again and copy all or selective data from hard drive 1 (for this example, it could copy the user's "My Documents" folder and/or email.) to Partition "c" of hard drive 2.

Another script could then run on hard drive 2 that would completely reformat hard drive 1. It could also map the "bad blocks" on the hard drive.

Then another script could run on hard drive 2 that copies the "perfectly functioning" copy of the OS and applications from partition "b" over to hard drive 1.

Optionally, a script could then run that asks the user which copy of the "backups" from partition "c" the user would like to revert to. Upon choosing a particular backup, the "My Documents" folder and email (from partition "c" on hard drive 2) would then be copied back to hard drive 1.

When it finishes copying, another new script could run that shuts-down the computer and its hard drives.

The user could then "flip" our switch again and it would switch the "device ID" back to "master" for hard drive 1, switch hard drive 2 to "slave" and cut its power.

The user could then restart the computer, and it would boot-up perfectly into the freshly reformatted hard drive 1, with its freshly copied OS and applications, its freshly copied "My Documents" folder, and its malfunctioning behavior would thus be repaired.

By switching data storage device IDs and/or power, and/or network connection, and/or other means, data storage devices can be connected to a computer in such a way that one or more of the data storage devices can be isolated from other data storage devices, and/or isolated from network connections.

Thus, if a hacker or virus were to enter a data storage device that was connected to a network, said hacker or virus could only access one of the data storage device(s) because the other data storage devices were "separated" by the Switching System. This data storage device could be devoid of user data.

Also, a user could switch from one data storage device that was "private" or "isolated" (by using our switching system) from the network, to a different data storage that was exposed to the network, but was "empty" of user's personal data. Thus, a hacker would not be able to access the user's private data storage device., but only the one containing no user data.

Master Template: A master template is a collection of software that consists of one or more of the following: operating system, applications, or whatever else the user and/or maker of the template wants to put on it, and/or default/user preferences and settings. It is created by copying said software onto a data storage device (or partition) that is defined as a Master Template Storage Device.

The repair process can function in a number of different ways. For example, it can be user controlled, it can always take place on a schedule, and/or on startup, shut down, etc.

The master template may be a "perfect" installation of the system and software and/or data that a user wants and/or is required and/or desired on their computer/computing device, that may also have been checked for conflicts and/or errors and said errors could then corrected by an IT professional.

There are a number of ways to create a master template. For example: an original "perfect" installation (where errors may have been identified and corrected) can be made on the user data storage device and then copied, or installed, to a second data storage device that contains the master template.

It can be created on another computer elsewhere, and downloaded via a network to reside on the users' computers.

It can be created and/or reside on a data storage device located on a computer elsewhere, and run across a network to repair the users' computer.

It can be created on the storage device and/or partition used to store the master template.

When the master template is created elsewhere and "run", or installed, over a network, or created on a different data storage device than the user data storage device, then shortcuts and/or aliases may need to be modified to work properly when they are copied to the user data storage device. In this case, during the copy process, the code fixes those shortcuts and/or aliases to point them to the correct item on the user data storage device.

The Switching Process can switch data storage device power on and off, thus "hiding" and "un-hiding" the device; switching between making the device inaccessible and accessible.

A network accessible data storage device could usually be switched partially or completely off, and/or the network connection could be switched off, and/or the network accessible data storage device could be "un-mounted." The network accessible data storage device could: 1) only be mounted and/or connected to the network, and/or turned on, when used for sending and/or receiving data on the network; or 2) could always be network accessible; or 3) sometimes be network accessible.

Optionally, the network accessible data storage device could be limited to containing only non-sensitive software, and/or outgoing data waiting to be uploaded or sent.

Optionally programs could exist on the network accessible data storage device that enables mail to be sent and/or received, but not opened.

Multiple communication cards with various identities may be used to switch identities and send/receive data. A computer send/receive function may be set up like a shell game, where the identity is changing rapidly, and the data storage device is on-line for as short a time as possible, for example just long enough to send and/or receive, and then it is taken off line. Rather than using a separate drive for viewing data, software would not allow viewing until drive was off line . . . then before going back on line, software would transfer all data except outgoing data to quarantine.

The Entertainment Center consists of electrical connections, holders, fittings, etc. on the inside, outside, and/or integrated into the body of a computing device that provide the ability for the user (or manufacturer) to hook up anything they want that may interact with the computer and provide entertainment, education, artistic value, etc. For example the outside of a computer can be covered in part, or completely with electrical connections that allow a user to attach devices.

Anti-theft system: The Anti theft system can contain one or more of the following: cellular phone technology, a global positioning system a transmitter/receiver, a meaning of identifying the user, and an extra data storage device, logic control, and a switching process. Using all or some of these devices it can use any means of identification to identify user. If user does not match authorized user the following events can occur:
1) User data storage device is switched off and is thus "hidden".
2) A "bogus," but normal looking data storage device is switched "on," and mounts (optionally id may be switched). It may optionally have a hidden partition that is protected from being erased. Software executes that may be hidden and/or misnames, and/or otherwise would not draw attention from the user and sends out machine location to for example, police, owner's e-mail address, a security service. Information can also be transmitted using any type of transmitter, example: cellular phone call, and/or be sent over a network and/or the internet. The anti-theft process could also be triggered by a phone call.

If user identity doesn't match authorized user, the device may hide the user data storage device, switches to "rigged" data storage device, and also may turn on a global positioning system transmitter to identify location of computer.

When the location of the computer is identified, it can be tracked, even if it is moving.

The repair process can (optionally) utilize a comparative process that compares the software on the user data storage device to a perfect Master Template. By monitoring user processes, we can monitor the state of the user template, be aware of changes (optionally, have a database of changes and/or differences between the user data storage device and the master data storage device) and rapidly repair the user data storage device (on the fly) as needed based on that database, reset connections, and reset memory if needed.

As an option, system does not need to discard (and/or overwrite) user documents, email, etc. so if there is a freeze or corruption problem only the system software, and/or offending software that is having a problem can be repaired, and just those components that are different from the master can be replaced.

Optionally, the user operating system and/or applications, and/or data and the Master Template, and repair process can be run in volatile memory, enabling a fast repair process to perform much more quickly, especially if a comparative repair process is used that repairs problems as they occur. Thus, if a "process watcher" is used to detect a problem, the fast repair process can happen so quickly it may not even be noticed by the user.

Optionally, the user operating system and/or applications, and/or data and the Master Template, and repair process can be run in volatile memory, enabling a fast repair process to perform much more quickly, especially if a comparative repair process is used that repairs problems as they occur.

In Anti-virus/Anti-hacker can switch back and forth between a "side" of a computer connected to the internet, and a "side" that is isolated from the internet, by use of a hardware and/or software switching process.

One option is for the "Backup and/or Repair" system to keep and/or utilize one or more perfect master template(s) of the users' data storage devices, and it can back up and archive the user's data using software or scripts [(which can, for example, be located on a StorExecute (see definition)] that "backs-up" or copies data from one data storage device to another. When the data storage device has a "problem," the "Backup and/or Repair" system can use its switching features to access the perfect master template(s), and/or the backup(s) and/or archive(s), and may use some scripts and/or programs [(which can, for example, be located on a StorExecute (see definition)] to restore a computer to a functioning state. Rather than using a master template, the "Backup and/or Repair" system can also conduct the repair from a backup, and/or archive on a separate data storage device.

Additional embodiments and aspects of the invention are now described. It will be noted that the invention further provides an apparatus and method of supporting the backup and recovery of a computing device. The computing device will typically include both a user computing environment and a supporting environment which enhances the stability and functionality of the user computing environment.

On-the-Fly Repair of a Computer

Embodiments of processes, different computing systems, snap-shot of data, monitoring, recovery, application configuration and application output are now described in turn.

Exemplary Processes

In one embodiment, a plurality of computing processes may be utilized to enable the On-the-Fly invention. Here, individual computing processes may monitor, track, predict the stability, backup, restore, or recover attributes within the user computing environment. The attributes may be software specific, data specific, operating system specific, or any combination. Utilization of the plurality of computing processes can facilitate the normal operation of the user computing environment. In one embodiment the user computing environment may be stabilized without user intervention such as requiring the user to shut-down, restart, logging off, logging on, or terminating applications. In one embodiment the supporting environment may have a capability interacting with the user computing environment. In one embodiment the supporting environment may be capable of initiating or causing the user computing environment to shut-down, restart, logging off, logging on, or terminating applications.

Different Computing Systems

In one embodiment the user computing environment and the supporting environment function in different computing systems. The two computing systems may reside in a common box. The user computing system may consist of data storage devices, RAM, processor, video card, and other attributes known in the art to facilitate a computing system. The supporting computing system may consist of a master template data storage device, RAM, processor, and other attributes known in the art to facilitate a computing system. In one embodiment, the data storage devices may be linked as needed to perform repairs. Such as, the need to copy data from the support environment to the user environment.

Snap-Shot of Data

In one embodiment, the present invention takes a snap-shot of the user computing environment. This snap-shot may subsequently be utilized to restore, analyze, or enhance the stability of the user environment. The snap-shot may include a stable image of the operating system, software applications, or user data. The snap-shot may contain an idealized or stable version of a disk drive utilized by the user environment, or a subset of the disk drive such as an individual partition. The snap-shot may also include an idealized version or image of the user system RAM, user system disk drive, user system partition image, memory of the video card, or any other memory stored or utilized in the user computing environment. These snapshots may be stored in the associated support environment data storage device Monitoring The supporting environment may monitor the user environment. The monitoring may include monitoring of processes running or enabled within the user environment. The monitoring may include monitoring both the utilization of the data storage device, data contained on the data storage device, and other aspect necessary for the normal operation of the user environment. This monitoring may facilitate identifying undesired changes, potential problems and also potential solutions. The supporting system may detect a freeze or other undesirable change within the user environment.

Recovery

When an undesirable change is detected in the user environment, the supporting environment may attempt to recover or restore or repair the user environment. The supporting system may be capable of re-enabling the user environment in a number of ways, such as resetting the keyboard in the event the keyboard locks the communication of keystrokes to the user environment. Further recovery of the user environment may be supported by reset connections such as describe by "Freezebuster", reset and clear devices as needed, replace defective software components as needed, and/or switch hardware components and/or devices as needed. The supporting environment and or supporting system may copy all or part of the data from one or more of the idealized snapshots mentioned above. These snapshots may be copied into their respective devices and/or locations.

Application Configuration

Another embodiment supports an ability to run two or more different programs at the same time on one computing system where the data and applications may be isolated from one another but may share output and/or input devices. In one embodiment, the applications may be isolated by executing the applications in a separate address space. The applications and data may be further isolated by utilizing two separated data storage devices. In order to safely send a command from one isolated data storage device to the other isolated data storage device the following may be utilized. In one embodiment, when an icon on the desktop icon is clicked the following may occur. The icon may execute a command that would launch a specific application on the other isolated data storage device. This may be accomplished by a shared ASIC that sends the command to the other isolated data storage device.

Another embodiment involves isolation of data with merged display. In this embodiment two user environments can be separated for the purposed of isolating data. For the AntiHacker System: A hard drive that does not contain "sensitive" data could be isolated and attached to a network. A second hard drive, may or may not be attached to the other hard drive (in any way), could be utilized for "sensitive" user data, but have no exposure to the network because it is "isolated" by a means of switching. The video signals associated with the data coming from these two hard drives could then be "merged" onto the same screen. In other words, all of the computing would be happening within isolated "secure zones" within a single computer but would not appear so to the user. Another example: the anti-virus system could use this method to isolate potentially infectious data.

Application Output

Applications may have its output displayed on the same screen alongside and/or superimposed upon the same screen with other applications and data that were being "computed" separately. Both computing processes may be separated but may then be "merged" together on the screen, and/or overlaid one another on the same screen. In one embodiment, this may be achieved by using multiple video cards. This concept can be applied for example to the Repair System, Multi User, Anti-Hacker, anti-theft and Anti-Virus.

In another embodiment both the user computing environment and the supporting environment will reside on a single computer system. A snap-shot of the operational user environment will be taken. The snap-shot will be associated with the supporting environment. Processes associated with the supporting environment will monitor the activities and status of the user computing environment. The monitoring function will become aware of any degraded performance of the user computing environment, such as a system freeze up. The monitoring function notifies the supporting environment of any degraded performance. The supporting environment will perform any recovery action as necessary to recover or restore the user environment. Recovery may include utilizing the snap-shot to recover or restore the user environment. An entire user disk may be restored. A specific application or software package may be restored, or particular files.

Embodiments of External Repair of a Computer

The invention may back up or recover a computing device. The computing device may include a user computing environment and a supporting environment which stabilizes the functionality of the user computing environment. The invention may include one or more external devices or removable media.

Master Template

A master template may be a copy of data that represents an ideal state of a computer system or component of a computer system. The master template may be created by copying data from an operational computer system or component of a computer system. The computer system may be in an ideal state before creating a master template. An ideal state of a computer system may be represented by data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, the master template for one computer system may include all of the information installed on that computer system, such as Windows 98 operating system, WordPerfect application, documents created by the user. The information may be installed across multiple hard drives accessible to the computer system. Additionally, the master template may include a copy or an ideal-state version of the BIOS settings.

A master template may represent a snapshot of a newly purchased computer system. The system is typically in an ideal state with an operating system and various applications pre-installed, thereby allowing a user to begin utilizing the computer system. For a particular user, the master template may represent an ideal state of a computer system, including, for example, an operating system, applications, and user customizations. A user customization may include the users prior selection of a picture or ".jpg" image for a desktop background, such as a picture of the users pet.

Optionally, the master template may be created from a first computer system and subsequently may be used as a master template for a different computer system. An ideal state of the first computer is thereby transferred to a second computer system or any number of computer systems.

Backups

A backup is a copy of data that represents an information on a computer system or component of a computer system. The backup may be created by copying data from an operational computer system or component of a computer system. A backup of a computer system may include data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, a backup for one computer system may include all of the information installed on that computer system, such as Windows 98 operating system, WordPerfect application, documents created by the user. The information may be installed across multiple hard drives accessible to the computer system. Additionally, the backup may include a copy or an ideal-state version of the BIOS settings.

An archive is a backup which typically may not be erased.

Data Storage Device

A data storage device includes memory devices, which are accessible to a computer system. A computer system is capable of accessing or storing data in a variety of memory devices. Memory device may include hard drives, RAM, ROM, EPROM, or BIOS. Memory devices store data (e.g., data or programs). User data is typically stored on disk drives, but may potentially be stored on any memory device. Typically, a computer system utilizes a variety of memory devices. For example, an operating system, applications and user data may be stored on a hard drive, a BIOS program may be stored in ROM, and BIOS data may be stored in a protected memory.

Data Storage Device—DSD

A "DSD" refers to a "data storage device."

Exemplary Methods of External Attachment

Data Storage Device (DSD) may be an external device. A variety of protocols currently exist for utilizing external devices. Some of the more prevalent protocols include TCP/IP, USB, USB 2, Firewire, IEEE 1394, PS/2, parallel, serial, PCMCIA, SCSI. Other protocols and method of connecting external devices to a computer system will be apparent to one skilled in the art. As an example, a SCSI hard disk and SCSI CDROM are memory devices that may be attached to a computer system. The computer system may then read or write to the external device.

Exemplary Repair Process

An automated process may repair a data storage device of a computer system. The repair process may include multiple programs. The automated process may be triggered by a particular event or a set of events. The repair process may be specific to a particular data storage device such as the primary boot partition of a hard drive. The repair process may encompass a variety of functions which may be modified, added, of skipped based on the type of repair or user preferences. The user may modify user preferences.

In one embodiment, the repair process represents a sequence of functions. Typically a Master Template is either provided to the user or created by the user. Backups are created intermittently. The computer system becomes unstable and repair becomes necessary. The user may activate the repair process or the repair process may recognize the instability or problems with the system and activate the repair process.

Prior to repair, a Master Template typically exists for the computer system. The Master Template may have been created in a number of different ways. Several ways of creating one or more Master Templates for this computer system include: shipped with a new computer, created with the installation of software (e.g., software to support this process), created by a user-activated program, periodically created of a Master Template by a program.

Backups typically exist for a computer system. A backup may include user data and programs which have been stored on a data storage device accessible to the computer system. For example, documents may have been created or modified by a user. These documents may be stored as a backup. The user may have installed additional programs that may be stored in a backup.

During a backup process data is copied from a data storage device of the computer system to the backup data storage device(s). Any data that is accessible to the computer system may be backed up. The backup may be compressed. Compression may reduce the amount of storage space required to hold the backup. Incremental backups may also be used. Incremental backups may reduce the time required to perform a backup and reduce the storage space required to store them. Backups may be stored as archives.

Repair Process is activated and (Optionally may be confirmed).

The repair process may include a number of functions. The repair process may be initiated by a user, administrator, repair software, or repair hardware. The user may specifically initiate the process (e.g., double clicking on an icon of a graphical operating system). An administrator may initiate the process by communicating with the computer system over an internet connection such as TCP/IP. Repair software may initiate the process by utilizing a boot diskette or a separate boot partition on the hard drive. Repair hardware may initiate the process by sensing a frozen state of the operating system or hard disk, and subsequently initiating the repair process. Alternatively, the user may press a hardware switch which initiates a process to shutdown the machine, switch boot disks, and the subsequent startup may initiate the continuation of the repair process.

The repair process may be configured to allow the user to confirm the repair process in a number of scenarios. For example, before a DSD is reformatted the user may be requested to confirm the operation. The user may be allowed to halt the repair process.

The repair process may utilize a Master Template, Backup, Archive, various commands associated with an operating system, switching, and other programs, for repairing a computer system. For example, the repair process may format and partition a hard disk using an MS-DOS command, then copy a Master Template to the primary boot partition of the hard drive, then copy the latest Backup or Archive, then mark the primary boot partition as the active partition.

Any number of backups or archives may be used to restore the user DSD(s).

Command associated with an operating system may be used to reset or update DSD of the computer system. A DSD (e.g., PRAM, BIOS, or CMOS) may be updated through the use of commands associated with an operating system. Typically, MS-DOS commands may be used to download, save, reset, reset to the default, or update a BIOS version. For example, one step in the repair process may include booting into an MS-DOS partition, executing MS-DOS commands to update the BIOS of the computer system, then change the boot device and reboot the computer system to continue the repair process if necessary. Alternatively, the DSD (e.g., BIOS) may be set to a previously saved state. The previously saved state may be included as part of the Master Template, Backup, or an Archive.

The repair process may also be capable of managing DSDs. Managing DSDs may include testing, reformatting, analyzing, resetting, or determining bad blocks. Alternatively, the repair process may interact with other programs to provide management functionality of all or some DSDs. For example, the repair process may rely on operating system commands to format a DSD (e.g., a hard drive), but interact with a program to interact with another DSD (e.g., BIOS, PRAM).

The repair process may evaluate the present state of the computer system. As part of the analysis the repair process may determine or recommend a type of repair. For example, if the DSD (e.g., hard disk) is not responding then reformatting may be recommended. If only several files appear to be corrupted then the repair process may determine only those files need to be copied from a Master Template or a backup. Some or all of the data from a master template may be copied on to the DSD(s). Alternatively, the repair process may copy the entire master template to the DSD(s).

The repair process may perform a similar evaluation regarding how much of a backup needs to be copied. Some or all of the data from a backup may be copied on to the DSD(s). Alternatively, the repair process may copy the entire master template to the DSD(s).

Rebooting the computer system may be integrated into the repair process. Switching between boot devices may be integrated into the repair process. The repair process may switch the boot disk from hard disk 1 to hard disk 2. Power may be cycled such that hard disk 2 boots up as the active partition. A default program may be executed as part of the boot sequence to perform part of the repair process. Subsequently, the repair process may alter the hard disk 1, switch hard disk 1 to the active partition, and then reboot or cycle the power to initiate the booting of hard disk 1.

Some Exemplary Embodiments of External Device Embodiments

The repair process may be initiated or managed by an externally located device that may be communicative coupled to the computing device through, e.g., USB, Firewire, parallel, serial, PS/2, PCMCIA, or infrared. The external device may be the boot device.

An external boot device may be connected to the computer system with the boot device activating the repair process. The repair program may reside on the boot device or a second data storage device. The second data storage device may also be communicatively coupled to the computer system. The second data storage device may contain master templates, backups, or archives. The second data storage device may also contain the repair program or other programs which facilitate the repair process.

For example, an internal SCSI device "id 0" may be the default boot device. The repair process may switch the power to the SCSI device "id 0" OFF. The repair process may switch the power to an external SCSI device "id 0" ON. The repair process reboot the computer system by actuating a reset command (e.g., a mechanical device, a logic circuit). When the computer system reboots, the external SCSI device may be the boot device. The repair process may then continue as directed by part of the repair process on the external SCSI hard drive.

The repair process may include switching the device id's of a primary and secondary SCSI disk. In this second example, the internal SCSI drive may be "id 0" and the external SCSI drive may be "id 5". The repair process may change the internal SCSI device to "id 5" and the external SCSI device to "id 0". Switching of the SCSI device id's may be performed by the repair process (e.g., a mechanical device or a logic circuit, activated by the repair process).

In another embodiment, the BIOS may be modified to enable booting from an external device. The boot device may also be switched by updating the BIOS. Typically the BIOS defines the boot sequence. If the first boot device is not found, then an alternate boot device may be defined in the BIOS (e.g., the boot-device sequence is CDROM, A:, C:). The BIOS may be downloaded, modified, and restored. The BIOS may be updated (e.g., in place, via download-modification-upload) to change the boot identifier of a USB device, an IDE device, or other devices. The repair process may download a copy of the BIOS in a variety of ways. One example, includes booting into an MS-DOS mode, executing a program to save the current BIOS to a file. The BIOS file may be saved into a master template, backup or archive. Alternatively, the BIOS file may be modified by the repair process to change the boot sequence. If the BIOS file is updated then it must be loaded into the computer system to take effect. Effectively the boot sequence may be changed to another DSD, such as a second hard drive. The external SCSI disk with a specific "id" may become the "boot device". Another option involves storing multiple copies of the BIOS file, each having a different boot sequence, uploading the appropriate BIOS file may allow booting from a particular boot device (e.g., IDE hard drive partition 1, SCSI device "id 0", USB disk, Jaz drive, etc.). An external device may be the boot device and start or continue the repair process.

In another embodiment, a secondary boot device may be attached as an external Data Storage Device to a computer system (e.g., connect to a parallel port). This secondary boot device may activate or manage the repair process. The secondary boot device may contain programs to conduct processes such as reformatting another data storage device (e.g., internal or external hard drive), copying data from a Master Template, copying data from a backup or archive.

A program on the secondary boot device, or accessible to the secondary boot device, may be activated to create a master template, backup, or archive of and data accessible by the computer system (e.g., the user's main drive).

A program on the secondary boot device, or accessible to the secondary boot device, may be activated to repair a data storage device on the computer system (e.g., the user's main drive that needs to be repaired). In this scenario, the Master Template, Backup, or archive Data Storage Device(s) may be attached externally via USB, firewire, etc. The program may actively search for Master Templates, Backups, or archive DSD(s) and present the user with a list of options for restoring the computer system. Alternatively, the repair process may determine and select the best restore options and continue the repair process.

In another embodiment the repair process may be initiated by insertion of a floppy, cd, dvd, or use any other form of removable storage/memory or startup device, and rebooting the computer system. The removable storage/memory or startup device may boot if the BIOS boot sequence contains a sequence in which the boot order enables a removable media to act as the boot device. Booting from the removable media may trigger or activate an automated repair process (e.g., a program located on the removable media or an external device). Booting from the removable media may activate a mechanical device or program logic to initiate the repair process (e.g., switch hard disk device id's and initiate a reboot sequence to boot from another device to continue the repair process).

In another embodiment, a repair program or part of the repair process may be placed in a StorExecute, microcontroller, ASIC, etc. The repair program may activate a repair process. The repair program may include managing the repair process. Functions which may be performed include reformatting data storage device(s), switching between boot devices, switching electrical components within the computer system or external components, copying data to/from data storage device(s), (e.g., copying master templates, backups, etc, or any portion to another data storage device), and other repair functions. The repair process, may also be located, integrated, or embedded in an external device. A switch trigger that activates the repair process may also be located, integrated, or embedded in an external device.

In one embodiment, the startup device may be selected by a StoreExecute. Alternatively, a device identity may be assigned by a StoreExecute. The necessity to perform switching through the use of jumpers is thereby reduced. For example if a repair process is triggered, a StoreExecute may assign device identities to data storage devices or may decide which data storage device shall be used for the repair process, and which data storage device shall be used for boot data storage device if rebooting is utilized in the repair process.

In one embodiment during "on-the-fly" repairs, an external data storage device may be utilized for such things as the Master Template or backups, or for software used for the repair process.

In this embodiment, an external data storage device ("DSD") is attached to a typical personal computer that contains an internal data storage device. The internal DSD may be referred to as the "main user" data storage device. An external DSD may be attached via any available external connection.

Example of external data storage device ("DSD") for repairing a computer:

In this example, a user attaches an external data storage device ("DSD") to a computer with any available external connection (e.g., Firewire, USB, SCSI, etc.). An external connection may include USB, USB 2, Firewire, IEEE 1394, PS/2, parallel, serial, PCMCIA, SCSI, and other protocols and method of communicating with an external device.

The user installs software on "main user" DSD that initiates a program to create a master template, and schedules Backups to execute every Friday morning. The master template is created by the program and stored on the external data storage device. Every Friday morning the repair process runs and stores a backup of additional information to the external data storage device.

A micro-controller and EPROM may be attached to the computer to perform part of the repair process. Attachment may be via any available external connection. The micro-controller and EPROM may be integrated into the external data storage device.

A switch trigger may be attached to the computer. Attachment may be via any available external connection. The switch trigger may be integrated into the external data storage device.

As another example, the main user data storage device is accidentally erased or damaged and that the computer system will not boot. The user decides to repair computer and initiates the repair process by activating a switch trigger, which initiates the following process:

The micro-controller may interrogate the BIOS of the computer system to determine its current boot up sequence. EPROM may store instructions for how to accomplish this.

The micro-controller may determine that it is necessary to alter the boot sequence so that the externally attached data storage device will become the boot device. The micro-controller and associated EPROM may flash the BIOS in order to accomplish this. The micro-controller may then send a command to computer to reboot the computer. When the computer reboots, it will reboot from the external data storage device.

Following the boot up, programs which are located on the external data storage device may execute the repair process as defined herein.

Additional embodiments and aspects of the invention are now described.

Embodiment of Apparatus and Method for Backup of a Computer

The invention may backup, maintain backups, or recover data associated with a computing system. The computing system may include any number of components including hardware and software, and any memory accessible to the computing system. The computing system may focus on a user computing system and potentially the supporting environment which stabilizes the functionality of the user computing system (e.g., operating system, BIOS, etc.). Typically data associated with the computing system is identified by a variety of characteristics, the data is stored as a backup, and subsequently data within the backup may be restored or used to evaluate an existing computing system.

Backups

Data has a number of characteristics, typically including availability for use in a computing system. Data may include one of more of any of the following: operating systems, application, user data, data residing in the computing system (e.g., hard disk, hard disk partition, RAM, ROM, BIOS, CMOS, EPROM, electronic serial numbers, etc.), applications residing in the computing system (e.g., sample listed above), and backups created or accessible. The term data may be used to describe a specific aspect of information for association with a backup process. A backup process may include identifying data and the characteristics of data, for backup, management, or restoration. Data may also refer to a backup or set of backups. By default the data to backup may represent all data on a given disk drive, a given disk partition, or a memory.

Characteristics of the data may include an indication of what data is part of the backup, how to access the data, where to backup the data, frequency of the backup, and type of backup. These characteristics may be used to define or identify specific data associated with a backup process. Specific implementations may vary according to what characteristics are associated with the backup process.

What data to include is limited by the accessibility of the data to the computing system. Specific data for inclusion in a backup may be predetermined or determined as part of the backup process. Predetermined identification of data to include in a given backup may be provided by a hardware or software manufacturer, or a user (e.g., system administrator). Predetermined set of data may provide an initial indication of what data to backup. An operating system may, for example, include a list of files and or directories associated with operating system functionality. Here the operating system may provide a predetermined list of files or associated data representing the operating system or identifying specific data to backup (e.g., list of uses, user preferences, passwords, windows registry file).

A hardware system may, for example, include a memory address range (e.g., RAM, ROM, EPROM, BIOS, etc.) that represents data that may be useful to backup for that system. The hardware system may also identify other data within the computing system that may be useful in the backup process (e.g., applications to extract or update a BIOS). Typically, the data identified is useful in the backup process, such as understanding the operation of the computing system or restoring data in the event of a failure or corrupted data. Data identified for backup may also have a variety of uses including cleaning up the computing system which may have limited disk space (e.g., verify the necessity of data in a current computing system) and restoring identified data.

Alternatively, what data to include in a given backup may be determined subsequent to the delivery of a computing system to a user. Data may be determined with installation of hardware or software, or during the normal course of utilizing the computing system. A determination may be made with the installation of hardware or software. The installation process may be actively engaged in identifying what data would be useful to the backup process. The installation process may interact with the backup process or tools to identify program files and data specific to a given installation. The location of user file may also be helpful to the backup process. The contents of a user directory may be marked by the backup process for inclusion in a periodic backup. Accessing data by an application may also be integrated into the backup process. One example includes added functionality, such that saving data (e.g., a files) by the application includes an indication to the backup process to backup that specific data. The installed application may add the saved user file to a list of files that should be include in a subsequent backup. If multiple users access the same computing system, the file to be included in a backup may include an ownership indication.

Data to include may be identified according to directories or specific files. For example, data to include may be identified by file type, file location, directory tree, of memory device. A selective backup may backup only data associated with a specific system component such as a disk drive or data storage device.

How to access the data may be an important characteristic of the backup. An important consideration may be required for accessing, storing, formatting, modifying, restoring, and updating data of the various components associated with a computing system. Not all data is readily accessible according to a well known process of accessing a hard drive. As described above, data may include any data accessible to the computing system. Typically, a piece of data is uniquely accessible according to a predefined process. The process for accessing information from a disk drive is readily appreciated by novice users.

For example, accessing BIOS data for backup may involve booting into a particular operating system (e.g., DOS 5.x), running a hardware-specific program which may verify the hardware compatibility, executing a second hardware-specific program which may copy the data (e.g., BIOS data) to a floppy disk. Updating the BIOS in the example may involve running another program to flash the BIOS. Both the old and new versions of the BIOS, and associated applications can be stored as data in a backup. Consequently, a restoration of the old BIOS can be incorporated into the backup process. Similarly, other data accessible to the computing system may be incorporated in to the backup process by analyzing the existing processes for managing data for specific components within the computing system.

Where a backup is stored may be predetermined or determined as part of the backup process. A manufacturer of the hardware or software may provide an initial predetermined backup storage area or an indication of another device where the backup is to be stored. An operating system may access a second data storage device such as a disk drive, a second partition, or a pre-allocated file (e.g., similar to a swap file). Backup data may be stored to this initial location. A Hardware system may, for example, include a second memory or an address range of a memory (e.g., RAM, ROM, EPROM, BIOS, etc.) that represents the default backup location. Optionally, the backup location may be another storage device within the computing system or accessible to the computing system (e.g., across an Ethernet, firewire, USB, etc.).

Frequency of the backup can be based on any of a number of factors associated with the data and computing system including: volatility of data, volatility of the computing system, importance, upgrade schedule, user projects, personal comfort level, past experience with similar environments, degree of user participation, etc. Backups can be scheduled at particular times and intervals based on these factors. Backups may be initiated by the hardware, software, or a user. Similarly, other activities on the backup process, such as maintenance and restoration, may be performed based on a given frequency.

Exemplary Types of Backup

A variety of backup types may be supported. The types may include at least one of the following: full backup, selective backup, partial backup, master template, data modified since a prior backup, or based in part on a comparison with a prior backup (e.g., a prior backup, or a listing of the contents of a prior backup). The type of backup may be defined for all data included in the backup, or part of the data associated with the backup process. For example, a backup may include an operating system wherein only files associated with the operating system and files modified since a prior backup are included in a specific backup. The specific backup may further include a user data directory identified for backup.

Exemplary Data Represented in a Backup

Data represented in a backup may be identified by the various characteristics described above. Typically, data represented in a backup supports a backup process, such as a possible restoration of the data for use in a computing system. The backup or the various data contained in the backup may be a compressed or encrypted. Specific data in the backup may be an exact duplicate or enough information that the data may be recreated, corrected, or verified. For example, file differences may be included in a backup, thereby allowing a set of backups to be utilized to recreate or correct a file or data. How to access the data may also be represented in a backup for certain types of data (e.g., BIOS) and not represented in a backup for other types of data (e.g., "c:\my docs\*.docs").

Data to be included in a given backup may identify by hardware, software, user, or other characteristic of the computing system. A computer manufacturer may create an initial backup of a standard installation, which may include various forms of data associated with a computing system. The manufacturer sells the computing system to a user and may provide a master template as a backup that represents the manufacturers initial computing system configuration. This saves the manufacturer time and money, and gives the user peace of mind. Subsequently the user may install additional software and thereafter create a partial backup of the changes to the computing system. A comparison may be performed between the master template and data associated with the current computing system. Difference between the two can be identified as the data for backup. Here, data that has been changed, added, or deleted, in comparison to data associated with a master template may be identified for backup. Consequently, the master template and a subsequent backup may be used, according to this example, to restore the computing system to the level of functionality associated with the subsequent backups. A variety of scenarios will be apparent to one skilled in the art.

Exemplary Embodiment of Repair Process

Exemplary Restoring

Data represented in a backup is typically restored to a computing system. Restoration may include the selection of at least one of the following: specific backup, group of backups, specific data contained within a backup, and a master template. The restoration may initially determine the difference between the current computing system and a prior backup. Characteristic associated with the identified data may be used in the backup process (e.g., restoration process associated with BIOS which may have been included in a backup).

The selection of a master template, for example, may return the computing system to an idealized state as defined by the master template. A master template and other data may be identified to restore the computing system to a state associated with the last backup in combination with the identified master template (e.g., master template represent the state as purchased, and the identified backup represents the state after a user installed several applications). Alternatively, a master template may represent an upgrade to the computing system. This upgrade may be combined with other user backup to enhance the functionality of the computing system and maintain existing user data.

Selecting Data

Data associated with the backup may be identified similarly to the selection of data for inclusion in the backup, as described above. This information may also be utilized to determine what data or aspects of the data to restore (e.g., specific users files).

Data matching a certain file type, file location, data storage device, device, component, description, date, wild card matching, etc. may be identified for restoration. The selection may be performed by the hardware, software, user, or any component in the computing system. In the event of an operating system failure it may be more appropriate to allow hardware or software select data to restore.

Restoration location for data may be specified by a user, hardware, software, default, original location of the data, temporary location, an alternate location (e.g., for further analysis), or by any component of the computing system. For example, a user may elect to restore data with wild cards such as "*.doc" and "*.txt" from all backups. The "*.doc" files will be placed in a user-specified or default file location (e.g., "c:\documents folder\doc"), and "*.txt" files will be placed in a user specified file location (e.g., "c:\documents folder\txt"). Alternatively, the data (e.g., files in this example) may be restored to their original location which may be identified in the backup.

Preferences

Preferences may be associated with the backup process, and may include preferences of hardware, software, users or other components of a computing system. Preference may be defined as a set of default values associated with the computing system, hardware, software, or particular users. Configuration information and characteristics may be defined as preferences for each component of the computing system. A preference associated with a BIOS may include a process or program for accessing the BIOS in a specific manner, such as booting to DOS 5.x, executing a specific program to extract the BIOS. Preference may be changed by hardware, software, or users.

The preferences can be used to define data characteristics (including backups), restore characteristics, and manage data. Preferences may limit the interaction required with users during the backup process (e.g., selecting data or restoring data). A new user may establish preferences to limit interaction with a backup process. A seasoned veteran may establish preferences to provide a more robust control of the backup process or aspects of the backup process.

For example, the specific characteristics of how the backup process interacts with updating a BIOS may be of a greater interest to an experienced user rather than a novice. In another example, user preferences may dictate the interaction between the user and the restore. By default, the restoration process my provide the user with a push button restore, such that the computing system will control the entire restoration process. Alternative, the user may modify the preference such that a user response is required before specific aspects of the backup process are performed (e.g., format hard drive, or flash the BIOS).

Software may also have preferences, which may identify data associated with the software, when installed, serial number, and possibly an indication of the best way to backup, manage, and restore the software. Preferably, preference associated with hardware and software would minimize interaction required a by user in the process.

Initiating Restoration

The hardware, software, or user may initiate and may manage the repair process. Data matching a restoration criteria may be restored. Criteria for restoration may be base on the data stored in the backup (e.g., frequency, master template, compression, encryption, etc.). Further criteria for restoration may be based in part on the type of backup or current status of the computing system (e.g., functional, hard disk failure, BIOS failure, OS non-responsive, etc.) The current status may be determined in part through the utilization of hardware and software to monitor the health of the computing system. For example, hardware or software can monitor the computing system for any indication of a keyboard "freeze", and activate part of the backup process to return the computing system to a normal operating state. Utilization of hardware and software can be used to maintain the health of the computing system. Maintaining the health of a computing system may include determining backup process characteristics which may be based on user preferences. The frequency of backup may be a way to help ensure the computing system's health.

For example, an alternate boot sequence may be initially established in the BIOS such that the computing system initially attempts to boot from a primary disk drive and subsequently to a second drive. The second drive may contain software designed to boot the machine and evaluate the present condition of the computing system. Once the necessity of any repairs have been determined, the software may proceed to correct the malfunctions and return the computing system to a normal operating state. The software may then reboot the computing system to the normal operating state, thereby minimizing user involvement in the repair process.

Removing Data

During a restoration, process data may be removed including: deleted, moved, renamed, or altered. The method of removal may be specified as part of the data characteristics. The restoration process may require the computing system to reflect the data contained in a backup, and therefore necessitate the removal of some data. For example, in restoring data representative of an operating system, a preference may provide that existing inconsistent files may represent the culprits behind a malfunction predicating the restore process. Removing this additional data (files in this example) may be warranted. Removing extraneous data may be performed in a number of ways based in part on the type of restoration, preferences, characteristics of the backup or data, and the goals of the backup process (e.g., minimal user involvement). For example, if the goal is to restore the master template, then as part of a comparative restoration all data determined to be different from the master template may be removed to a specified data storage device or memory such as a default folder.

Restore Specific Data

The hardware, software, or user of a computer system may request the restoration of data. To facilitate the restoration of specific data a user may perform a restore based in part on: file type, creation date, user identification, modification data, backup date, or any characteristics of the data. For example, a completed restore may include a default folder that contains all data from the last backup which differs from data currently available for access to the computing system or some subset of all of the data (e.g., specified according to preferences). Alternatively, the folder may contain all data which differs when comparing two backups, such as the last backup and a master template. Data conforming to the users request may be sorted into different directories to provide the user with an indication of the information contained therein, such as "This is probably your stuff Feb. 25, 2003", "Is any of this your stuff? Feb. 25, 2003", and "Probably not your stuff Feb. 25, 2003".

Managing Restored Data

Preferences may also control what happens to restored data. Data restored may be available to the user or the computing system for a limited duration, to reduce the amount of memory utilized by the computing system. For example a user definable preference may indicate that a dialog warning that the folders named "Is any of this your stuff?Feb. 25, 2003" and "Probably not your stuff Feb. 25, 2003" will be automatically deleted in 10 days and if the user desires data from those folders the data should be moved prior to the expiration date. Optionally, a preference may provide that after 10 days the contents specific folders may be moved to a temporary "trash" folder with a new expiration date of 30 days.

Placement of Restored Data

Placement of data may be defined in part by the data characteristics stored with the backup or data, the characteristics associated with the backup process, and the preferences. Data, such as user data, may be returned to an original location, and other data may be placed in a different location. For example, user data located on the desktop may be returned to where it was, whereas user data located in the system folder may be returned to its original location depending in part on preferences. Alternatively, user data may be deposited in a default or indicated location such as a "documents" folder, a "Your Stuff is In Here" folder, a "proposed trash" folder, a "trash" folder, or other custom locations.

Master Templates

A master template is a backup of data, representing a computing system according to an ideal state. The ideal state typically includes an operating system, a collection of applications or software. The data included in the master template may have been specifically chosen for a particular user and for a particular hardware configuration.

A master template may be created or updated according to a variety of approaches. One approaches involving a data storage device may include: 1. Creating several backups of data on a data storage device over time; 2. An activity associated with the backup process, such as a repair process is triggered; 3. A backup of user data files is performed (e.g., to save the users current work); 4. Existing data storage device (e.g., memory) may be reformatted or tested, and may be performed according to preferences for that data storage device; 5. The master template is copied to the user data storage device; 6. Backup of user data files is restored to the user data storage device.

The computing system is thereby restored to a normal operating state with minimal user intervention.

The master template may also be updated, changed, or modified in a variety of ways including: by the user, by access to an update (e.g., an incremental release by a computer manufacture), or by access to a replacement master template, etc. The preferences associated with a master template may provide a method for performing these modification.

The master template may be tested to ensure the master template and the repair process functions as expected in the backup process, such as restoring the computing system This testing helps ensure the functionality of the master template, the restore process, and may also be used as a virus check and repair. An on-line service may be provided to detect virus, verify the integrity, or to update a master template.

Restoring

A backup may be tested to verify its integrity (e.g., with a checksum and verifying readability). If the backup is tested and fails, the user may change the preferences. The user may restart the repair process, select different preferences (e.g., applications or software), upgrade the backup (e.g., master template), and retest the backup. If the backup passes the verification tests, the user may accept the backup and continue with the restore. When a backup (e.g., master template) is accepted it can be copied from its storage location to a second backup (e.g., the new master template). The old master template(s) can be saved so that it is possible to revert back to prior master templates. After the user template is "accepted", the backup user data is returned to the user data storage device.

In one embodiment, a master template can be created by the user selecting to "boot into" a master template. The user may then make changes, install new software, make modifications, etc., and then exit. This approach allows the master template to be updated independently of user's documents and other data which may not be a beneficial to a master template.

In a different embodiment, the master template may be modified/updated by the user first conducting a repair of computing system. The repair process may automate 1. The backup of user files according to preferences, potentially including particular file types (e.g., documents); 2. the reformat of the user's primary disk drive or the restoring of the master template to the user's primary disk drive. The user may then install new software to an essential copy of the master template as present on the user's primary disk drive. A backup may-subsequently be activated to generate a new master template version. A backup of the user's data (e.g., user specific documents) may then be restored to the computing system. Preferably, restoring the user specific documents is performed automatically.

The master template may be created by a process of selective copying. For example, depending on the particular OS in use, a program may interrogate the registry, determine what entries are associated with a particular program or application, and then choose to selectively copy only those files and entries associated with the particular program or application to the master template.

Additional embodiments and aspects of the invention are now described.

An Exemplary Computer with Special-Purpose Subsystems Switching Mechanisms

A variety of events may trigger a repair system to perform a repair process on a primary system(s) to be repaired. An event, such as switch triggers, may include single step and multiple steps. Each step may include a logical or physical action initiated by the repair system itself, user, external system, or the primary system to be repaired. A step may include a logical or physical confirmation of the repair process. Individual steps may be automated by the repair system, switching process, or a primary system. An example of multiple steps that trigger the repair system may include 1) pressing a button, and then 2) sliding a switch for confirmation of the repair process. Other steps will be apparent to one skilled in the art and are therefore not described herein.

The repair may include any process that attempts to place a primary system into an idealized state or restored state. The repair system may include various apparatuses and methods previously described, including the switch process. As an example, the repair system may be triggered by voice recognition or voice identification associated with an individual step or multiple steps of a triggering event. In one embodiment, pressing a physical button triggers the repair process.

In another embodiment, the repair system may include a processor and logic that is independent from the primary system. Events may trigger the repair system independently of the primary system. The repair system may be triggered by a variety of events independently of the primary system to be repaired. Here, the repair system would be capable of receiving or recognizing the triggering event.

For example, the primary system may be nonoperational while the repair system remains operational with the capability of recognizing events that trigger a repair process, such as a user request to repair the primary system. The repair system may perform the repair process or may trigger another system or application to perform the part or all of the repair process. Other applications may include such programs as: Virus Scan, Virex, Arcserve, Assimilator, Deep Freeze, Ever Dream, Filewave, Ghost, Goback, HddSheriff, PCRdist, Retrospect, RevRdist, Rewind, Hard disk toolkit, Anubus, Drivesetup, and Charis Mac.

A repair system may include a physical switch used as a step of a triggering event for a repair process supported by other applications. Alternatively, the triggering event may activate a repair process that is performed by other applications. For example, steps associated with a button, voice command, personal identification card, retinal scan, or push button with a confirmation by a slide button, key switch, or diagnostic process, could be used to activate a repair process by other applications.

In another embodiment, when a primary system, such as a computer, is started an application associated with the repair system may be triggered to perform diagnostics on the computer. The application may be used to determine if the second computer attempts to start, such that, if the second computer does not attempt to start then the repair system may modify the boot sequence of second computer to boot to a different device. The application may also initiate the rebooting of the primary system. If the second computer does start, the repair system may analyze or record the boot sequence. If boot sequence fails, the repair system may automatically reboot the primary system using a different data storage device to boot and may also initiate the repair of the primary system. The repair system may also manage an "on the fly" repair process, as defined previously.

In one embodiment the push of a button (or other trigger event) triggers the repair system to perform a diagnostic process and based on diagnostic results the repair system may perform the appropriate repairs. Physically pressing the button may be the only step of the triggering event. As part of the repair process, the repair system may perform a diagnostic process. The repair process may include interacting with a user to determine the repair process. For example the user may be prompted to respond to several questions, such as, "Your computer will soon need a repair that could take 60 minutes to perform, alternatively a temporary repair may take 5 minutes to perform. Which repair should be performed?" The user response may be taken into consideration by the repair process.

A Computer with Multiple Special-purpose Subsystems

This section provides apparatuses and methods of protecting computers and computing devices from hacking, viruses, cyber-terrorism, and from potential damage or intrusion such as spy software, keystroke recorders and damage from hacking, viruses, worms, Trojan horses, and similar threats and vulnerabilities. Cyber-terrorism is an attempt to cripple or subvert a computing system. The present invention provides a solution to potential cyber-terrorism.

A computer system of the prior art typically includes: a processor, memory, display, a display controller, and input/output controller. The present invention provides a plurality of special-purpose subsystems housed within a computer system. These special-purpose subsystems typically perform limited functions and have limited interaction with other special-purpose subsystems.

Special-purpose subsystems may be designed for many purposes, including to support storing information, performing work, and handing communication. A storage special-purpose subsystem may be designed to store data and retrieve data, while allowing limited assess to the stored data. A working special-purpose subsystem may be designed to process information, such as a general purpose computer with various applications. A communication special-purpose subsystem may be designed to facilitate communication between other special-purpose subsystems.

Each special-purpose subsystem typically includes: processing capability, memory, logic, and an interface. Processing capability may be a computer processing unit (CPU) or ASIC. The processing capability may be the computer-system CPU, or a CPU shared by multiple special-purpose subsystems. Thus, the processing capability associated with a special-purpose subsystem may also be used by the computer system or other special-purpose subsystems.

Memory may include any data storage device accessible to the special-purpose subsystem. Further, a specific memory area may be divided into logically separate areas, each of which can be associated with different special-purpose subsystem. A controller associated with the specific memory area may be configured to restrict access of a given logical memory area to a specific special-purpose subsystem. Each specific memory area may thereby be effectively isolated for use by a special-purpose subsystem.

The logic of a special-purpose subsystem supports the intended function of the system, such as storage, work, or control. The logic may include the ability to move a file, display a file, provide a directory of information available from special-purpose subsystem and other functions as necessary. Further, the logic may include or be incorporated in an operating system associated with the special-purpose subsystem. The logic may be read only or inaccessible from other special-purpose subsystems to avoid potential attacks. For example, the logic may analyze and record when files are read or written, access attempts, and associated timing. This information may be used by the logic to determine if protective measures are necessary, such as prompting the user for a confirmation of an action or denying access to the special-purpose subsystem.

The interface of a special-purpose subsystem supports the intended function. An interface of a storage system may include logic to read and write files. An interface of a working system may include a copy of a master template and applications to process and modify information, including storing temporary files. A controller system may provide an interface for receiving requests from a working system, requesting a file from a storage system, receiving the file from the storage system, and sending the requested file to the working system.

A interface may also support interaction with common controllers of the computer system, such as for a display, keyboard, or mouse. Alternatively, the special-purpose subsystem may include a separate controller for accessing common peripheral devices. Each of the interfaces associated with a special-purpose subsystem may be enabled or disabled according to a logical or physical switch, such that interaction with the special-purpose subsystem is halted or restricted to a subset of functionality associated with the interface.

According to one embodiment, two special-purpose subsystems are provided within a computer system, the first being a working system and the second being a storage system. The computer system may include a display, a display controller, and an I/O controller. Both of the special-purpose subsystems are capable of interacting with the computer system display controller and the computer system I/O controller. A separate area of the computer-system display may be associated with each of special-purpose subsystems. If a display area is selected or otherwise active, then keyboard, mouse or other I/O-controller-mediated input would be accessible to the associated special-purpose subsystem.

Another embodiment, includes a working system and a storage system that does not allow execution of data stored (with the exception of the storage-system logic). The storage system prohibits the execution of user data, such as any information stored by a user in the memory of the storage system. The two systems are isolated from one another, and therefore events taking place in the working system cannot directly affect information stored in the storage system. Communication of data between the two systems may be through a communication controller that performs a copying process associated with moving data, such as a file, between the storage system and the working system.

Communications between special-purpose subsystems, such as the working system and the storage system may be through a communication controller, according to one embodiment. The storage system may communicate specific information to the communication controller to transfer the specific information to the working system. The communication controller may also transfer specific information from the working system to the storage system.

A user selection of a file in the storage system can be used to prompt a communication controller to copy the file from the storage system to the working system. The file can be executed or processed in the working system. Then, the file may be saved causing the communication controller to copy the file from the working system to the storage system. In the storage system the file is not executable and thus could not corrupt other files or data associated with the storage system even though the file itself may be infected with a virus or corrupted. The working system does not typically allow user data, e.g., document files, to be stored in the working system unless they are currently being used, e.g., temporary files.

Alternatively, the communication controller may interact with the common controller to display information available from the storage system. User selection of the specific information may be performed through interaction with the communication controller. For example, the communication controller may request a list of available files from a storage system, and arrange them for a display of the list through a common display driver. A user could select a file from the list for processing in a given working system. Consequently the communication controller may cause the file accessible to the storage system to be copied to the given working system. After the working system is finished processing the file, the file could be saved through the working system's interaction with the communication controller. As such the storage system and the working system are not required to directly interact with one another.

Additionally, the communication controller may perform an analysis on data accessible or transferred by the communication controller to determine the level of threat associated with storing or transferring the data, may refuse to handle the data based in part on the level of threat, may present the user with information which indicates a threat and a request to confirm the transfer or storage. Information presented to users may include the number of requests in a given time frame, extent of modifications, or origination location. The user response may be received by the communication controller and used to determine whether to allow the transfer or storage.

The working system may include a copy of a master template that represents an idealized state of an operating system. The working system may be an existing computer system capable of running an operating system, and additional logic for interaction with a special-purpose storage system. Typically the working system is incapable of interacting directly with the storage system. According to one embodiment, an interaction may be initiated by the storage system, or the controller system.

The working system is a special-purpose subsystem, and may be used to perform processing, editing or modifying data. The working system typically includes logic to display information to a user through the display controller to the computer display. Users can interact with the working system as though it were the primary computer system. The display controller and I/O controller may be used by the working system to interact with other devices associated with the computer system.

The storage system is a special-purpose subsystem, and typically includes data files that are stored in a data storage device. The data storage device may be volatile or non-volatile. The storage system may represent an existing computer system capable of running an operation system, and additional logic for interacting with a working system.

According to one embodiment, the storage system initiates an interaction with the special-purpose working system. Alternatively, the storage system interacts with other special-purpose subsystems through a communication controller. The storage system may include logic to display information to a user through the display controller coupled to the computer display.

Each special-purpose subsystem may present information to a user by utilizing the same computer display. Thus, information presented on the computer display may overlay other information being displayed by another special-purpose subsystem. The user may select specific information, e.g., a document file, to work on. The user selection of the specific information may be communicated to the storage system through a common device associated with the computer system, such as a serial I/O controller connected to a mouse or keyboard. The serial I/O controller may be utilized when storage information is presented to the user. After specific information is requested, the storage system may transfer the specific information to another special-purpose subsystem such as a working system. The storage system may initiate the transfer of the specific information. In one embodiment the storage system initiates the transfer to a working systems interface. Alternatively, the storage system initiates the transfer to a common memory area for access by a working system. Another embodiment provides the storage system transfers the specific information according to a communication controller to the working system.

The working system may then access the specific information provided by the storage system. After processing, modifying or viewing the specific information, an altered version may be saved or returned to the storage system. Before saving the specific information, the working system may perform an analysis to determine the level of threat associated with storing the information, and may refuse to save the information or may present the user with a confirmation request and information which indicates a threat. The working system may save the specific information to the storage system, the working system may transfer the specific information to another special-purpose subsystem such as a storage system. The working system may initiate the transfer of the specific information. In one embodiment the working system initiates the transfer to a storage systems interface. Alternatively, the working system initiates the transfer to a common memory area for access by a storage system. In another embodiment, the working system transfers the specific information through a communication controller to the storage system.

In one embodiment, the storage system may perform an analysis to determine the level of threat presented by storing the information, and may refuse to store the information or present the user with a confirmation request and additional information which indicates a threat.

Data may be moved between special-purpose subsystems using a separate logic control device, such as an ASIC or logic control device utilizing direct memory access. The process of moving data does not allow the data to be executed, which could possibly enable hacking, viruses, and the like. Additionally, data may be encrypted, compressed, or encoded to prevent its execution.

A control system may be an additional type of special-purpose subsystem, and could provide overall operation of the computer, computing devices, and other special-purpose subsystems. Additionally the control system may orchestrate the process of copying data, switching network communication, and repair functions as needed. The control system may be read-only, permit read only access as needed when interacting with other special-purpose subsystems such as a storage system or working system. Both the network communication and repair process may be controlled by the control system. Optionally the control system could have limited communication with other special-purpose subsystems while maintaining an ability to initiate or conduct a copy process, activate and terminate communication to other special-purpose subsystems.

Special-purpose subsystems may be combined into a single special-purpose system that performs functions associated with the individual special-purpose subsystems, such that the single special-purpose subsystem functions performs the functions as separate threads. In one embodiment, a storage system, communication system, and working system may be combined into a computer system as individual processes executed by the computer system. The computer system may utilize any method of isolating the individual processes using techniques known in the art.

In contrast, a special-purpose subsystem or a set of special-purpose subsystems may be spread out over a number of additional special-purpose subsystems, such that some of the functionality associated with the system or set is performed by the additional special-purpose subsystems.

Exemplary Repair Process

Optionally, a special-purpose subsystem may be repaired or returned to an ideal state using an automated repair process. Such repairs may be conducted "on the fly", or after each transaction or without rebooting. Master templates typically represent an ideal state of a special-purpose subsystem, and may be stored on a storage system. A transaction may include reading e-mail, wherein the opening of each individual e-mail messages represents a separate transaction. Optionally, one or more items can be ignored during a repair process. For example if an e-mail has been opened, a repair process may run ignoring the open e-mail, detect and repairs problems, and then a user may respond to the e-mail without quitting it. In another embodiment, all downloads and e-mail can be saved immediately to the storage system prior to opening the download or e-mail in the work subsystem.

In one embodiment, the logic of a special-purpose subsystem, such as a working system, may trigger an event associated with a repair process. The repair process may perform a comparison between a master template of the working system and state of the current working system. Any differences between them could trigger a subsequent repair process in which some or all data that is different is deleted from the working system. Further, data may be copied from the master template by the repair process as necessary. In one embodiment, the repair process may make the working system identical to the master template.

In one embodiment, a repair process can be conducted after one or more e-commerce transactions, or after surfing one or more web pages, and the like. Thus all known and unknown viruses and Trojan horses can be made impotent prior to the next transaction. While this process does not eliminate viruses, worms and Trojan horses from the computer. (they may be stored in the storage system), it keeps them in an in operative state. The repair process could repair volatile and non-volatile memory, or clear volatile memory, or set volatile memory to an ideal state.

In one embodiment, if the user selects more than one e-mail to open, two or more e-mails could be copied to the working system and could be open simultaneously. Optionally each e-mail could be copied to its own separate isolated working system, opened, viewed, and worked on separately. If the user needs to copy data from one isolated e-mail to another isolated e-mail, a copying process can be used that does not allow code to execute.

In one embodiment, web commerce software, or e-mail software, or any software can be modified so that individual records, or only copies of the records that are specifically needed for a transaction are copied to the storage system, utilized and then copied back to the database in the storage system, and after each such transaction a repair can be conducted. Optionally, in a transaction in which data interacts with more than one database or CGI for example, the transaction can be broken up into discrete segments, data copied to and from the isolated storage system(s) or working systems as needed, and repairs can be run between each segment of a transaction, or between some segments of a transaction. Optionally, software can contain instructions that define what type of data can comprise a transaction, limiting the copy process to only copying data that meets certain criteria.

Cyber-Terrorism Examples and Embodiments

Cyber-terrorism represents a number of threats. One such threat occurs when e-mails are downloaded of which one e-mail contains a virus that when executed has the ability to infect other e-mail, infect the e-mail program so that it sends a copy of the virus with each new e-mail sent, and the virus places a hidden item in the operating system or applications that when executed after a period of two days, destroys the format or data structure or device drivers contained on any accessible data storage device, Such a virus may have been unknown and no protection or method of identification is available from virus-detection companies.

The protection process is described for processing e-mail, according to one embodiment. Upon download to the working system the unopened e-mails are then copied to the storage system (or alternatively they could be directly downloaded to the storage system) using a method in which the data cannot execute. A list of the e-mail subjects and who sent the e-mail and other pertinent information can be created and displayed to the user. For example this list could be generated by the storage system or the control system. User selects an e-mail to open. A copy of that e-mail is copied to the working system and then may be automatically opened. Optionally, a virus scan of the e-mail may be conducted. User reads and responds to the e-mail, and the response may be copied to the storage system. A repair process may take place and repairs volatile or non-volatile data storage devices as needed.

Further, according to the example, a user selects next e-mail to open. This e-mail contains the virus. It is copied to the working system and is opened. No other e-mail is available for it to infect, but the e-mail infects the system folder used by that working system and several applications used in that working system. The user decides to respond to the e-mail and selects "respond". Optionally prior to responding, a repair process can be run or comparative process may be made between a master template and the working system. During the repair process or comparative process, the changes to the operating system associated with that working system or applications could be noted, and based on the difference(s) a virus warning could be drawn to the users attention, warning user not to respond to the e-mail as it may negatively affect the computer receiving the e-mail. Optionally a dialog can suggest that the user contact a virus alert center (e.g. such as a national or international virus alert center that collects or responds to potential virus alerts.) and notify the center of the virus, or to allow the repair process to notify a virus alert center concerning the potential virus.

Optionally, based on certain criteria such as a virus threat analysis based on the type of changes made to the operating system or applications, the repair process could initiate commands to disable the network connection or e-mail software, or disable the e-mail process, or give the user a dialog indicating that based on the results of the virus threat analysis, the user may not be permitted to respond to the e-mail, and the ability to respond to that e-mail has been disabled. That e-mail could then be destroyed, or quarantined, or kept in isolation or kept in a storage system. Optionally such virus could be stored and deletion would not be permitted, pending approval from some entity, such as a virus alert center that could authorize destruction of the virus by providing (for example) a code that would allow destruction of the virus. Optionally upon receiving such code the repair process could automatically destroy the virus laden e-mail. Optionally, the file could be encrypted or compressed, or modified in such a way that it could not execute and the repair process could send it to the virus alert center (with or without permission from the user.)

Optionally, such modification to computers and computing devices may be required by law, and the part of the repair process that dealt with potential viruses may be modified as needed to interact with government/commercial virus checking companies. For example a method of allowing upgrade of the software that dealt with viruses, permission to delete files, etc. may be required. In such cases specialized code could be created to interact with government agencies that would allow or require upgrade of the repair or virus checking software, allow or deny destruction of infected files, etc.

The repair process may run and make the working system identical to the master template, destroying all viruses, worms, and other changes in the process. The user finishes with the e-mail and selects the next e-mail. A repair may be conducted and then the next e-mail may then be copied to the working system, without risk of infection.

Loading a Master Template into Volatile Memory

In one embodiment, to further speed the repair process a master template of the working system and the software in the working system, may each be loaded into their own separate isolated volatile memory areas or shells to increase the speed of the repair process. Thus, if data in the working system is in volatile memory and the master template is in volatile memory, repairs can be conducted at higher speeds. Alternatively a new working system shell can be utilized, eliminating the need for a repair. For example a user could open an e-mail, and read the e-mail using one shell, and if they want to respond to the e-mail a second shell could be used for the response. (Optionally the first shell can be checked for a virus while the user is writing a response to an e-mail using a second shell.) Additional shells can be made ready for use.

In another embodiment, data can be downloaded directly to a storage system, using a method of encrypting or compressing or other copying which prevents execution of the data. A virus checking or repair process can be run as part of the repair sequence, or as a separate sequence. Optionally, an isolated hidden backup or archive system may be utilized with this invention, which may make an array of hidden backups or archives of the storage system or working system volatile or non-volatile memory/memories or data as desired, and which may be time stamped. Copying of data to such backup or archive system could also use techniques described herein to prevent execution of files and damage to the data on the backup system.

Optional Information Regarding Copying or Saving Data

In one embodiment, the process of copying data may be dumb or restricted so that data being copied can't execute and thus the data on that data storage device can't be damaged by malicious code. For example, to move/copy data it can be encoded, or an ASIC can be utilized, or direct memory transfer or any other method of moving or copying data can be used that does not allow data to execute.

Optionally, copying could be orchestrated by a StoreExecute/control system that could have access to the isolated working system(s) and isolated storage system(s).

Selecting a file to open in the storage system could initiate a process whereby a file is copied from the storage system to the working system and opened. Saving a file in the working system could initiate a process whereby the file is copied to the storage system. Quitting a file in the working system could initiate a process whereby the file is copied to the storage system and deleted in the storage system.

The term "copy" or "copies" or "copying" may be used in its broadest sense, and may include an algorithm, snapshot, compressed data, bit by bit, encryption, encoding, and the like.

Optional Information Explanation of Data Storage Associated with the System

Optionally, the data storage associated with a user working system could be temporary data storage, used while a file or files are needed or actively being worked on or needed by the system or the user. For example, when files were not being worked on they could be moved to the storage system, (ie. copied to the storage system and deleted from the working system). Thus, except for a copy of the Master Template located in the working system, data not being used is not stored on the working system data storage device where it would be potentially subject to being infected, damaged, destroyed, hacked, or manipulated in some way.

Optional use with Internet, Network, or Web Sites

Optionally, the working system could support a web site, or a computer could contain more than one working system or more than one storage system that could support various functions. For example one working system could contain a web site, while another working system is used by a user.

Optionally, one or more NetLock devices (described in the Appendices) may be used and may automatically switched or enable/disable network connections as desired.

Optionally, one or more NetLock devices may be used to switch, enable, or disable connections to a working system as needed.

Optionally, use of web software could indicate to a controller that is associated with a Netlock Device and is process watching to enable a network connection to or from a working system, and quitting all network software (or lack of activity or other trigger) may indicate to a controller associated with the NetLock device to disable the network connection.

Optional Explanation of Automatic Backup or Archiving

Optionally, an automatic backup or archiving process may be associated with the storage system or the working system. Volatile or nonvolatile data may be saved, backed up or archived.

In one embodiment, external devices may be isolated and be used as storage systems. Alternatively, one or more external device(s) could also be isolated and used as one or more working systems. External ports can be connected to switches and switched, enabled, or disabled to connect to one or more isolated working systems, and then switched to connect to one or more isolated storage systems. Such switching may be done manually or automatically, or using a hardware switching process or a software switching process.

Optionally, in one embodiment, each time a save is made in a working system, a copy can be made to a storage system. Optionally, in order to prevent a virus or Trojan horse from causing havoc by performing millions of saves that get saved to the storage system, there could optionally be imposed a limit on frequency that a file could be saved, or other limitations could be placed on the process of saving data to the working system. (Optionally this could be part of the ROM or StoreExecute program.)

Optionally a quarantine data storage device can be used, or one or more common data storage device(s). Optionally, such data storage device can be accessed by the working system, or by the storage system, or by another logic control device that may also have access to the working system or storage system.

Optionally, a storage system may utilize one or more data storage devices. A working system can utilize one or more data storage devices. A working system and storage system can share a data storage device if they are isolated from each other. For example, a data storage device could be partitioned into two or more partitions, for example: Partition A and Partition B.

Optionally, working system "A" could consist of an isolated computing process associated with an isolated data storage partition located on partition "A". Storage system "B" could consist of an isolated computing process associated with an isolated data storage partition located on partition "B". Partitions can be isolated in a manner similar to how data storage devices can be isolated. Control over the partitions could optionally rely up an isolated computing process "C".

Optionally, applications and programs stored in the isolated working system can be repaired on command or automatically as needed. Optionally, a comparison process between a master template and the application/software in use could be used as a basis for how the application/software should look, and if different, components could be replaced as needed.

Optionally, a separate processor that has restricted functionality may be used to process data in the isolated working system, or the main processor can be given a restricted functionality. This can be done with multiple data storage devices, or one data storage device that has isolated partitions.

Optionally, the ability to execute files (located on a nonvolatile data storage device associated with a working system) may be enabled/disabled as needed. For example, logic control software may not contain code needed to execute files located on a nonvolatile data storage device associated with a storage system, or code needed to execute files can be disabled/enabled or switched on/off as needed.

Optionally, the logic control software associated with the storage system may be set to read only, or inaccessible from the working system or storage system (so that malicious code can not effect the software nor the processor nor gain access to the storage system). Optionally, a third isolated logic control and computing processes may be used to access that code. A logic control and computing processes may be performed via separate logic control and processing devices, or be on a single device that has the ability to isolate two or more logic control processes.

Optionally, data that is copied from the volatile or nonvolatile data storage device(s) associated with the working system to the storage system can be deleted from the working system and associated data storage devices as needed. This may help to prevent hacking, etc.

Optionally, working system(s) or their associated Data Storage Devices, and storage system(s) or their associated Data Storage Devices, need not be on a computing device together. They can be on a network, external, have wireless connections, or be anywhere. For example, a computing device may have a working system, in which an associated nonvolatile data storage device is in a nearby server; and a storage system may be located over a network, and associated with an external wireless data storage device.

Optionally, a working system may not have an associated non-volatile data storage device. A working system could be limited to volatile storage. Additionally, a working system may have a plurality of processing functions or processors associated with it.

In one embodiment a switching process that may be controlled by the control system that may be used to switch which system(s) have access to network communication. Network communication can be dedicated to a particular working system/or storage system, or switched as needed.

Optional Shells

Optionally, using a variation of the Shell approach, isolated shells may operate as working systems optionally with associated data storage, and other isolated shells can operate as storage systems optionally with associated data storage. Data may be copied to and from to the working system and storage system shells associated volatile or nonvolatile memory using a copy process that prevents the execution of data.

Optional Changes to Software

Optionally, in order to enhance the effectiveness of the isolated working system & storage system embodiments described above, the following changes may be made to software. Data used by the software may be kept in a storage system until needed. Data can be broken up and only data pulled from the working system that is needed. For example, instead of treating an e-mail in box as one file, e-mail programs can be modified to treat them as separate files, and only copy specific file(s) into or out of the working system as needed, keeping all of the other data isolated. Alternatively, data could be stored in the working system as one or more files, but when for example a specific e-mail was needed, only that specific e-mail part of a file could be copied to the working system, and data could be saved from the working system into that one file in the storage system.

E-mail was used here as an example. Optionally, software, and especially software used for the web, may use the approach of storing records as individual files, or keeping them in one or more files and only bringing the data into the working system that is needed at that time or is likely to be needed.

Optionally, when a Netlock device enables internet connection e-mail and other software used on the web that is currently in the working system may be limited to only data that needs to be sent or used, limiting a hackers ability to access any other data. During web commerce sessions, data can be frequently moved to and from the storage system as needed to ensure that the least possible, preferably only that data required and in use or needed for use is in the working system.

Optionally, an index or database containing content of some data or files contained in the storage system may be moved to or located in the working system. When such data is selected to use or open, it could then be copied into the working system as needed and copied back to the storage system when not needed, and deleted from the working system.

Optionally, switching data storage device identity may be done using software that interacts with the data storage device or data storage device controller. Such software could be isolated from the working system and storage system. For example it could be part of an isolated StoreExecute that conducts the repair process, or it could be on it's own isolated StoreExecute. This may necessitate a change in some data storage device controllers to enable them to accept software commands to change identity/boot sequence.

Optionally, a data storage device may be hot swappable, and turned on only as necessary during the isolated backup event.

Optional Netlock

Optionally, the netlock device may be controlled by any type of logic control device, triggered automatically or manually, by a hardware or software process. Switch trigger may include or utilize a timer/scheduler. It may also include any method of triggering a switching process. For example, a coin operated mechanism or pin card operated mechanism could be used that triggers netlock. A dual or multi-line version of netlock that can deal with more than one network connection (two or more network connections), in which case the netlock device may optionally be modular in nature to add additional network connections as needed.

Optionally, a dual or multi-line version of netlock that can deal with more than one network connection (two or more network connections), in which case the netlock device may optionally be modular in nature to add additional network connections as needed. If so desired the multi-line version could potentially controlled by one logic controller or switching process.

The inventions and methods described herein can be viewed as a whole, or as a number of separate inventions that can be used independently or mixed and matched as desired. All inventions, steps, processed, devices, and methods described herein can be mixed and matched as desired. All previously described features, functions, or inventions described herein or by reference may be mixed and matched as desired.

Optionally, a process hereinafter referred to as an Installer Watcher, may run in the background of a computer that can look for activity that appears to be an installer. If the user attempts to install software, the attempt at installation may be halted and a dialog could query the user as to whether the user is installing software. If so the Installer Watcher could walk the user through a process of installation or testing the software prior to updating a Master Template or during actual update of a Master Template.

Additional embodiments and aspects of the invention are now described.

Embodiments of Computers That Defend Against Viruses, Hacking, SPY Software, Cyber-Terrorism, Theft, and Make Malicious Code Irrelevant Embodiments of the invention defends computers and users' personal data (such as, but not limited to: documents, email messages, etc.) against hacking, and/or viruses, and/or cyber-terrorism, and/or theft; prevents known and unknown malicious code from causing meaningful damage, prevents hacking software from successfully engaging in hacking or spying while on a computer that utilizes this technology, and helps to enable capture of hackers and cyber-terrorists. Although the technology may aid in removal of malicious code from infected data files (A standard virus checker may be used for that purpose), its success does not rely on the removal of such code.

The computer isolates the user's personal data. Thus, if an infected file arrives, the user data is isolated from it, and is thus protected from being negatively affected by said malicious code. A process is conducted that not only repairs any damage to the computer system software and applications, but may also delete known and/or unknown viruses, hacking software, and/or reformat the hard drive, etc. User's personal data is isolated and inaccessible to hackers and hacking software. Unknown and known viruses and hacking software may optionally be saved and stored in a manner in which they are unable to execute, and may be used as evidence against a hacker or cyberterrorist. Embodiments are also described that enable use of the inventions to aid in the capture of hackers, thieves, and cyberterrorists.

It will be appreciated that existing methods of attempting protecting against viruses and hacking frequently fail. New viruses and methods of hacking are invented, and existing protection is repeatedly proven inadequate. This costs billions of dollars in damages annually. An inexpensive and reliable solution was needed. This invention solves these problems. Additional embodiments directed to these and other features and advantages are now described.

Overview of One Embodiment

User data may be stored using one or more data storage device(s) which may be associated with other computing hardware and/or software, such as, but not limited to: RAM, and/or ROM, and/or Method of Control, and/or processing, and/or processor, and/or other computing features and abilities collectively referred to as Protected Storage. This data storage device and optionally associated computing hardware and/or software may be isolated. Optionally, communication with Protected Storage may be activated/deactivated, and/or locked/unlocked, and/or read only/read write. Isolated video and/or I/O and/or Method of Control, and/or other features may be associated with Protected Storage(s).

On one or more additional/secondary isolated data storage device(s) which may be associated with other computing hardware and/or software, such as, but not limited to: RAM, and/or ROM, and/or Method of Control, and/or processing, and/or processor, and/or other computing features and abilities collectively referred to as the Explosion Room . . . an isolated environment where for example a user may "work on" data, play games, etc., and where viruses can "explode" or execute without causing damage to the data in the Protected Storage. Optionally, a copy of all or part of one or more Master Templates may be contained in the Explosion Room. There may be one or more Explosion Rooms. Isolated video and/or I/O and/or Method of Control, and/or other features may be associated with Explosion Room(s).

When the user finishes working on a document the document may be saved to a Protected Storage, optionally using a method of copying in which code cannot execute.

A repair process may be conducted which may consist of, for example, one or more of the following:
making software in the Explosion Room identical and/or partially identical to all or part of a Master Template.
deleting and/or repairing the Explosion Room, and/or switching to a secondary Explosion Room.
reformatting and/or repairing one or more data storage devices
running one and/or more other repair processes.

A repair process may be run, for example, each time a user "quits" a document (and/or other criteria may be used for when it may run). Thus each new document may be opened in a clean environment which contains no viruses and/or hacker software or other malicious code.

In one embodiment, video associated with the Explosion Room(s) and/or Protected Storage, and/or Master Templates, and/or other computing processes may be isolated, so that video data associated with one or more other Explosion Rooms and/or Protected Storage may not be captured. Likewise, video associated with other data storage devices and/or associated RAM and/or processing may be isolated. For example, video associated with a Protected Storage may be isolated. In another embodiment, video need not be isolated. Instead, communication with the device(s) would not be established until after a repair has been run so that viruses could not be spread, and hacking could not take place.

In a different embodiment, the Explosion Room where the user works/plays games, etc. may not contain a Master Template, and/or may not contain an operating system. Instead, a copy of a Master Template and/or operating system may utilize a different Explosion Room that may optionally be isolated and/or optionally may be located across a network, and/or may optionally be switched to different modes such as for example locked/unlocked and/or read only/read write.

In another embodiment, an Explosion Room may only contain a copy of part of a Master Template. For example it may contain those parts of an operating system that get modified, but not other parts of an operating system. For example, in one embodiment, the only part of an operating system included in the Explosion Room being used by the user might be the "preferences folder". The rest of the operating system may be located in a different data storage device and or Explosion Room, and may be usually be locked or read only. Likewise, optionally, the only part of applications located in an Explosion Room may be the parts of an application that may change during use. The rest of the application may be located on a different data storage device, (and/or over a network) and optionally may be usually locked and/or read only. Thus, less data would need to be copied to Explosion Rooms. Some modification of operating systems and/or ROM, and/or applications may be desirable to support this embodiment. For example, instead of looking for the preferences folder to be located in the operating system, code could be modified to look for the preferences folder inside of an Explosion Room.

Likewise, applications and other software may be modified to look for one or more data files that is/are part of the software and that may be modified during use of the application, may look for those files to be located in an Explosion Room. Optionally, because software may utilize and interact with parts of the operating system, the software manufacturers and operating system manufacturers, and/or computer manufacturers may all need to coordinate their design specifications to enable this functionality.

One or all of the following may be located as part of a computing device, and/or on a network:
Explosion Room(s), Master Template(s), Protected Storage(s), Backup(s), Archives(s), processing, RAM, ROM, computing, network connection, control, I/O, video, any other component and/or function described herein and/or desired and/or needed for use.

Optionally, network connections may be deactivated and/or activated at various times during use of the computer.

Various criteria may be used for deciding when to activate/deactivate communication between a network and an Explosion Room. For example, in one embodiment, a network connection may be established with an Explosion Room when there is no communication between that Explosion Room and other Explosion Rooms, and the explosion room has been repaired and/or replaced by a new Explosion Room. Another example of criteria, a network connection may be established with an Explosion Room when there is no communication between that Explosion Room and Protected Storage. These are examples of criteria and are not intended to limit criteria.

Using such criteria, it is thus possible to make the user data in Protected Storage inaccessible to a hacker across a network.

In one embodiment, one or more Master Template(s) is used, and for example, one or more of the following could be used as Master Templates:

Protected Master Template (Optional):

In one embodiment, A Master Template may be stored on a Data Storage Device that optionally may be hidden, and/or may not be normally visible to the user and may be referred to as a Protected Master Template, and/or Master Template. Optionally, it may be "read-only", and/or locked, and/or turned off, and/or disabled until needed, and/or disconnected, and/or inactivated, and/or communication with it can be terminated and/or inactivated. These (and other) techniques can be used to protect the Protected Master Template from malicious code.

Example of Master Template Storage Location (Optional):

In one embodiment, a master template, or copy of a Master Template, may be kept on a data storage device such as, for example, RAM, and/or a RAM disk, and/or ROM (for example flash ROM or other ROM) that may optionally be hidden and/or made not normally visible to the user. It may be "read-only" and/or locked (for example it could be locked via hardware and/or software), and/or isolated and/or otherwise made impervious to malicious code. Optionally, the Master Template can be repaired and/or replaced as needed by copying and or replacing it from the Protected Master Template. Please note that this is an optional step that is not essential to this process, but in some embodiments may be desirable.

Self Repairing User Work Area, or Explosion Room:

In another embodiment, another copy of all or part of one or more Master Templates may also be stored on a data storage device (for example, one embodiment could utilize a data storage device associated with volatile memory, RAM and/or a RAM disk, associated I/O, associated video, that optionally may all be isolated). This copy of all or part of one or more Master Templates may be referred to as the Master Template(s) and the data storage device where it is stored and associated RAM, ROM, Processing, I/O, video, computing, etc. may be referred to as the "Explosion Room."

The Explosion Room may contain all or part of one or more copies of a Master Template(s) and may also be used for example for data storage and and/or scratch disk space for one (or more user data file(s) needed for the user to perform such tasks as: playing a game, checking E-mail, surfing the Internet, working on documents, etc. Software such as viruses, Trojan Horses, worms, hacks, spy software, and "conduit hackers" that arrive here can do no permanent damage, and the Data Storage Device that contains the user's personal data is inaccessible. In one embodiment, a high speed repair process may be run that eliminates known and unknown viruses and hidden software from the Explosion Room. For example, this repair process could be run each time the user quits a document, and/or on some other schedule or basis. Because this may be an isolated work area, and may be repaired after each use (for example), this Explosion Room is a place where a virus can "explode" or execute without causing damage, and where hacking software is useless.

Protected Storage

In one embodiment, a Data Storage Device is used to store the user's personal data (documents made by the user, E-mail, bookmarks, favorites, etc.) This Data Storage Device may be referred to as "Protected Storage". Network communication and/or communication with Protected Storage, may be disabled, and/or disconnected and/or switched off (logically and/or physically) when potential viruses or hacks may be processed and/or present; and may be enabled, and/or connected, and/or switched on (logically and/or physically) after criteria has been met, for example after a repair has been conducted. Thus, there is no way a virus or hacking software can affect or gain access to the user's personal data on the Protected Storage. In one embodiment the Protected Storage may normally be "read only", except, for example, when data needs to be copied to or from it. In one embodiment, when network connection is to be established, a repair may be conducted (which would remove/disable/overwrite any active viruses or hacking software), and/or communication with the Protected Storage may be disabled, and/or disconnected and/or switched on/off (logically and/or physically).

Temporary Storage

In one embodiment, Data Storage Device(s) and/or partition(s) may be used to temporarily store the user's personal data (documents made by the user, E-mail, bookmarks, favorites, database components, etc). This Data Storage Area may be referred to as Temporary Storage. For example, when the user saves a document, it may be saved to the Temporary Storage. When the user saves a database, for example, it (and perhaps related components) may be saved to the Temporary Storage. When a user downloads E-mail, it may be saved to Temporary Storage. When items are created such as bookmarks and favorites, they may be saved to temporary storage when they are created, and/or when the application is quit. When a document is requested from Protected Storage (described elsewhere herein), it may be first copied to Temporary Storage. For example, if the user wants to open an Internet browser, then favorites/bookmarks, and other user information may be copied from Protected Storage to Temporary Storage. Please note that this is an optional step that is not essential to this process, but in some embodiments may be desirable.

A repair process may repair Temporary Storage, or replace it with a new copy that has been prepared in advance. For example, in one embodiment, multiple temporary storage areas may be prepared in isolation. Then, as they are needed, the old Temporary Storage Device(s) may be deleted and replaced with one or more new ones, that may for example have been created using RAM, a RAM disk, a shell, etc.

In one embodiment, for example, the Protected Storage may be the storage area where the user's personal data is isolated from the Explosion Room except after a repair, or if the explosion process has been suspended. Temporary Storage may be the data storage area that may be used (optionally) when data is "shuttled" from Protected Storage to Temporary Storage, and back again after the document has been worked on, from Temporary Storage to Protected Storage. Temporary Storage may, in one embodiment, always be accessible to the Explosion Room. In this example, the user may save data to the Temporary Storage while working, and then upon quitting, the document is copied from Temporary Storage to Protected Storage.

Backup and/or Archive Storage:

Optionally, in one embodiment, backup system(s) may be used to keep successive backups of all user's personal date: e.g., documents, E-mail, favorites, etc. Optionally, if a file is damaged by a virus or corruption, the user can copy past versions from the backup system. Successive backups and/or archives may be time/date stamped so that the user can easily determine when backups were made. The frequency of backups may be predetermined as a default from the manufacturer, but may be changeable by the user. Optionally, the backup system(s) may normally be hidden from the user. In one embodiment, when the backup system is made available to the user, it is kept in "read only" mode so that it can not be accidentally modified by the user. Optionally the backup may be on a separate data storage device (and in some embodiments, a partition,) and/or located elsewhere such as, for example, on a network. Please note that this is an optional step that is not essential to this process, but in some embodiments may be desirable.

Control of the Processes:

A wide spectrum of methods of control are possible, and may be referred to as Method of Control and/or Methods of Control. A few examples follow:

For example, in one embodiment, code stored in a separate ROM device and/or an ASIC and/or a controller and/or a subsystem, and/or an operating system, can control the process of saving data, and/or activating/deactivating connections and/or activating/deactivating communications, and/or conduct switching processes as needed, and/or triggering repair processes, and/or perform other functions as described herein.

In one embodiment, when a document is closed, a "process watcher" can be used to determine whether a repair shall be triggered, and/or whether there is a functioning operating system. If there is not a properly functioning operating system, and/or the repair does not take place, the Method of Control may switch to a secondary system that may be held ready in isolation, and/or created as needed. Optionally, it may re-boot the computer to a secondary system, conduct a repair process, and reboot the computer. Optionally, no reboot may be required. In one embodiment, a secondary and optionally isolated system may be used by the repair process and/or anti-virus/anti-hacking process and other software used to repair and/or maintain the first or primary system. Optionally, a secondary system can be used to "run" the computer while the first system is being repaired and/or anti-virus, anti-hacking, and/or diagnostic, and/or other process is conducted.

In another embodiment, a primary operating system may run the computer, and Explosion Rooms, and/or Protected Storage, and/or other functions may operate as subsystems and/or virtual systems and/or subsystems.

In another embodiment control can be provided by code in volatile memory, and/or shells, that may be kept in isolation until needed, and/or may be read only. While volatile memory "A" may be used for control, volatile memory "B" may be isolated. Optionally, the Method of Control may be repaired by use of copying from one or more Master Templates all or part of the code used by the Method of Control and/or the Method of Control can be replaced as needed with one or more copies that may be isolated and readied for use.

In one embodiment, communication with isolated volatile memory can be switched on/off to provide isolation as needed/when needed. Optionally, multiple volatile memories may be available for use and may be isolated. During a repair communication with a volatile memory can be switched to a new volatile memory area.

In one embodiment, in order to prevent viruses or hackers from tampering with commands to activate/deactivate communication with the Internet, Intranet, or the Protected Storage, those commands may be controlled by ROM and/or an independent controller, and/or other Method of Control and may be isolated as needed. Alternatively the Method of Control may conduct such commands following a repair. In one embodiment, in order to prevent malicious code from, for example, sending a copy command a billion times instead of just once, the ROM and/or Method of Control instructions for copying may limit the number of viable requests to copy. Optionally, unreasonable requests such as requesting a copy command a billion times may trigger code that clears the process and/or clears RAM and/or runs a repair process. Limits can be placed on the number of times an event can be requested, and other such malicious behavior.

In one embodiment a trigger may be used to initiate one or more of the events described herein. For example, one or more button(s) could be located at a place convenient for the user, and could be used to physically trigger the repair process; and/or switch data storage devices (for example to initiate communication with the Protected Storage and/or Master Template; and/or High Speed Master Template, and/or Protected Master Template, etc. Optionally any other sort of trigger may be utilized such as voice commands, touch, any means of identifying a user, and/or any other known means of triggering an event and/or initiating a hardware and/or software switching process.

In another embodiment, a system of public and private "keys' may be utilized to determine the validity of instructions that should (or should not) be executed by the Control Method. This validation system could be hardware and/or software based.

An Embodiment of the Repair Process:

Overview of the Repair Process:

The repair process and how the repair process eliminates unknown viruses

The repair process consists of a process that is used to repair the computer, and/or put the computer into a state in which it is operating properly.

For example, a repair process can eliminate anything in an Explosion Room that is not identical to a Master Template by a process of comparison with and/or copying from the a Master Template to the Explosion Room.

In another embodiment of the repair process, communication may be established with a new Explosion Room that may optionally utilize volatile memory, and/or shell(s), and/or ROM(s), and/or RAM disk(s), containing a copy of all and/or part of one or more master template(s). Optionally, the old Explosion Room may be deleted or repaired (i.e.: by copying from the Master Template to the shell.)

In one embodiment, here is an example how the repair/anti-virus/anti-hacker process works: Consider a user who works on a document that is infected by a virus. Assume that the virus infects some of the software, the operating system, various executables, E-mail software, and hides itself in "read me" files that are with most applications. In this embodiment, when the user quits a document, the "close" or "quit" command triggers code in the Method of Control that conducts and/or initiates a sequence of events.

(Note: This code may be in ROM, an ASIC, a control system, a subsystem, an operating system, and/or elsewhere, depending on the design of that particular embodiment of the computer. In one embodiment, the code may be inaccessible to a virus or hacking software to manipulate because it may be read only, locked, and/or otherwise made unavailable to the virus and/or hacking software.)

One possible sequence of events follows (but many other sequences of events are possible).

If the user chooses to save the document it is saved (where and how it is saved is explained elsewhere in this document) and then quit. The processor may be allowed to complete processing and/or may be "cleared" or reset, RAM may be cleared or reset, (optionally, a second isolated RAM that may optionally be unavailable and/or deactivated may be made available [for example communication with it can be established] and/or activated and utilized while the first RAM is cleared, but use of a second RAM is not required), and the processor and/or RAM may now be utilized in the repair process that follows, (and/or a different processor and/or RAM may be utilized.)

Repair of an Explosion Room

In one embodiment, all or part of one or more Master Templates is copied from its storage location to the Explosion Room. The copy process may be a partial copy, or complete copy. A comparative process may be utilized to copy and/or replace as needed data that is missing, changed, or modified. Data that is not identical to a Master Template may be removed. (Optionally the process may utilize copying, and/or comparison of data, and/or other methods described elsewhere herein such as in descriptions of how Master Templates can be used.)

In one embodiment, anything that is in the Explosion Room that is different from the Master Template may be destroyed (for example, overwritten). Any missing software or files may be replaced by copying missing items from the Master Template to the Explosion Room. Optionally, all files can be replaced by copying items from the Master Template to the Explosion Room. Files that are not identical to the Master Template may be deleted, and or copied, for example to a data storage device (that may be isolated), and may be encrypted, and/or compressed, and/or otherwise disabled. This repair process destroys any known and unknown viruses and hacks that may have been placed into the software and/or hidden on the Explosion Room In another embodiment, one or more of the Explosion Rooms, each containing a copy of all or part of one or more Master Template(s) may be created and/or exist, each copy of all or part of one or more Master Template(s) in an Explosion Room may be in, in this example, a volatile memory, and/or RAM DISK, and/or ROM (and/or other form of data storage), which may be created in isolation (optionally) and made ready for use as needed. For example several Explosion Rooms, each in it's own volatile memory and each containing a copy of a Master Template can created and waiting—ready to be used "as needed". The Explosion Room that had been used may be deleted, and/or can be repaired as needed and/or desired. A software and/or hardware process may activate communication with a new Explosion Room in volatile memory (and/or other form of data storage), so that it is available for use by the user. While the user is using the new copy of the Master Template in the new Explosion Room, either the old Master Template in the old Explosion Room may be repaired, or another Master Template may be readied for use in a new Explosion Room. Shells may be used for Explosion Rooms.

The process of replacing "used" Explosion Rooms with new Explosion Rooms may happen so quickly that the user may not notice it, or it may take noticeable time. If noticeable time is taken, the interface may indicate to the user to wait.

Upon completion of the repair and or replacement of the Explosion Rooms that had been in use, the user may open the next document or E-mail in an environment that is free of malicious code.

In one embodiment, prior to copying data from a Temporary Storage to a Protected Storage (or visa versa), RAM and/or the processor may be reset and/or cleared of potentially malicious code, and/or a repair can be performed on the Explosion Room to delete (and/or overwrite) and/or replace any code that is different and/or missing when compared to a Master Template, and/or the Explosion Room may be replaced by another Explosion Room and then a switching and/or copying process may be conducted by the Method of Control to turn on (or enable/activate) communication with the Protected Storage, and may copy data from a Protected Storage to the Temporary Storage, and/or may copy data from a Temporary Storage to a Protected Storage, and then turn off (disable/deactivate) communication with the Protected Storage. In one embodiment the step of using a temporary storage may be omitted, and instead data can copy directly from Protected Storage to an Explosion Room.

In one embodiment, when the user wants to select, for example, a document to work on, they may select the documents folder from a menu. Optionally, this may first trigger a repair process. Unlike computers that are in existence today, instructions in ROM and/or the operating system, (for example) and/or other code that instructs the computer how to operate may be different from current software as follows in this example: When, for example, a user document or folder is selected instead of opening that document/folder, a different sequence of events occurs as described herein. For example, then a repair could be run if a repair had not already been run, and/or the Explosion Room could be replaced with a different Explosion Room, then communication with a Protected Storage (where the users data is stored) could be activated so that data could be copied to a Temporary Storage and/or Explosion Room. Then the document the user selected may be copied from the Protected Storage that contains the users data, to a Temporary Storage (that can for example be a partition on a data storage device, and/or to an Explosion Room. Optionally, in this embodiment, separate isolated video may used so that video of the Explosion Room can not be captured.

In one embodiment, user data can not execute and/or open in Protected Storage. Data can be copied to or from Protected Storage, deleted, duplicated, but not executed and/or opened.

Note that in one embodiment, repair of an Explosion Room may also be defined as replacement of the Explosion Room with another Explosion Room. One method of achieving this is to delete the first Explosion Room, and activate communication with the Second Explosion Room. Alternatively, the first explosion room can be repaired while the second Explosion Room is in use.

Synchronized Activation and Deactivation of Communication

In order to prevent hackers from accessing users' personal data, the connection with the Internet (world wide web) may be routinely deactivated except for when the user is actively sending or receiving E-mail, downloading a document, or surfing the web. A request to activate Internet and/or network communication may automatically trigger code and/or a switching process that deactivates communication with Protected Storage. A request to save to and/or access Protected Storage may automatically trigger code and/or a switching process that deactivates communication with Internet and/or Network communication. Such changes in code can be modifications (for example) to ROM, and/or the operating system, and/or other software that performs such operations. In one embodiment, in order to safeguard this process so that viruses and/or hackers can not mimic the instructions, the code may be isolated, and/or encoded, encrypted, and/or any method of verifying and/or securing the code can be used. Optionally, isolated processing, and/or RAM, and/or control can be utilized to perform these functions. For example, an isolated controller could conduct these functions, and/or conduct any repair and security functions desired to secure this process.

Optionally, activation of Intranet access, (such as communication with a local corporate network), may also be switched on and off, deactivated/activated, be enabled/disabled, may (in one embodiment) only be accessed after a repair is conducted, and optionally, may not be activated while connection to the internet is active. This protects the intranet from hackers, viruses and spy software. In one embodiment, two (or more) communication ports may be utilized for this purpose. Activation/deactivation of network communication may be accomplished by a hardware and/or software switching process.

In another embodiment, network access can be operative while the user is working on data, and/or while the Protected Storage device is communicating with an Explosion Room. In this embodiment, a second isolated Explosion Room is utilized, optionally with isolated video, and/or I/O, etc. In this way the user can simultaneously have network access while working on documents without needing to fear that data may be accessed by hackers, or that viruses could spread to data. This Explosion Room may also access protected storage.

Preventing Virus Contamination When Multiple Documents are Opened; and Modification to E-mail, Internet Software, Databases, and/or Other Software In one embodiment, to decrease the chance that unknown hacking software or viruses are spread, when the user selects a document or E-mail to open, only that one document or E-mail is opened, and all other data is safely stored on the Protected Storage so that it can not be contaminated, hacked, copied, damaged, etc.

Exemplary Safeguards if multiple documents and/or E-mails are opened:

Optionally, in one embodiment, copies of the documents requested to be opened may be copied from the Protected Storage to Temporary Storage. After data is copied to the Temporary Storage, and the user finishes working on one or more documents, documents that have been changed may be saved, but the documents that have not been modified may be automatically destroyed (for example, by the Method of Control) rather than copied back to Primary Storage.

Optionally, multiple isolated Explosion Rooms may be created. In one embodiment, each Explosion Room may have the ability to open only one document (for example this limitation could be included in code in ROM, and/or the operating system, and/or other software). Optionally, in order to prevent the spread of viruses between documents, data may copied between the documents as follows: A copy process is used that does not allow code to execute. For example DMA (direct memory access), and/or an ASIC that may perform "dumb" copying (i.e. does not have the ability to execute code other than the "copy to" command), and/or encoding may be utilized to prevent execution of code during the copy process.

Optionally, a process may be run to review code prior to copying. If the code matches pre-approved strings or requirements it may be copied. If it does not match pre-approved strings or requirements, the user may be warned that a virus may be transferred and asked if he/she wants to continue. For example, code that is equivalent to a dictionary of known words and/or punctuation may be copied, whereas other code may not be copied. Optionally, variations may be brought to a reviewers attention to alloy or deny copy of data.

Optionally, in one embodiment backups of all files may be kept, and if multiple files were opened within the same work area without conducting a repair first, and if an unknown virus is spread between the files, it is possible to use a backup copy. Please note that if a virus were to spread in such a fashion, that that no other files would be contaminated or damaged, and no other harm would have been done.

Optionally, in one embodiment when the user quits one or more document(s) or E-mail, an automated process may take place, for example: The document may be saved to Temporary Storage, processing and/or RAM may be cleared, a repair may be made of the Explosion Room, optionally a backup and/or archive may be made, the data created and/or modified by the user may be saved to Protected Storage. These steps may not take place in the order listed, and not all steps are required.

In one embodiment whenever a request is made to open multiple documents, the code that controls the process may automatically update the current virus checker and run it. (Please note that this automated anti-virus update and run virus checker function can also be optionally triggered upon other events such as updates to master templates, upon starting or completing web access, on a schedule, etc.)

Email, Databases, and Multi-Part Documents and/or Software

E-mail in-boxes and out-boxes are usually stored as large files containing many individual messages. For example one "in-box" may contain all messages that have been sent to a user. Thus when one E-mail is read or sent, the entire E-mail file may be at risk from a virus or hacker.

Optionally, E-mail software may be modified so one E-mail at a time can be copied to the Temporary Storage for use. This would protect other E-mail from contamination. A repair may be run prior to opening the next E-mail.

In one embodiment, address books, and or other E-mail components could be stored in Protected Storage, and only the particular address(es) a user selects may be copied from Protected Storage to a work area to use. Thus, a virus would not have access to a users entire address book. Optionally, updating an address book could be restricted so that a repair process must be first conducted . . . thus protecting the address book from contamination.

Optionally, databases and other software may store multiple files as one large file or database—just as most E-mail programs treat individual Emails as one file. Such software may be modified so that individual files and/or discrete records can be copied to the Temporary Storage and worked on one at a time by the user, so entire databases are not put at risk. A repair may then be run prior to opening the next file or record. For example, each E-mail in an Email in box could be stored as separate file. Alternatively, the location of the data could be entered in a directory and/or database, and only that data could be copied, without to the Temporary Storage and/or Explosion Room without opening any file in protected storage.

In one embodiment code could prevent user data from being opened in Protected Storage.

Optionally, such changes in databases, E-mail, and other software could be made by software manufacturers. Optionally, until then, code can be utilized that could enter the E-mail file or database, extract the data which composes the user request(s), and when the user is done, save the data back again if it has been revised, or if the data has not been revised, delete the copy that the user has viewed.

In another embodiment, databases and/or Email may be treated as follows" here Email is used as an example: If the user chooses to use Email, the E-mail program, inbox, out box, etc. may be copied to an Explosion Room that optionally may not have network connection activated. The Email program may then be opened, and, for example, the directory of folders in the In box may be displayed to the user. However individual E-mails are not opened in this Explosion Room. Instead, if a user selects an E-mail to open, that E-mail may be copied to a second Explosion Room that may optionally have network connection activated as needed) and, then communication with the first Explosion Room may optionally be terminated, and then the E-mail may then be opened. When the user is done reading the E-mail, and for example if the user makes a response to the E-mail, the copy of the response may then be copied back to the first Explosion Room, stored in the Email out (or sent) box, and then the In box, Outbox, and/or Address Book may be copied back to protected storage when the user is done interacting with Email in this manner. This same technique of copying a database to one Explosion Room, and opening a file and/or limited part of the data in a second Explosion Room, can be used for databases and/or other software.

In one embodiment E-mail and/or databases may be copied from the Protected Storage Area to a Explosion Room and/or other data storage device, and one (or more in some cases) E-mail or file(s) can be opened to work on. Only that one Email (or database file) can be opened and worked on and the rest of the E-mail and/or database can be deleted (because it still resides on the Protected Storage Device).

In another embodiment, for example, the entire E-mail database can be opened, one E-mail checked, and on completion of checking that one E-mail the entire database can be deleted from the Protected Storage Device, copied again from the Protected Storage Area, and the next E-mail can be read. Alternatively, only the parts of the database that are modified and/or changed can be deleted. An E-mail response and/or start of a new E-mail letter could be excluded from the deletion process, and may be saved. (Information such as deletion and/or creation of Email and/or database information, and/or other software information, responses to E-mail, etc. may be stored in a file and/or database and optionally that database may be saved to Protected Storage to be used as needed.

Further Description About Temporary Storage Areas

In one embodiment the temporary storage area may be "repaired" by deleting files on it and then, for example, the one (or more) file(s) being worked on can be saved from the Explosion Room back to Temporary Storage Area to be then saved to the Protected Storage Area. The sequence of events does not need to happen in this order.

In one embodiment, no Temporary Storage Area is used, and instead the repair process and/or Method of Control may keep track of the file(s) that is/are being worked on and/or utilized in the Explosion Room, and omits deleting that file(s) during the repair process. A database and/or file and/or directory may be used for this purpose.

Additional Aspects and Embodiments

Optionally, Internet surfing software, and/or E-mail, and or other software may have their own isolated Explosion Rooms so that a user may work on documents and surf or check E-mail without cross contamination. Optionally, a switching process can be used to switch back and forth between these the isolated areas, and/or activate/deactivate communication with Explosion Rooms. In another embodiment, two or more Explosion Rooms may be active simultaneously, but may optionally be isolated until such time as it is safe to establish communication. (for example, until repairs have been conducted, and/or a method of communication is used that does not risk the spread of a virus.

In one embodiment communication between Explosion Rooms and/or Temporary Storage, and/or Protected Storage, and/or other Explosion Rooms may take place without a repair first being conducted, and without risking hacking and/or the spread of a virus. This may be accomplished as follows: Decisions pertaining to coping data, deleting data, movement of data, etc. from one data storage to another would take place using a copy process that is controlled by a Method of Control that is independent of the aforementioned areas . . . thus this code cannot be affected by a virus. Additionally, optionally, the communication process may utilize a copy process that does not allow code to execute.

In one embodiment the work areas can be viewed and/or interacted as independent and isolated video layers. Optionally, each area could utilize isolated RAM and/or processing, and/or RAM and/or processing could be shared between the isolated sides, and cleared before switching takes place.

Optionally, bookmarks and favorites user preferences, and other software may be stored on a Protected Storage when not in use, thus protecting such items from possible contamination and/or hacking. Optionally, to accomplish this, a database, and/or file, and/or directory may be created that contains a list of the associated files that must be copied from Protected Storage during use of an of an application and/or other software. Additionally a list may contain directions and/or locations that data must be copied to in the Explosion Room. Then, for example, on quitting the software, a database and/or directory may be consulted of what to copy back to Protected Storage, and the location(s) where data is to be stored in Protected Storage. For example, if the user selects Netscape to open, then the Method of Control may check a directory of what needs to be copied from Protected Storage to an Explosion Room, and where those files are located, and where they need to be copied in the Explosion Room. Files such as Netscape bookmarks, user data, etc. may thus be copied to the proper locations in a copy of all or part of a Master Template located in the Explosion Room. Then when the user quits using the software, optionally a directory may be consulted listing files to copy and/or the locations of where to copy files to the Protected Storage.

In one embodiment, rather than replacing the prior saved versions of files, the older files may be retained. For example, when the updated Netscape bookmarks and user data are copied back to Protected Storage, they may not replace the previous version of the Netscape bookmarks and history. Thus, the next time the data is used, if it is corrupt and does not operate properly, the Method of Control and/or user may run a repair, and switch back to using a prior version of the data. Optionally, files associated with the corrupt data may also be referenced in a directory and may be not used and/or may be tested for a virus. In this example, next time Netscape is opened, a prior version of the bookmarks and User Data may be copied from Protected Storage to the Explosion Room. Optionally, code may be modified to automate the process of reverting to a prior version of the software automatically if files malfunction. For example if Netscape bookmarks failed to open properly, the Method of Control may automatically run a repair, (or switch to a different Explosion Room) and switch to using a prior version of the data . . . thus an earlier version of Netscape bookmarks and possibly the associated files (user data for example) could be copied to the Explosion Room for use.

Optionally, on a schedule (for example, hourly) the Method of Control may for example activate a connection with an Explosion Room, may automatically check to see if there is a new virus checker available, and if so, download the virus checker, disconnect network communication, run a repair, activate communication with the Explosion Room(s), and/or Protected Storage(s), and run the virus checker. Optionally the virus check may also be run on all downloads. In this example, events need to happen in the order listed.

In one embodiment multiple independent Explosion Rooms can be utilized, and each may have (optionally) its own volatile memory and/or RAM disk, and/or RAM, and/or shell, and/or other form of data storage, and may have associated processing, and/or RAM, and/or ROM, and/or I/O, and/or video, and/or computing. In one embodiment, during execution of user data, the Explosion Room may be isolated, whereas following a repair communication may be established, for example, with Protected Storage, or a network connection.

Rather then repairing a copy of a template in a Explosion Room, the Explosion Room can be deleted and the next Explosion Room can be utilized. Thus, no repair time is required. For example, when a document is quit, instead of running a repair, the Self Repairing User Work Area may be deleted or "removed from service" for repair, and a new and/or repaired Explosion Room may be utilized. Alternatively, multiple shells may be utilized, and the entire contents of the shell can be deleted, and the next shell can be used. Multiple shells and/or RAM and/or Explosion Rooms in volatile memory can be created and made ready for use as needed. These shells and/or RAM disks and/or Explosion Rooms in volatile memory may be isolated from each other to prevent cross contamination.

In one embodiment, although an Explosion Room may be isolated from the user, it may have communication with a repair template and undergo a repair process, and/or a process of creation of a new copy of all or part of one or more Master template(s).

In one embodiment, a secondary comparison can be run after the repair to make sure that no viruses or other software has somehow survived the repair process. In the event that anything did survive, optionally the entire contents of the RAM disk can be deleted and re-created from scratch from the read-only Protected Master Template Partition.

In one Embodiment, data may be transferred between the Protected Storage and the Temporary Storage by using a process that prevents execution of data during the copy process. This may be achieved for example by direct memory access, and/or a process of encoding data, and/or use of a specialized ASIC that for example may perform "dumb" copying, and/or any other method of copying that does not allow the data being copied to execute.

In one embodiment only the software the user needs to use at the moment (optionally including an operating system) is copied into the Explosion Room. Thus, the repair process may run more quickly because there is much less data to compare, and/or copy during the repair process than if all of the applications, utilities, games, and internet software was loaded into the Explosion Room.

Alternatively, in a different embodiment, one or more set(s) of software frequently used by the user(s) can be loaded into Explosion Rooms. Optionally other software, for example, less used software can be copied into the Explosion Room(s) only as needed.

Any number of Explosion Rooms may be created containing any mix and match combinations of software and/or copies of all or part of templates. Some Explosion Rooms may contain one set of software, whereas other Explosion Rooms may contain identical, and/or other sets of software. Optionally, Explosion Rooms may be held in a state that is isolated from the Explosion Room then in use, so they are protected from viruses and hacks. Communication with one or more of them may be established as needed.

In one embodiment, when an application is needed: if the Explosion Room that is in use does not contain desired software, the software needed may be copied from a Master Template. Thus, for example code could check to see if software is located in an Explosion Room, and if not search a database and/or directory and/or file of master template(s) and/or their contents for the software needed.

Optionally, for example, two or more Explosion Rooms can be created, one that, for example, has a complete Master Template, and another that, for example contains only abbreviated set of frequently used applications and the operating system. Optionally, when software is needed, if the Explosion Room does not contain the software, the required software may be added to the Explosion Room, by copying it from a Master Template that may for example contain the full set of the users software and may optionally contain an operating system.

Optionally, if software needed is not contained in an Explosion Room, communication with a second Explosion Room, which may contain for example the full set of the users applications and operating system, can be established and the program can be opened.

In one embodiment, prior to copying from Protected Storage to the Explosion Room, a repair may be run to eliminate all viruses and hacking software, and then communication between Protected Storage and the Explosion Room may be established, the data may be copied from Protected Storage to the Explosion Room, communication between the Explosion Room and Protected Storage may be terminated. Optionally, if RAM(s), RAM disk(s), ROM, shells, and/or other data storage device(s) are used as multiple Explosion Rooms, new Explosion Rooms may generated in advance containing the software needed by the user. Events do not necessarily need to take place in this order.

Optionally, an Explosion room can be switched from read only, to read write and/or locked to unlocked as needed for communication.

In one embodiment, the Protected Storage(s) and/or the Explosion Room(s) can be run as sub-system(s).

Optionally, a control system and or Method of Control (that may contain an operating system) can be run as an isolated and/or read only primary system, and the Explosion Room, can be run as sub-system(s). Optionally, a Method of Control can run as a sub-system.

In one embodiment, a system used to catch hackers and cyber-terrorists can be included as follows:

Explosion Room(s), and/or Partition(s) and/or data storage device(s) may be included that contain information that hackers/cyber terrorists could see over a network, but is not visible to the computer user and/or may be isolated from the user. The Explosion Room(s) may contain what appears to be tantalizing user data, passwords, etc. The Explosion Rooms could also contain what appears to be security software, but such software may be designed to be intentionally "hackable". The Explosion Room(s) may contain software that when copied and/or accessed and/or copied and/or accessed without proper identification sends out information (for example to law enforcement authorities) providing pertinent information such as it's location, the users e-mail address, internet service provider settings and other relevant information. Herein, data storage devices, partitions, and/or software used for this purpose may be referred to as an Anti-Theft/Anti-Cyber terrorist System. In one embodiment, when network communication is deactivated for the Explosion Room(s) in use, communication may be kept active with an Anti-Theft/Anti-Cyber terrorist System.

Optionally, a means of identifying the computer user can be used, (ie: password, retina scan, thumbprint, voice ID, etc.) and if the user identity is not correct, an Anti-theft/Anti-Cyber terrorist partition and/or Explosion Room may be made available to the user, the Protected Data may be locked, and/or encrypted, and/or may be made unavailable, and/or destroyed. Optionally, while the unauthorized user is accessing the bogus files on the Anti-Theft data storage device, and/or partition, and/or Explosion Room, an alert can be sent out over the network, and/or phone system to authorities.

Optionally, the repair process and or Method of Control could backup data, reboot the computer to a working startup data storage device, reformat data storage devices as needed, and copy data back as needed. Optionally, the repair process may utilize a dedicated controller and code to perform these processes.

Optionally, prior to activating network communication: some or all E-mail to be sent can be encrypted. Optionally, a repair can be conducted which would eliminate keystroke recorders and other malicious code. These steps could make it more difficult for a hacker to gain access to the data over a network.

In one embodiment, the Method of Control could make partitions visible and/or invisible. Optionally, visibility of partitions can be password protected, hardware switched, or other means of changing visibility that can not be tampered with by software. The Method of Control can be isolated as needed, for example isolated from an Explosion Room during the time that user data is executed. The Method of Control have an isolated video signal. Optionally, the video single may overlay one or more other video singles on the monitor in an isolated manner, so that video data can not be hacked into (for example from a network, and/or from code executed in an Explosion Room. Optionally, the ability to take a snapshot and/or access both video signals (the primary and/or the secondary and/or others) can be disabled.

Optionally, in one embodiment, Protected Storage can be read only and/or locked until the Method of Control receives a command to move data to an Explosion Room. Thus, in this example, if a user selects a document in the Protected Storage to open, code (that may for example be instructions in ROM and/or an operating system) could instruct the Method of Control to conduct a repair. Then following a repair the Method of Control could switch Protected Storage to read-write and/or unlocked. Data can be copied from the Protected Storage to the Temporary Storage and/or Explosion Room. These events may take place in other order, may contain additional and/or other steps, and/or may not contain some of these steps.

Optionally, one or more operating systems used by the computer may be located on one or more Self Repairing User Work Area(s), and/or isolated data storage device(s), and/or subsystem(s), and/or across a network, or elsewhere.

Optionally, if an operating system and/or data storage device format is damaged, and/or other damage occurs that prevents the computer from operating properly, a secondary system can be utilized to operate the computer and/or conduct and/or initiate the repair process. The first system may be repaired/replaced as needed.

Optionally, one or more copies of master templates and/or operating systems can be readied in isolation, and when needed communication can be activated with them, and communication may be deactivated with the one(s) that had been in use (or the one(s) that had been in use can be deleted and/or deactivated and/or disabled.

In one embodiment, one or more primary operating system(s) can be used to run one or more secondary operating systems. Optionally Explosion Room may contain secondary operating systems.

Optionally, the primary operating system(s) could be read only and/or use protected processing, and/or protected memory and/or be isolated from Explosion Rooms that are in use.

Optionally, the primary operating system could run the general operations of the computer in an isolated and/or independent manner that protects the basic operation of the computer. Optionally the primary operating system could also be used as a control system for the secondary systems, and/or a separate control system could be utilized.

Optionally, Explosion Rooms may run primary and/or secondary and/or additional operating systems.

Optionally multiple Explosion Rooms may operate simultaneously, so that if one "crashes" and/or is quit and/or closed, and/or no longer needed, another Explosion Room is ready to take the place of the Explosion Room that was in use. For example, the Method of Control may switch to a secondary Explosion Room, and/or activate communication with a secondary Explosion Room.

The user(s) and/or software may interact with one or more Explosion Room(s) at a time. Optionally, these Explosion Rooms may be isolated during execution of user data, but following a repair/replacement communication could be established with the Work Area(s).

In another embodiment, Explosion Rooms would be unable to communicate. Instead a Method of Control would copy data between the Explosion Room(s), Protected Storage, and/or other locations. Thus, for example, a virus could never send a command to copy itself to a Protected Storage. Instead, for example, the Method of Control could copy data to protected storage when the data was saved and/or quit. In one embodiment, in order to accomplish this, the method of control may for example check a file, and/or database, and or directory, to determine which files had been copied from Protected Storage to the Explosion Room, and which new files had been created by the user. Optionally, in the event that one or more new files were created in an Explosion Room, the Method of Control may confirm with the user that the files should be saved to protected storage and/or Temporary Storage.

In one embodiment, code associated with Protected Storage may not permit data to execute and/or may not support execution of data in Protected Storage) Thus, in this embodiment, no user data can execute in Protected Storage. Optionally, communication with Protected Storage may never be established with an Explosion Room prior to a repair, and prior to a new network connection with that Explosion Room, and/or prior to the opening of any user document. Thus, Protected Storage is impervious to hacking, and the execution of viruses.

In one embodiment, secondary operating system(s) may utilize protected and/or unprotected memory and/or processing. In the event that protected memory is utilized, one or more of the secondary operating systems may be isolated from each other. Thus, when one system crashes, and/or is no longer to be utilized, the computer may switch to another secondary isolated and/or protected operating system.

In one embodiment, Explosion Rooms may each be identical to each other, and/or may have differences from each other, and/or act as "time delayed" mirrors. In one embodiment secondary Explosion Rooms may be identical, but keystrokes and/or input may be sent to multiple Explosion Rooms in a delayed manner. Thus, some Explosion Rooms may be time delayed so that if a Explosion Room crashed, the control system could switch to a time delayed Explosion Room.

Optionally the user could be warned not to do what they had done, in order to avoid a crash. Optionally, if the computer crashes again, the control operating system could switch to an even more time delayed Explosion Room, hoping to avoid the sequence of events that caused the crash. Optionally as needed the control system could switch to successively older Explosion Room until a crash is successfully avoided. Optionally, in the event of a crash, data in volatile memory may optionally be saved to non-volatile memory.

In one embodiment the Method of Control may utilize a process watcher and/or crash detection system to determine whether to switch to secondary system Explosion Rooms, and optionally may diagnose problems so that problems may be avoided when switching to successively older Explosion Rooms.

Optionally, when an Explosion Room crashes and/or is closed and/or quit and/or is no longer needed, some or all of the contents of volatile memory that is associated with it may be kept to use with subsequent Explosion Rooms, and/or may be deleted. Optionally, the control system could delete and/or clear, and/or replace, and/or modify and/or repair the contents of volatile memory.

Optionally, in one embodiment a control system could utilize one or more RAM disks, and/or ROM, and/or RAM, and/or volatile memory and/or shells, and/or other data storage devices and associated processing and/or memory. The control system could replaced as needed by switching to a secondary control system. A secondary control system can watch a first control system for malfunctions and switch it as needed. Optionally, a process watcher may be utilized for this purpose. Optionally, a control system can function in a manner similar to an Explosion Room, and/or may utilize an Explosion Room.

In one embodiment, data in volatile memory may be copied, and/or saved, and/or backed up to another memory area and/or logic control device prior to executing a command. Successive backups of data prior to execution of commands may be stored. Then, when a command is executed, and if a problem such as a freeze occurs, a new secondary system and/or secondary Self Repairing User Work Area can be used, and/or optionally backups of volatile memory may be loaded into volatile memory. This may provide a good copy of volatile memory for use. If a problem or freeze occurred again, an older version of the saved volatile memory may be utilized. Optionally user(s) may be notified of the problem and asked to change what they input, and/or how they input data, and/or other behavior. Optionally a process watcher and/or error detection system may be used to identify problems. Optionally, when a secondary Explosion Room is used, the Method of Control may choose to utilize an earlier backup of volatile memory, and/or command the secondary system to treat the data differently to avoid a crash.

In one embodiment, a method of control could conduct the copying and/or backup process, so that it could not be influenced by malicious code in an Explosion Room.

In one embodiment an isolated primary operating system could be used to run the basic operations of the computer, and secondary operating systems could be used as Explosion Rooms.

References to volatile and/or non-volatile data storage devices are examples only. Herein, any form of data storage device can be used . . . data storage devices can be mixed and matched as desired. Please also note that data storage devices can consist of hardware, and/or software, and/or a combination of both. All hardware devices and functions can be performed by software and/or "virtual hardware" as desired.

Example of One Particular Embodiment:

Here are some highlights of the concepts in this example:

The user normally does work (or interacts with programs) utilizing an Explosion Room that (until a repair has run) is isolated from the data storage device where the user data (E-mail, documents, etc.) is stored (Protected Storage). Following a repair communication with the Explosion Room may be established.

The only document that is copied to the Explosion Room is that document (or in some cases documents), that the user is going to work on in that session. (A session is a period of computer use until a repair on the Explosion Room is performed). No other user data is accessible, no other data is copied to the user work area.

Thus if a virus were to trigger, or if hacker software was present, the virus or hacking software would ONLY have access to the document(s) the user was then working on. typically only one document.

Optionally, each time that the user quits a document it is saved to the Protected Storage. Optionally, a method of copying may be utilized in which data can not execute.

In one embodiment, each time that the user quits a document the Explosion Room may be repaired in a manner that deletes all known and unknown viruses and hacking software.

Optionally, this repair may be performed using one or more methods. For example a Master Template can be used to make the Explosion Room identical to some or all of one or more Master Templates. All data that is missing, modified, or changed may be replaced by copying data from the Master Template.

Optionally, another method of performing the repair, for example, is to prepare multiple Explosion Rooms in isolation. These Explosion Rooms could be in the form of RAM disks, RAM, shells, volatile memory, or other data storage and may have associated RAM, and/or processing, and/or computing, and could contain copies of all or part of one or more master templates. Isolation could be created for example by activating and/or deactivating communication to switch a Explosion Room from being an isolated backup, to being the current Explosion Room.

Tracking Data:

In one embodiment, information pertaining to files, folders, data, databases, directories, location, size, date of modification, and/or other information may be stored in isolation from the Explosion Room. For example, this data may contain information pertaining to what E-mails a user has opened, sent, the contents of the users "In" box "out" box, what file(s) has been copied to the Explosion Room, what file(s) needs to be copied back to the Explosion Room where files should be saved to, etc. This data may be stored in one or more memory areas, that may be isolated, and/or may be stored in, for example, a Protected Storage area, and/or stored as part of data used by the Method of Control, and or stored on any data storage device.

In a typical computer, files and/or data that is normally stored on a hard drive and/or in an operating system may get updated or changed during use of the computer . . . for example on a Macintosh computer, the desktop database may be updated. In one embodiment, unlike a computer of the prior art, in this embodiment, updated files may be stored to a protected and/or isolated storage device, such as, for example Protected Storage, and/or storage used by the method of control. These and other files may optionally be copied into and from protected and/or isolated storage as desirable, and/or some and/or all of their data may be saved to protected storage. Thus, to avoid destruction of these files they may optionally be saved and not destroyed by the repair process. They may also be recreated as needed. For example, optionally, a desktop database may be created when a new Explosion Room containing copies of all and/or part of one or more Master Templates is created.

Optionally, in one embodiment, in the event that one or more unanticipated, and/or unidentified files appears in the Temporary Storage Area, (for example one or more files that do not appear in a protected database of information pertaining to what data should be in the Temporary Storage Area) the code, for example, in the Method of Control and/or operating system, and/or ROM may draw such files to the attention of the user. The user may be given the option of destroying and/or saving the file(s), and/or marking the file(s) to indicate that the file(s) is/are some way questionable, and/or may need further inspection and/or validation. In another embodiment the unidentified files may be deleted and/or saved to a data storage device and/or marked for further inspection, and/or may be automatically and/or manually sent somewhere for further examination, for example to a network administrator and/or a virus inspection entity.

In one embodiment, a "typical" computer may be modified as follows:

In one embodiment, a Protected Master Template on a non-volatile data storage device is used as needed to repair a locked or read only High Speed Master Template in volatile memory. For example, imagine that it was decided to place a Protected Master Template on a non-volatile data storage device, but to place a High Speed Master template on a volatile data storage device.

Optionally, the Protected Master Template may be locked and/or read only. Optionally, the Protected Master Template may be usually powered off, or put in sleep mode. Optionally, a switching process controlled by a Method of Control may be used to perform the functions of switching power to Protected Master Template, and/or lock/unlock, and/or make read/write data storage devices as needed. Optionally, code in ROM and/or on the hard drive controller and/or the Method of Control may be modified to support this process.

In one embodiment a "typical" computer is modified as follows:

An Explosion Room is included, a means of repairing and/or replacing the Explosion Room via copying from a master template, a means of resetting, and/or clearing, and/or erasing RAM, and/or volatile memory, a means of resetting, and/or clearing, and/or erasing Temporary Storage, a means of unlocking and/or locking and or making read only and/or read write data storage device(s), a means of switching communication with Data Storage Device(s), and/or a means of protecting data on storage devices which may be housed within a computer system and/or externally.

In one embodiment Protected Storage(s) is/are normally made inaccessible by any means prior to a repair process, for example when user data is being executed, when user data has been executed and prior to a repair, when network connection has been made and prior to a repair. For example, in one embodiment Data Storage Device(s) could be switched to read only; switched off; switched inactive; could have communication deactivated; etc.

In one embodiment one or more temporary Data Storage Device(s) may be used to temporarily store data and/or may act as scratch disk(s) and/or may be utilized by applications, software, programs, and/or the operating system as needed. This temporary Data Storage Device may consist of volatile and/or non-volatile memory.

Optionally, a copy of a template may be stored on a temporary storage device and/or other Data Storage Device(s). This template copy may contain applications and/or software needed by the user, and/or repair software, and/or one or more operating systems, and other software as desired.

In one embodiment, one or more Data Storage Device(s) may be hardware and/or software switched between read only and read/write modes and/or locked and/or unlocked mode, and/or accessible and/or inaccessible mode. In one example, a user may open a file from a read only Data Storage Device, does work on the file, and when the user saves the files is saved to a temporary storage area. Optionally, on closing some or all files, logic and/or Method of Control may perform one or more of the following steps, clear and/or reset RAM, clear/reset processor, and/or make one or more data storage devices unlocked and/or locked, and/or read/write and/or read only, move data from temporary storage to Data Storage Device, close/lock/make read only one or more data storage device(s), optionally clear/reset temporary storage area, (optionally run repair process), wait for next user command. In one embodiment, Temporary Storage may consist of volatile and/or non-volatile memory. In one example: random access memory and/or flash ROM, and or other data storage may be used.

In one embodiment, to copy data between documents, data to copy may be loaded into one or more specific address(s) in RAM and/or volatile memory. When receiving a paste command the data may be communicated by use of a copy process that does not allow data to execute.

In one embodiment the Method of Control may control the process of locking and/or unlocking/and/or making read only one or more Data Storage Device areas. Optionally Method of Control fictions may be performed by the primary logic used by the computing device, and optionally may be performed in an isolated manner. Optionally, the method of control could be switched between read only and read/write as needed, and/'or communication with it could be restricted, for example to after repair a process had run.

In one embodiment, prior to running a repair, (and/or other criteria may be used), Protected Storage area may be locked and/or read only.

Associated data may be associated with a particular file by using a database of associated files and/or data, and/or by any method of associating data with a file.

In one embodiment a repair may be run after one or more transactions. In one embodiment a new Explosion Room may be used after one or more transactions. In one embodiment, an Explosion Room can be used as a master template.

In another embodiment, a Method of Control and/or for example ROM, may suspend and or discontinue all processing data in an Explosion Room. Then, a clean operating system (not the one that had been in use in the Explosion Room) and code for copying data may be used to copy data. For example, while processing is suspended in the Work Area, a separate memory such as for example ROM and/or a Method of Control, can be used to perform such functions as enabling communication with Protected Storage and/or copying data to and/or from Protected Storage, and/or enabling other operations with a second Explosion Room. For example allowing another Explosion Room to conduct process, such as checking E-mail. Then, the Method of Control may suspend activity of the Second Explosion Room and let a third and/or the first Explosion Room continue processing data.

In one embodiment, a Method of Control may "referee" which Explosion Room(s) data is being processed, and/or utilizing RAM, and/or utilizing computing ability. The Method of Control may switch back and fourth between giving the right to use computing and/or processing do different Explosion Rooms depending on a variety of criteria. For example, if the user is working in one Explosion Room on a word processing document, and then suddenly selects the E-mail software, processing may be suspended for the Explosion Room that has the word processing document open, and activated for an Explosion Room containing E-mail software. Then, the user may type part of an E-mail, and then select the word processing document again. Then, for example, the Method of Control may suspend processing for the Explosion Room containing E-mail software and activate processing for the Explosion Room containing the word processing document.

In one embodiment, although files may not be opened in Protected Storage, they may be, for example but not limited to: copied, moved, deleted, flagged, backed up, archived, and other such functions. Optionally, additional data storage devices and/or backup and/or archive data storage devices may be attached and/or in communication with Protected Storage. In this case, files may be copied, and/or backed up, and/or archived to and/or from such data storage devices. In one embodiment, in the event that such data storage is across a network and/or may pose a risk to Protected Storage, rather than directly connecting such possibly risky devices directly to the Protected Storage, they may be connected to an Explosion Room, and, optionally following a repair, data may be copied from Protected Storage to an Explosion Room, and then from the Explosion Room to the network attached storage and/or other potentially risky attached and/or other device that may be in communication with the Explosion Room.

In one embodiment, network communication may be disabled except when the user is actively receiving or sending E-mail, surfing the web, downloading/uploading a document, and/or requiring other network access.

Optionally, when network communication is enabled, communication may be disabled between the Protected Storage and the Explosion Room connected to the network.

Using these techniques, a hacker who is attempting to break into the computer from the network only has the opportunity to hack during a very limited time, and during that time has no access to the users data located on the protected hard disk. Optionally, the rest of the time the hacker could only view and/or hack into the optional Anti-Theft, Anti-cyber terrorist Explosion Room.

In one embodiment, assume for example that a document is received by the user and that that was saved to the protected hard disk, was infected with malicious code. It doesn't matter that the document is infected because: 1) when the user had the infected document open the virus was unable to access the user data to damage or infect it, because the user data is stored in Protected Storage that is "protected", for example the power may be turned off, and/or, the communications link is toggled "off" 2) the malicious code was unable to permanently damage the system software or applications thanks to the repair process, and 3) a method of copying the data is used that prevents the unknown virus from executing 4) While in Protected Storage, the malicious code is unable to cause damage because it can not be opened and/or executed in Protected Storage because code associated with protected storage may not enable opening of data. In this manner known and unknown viruses and unknown hacking software is made impotent.

Optionally, changes to bookmarks/favorites, and other changes may be auto saved to Temporary and/or Protected Storage.

In one embodiment, this is an example of one possible dialog when button is pushed:

"A fast (1-3 minutes) repair will start in 20 seconds.

Push button again to cancel repair or select any of these functions:

Cancel repair

Set preferences

Change, remove, or copy from a Master Template

Make, copy from, or delete a backup

Change the quality of repair (diagnostic only, fast, better, best)

Exit"

Of course variations on this dialog may be expected and is only exemplary.

In one embodiment, control over this dialog and related functions may be performed by a controller that is isolated from the Explosion Room(s), so no virus could influence these functions.

In another embodiment, an isolated controller is not required. Instead, there can be communication between the main computer and a controller in a manner that may be for example password protected, encrypted, or other method of providing secure communication and/or to verify the validity of the communication. In this embodiment the controller could interact with the main computer, and optionally, the main computer may take commands from the controller and/or optionally the controller may take commands from the main computer.

In another embodiment, for example, a repair could be required (deleting viruses and hacks) prior to accepting other commands such as to modify a master template, delete backups, etc.

Optionally, in order to run commands that would change preferences, modify master templates, delete backups, etc, a repair may required and/or functions in RAM and/or being processed could be cleared and/or terminated and/or suspended in order to prevent a virus or hacking program from influencing the process, or gathering data.

Herein the term isolation may be used to convey the concept that at times what is being described is isolated; at specific other times as described herein it may not be isolated. For example, an Explosion Room may be isolated when user data is executing, and until a repair process runs. Then, to run a repair process, communication may be established with, for example a read only Master Template, a repair may be conducted, and then other communication may be established with the Explosion Room, such as communication with a network. Isolation is utilized as needed and when needed to prevent hacking and the spread of viruses.

Session: A session is a period of computer use until a repair or replacement of a Explosion Room is performed. For example in one embodiment if the user quits a document, the document may be saved, the session ends. A repair or replacement of the Explosion Room takes place, the user opens the next document.

Saving a document may happen before and/or after, and/or during a repair, depending on the embodiment. For example, in one embodiment, a document may be saved to a Temporary Storage Area, a repair and/or replacement of the Explosion Room that had been used may take place, and then the document may be saved from the Temporary Storage Area to the Protected Storage Area.

In an example of another embodiment, a copy process may be used that prevents the execution of a virus, so the document may be saved to the Protected Storage prior to a repair.

In an example of another embodiment, processing of user data may be suspended and then data may be copied to the Explosion Room "Disposable copies" of Master Templates used in the Explosion Room may be created in many ways and using a variety of criteria. In one embodiment a variety of Master Templates in Explosion Rooms may be created. Criteria for creating Master Templates may be established. For example one criteria could be based on selecting programs commonly used on the computer/computing device. For example, assume that a computer user most commonly uses 1) a word processing program 2) an E-mail program 3) two internet browsers and a utility that prevents pop-ups and a program that tracks on-line auctions; and to a lesser extent uses a variety of other applications, games, utilities and/or other programs. Using this example Master Template(s) could be created using each of these needs as criteria. Thus one Master Template may contain an operating system and a word processing program; another Master Template may contain an operating system and an E-mail program. Another Master Template may contain an operating system, two internet browsers and a utility that prevents pop-ups and a program that tracks on-line auctions; and yet another Master Template may contain all of the users software.

In another embodiment, one (or more) master templates may be created, and only the parts of the Master Template that are needed to meet a criteria may be copied to create one or more Explosion Room(s). For example, there could be one master template, but it could be used to create parts of a Master Template in one or more Explosion Rooms. For example, using the criteria mentioned above, one Master Template may be used to create Explosion Rooms that are readied for possible use by the user. An example of those Explosion Rooms might be:

2 Explosion rooms containing an operating system and the parts of a master template needed to open a word processing program.

2 Explosion rooms containing an operating system and the parts of a master template needed to open an E-mail program.

2 Explosion rooms containing an operating system and the parts of a master template needed to open two internet browsers and a utility that prevents pop-ups and a program that tracks on-line auctions.

2 Explosion rooms containing an operating system and the parts of a master template needed to open all applications, games, utilities and/or other programs.

Then, in this embodiment, for example if the user selected a word processing document to open, then communication could be established with one of the Explosion Rooms containing an operating system and the parts of a master template needed to open a word processing program.

Optionally, for example, if the user wanted to conduct research on the internet while doing word processing, a second Explosion Room can be utilized to surf the web while the user is simultaneously doing word processing in the first Explosion Room. In this case the two Explosion Rooms, processing, RAM, video, etc. may be isolated. Separate and/or shared Protected Storage may be utilized in this case.

A database and/or directory may be maintained by the software to keep track of which components of a master template are needed for which programs to operate correctly. This database/directory may for example be automatically created by software during the installation process (there are already various programs on the market that keep track of what is installed during software installation), and/or such a database/directory may be listed provided by the manufacturer and/or other service and/or entity. For example such a database may be provided as a download from the web, may be included when software is sold, and/or through other means.

In another example of an embodiment, assume there are multiple users of a computer and/or a desire for different software setups for different situations and/or uses. A variety of templates may be created, and/or parts of one or more templates could be selected for creating full or partial copies of Master Templates in Explosion Rooms for different users.

In one embodiment a user may be identified, and based on the user a database of Explosion Rooms containing various templates and/or parts of templates can be established. Thus, for example, when "Mary" logs in and/or is identified as the user, one or more Explosion Rooms may be created containing each containing a copy of one or more copies of Master Templates and/or copies of parts of one or more Master Templates useful and/or appropriate for Mary. When Mary logs out and/or leaves, and "Fred" logs in and/or is identified as the user, one or more Explosion Rooms may be created, each containing a copy of one or more Master Templates and/or copies of parts of one or more Master Templates useful and/or appropriate for Fred. For example in this embodiment, when Fred is identified as the user Explosion Rooms may be created containing copies of all and/or part of Master Templates each containing an operating system and photo editing software; and other Explosion Rooms containing an operating system and E-mail software; whereas when Mary is identified as the user Explosion Rooms may be created containing a different E-mail program than Fred uses, and music editing software; and yet other Explosion Rooms containing a Latin word processing program and a Latin Dictionary.

Explosion Rooms may be primary systems, and/or subsystems and/or contain subsystems, and/or may comprise one and/or part of multiple systems and/or subsystems.

In some embodiments use of an operating system as part of a Master Template may not be necessary.

In one embodiment, the user may be able to select which Explosion Room(s) to utilize/open, and may copy data to the Explosion Room(s). Optionally, selection of Explosion Rooms and/or copies of Master Templates to use may happen automatically, and may be orchestrated by code. For example if the user selects a word processing document to open, when the document is selected code may execute that searches for an Explosion Room containing the appropriate Word Processing software, and/or may check a database and/or directory to identify the location of the appropriate software, and/or use other means to identify the correct software, and/or Explosion Room to utilize.

Input/Output (I/O) may be isolated, video may be isolated, the ability to do screen snapshots and/or captures may be disabled, and/or isolation of video may be utilized to prevent screen captures of isolated data.

In one embodiment, data storage devices and/or controllers may be modified so that they may be physically switched in hardware and/or software can be used to activate/deactivate the data storage device to/from read only to read/write and/or read/write to read only, switched from locked to unlocked and unlocked to locked, on/off, in sleep mode/out of sleep mode, etc. Optionally, pin outs and/or jumpers, and/or software that is isolated from the Explosion Room(s), may be used for this purpose.

Evidence and Documentation

In one embodiment, hacking software, viruses, spy software, software that sends messages without the knowledge or consent of the user, and other undesirable software may be kept as evidence. Rather than destroying such software during a repair, it can instead be placed into isolation using an isolated data storage device and or Storage Room.

In one embodiment, if a user selected a document to open, for example, a word processing document, a Method of Control could trigger a process in which, optionally, a database and/or directory could be checked/searched to see which/where there was an explosion room containing an application needed to open the document. Alternatively, a search of the explosion rooms could be conducted to determine the contents of the Explosion Rooms. Additional criteria may be utilized to select an explosion room. For example if there are multiple templates containing In one embodiment, if an Explosion Room is selected for use, and the user starts work utilizing that Explosion Room, and then decides to open an additional document requiring software that is not contained in the Explosion Room that is then in use various solutions are possible. For example:

Open separate isolated explosion room, optional copy between data between rooms/documents using method to copy in which code cannot execute.

Switch to Explosion Room that contains both Applications needed.

RAM cleared as needed during repair process, and/or as needed during copy process.

Upon identifying an Explosion Room containing the correct application to open the document, communication with that Explosion Room containing a copy of part or all of one or more Master Templates may be activated In one embodiment, upon identifying the correct Explosion Room to activate communication with, and activating that Explosion Room, optionally the word processing document that had been selected by the user could be copied to the explosion room, then optionally communication with the Protected Storage could be deactivated. Then the document(s) could be opened. Then the user may modify the document, and when the user quits the document it may be automatically and/or manually saved to temporary storage (in one embodiment) and/or to Protected Storage (in one embodiment). If it is copied to Temporary Storage, then a repair of the Explosion Room and/or associated RAM may be conducted prior to conducting a repair process and/or deactivating the Explosion Room and activating a new Explosion Room.

User then may then, for example, select another document to open.

Embodiments of Computer System and Method Capable of Supporting Multiple Independent Computing Environments Pages 167-172 of the Appendix illustrate an embodiment of the invention including special purpose sub-systems and a common controller within a computer system that is coupled with a number of peripherals including a display, keyboard, and mouse. As illustrated, a separate logic control device 1180 may be coupled between a first and second special-purpose sub-systems.

Page 173 of the Appendix illustrates an embodiment of the invention including special purpose sub-systems and a common controller within a computer system that is coupled with a number of peripherals including a display, keyboard, and mouse. As illustrated, a controller system may be coupled between a first and second special-purpose sub-systems.

Pages 174-206 of the Appendix illustrate a laptop computer system, according to the prior art.

Pages 207-220 of the Appendix illustrate a laptop computer system incorporating one embodiment of the present invention.

FIG. 14 illustrates a schematic system for supporting multiple independent computing environments, including a computer system capable of supporting multiple independent computing environments may be used to prevent computer hacking. Such a computer system may include a plurality of data stores, a switch system, an 110 system, and one or more computing environments.

One or more data stores may be coupled with the computer system. A data store is representative of a memory area. The data store may represent the memory area that corresponds to a disk drive and/or a portion of a one or more disk drives. According to one embodiment of the present invention, a data store may contain a copy of a master template. One example of a master template is described in the section identified as "Computers that defend against viruses, hacking, spy software, cyber-terrorism, theft, and make malicious code irrelevant".

A protected data store represents a data store that is used for storing information independently of a given processing environment that typically performs processing based on the contents of the store information. According to one embodiment of the present invention, a user file (such as, for example, a user's document) may be stored on a protected data store. Ideally, user edits of the corresponding document are performed independently of the original version of the document that is stored on the protected data store.

One or more data stores may be used to define a protected data store. According to one embodiment of the invention, the protected data store may be used to store user data files independently of a processing environment that modify the user file. According to one alignment of the present invention, a user's decision to edit the document causes the original version of the document to be copied from the protected data store to a second data store. A user computing environment that can be coupled with the second data store for editing the original document may be used to create a second version of the document. An action by the user, such as, for example, saving the second version of the document, generates a series of instructions that copies the second version of the document from the second data store back to the protected data store. Copying the second version of the document back to the protected data store may overwrite the original version of the document.

The general switch system may be used to couple one or more of source and one or more of destination to support a communication between source and the destination. The communication may support bi-directional communications between a source and a destination. The general switch system may be coupled with a switch configuration that is used to determine which sources are to be coupled with which destinations. The general switch system may be implemented in hardware, software, and/or a combination of hardware and software.

According to one embodiment of the present invention, the general switch system may be implemented in hardware as a physical switch. The source may be represented as an IDE drive and the destination may be represented as a computing environment. Each source may be coupled with the general switch system using an IDE cable. Each destination may also be coupled with the general switch system using an IDE cable. According to one embodiment of the present invention, the switch configuration may be represented according to the physical capabilities of the switch and where the IDE cables are physically coupled with the switch. Physical manipulation and/or twisting of the physical switch may thereby connect a given IDE cable corresponding with a source to a given second IDE cable corresponding with a destination for supporting communication between the source and the destination. The communication between the source and the destination may support bi-directional communication. According to one embodiment of the present invention, the switch may be actuated manually and/or under the direction and/or control of one or more computing environment.

At least one trait is used to represent each source and destination. The trait may be representative of a physical identifier and/or a logical identifier. According to the IDE example, described above, each IDE cable may be identified by a physical coupling with the physical switch. The IDE drive information, (such as, for example, master and/or slave designation, drive size, etc.) may be used to identify the drive and/or a data store coupled with the drive.

Similarly, at least one trait is used to represent each destination, such as, for example, a computing environment. If the computing environment is representative of a separate physical computing environment, it may be identified by the separate physical computing characteristics, such as, for example, a unique interface coupled with the general switch. According to one embodiment of the present invention, the computing environment may be represented as a logical computing environment that may share some or all of the physical computing properties that correspond with another computing environment. A logical computing environment may be identified in a variety of ways, such as, for example, through a unique process identifier.

According to another embodiment of the present invention, a general switch system may be implemented in a combination of hardware and software, such as, for example, through the use of a computer system coupled with a general switch system. The computer system is capable of executing one or more computer instructions and may be used to configure the general switch system. Several example instructions may include configuring instructions, communication instructions, and accessing instructions. Configuring instructions may be used for configuring communication to support enabling or disabling communication between a given source and destination. Communication instructions may be used for receiving, sending, and/or verifying information related to one or more configurations. For example, communication instructions may be used to receive information that may subsequently be used by a configuration instruction. Accessing instructions may be used to read and/or write information related to a switch configuration. However, one should appreciate that other instructions and/or sets of instructions may be used.

The data store switch system includes the functionality of a general switch system, where the source may represents a data store and the destination may represent a computing environment. The general configuration may be used to identify which data stores are coupled with which computing environments. As described above, the IDE devices may represent one embodiment of a data store that may be configured to support communication with one or more computing environment.

According to one embodiment of the present invention, the data store switch system may be coupled with a data store switch system configuration that may extend the number and/or type of traits corresponding with a general configuration. The data store switch system traits may further support configuring communication between the source and the destination.

The I/O switch system includes the functionality of a general switch system, where the source may represent a peripheral and the destination may represent a computing environment. The general configuration may be used to identify which data stores are coupled with which computing environments. A keyboard device may represent one embodiment of a peripheral that may be configured to support communication with one or more computing environment.

According to one embodiment of the present invention, the I/O system may be coupled with an I/O system configuration that may extend the number and/or type of traits corresponding with a general configuration. The I/O switch system traits support configuring communication between the source and the destination.

One or more trait may correspond with an output device, such as, for example, a computer monitor and/or computer graphics card. According to one embodiment, a trait my correspond with a display region associated with a potential viewing area of the computer monitor. Display outputs from a source may be positioned according to the display region trait, such that output from one computing environment is directed for display within the region associated with a region trait. A region trait may include a pair of x, y coordinates that define a rectangular display region associated with the potential viewing area of the computer monitor. Accordingly, a display output from a particular computing environment may be represented according to one or more trait within the corresponding region and not another region.

One or more traits may correspond with an input device. As described above, a region trait associated with the potential viewing area may be further extended to identify when inputs are communicated to a particular computing environment. Mouse movement and mouse commands may also correlate with a rectangular display region, such that inputs corresponding with the rectangular display region may be directed to the corresponding computing environment. Consequently, mouse movements within a region may be communicated with a computing environment that corresponds with the same region.

A computing environment may execute one or more computer program instruction. One or more computing environments may be coupled with a computer system. The computing environment may be represented by a physical representation, a logical representation, and/or a combination of physical and logical representations. In a physical representation, the computing environment may incorporate a number of physical computer components, such as, for example, a central processing unit (CPU), one or more memory, and one or more peripheral. In a logical computing environment representation provides that a first computing environment may coexist with other computing environments by utilizing one or more common computing components. The first computing environment is isolated from the other computing environments such that no direct communication is supported between the first computing environment and the other computing environments.

According to one embodiment, a logical computing environment and other logical computing environments may exist in different address spaces that correspond with a computer system. Consequently, each logical computing environment is isolated from the operation of each of the other logical computing environments. Furthermore, one should appreciate that a variety of configurations may be used for the managing the creation and operation of multiple logical computing environments. Furthermore, one should also appreciate that an operating system, (such as for example Linux, Macintosh, Microsoft Windows (R), and/or other operating system), may correspond with a logical computing environment, a physical computing environment, and/or a combination of logical and physical computing environments.

Each computing environment may be identified by at least one trait selected from a wide variety of potential traits that may be used to uniquely identify one or more of the computing environments.

One or more computing environment trait may be used to identify the computing environment. A computing environment trait may be used to uniquely identify the computing environment. The trait may identify a computing environment through corresponding physical attributes, logical attributes, or a combination of attributes. For example, a trait may identify a physical address of one or more computing system components. Alternatively, a trait may identify a logical address corresponding to a logical computing environment. Furthermore, one should also appreciate that a trait may identify a number of characteristics of a given computing environment, and the number and type of corresponding traits may vary in accordance with the present invention.

The computing environment trait may be used to identify one or more output as having originated from the computing environment. The computing environment trait may also be used to identify one or more input and the corresponding computing environment that is a designated recipient of the input.

A data store switch communication path is used to couple a computing environment with the data store switch. The data store switch communication path is used to support the communication with at least one data store according to the data store switch configuration, as described above. According to one embodiment, one of the data stores coupled with the computing environment includes an operating system that may be used by the computing environment as a computer boot device.

An I/O switch communication path is used to couple a computing environment with the I/O switch system. The I/O switch communication path may be used to couple one or more peripheral with one or more computing environments. The I/O switch system configuration may be used to direct the output from one or more computing environments to a single output device. Similarly, the I/O switch system configuration may be used to direct an input from a single peripheral computing device to one or more computing environments.

Each computing environment is typically capable of performing processing activities including receiving input from one or more peripheral through the I/O switch system, and sending output to one or more peripheral through the I/O switch system. The processing activity performed by one computing environment is typically independent of the processing activities of another computing environment. According to one embodiment of the present invention, a potentially malicious processing activity of one computing environment does not directly interfere with the processing activity of another computing environment.

A controlling computing environment may be selected from the computing environments for configuring and/or reconfiguring the data store switch system configuration and/or the I/O switch system configuration. The data store switch system configuration may support communication between the control computing environment and the protected data store, as described above. According to one embodiment of the present invention, an initial boot sequence may identify initial configuration information within the computer CMOS data to identify the control computing environment, the protected data store, and initiate configuration of the data store switch system configuration and/or the I/O switch system configuration.

One or more user computing environment may be selected from the computing environments to perform computer processing in isolation from the controlling computing environments and other user computing environments. Data (such as computer files) may be received by the user computing environment through a data store that may be communicatively coupled with the user computing environment. According to one embodiment, the controlling computing environment that may be communicatively coupled with a first data store that may include user information and a protected data store that may also include user information. The controlling computing environment is configured to support copying information between the protected data store and the first data store. After the controlling computing environment initializes the first data store then the first data store may be communicatively de-attached from the controlling computing environment and then attached to the user computing environment for use independent of other computing environments. After the user computing environment completes an activity (such as for example, editing a file, receiving email, etc.) then the first data store may be communicatively de-attached from the user computing environment and attached to the controlling computing environment. Again, the controlling computing environment is configured to support copying information between the protected data store and the first data store. Consequently, data may be saved independently of the processing activities of the user computing environment. Accordingly, malicious code being processed within a user computing environment does not corrupt other files and/or data stored on a protected data store.

The I/O switch system configuration may be configured to direct a received input to at least one of the computing environment based on a corresponding trait. And, the I/O switch system configuration may be configured to direct an output generated by one or more of the computing environments to a peripherals based on a corresponding trait.

FIGS. 15, 16 and 17 illustrate a method for using a computer system capable of supporting multiple independent computing environments may now be illustrated.

According to one method, using multiple independent computing environments (1508-N) may include initiating a system startup (1602), configuring the I/O switch system configurations (1512) at 1604 and data store switch configurations 1506 at 1604, configuring the I/O switch system 1510 to support communication, configuring the data store switch system 1504 to support communication, performing control processing at 1623, and user processing at 1631. Typically the control processing may also include control setup processing at 1615 and control save processing at 1621.

Initiating a system startup at 1602 may include an initial boot sequence similar to known boot sequences of a computer system. The boot sequence may further include support for defining and/or modifying one or more switch configuration at 1604, such as, for example, a data store switch configuration and/or an I/O switch configuration. The initial configuration of each switching system may be initiated to establish one or more communication paths between one or more source and one or more destination according to the corresponding switch configuration 1604.

According to one embodiment of the present invention, the power may be turned on via a physical switch 1704 to initiate a system startup. At system startup, a CMOS memory 1708 may be used to define one or more step of the initialization process and/or boot sequence. The boot sequence 1706 may use information coupled with the CMOS 1708 to establish a switch system configuration and subsequently initialize the corresponding switch system to apply and/or modify the configuration to communicatively couple sources and destinations. One or more computing environments may also be initiated by the system startup at 1602.

Establishing a computing environment at 1608 and 1622 may include configuring the I/O switch system configurations and data store switch configurations, configuring the I/O switch system to support communication, and configuring the data store switch system to support communication According to one embodiment, two data stores (such as, for example, data stores 1502-1, 1502-N) may be coupled with a computing environment. The first data store may include an operating system to support the processing activities of the computing environment. The second data store may include a variety of information that may be used or operated on by the computing environment. The variety of information may, for example, include specific user information and/or configuration information. Specific user information may include a document that is to be edited by a user. Configuration information may be used of a controlling computing environment to configure a data store switch configuration and/or an I/O switch configuration.

Typically a control computing environment is established at 1608 before any user computing environments are established. A first control computing environment may be established by the boot sequence as described above. The first data store may support an computer operating system. The second data store may represent the protected data store. After the data stores are coupled to the computing environment, then the computing environment may boot to allow a user to interact with the computing environment. User inputs may be received through the I/O switch system 1510 that is configured to communicate inputs that correspond with traits of the control computing environment (such as, for example, a region trait and an computing environment identification trait) to the control computing environment. Similarly, outputs from the control computing environment may be sent to a peripheral (such as, for example, peripheral 1514-1, . . . , 1514-N) based on the traits that correspond with the control computing environment. Accordingly, the control computing environment may boot from the first data store and have access to the protected data store. Consequently, a user may interact with the control computing environment.

Ideally, the only type of computing environment capable of configuring a switch system is the control computing environment. The control computing environment may re-configure the switch system configurations such as the data store switch configuration and the I/O switch configuration. The configuration of the corresponding switch system may be activated in a variety of ways, such as, for example configuring and or reconfiguring communication through the switch when any change to a supporting switch configuration is made and/or determined. Further, communication between the control computing environment and a switch system and/or switch system configuration may be encrypted to help ensure that only the control computing environment is capable of configuring the switch systems.

User processing within the control computing environment is minimized to reduce the potential for corruption of information (such as for example, files) corresponding to the protected data store. According to one embodiment of the present invention, if a user initiates a user operation, such as an activity that may typically be performed by a user, (such as, for example, email, word processing, etc.) then the user operation may be processed in a separate computing environment.

The control computing environment may receive a user input to initiate a user operation. A computer mouse input may be received by the I/O switch system and directed to the control computing environment according to the I/O switch system configuration. Other inputs from other peripherals may also be received by the control computing environment through the I/O switch system.

The user of a control computing environment may initiate a user operation. In one example, the user may double click on a particular icon displayed within a region of the monitor. The mouse action may be received by the control computing environment and result in the initialization at 1612 of a separate computing environment to perform user processing at 1631, such as, for example word processing.

The control computing environment may initialize the creation of a separate processing environment to perform the word processing corresponding with an existing and or new document. If this is an existing document, the control computing session may need to copy a copy of the document to a third data store for subsequent use by a user computing environment.

The control computing environment may configure the switch systems to support the user environment. The data store switch system may be configured to couple a third data store and a fourth data store with the user computing environment. The I/O switch system may be configured to couple peripherals with the user computing environment, such as, for example, a region of the display may be coupled with the user computing environment. The user computing environment may also be initiated by a signal or event triggered by the changes to one or more switch configurations. A variety of alternative approaches may also be used to initialize the user computing environment.

As part of the initialization at 1606 of the user computing environment, the file to be edited may be launched after the user computing environment is booted. According to another embodiment, an existing user computing environment may be coupled with a corresponding data store to make the file available for processing within the user computing environment. According to one embodiment of the present invention, the file or files to be edited may reside in a predefined location, such that a corresponding application may be launched to open the corresponding files and/or support the user activity.

Control processing may be performed by the controlling computing environment, and may include configuring one or more switch configurations, initialization the reconfiguration of one or more switch systems, copying information between one data store to other data stores, copying information between the protected data store and other data stores.

User processing may include interaction with the controlling computing environment and user computing environments. Any processing typically associated with function that may be performed by a user may be configured for processing in an independent user computing environment. Accordingly, the user processing activities may not directly interfere with the processing activities of the controlling computing environment and/or the processing activities of other user computing environments. Information may be made accessible to the user computing environment through the copying of computer information from one data store to another data store depending on the computer information that is necessary to support a particular user processing activity, such as, for example, a word processing activity, may require access to a user file to be edited.

Typically, the control computing process may include control setup processing at 1615 and control save processing at 1628. The control setup may be used to support the establishment of a user computing environment to be used to perform at least one processing activity, such as, for example, a word processing activity. Control save processing may include saving user information to a protected data store. Once the user processing activity is completed, then information related to the user processing activity may be saved into the protected data store at 1618 without allowing the user computing environment to perform the save function directly into the protected data store.

According to one embodiment of the present invention, the controlling computing environment may copy one or more file to a temporary data store. The controlling computing environment may update a data store switch configuration at 1616 to allow a user computing environment access to the temporary data store. According to one embodiment the controlling computing environment may verify the user computing environment has be communicatively coupled with the temporary data store. Subsequently, the controlling computing environment may wait for the processing corresponding to one or more user computing environment at 1614 to complete. While waiting for the user computing environment to complete the controlling computing environment perform the function that may correspond with general desktop functionality. The desktop functionality may correspond to the management of data stores, configuring data stores, and copying of computing information between data stores, such as, for example, to clean one or more data stores of a computer virus. Typically, the functionality corresponding to the desktop functionality is limited to reduce the possibility of corrupting the computing information stored in the protected data store.

At the completion of a user processing activity, the controlling computing environment may be notified according to a variety of different notification approaches. According to one such approach, the user computing environment may terminate such that the termination is sensed by the corresponding switch system. The switch system may activity notify the control computing environment that the data may contain user information that should be placed in the protected data store.

In response to the completion of the user activity, the control computing environment may couple the user data store with the controlling computing environment such that the user information and/or files may be copied to the protected data store independently of any process that may have been performed by the user computing environment. Accordingly, other files stored with the protected data store would not be corrupted by the operation of the independent user computing environment.

According to one embodiment of the present invention, a file save command may be used as a triggering event that causes the controlling computing environment to store a user file to the protected data store independently of other operations that may be preformed within the context of the user computing environment.

According to one embodiment of the present invention, a temporary data store may be coupled with both a user computing environment and a controlling computing environment such that the user computing environment cannot corrupt other files coupled with the controlling computing environment. The user computing environment may save a file in a temporary data store, where the controlling computing environment may include the ability to copy the file to the protected data store and/or an intermediate data store. An intermediate data store may be subsequently used to save a corresponding file to the protected data store, such as, for example, when the user application is closed. Communication between a user computing environment may be passively implemented to help ensure the user computing environment can not corrupt files stored in a protected data store.

A user file may be saved to a temporary data store, as the result of a file save command. Subsequent to the initiation of the save command, the data store switch system may verify that the data store is coupled with a saved file. If the file was present, then a series of instructions may be executed to copy the file from temporary data store to the protected data store.

According to one embodiment of the present invention, the controlling computing environment may wait for a corresponding user computing environment to complete a user activity, such as, for example, saving the file. Subsequently, the data store switch may be configuration to uncouple the temporary data store from the user computing environment. The temporary data store may then be coupled with the controlling computing environment. The protected data is also coupled with the controlling computing environment. The file may be copied from the temporary data store to the protected data store independently of the user computing environment. The temporary data store may then be uncoupled from the controlling computing environment and recoupled with the user computing environment.

According to an alternative embodiment of the present invention, the save process may trip and/or set a flag corresponding to a switching system that is communicated to the controlling computing environment. The presence of one or more files may be verified. If the verification of files indicates the presence of files, then a series of computer instructions may be executed to copy one or more file from the temporary data store to the protected data store.

According to an alternative embodiment of the present invention, a keyboard command (such as, for example, Control S) may be used to save a file. The I/O switch system may be configured to communicate the command sequence to both the user computing environment and the control computing environment. Consequently, the control computing environment may reconfigure the data store switch and/or the I/O switch system to support copying the file saved in the user computing environment to a protected data store.

According to an alternative embodiment of the present invention, the file could be transferred to protected data store when the user computing environment is closed and/or shutdown. One or more of the switch systems could sense the closure and/or shutdown. According to one embodiment of the present invention, a closed user computing environment may be verified by the data store switch system by an altered power state corresponding to the data store that may have been supplied by the user computing environment.

According to an alternative embodiment of the present invention, a graphical region corresponding with a computer display monitor may be used to identify when user inputs have been received that correspond with a particular computing environment. The user input may be analyzed within the I/O switch system and/or within the controlling computing environment depending on the specific implementation. According to one embodiment, a save command and/or a close command corresponding with a user computing environment may be used to identify that user information may need to be saved to a protected data store, and/or trigger the saving of computer information to a protected data store.

Closing the user computing environment may include turning a power switch off. A switching system may be capable of sensing a change in power consumption and/or interruption. If the user closes an application and a corresponding user computing environment then the controlling computing environment may sense the transition and save any corresponding user data to the protected data store. Before reconfiguring the data stores, a corresponding switch system may verify that the power to the data store containing the user data is disabled and/or in an off state. The controlling computing environment may then uncoupled the data store containing user information from the user controlling environment and copy the user information to a protected data store, as described above.

According to one embodiment of the present invention, data stores may be cleaned after they are coupled with a user computing environment. The controlling computing environment may reformat and/or clean one or more data stores after a user computing environment has used the data source. A master template data store may also be used to initialize a data store prior to coupling the data store with a user computing environment. According to another embodiment, the controlling computing environment may initiate another user computing process that is defined to support reformatting and/or cleansing one or more data stores.

The terms used in the present disclosure may use or may correspond with one or more other terms disclosed herein. Several examples of terms that may correspond with other and/or build upon are now described. The additional terms are intended to disclose some potential variations. A control computing environment may correspond similar functionality such as, for example: a combination of a ROM, a memory and a logic controller; a BAR switching system; a common controller. A User computing environment may be related to: a data storage device, explosion room, a MAW, a Network accessible data storage device; a working system. An I/O Switch System may be related to: a switching process; net-lock device; and/or a net-lock system. A Freez-B may be related to a Freeze Buster. A data store switch system may be related to a switching system. A general switch system may be related to: a switching process; and/or a DRAMUS switch. A data store may be related to: a data storage device. These additional descriptions are not intended to limit the present invention.

An additional disclosure directed to aspects and features of the invention is provided in an appendix.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for a computer maintaining an operational status at any time during operation, the method comprising the computer-executed steps of:
    booting from a first hard disk drive boot device disposed within a main computer hardware box of the computer, the first hard disk drive boot device providing a plurality of data stores containing a set of data from the first hard disk drive boot device;
    providing a plurality of isolated processing environments while booted from the first hard disk drive boot device by enabling access to selective data stores during selective data processing tasks;
    processing data in an isolated processing environment and storing data in a data store different from a data store accessed by an isolated processing environment;
    repairing or replacing the processing environment;
    then, in response to a signal indicating a need for repair of the first hard disk drive boot device during the booting or during any operating state, booting from a second hard disk drive boot device also disposed within the main computer hardware box of the computer prior to the signal indicating a need for repair; and
    then repairing software on the first hard disk drive boot device while booted from the second hard disk drive boot device and selectively either: (i) maintaining operation of the computer from the second hard disk drive boot device during repairing of the software on the first hard disk drive boot device, or (ii) changing to operation of the computer from the second hard disk drive boot device to the first hard disk drive boot device and providing isolated data processing while booted from the second hard disk drive boot device.

2. The method of claim 1, wherein the step of repairing software further comprises: copying software from a device other than the first boot device onto the first boot device.

3. The method of claim 2, wherein the step of copying software further comprises: copying any of application, operating-system and repair-process software.

4. The method of claim 2, wherein the step of copying software further comprises: copying any of a boot record, a partition table, and a basic input-output system (BIOS).

5. The method of claim 2, wherein the step of repairing software further comprises: copying software from the second boot device onto the first boot device.

6. The method of claim 5, wherein the step of repairing software further comprises: copying one of template, backup and archive software from a device other than the first boot device onto the first boot device.

7. The method of claim 6, wherein the step of repairing comprises: copying one of template, backup and archive software from the second boot device onto the first boot device.

8. The method of claim 1, wherein the step of booting from a second boot device comprises: switching the second boot device, thereby making the second boot device bootable.

9. The method of claim 8, wherein the step of switching comprises: generating the signal indicating a need for repair.

10. The method of claim 8, wherein the step of booting from a second boot device comprises: logically switching the second boot device.

11. The method of claim 8, wherein the step of booting from a second boot device comprises: physically switching the second boot device.

12. The method of claim 11, wherein the step of physically switching comprises:
    altering identification jumpers of a data storage device to be switched.

13. The method of claim 11, wherein the step of physically switching comprises:
    turning on or off the power to a data storage device to be switched.

14. The method of claim 1, wherein the signal is generated by a user altering the state of a physical switch different from an on-off switch of the computer and exposed on an exterior surface of the main computer hardware box of the computer.

15. The method of claim 1, wherein the step of repairing software comprises:
    automatically repairing software on the first boot device.

16. The method of claim 15, wherein the step of automatically repairing software comprises: automatically repairing software on the first boot device without further direction from the user.

17. The method of claim 15, wherein the step of automatically repairing software comprises: repairing software on the first boot device according to preset preferences.

18. The method of claim 17, wherein the repairing according to preset preferences comprises: repairing according to whether to recover data; to run a virus check; to reformat the first boot device; to revert to a backup; or to run diagnostics.

19. The method of claim 1, wherein the step of repairing software comprises: reformatting the first boot device; and then copying software onto the first boot device.

20. The method of claim 1, wherein the step of repairing software comprises: resetting parameters in a persistent memory; and then copying software onto the first boot device.

21. The method of claim 1, further comprising the step of: directing a user to re-boot from the first boot device.

22. The method of claim 1, wherein before the step of booting from the second boot device, the following step is performed: installing software onto the second boot device.

23. The method of claim 22, wherein the step of installing software onto the second boot device comprises one method from the following set of methods: a. installing software onto the second boot device; b. copying installed software onto the second boot device; c. copying installation software onto the second boot device; and d. writing onto the second boot device a version of an operating environment running as a result of the boot from the first boot device.

24. The method of claim 22, wherein the step of installing software onto the second boot device comprises one method from the following set of methods: a. installing software onto the second boot device; b. copying installed software onto the second boot device; c. copying installation software onto the second boot device; and d. writing onto the second boot device a template of an operating environment running as a result of the boot from the first boot device.

25. The method of claim 22, wherein after the step of installing and before the step of booting from the second boot device, the following step is performed: updating the software installed onto the second boot device.

26. The method of claim 22, wherein after the step of installing and before the step of booting from the second boot device, the following step is performed: protecting the second boot device from further modification.

27. The method of claim 26, wherein the step of protecting comprises one of: switching the second boot device to a state of unavailability; and switching the second boot device to a read-only state.

28. The method of claim 1, wherein before the step of repairing software the following step is performed: offering a user a choice of thoroughness of repair.

29. The method of claim 1, wherein before the step of booting from the second boot device, the following step is performed: automatically monitoring an operating environment running as a result of the booting from the first boot device.

30. The method of claim 29, further comprising the step of: detecting an undesirable change in the operating environment; and generating the signal indicating a need for repair in response to the detection.

31. The method of claim 1, wherein before the step of booting from the second boot device, the following step is performed: automatically searching for boot devices.

32. The method of claim 1, wherein:
the step of repairing software further comprises copying software from the second boot device onto the first boot device;
the step of copying software further comprises copying any of application, operating-system and repair-process software, and copying any of a boot record, a partition table, and a basic input-output system (BIOS);
the step of repairing software further comprises copying one of template, backup and archive software from a device other than the first boot device onto the first boot device;
the step of repairing comprises copying one of template, backup and archive software from the second boot device onto the first boot device;
the step of booting from a second boot device comprises switching the second boot device to make the second boot device bootable;
the step of switching comprises generating the signal indicating a need for repair;
the step of booting from a second boot device comprises one of logically switching the second boot device, and physically switching the second boot device; and
the step of physically switching comprises altering identification jumpers of a data storage device to be switched, or turning on or off the power to a data storage device to be switched;
the signal is generated by a user altering the state of a physical switch different from an on-off switch of the computer and exposed on an exterior surface of the main computer hardware box of the computer; and
the step of repairing software comprises automatically repairing software on the first boot device without further direction from the user according to preset preferences, the preset preferences selected from the set consisting of repairing according to whether (i) to recover data, (ii) to run a virus check, (iii) to reformat the first boot device, (iv) to revert to a backup; (v) to run diagnostics, and (vi) combinations thereof.

33. The method of claim 32, wherein the step of repairing software further comprises: reformatting the first boot device; and then copying software onto the first boot device.

34. The method of claim 32, wherein the step of repairing software further comprises: resetting parameters in a persistent memory; and then copying software onto the first boot device.

35. The method of claim 1, wherein before the step of repairing software the following step is performed: offering a user a choice of thoroughness of repair selected from the set of repairs consisting of a quick repair that re-installs or copies template software without first re-formatting, a better repair that performs a high-level re-format before that copy or re-installation of software, and a best repair that performs a low-level re-format before copying over or re-installing software.

36. The method of claim 1, wherein:
the step of repairing software further comprises: (i) copying software from a device other than the first boot device onto the first boot device, and the step of copying software further comprises copying any of application, operating-system and repair-process software, wherein such copying may include copying any of a boot record, a partition table, and a basic input-output system (BIOS); (ii) copying software from the second boot device onto the first boot device, and either or both of copying one of template, backup and archive software from a device other than the first boot device onto the first boot device and copying one of template, backup and archive software from the second boot device onto the first boot device;
the step of booting from a second boot device comprises switching the second boot device, thereby making the second boot device bootable, and the step of switching comprises generating the signal indicating a need for repair; the signal is generated by a user altering the state of a physical switch different from an on-off switch of the computer and exposed on an exterior surface of the main computer hardware box of the computer;

the step of automatically repairing software comprises automatically repairing software on the first boot device without further direction from the user including repairing software on the first boot device according to preset preferences;

the repairing according to preset preferences includes repairing according to whether to recover data, to run a virus check, to reformat the first boot device, to revert to a backup, to run diagnostics;

the step of repairing software further includes resetting parameters in a persistent memory; and then copying software onto the first boot device;

wherein before the step of booting from the second boot device, installing software onto the second boot device, the step of installing software onto the second boot device comprises one procedure from the following set of procedures: installing software onto the second boot device, copying installed software onto the second boot device copying installation software onto the second boot device, and writing onto the second boot device a version of an operating environment running as a result of the boot from the first boot device.

37. A computer comprising:
a main computer hardware box;
a CPU disposed within the main computer hardware box for supporting a plurality of processing environments;
a memory disposed within the main computer hardware box for providing a plurality of data stores;
at least one peripheral;
first and second controllers for respective first and second hard disk drive data storage devices disposed within the main computer hardware box;
a bus, communicatively coupling the CPU, memory, at least one peripheral, and first and second controllers;
at least one instruction set for communicatively coupling or decoupling a selective processing environment and a selective data store when the selective processing environment is communicatively coupled to the at least one peripheral; and
a switch, communicatively coupled to the second hard disk drive data storage device, for altering the accessibility of the second data storage device to the CPU and exposed through the main computer hardware box or at a surface of the main computer hardware box for manipulation by a user.

38. The computer of claim 37, wherein the second data storage device contains one of a backup and a master template.

39. The computer of claim 37, further comprising a power supply, for powering the CPU and the switch.

40. The computer of claim 39 wherein the power supply comprises: the power supply, for powering the switch when not powering the CPU.

41. The computer of claim 37, wherein the switch is mechanical.

42. The computer of claim 37, wherein the switch is at least partially software.

43. The computer of claim 37, the switch comprising: a switch for switching an identification setting of the second data store.

44. The computer of claim 37, the switch comprising: a switch for switching power to the second data store.

45. The computer of claim 37, further comprising: an output device.

46. The computer of claim 45, wherein the output device comprises one from the set comprising a CRT, an LED, and an LCD.

47. The computer of claim 37, wherein the second data storage device comprises: a read-only data storage device.

48. The computer of claim 37, wherein the second data storage device comprises: an externally located data storage device.

49. The computer of claim 37, wherein the second data storage device comprises: a data storage device located over a network.

50. The computer of claim 37, wherein the second data storage device comprises: a data storage device co-located with the first data storage device.

51. The computer of claim 37, wherein the switch comprises: a controller for monitoring the first and second data storage devices to prevent damage to the first or second data storage device during switching.

52. A computer system comprising:
a plurality of data stores including at least one protected data store;
a plurality of switching system for communicatively coupling at least one source with a plurality of destinations, including a data store switch system wherein said source is a data store source, and a I/O switch system wherein said source is a peripheral source;
a plurality of computing environments for performing a processing activity independently of another computing environment, wherein each said computing environment is coupled between said data store switch system and said I/O switch system;
a plurality of traits for identifying each said computing environment and each said peripheral source, wherein said switching system communicatively couples said source and said destination according to said traits without requiring a reboot;
at least one control computing environment selected from said plurality of computing environments for configuring said switch configuration according to said processing activity and said traits, communicatively coupled with said protected data store; and
at least one user computing environment selected from said plurality of computing environments, wherein said processing activity is not performed on said protected data store.

53. The computer system of claim 52, wherein said computing system is further comprises:
a main computer hardware box;
a CPU disposed within the main computer hardware box;
a memory disposed within the main computer hardware box;
said data store switch system coupled between said memory and said CPU, said I/O switch system coupled between said peripheral and said CPU, said plurality of switching systems disposed within the main computer hardware box; and
a bus, communicatively coupling the CPU, memory, data store switch system, and I/O switch system.

54. The computer system of claim 52, wherein said computing system further comprises:
a main computer hardware box;

at least three CPUs including a control computing CPU and a plurality of user computing CPUs, said CPUs disposed within the main computer hardware box;

at least three memories disposed within the main computer hardware box;

said data store switch system coupled between said memories and said CPUs, said I/O switch system coupled between said peripheral and said CPUs, said plurality of switching systems disposed within the main computer hardware box; and a bus, communicatively coupling the CPUs, the memories, the data store switch system, and the I/O switch system, wherein said control computing environment is coupled with a control computing CPU, and said user computing environment is coupled with a second CPU selected from said user computing CPUs.

55. A computer system comprising:

a plurality of data stores including a plurality of magnetic rotatable disk drives;

a protected data store selected from said plurality of data stores for storing at least said user data;

a data store switch system coupled with said plurality of data stores, said switch system coupled with a data store switch configuration for configuring communication with one or more data store;

an I/O switch system coupled with at least one peripheral, said I/O system coupled with an I/O system configuration including a plurality of traits for configuring said communication with said peripheral;

a plurality of computing environments, each said computing environment identified by at least one trait selected from said plurality of traits, including: a data store switch communication path coupled with said data store switch, said data store switch communication path coupling at least one data store with said computing environment according to said data store switch configuration; an I/O switch communication path coupled with said I/O switch system, said I/O switch communication path for coupling said peripheral with said computing environment according to said I/O switch system configuration;

said computing environment capable of performing a processing activity including receiving input from said I/O switch system and sending output to said i/o switch system, said processing activity performed independently of said processing activity of another computing environment;

a control computing environment selected from said plurality of computing environments for configuring said data store switch configuration, for configuring said I/O switch system configuration, said data store switch configuration supporting communication between said control computing environment and said protected data store; and at least one user computing environment selected from said plurality of computing environments;

wherein said I/O switch system configuration is configured to direct a received input to at least one of said computing environment based on said trait, said I/O switch system configuration is configured to direct an output generated by one or more of said plurality of computing environments to said peripheral based on said trait without requiring a reboot of the computer system.

56. A computer system comprising:

a plurality of processing environments, a communication device for communicating over a communications link to a second computer system, a port for communicatively coupling a processing environment selected from said plurality of processing environments and said communication device over a bus having a plurality of data lines; and a switch coupled within said data line selected from said plurality of data lines for selectively enabling and disabling said communication device when communicatively coupled to a first processing environment selected from said plurality of processing environments and not communicatively coupled to a second processing environment selected from said plurality of processing environments.

57. The computer system of claim 56 wherein said communication device is a network interface card disposed within a main computer hardware box and said switch is affixed to said network interface card.

58. A computer system comprising:

a plurality of processing environments, a port for communicatively coupling a processing environment selected from said plurality of processing environments and a peripheral over a bus having a plurality of data lines, such bus disposed within a main computer hardware box of the plurality of processing environments; and a switch coupled to at least one data line selected from said plurality of data lines for cycling said peripheral when communicatively coupled to a first processing environment selected from said plurality of processing environments and not communicatively coupled to a second processing environment selected from said plurality of processing environments.

59. The computer system of claim 58 wherein said port is serial controller, said peripheral is a serial mouse, said bus is a serial bus coupling said serial mouse and said port, wherein said cycling includes temporarily grounding said data line for resetting said coupling between said computer system and said peripheral.

60. A computer system comprising:

a plurality of bootable data stores;

a boot drive selected from said plurality of bootable data stores for booting said computer system; a plurality of processing environments; and a physical data store switch coupled with said plurality of bootable data stores for altering the accessibility of said bootable data stores and identifying said boot drive when communicatively coupled to a first processing environment selected from said plurality of processing environments and not communicatively coupled to a second processing environment selected from said plurality of processing environments.

61. The computer system of claim 60 further comprising:

a main computer hardware box; a CPU disposed within the main computer hardware box;

a memory disposed within the main computer hardware box; and a bus, communicatively coupling the CPU, the memory, and the physical data store switch for altering the identification of the bootable data stores to the CPU, said physical data store switch exposed through the main computer hardware box or at a surface of the main computer hardware box for manipulation by a user.

62. A computer system comprising:

a plurality of processing environments, a plurality of data stores;

a data store switch coupled with said plurality of data stores for altering the accessibility of said data store;

a peripheral controller for communicatively coupling said data store switch and said plurality of processing environments;

an accessible data store selected from said plurality of data stores communicatively coupled with said peripheral controller; and a computer program including at least one instruction capable of executing on a processing environment selected from the plurality of processing environments, said instruction for analyzing said accessible data store to determine a health of said accessible data store; said health selected from a group of healths consisting of: a corruption health, and a correct health; if said corruption health is determined then said data store switch is operative to decouple said accessible data store and said selected processing environment, and communicatively couple a second accessible data store and said selected processing environment, if said correct health then said data store switch remains is not altered.

63. The computer system of claim 62 further comprising:

a main computer hardware box;

a CPU disposed within the main computer hardware box;

a memory disposed within the main computer hardware box;

each of said data store represents a computer hard disk drive, said plurality of data stores includes eight data stores disposed within the main computer hardware box;

wherein said health is determined for one data store in said plurality of said data stores, if said health is said corruption health then a successive data store health is determined; and a bus, communicatively coupling the CPU, memory and plurality of data stores.

64. A computer having a plurality of processing environments, a communications link, a data port, and a means to switch a data line of a communications link to selectively interrupt or enable the ability of the communications link to transfer data to a data port when communicatively coupled to a first processing environment selected from said plurality of processing environments and not communicatively coupled to a second processing environment selected from said plurality of processing environments.

65. A computer having a plurality of processing environments, at least one peripheral, at least one bus, a shared power line between the at least one bus and the at least one peripheral, and a means for switching a power line of a bus to powering the at least one peripheral on or off when the at least one peripheral is communicatively coupled to a first processing environment selected from the plurality of processing environments and not communicatively coupled to a second processing environment selected from the plurality of processing environments.

66. A method for isolated data processing comprising: providing a plurality data storages; providing a plurality of processing environments, storing pristine files or file sets in a first data storage selected from the plurality of data storages; providing a copy of said pristine files or file sets in a second data storage selected from the plurality of data storages different from the first data storage; processing data in a processing environment when said processing environment is communicatively coupled with the second data storage but not the first data storage; and then in response to a signal indicating a need for repair of the second data storage, decoupling the processing environment from the second data storage and copying selective data from the first data storage to the second data storage.

* * * * *